US008435109B2

(12) United States Patent
Yoshizawa

(10) Patent No.: US 8,435,109 B2
(45) Date of Patent: May 7, 2013

(54) GAMING MACHINE WITH MECHANICAL REEL ROTATABLE THROUGH PLAYER'S OPERATION AND CONFIRMATION METHOD OF SYMBOL

(75) Inventor: Kazumasa Yoshizawa, Tokyo (JP)

(73) Assignee: Universal Entertainment Corporation, Tokyo (JP)

( * ) Notice: Subject to any disclaimer, the term of this patent is extended or adjusted under 35 U.S.C. 154(b) by 918 days.

(21) Appl. No.: 12/396,296

(22) Filed: Mar. 2, 2009

(65) Prior Publication Data

US 2009/0227353 A1 Sep. 10, 2009

Related U.S. Application Data

(60) Provisional application No. 61/037,489, filed on Mar. 18, 2008, provisional application No. 61/035,176, filed on Mar. 10, 2008, provisional application No. 61/038,612, filed on Mar. 21, 2008, provisional application No. 61/035,873, filed on Mar. 12, 2008, provisional application No. 61/038,643, filed on Mar. 21, 2008.

(51) Int. Cl.

| | |
|---|---|
| ***A63F 9/24*** | (2006.01) |
| ***A63F 13/00*** | (2006.01) |
| ***G06F 17/00*** | (2006.01) |
| ***G06F 19/00*** | (2011.01) |

(52) U.S. Cl.
USPC .................................................. 463/20

(58) Field of Classification Search .................... 463/16, 463/20, 21, 25, 29, 17, 18
See application file for complete search history.

(56) References Cited

U.S. PATENT DOCUMENTS

| | | | | |
|---|---|---|---|---|
| 5,580,055 | A | 12/1996 | Hagiwara | |
| 2004/0053661 | A1 * | 3/2004 | Jones et al. | 463/16 |
| 2007/0117605 | A1 * | 5/2007 | Ghaly | 463/16 |

* cited by examiner

*Primary Examiner* — Olik Chaudhuri
*Assistant Examiner* — Quovaunda V Jefferson
(74) *Attorney, Agent, or Firm* — Lexyoume IP Meister, PLLC.

(57) ABSTRACT

The gaming machine includes: a game requiring a player's bet; a reel used in the game and mechanically driven to rotate; a plurality of symbols on the reel; a display capable of generating a video image; an input device which receives an input by the player; and a controller which is programmed to carry out the steps of: (a1) receiving an input inputted through the input device; (a2) when the input is a rotation command related to the reel, rotating the reel while the rotation command is being inputted; and (a3) successively displaying, on the display, a video image of at least one of the symbols on the reel in sync with the rotation of the reel.

6 Claims, 95 Drawing Sheets

FIG. 6

| | FIRST SYMBOL COLUMN | SECOND SYMBOL COLUMN | THIRD SYMBOL COLUMN |
|---|---|---|---|
| CODE NUMBER | SYMBOL | SYMBOL | SYMBOL |
| 00 | JACKPOT 7 | JACKPOT 7 | JACKPOT 7 |
| 01 | BELL | CHERRY | ORANGE |
| 02 | APPLE | ORANGE | PLUM |
| 03 | BELL | APPLE | STRAWBERRY |
| 04 | CHERRY | ORANGE | BELL |
| 05 | ORANGE | PLUM | PLUM |
| 06 | PLUM | ORANGE | APPLE |
| 07 | CHERRY | PLUM | BLUE 7 |
| 08 | BELL | ORANGE | PLUM |
| 09 | APPLE | PLUM | ORANGE |
| 10 | BELL | ORANGE | BELL |
| 11 | STRAWBERRY | PLUM | ORANGE |
| 12 | PLUM | BELL | PLUM |
| 13 | BLUE 7 | STRAWBERRY | CHERRY |
| 14 | BELL | BLUE 7 | APPLE |
| 15 | APPLE | BELL | STRAWBERRY |
| 16 | BELL | CHERRY | CHERRY |
| 17 | STRAWBERRY | PLUM | BELL |
| 18 | PLUM | ORANGE | PLUM |
| 19 | CHERRY | PLUM | ORANGE |
| 20 | BELL | ORANGE | CHERRY |
| 21 | APPLE | PLUM | PLUM |

FIG. 7

PAYOUT CONTROL TABLE

| WINNING COMBINATION | BASIC GAME |
|---|---|
| PLUM | 5 |
| ORANGE | 8 |
| BELL | 10 |
| CHERRY | 20 |
| STRAWBERRY | 30 |
| BLUE 7 | 40 |

FIG. 8

FREE GAME QUANTITY TABLE

| ACCUMULATED POINTS | NUMBER OF FREE GAMES TO BE PLAYED |
|---|---|
| 0 | 10 |
| 1 | 20 |
| 2 | 40 |
| 3 | 60 |
| 4 | 80 |
| 5 | 100 |
| 6 | 120 |
| 7 | 140 |
| 8 | 160 |
| 9 | 180 |
| 10 | 200 |

FIG. 23

| | FIRST SYMBOL COLUMN | SECOND SYMBOL COLUMN | THIRD SYMBOL COLUMN | FOURTH SYMBOL COLUMN | FIFTH SYMBOL COLUMN |
|---|---|---|---|---|---|
| CODE NUMBER | SYMBOL | SYMBOL | SYMBOL | SYMBOL | SYMBOL |
| 00 | JACKPOT 7 | JACKPOT 7 | JACKPOT 7 | JACKPOT 7 | JACKPOT 7 |
| 01 | PLUM | BELL | CHERRY | ORANGE | APPLE |
| 02 | ORANGE | APPLE | ORANGE | PLUM | ORANGE |
| 03 | PLUM | BELL | APPLE | STRAWBERRY | BELL |
| 04 | ORANGE | CHERRY | ORANGE | BELL | PLUM |
| 05 | PLUM | ORANGE | PLUM | PLUM | BLUE 7 |
| 06 | ORANGE | PLUM | ORANGE | APPLE | ORANGE |
| 07 | PLUM | CHERRY | PLUM | BLUE 7 | APPLE |
| 08 | BLUE 7 | BELL | ORANGE | PLUM | PLUM |
| 09 | CHERRY | APPLE | PLUM | ORANGE | BELL |
| 10 | ORANGE | BELL | ORANGE | BELL | CHERRY |
| 11 | BELL | STRAWBERRY | PLUM | ORANGE | PLUM |
| 12 | ORANGE | PLUM | BELL | PLUM | BELL |
| 13 | STRAWBERRY | BLUE 7 | STRAWBERRY | CHERRY | ORANGE |
| 14 | BLUE 7 | BELL | BLUE 7 | APPLE | APPLE |
| 15 | ORANGE | APPLE | BELL | STRAWBERRY | PLUM |
| 16 | APPLE | BELL | CHERRY | CHERRY | CHERRY |
| 17 | PLUM | STRAWBERRY | PLUM | BELL | ORANGE |
| 18 | ORANGE | PLUM | ORANGE | PLUM | BELL |
| 19 | PLUM | CHERRY | PLUM | ORANGE | ORANGE |
| 20 | BLUE 7 | BELL | ORANGE | CHERRY | PLUM |
| 21 | CHERRY | APPLE | PLUM | PLUM | STRAWBERRY |

FIG. 24

PAYOUT CONTROL TABLE

| WINNING COMBINATION | BASIC GAME |
|---|---|
| PLUM | 5 |
| ORANGE | 8 |
| BELL | 10 |
| CHERRY | 20 |
| STRAWBERRY | 30 |
| BLUE 7 | 40 |

FIG. 25

FREE GAME QUANTITY TABLE

| ACCUMULATED POINTS | NUMBER OF FREE GAMES TO BE PLAYED |
|---|---|
| 0 | 10 |
| 1 | 20 |
| 2 | 40 |
| 3 | 60 |
| 4 | 80 |
| 5 | 100 |
| 6 | 120 |
| 7 | 140 |
| 8 | 160 |
| 9 | 180 |
| 10 | 200 |

FIG. 41

| | FIRST SYMBOL COLUMN | SECOND SYMBOL COLUMN | THIRD SYMBOL COLUMN |
|---|---|---|---|
| CODE NUMBER | SYMBOL | SYMBOL | SYMBOL |
| 00 | JACKPOT 7 | JACKPOT 7 | JACKPOT 7 |
| 01 | BELL | CHERRY | ORANGE |
| 02 | APPLE | ORANGE | PLUM |
| 03 | BELL | APPLE | STRAWBERRY |
| 04 | CHERRY | ORANGE | BELL |
| 05 | ORANGE | PLUM | PLUM |
| 06 | PLUM | ORANGE | APPLE |
| 07 | CHERRY | PLUM | BLUE 7 |
| 08 | BELL | ORANGE | PLUM |
| 09 | APPLE | PLUM | ORANGE |
| 10 | BELL | ORANGE | BELL |
| 11 | STRAWBERRY | PLUM | ORANGE |
| 12 | PLUM | BELL | PLUM |
| 13 | BLUE 7 | STRAWBERRY | CHERRY |
| 14 | BELL | BLUE 7 | APPLE |
| 15 | APPLE | BELL | STRAWBERRY |
| 16 | BELL | CHERRY | CHERRY |
| 17 | STRAWBERRY | PLUM | BELL |
| 18 | PLUM | ORANGE | PLUM |
| 19 | CHERRY | PLUM | ORANGE |
| 20 | BELL | ORANGE | CHERRY |
| 21 | APPLE | PLUM | PLUM |

FIG. 42

PAYOUT CONTROL TABLE

| WINNING COMBINATION | BASIC GAME |
|---|---|
| PLUM | 5 |
| ORANGE | 8 |
| BELL | 10 |
| CHERRY | 20 |
| STRAWBERRY | 30 |
| BLUE 7 | 40 |

FIG. 43

FREE GAME QUANTITY TABLE

| ACCUMULATED POINTS | NUMBER OF FREE GAMES TO BE PLAYED |
|---|---|
| 0 | 10 |
| 1 | 20 |
| 2 | 40 |
| 3 | 60 |
| 4 | 80 |
| 5 | 100 |
| 6 | 120 |
| 7 | 140 |
| 8 | 160 |
| 9 | 180 |
| 10 | 200 |

FIG. 59

| | FIRST SYMBOL COLUMN | SECOND SYMBOL COLUMN | THIRD SYMBOL COLUMN | FOURTH SYMBOL COLUMN | FIFTH SYMBOL COLUMN |
|---|---|---|---|---|---|
| CODE NUMBER | SYMBOL | SYMBOL | SYMBOL | SYMBOL | SYMBOL |
| 00 | JACKPOT 7 | JACKPOT 7 | JACKPOT 7 | JACKPOT 7 | JACKPOT 7 |
| 01 | PLUM | BELL | CHERRY | ORANGE | APPLE |
| 02 | ORANGE | APPLE | ORANGE | PLUM | ORANGE |
| 03 | PLUM | BELL | APPLE | STRAWBERRY | BELL |
| 04 | ORANGE | CHERRY | ORANGE | BELL | PLUM |
| 05 | PLUM | ORANGE | PLUM | PLUM | BLUE 7 |
| 06 | ORANGE | PLUM | ORANGE | APPLE | ORANGE |
| 07 | PLUM | CHERRY | PLUM | BLUE 7 | APPLE |
| 08 | BLUE 7 | BELL | ORANGE | PLUM | PLUM |
| 09 | CHERRY | APPLE | PLUM | ORANGE | BELL |
| 10 | ORANGE | BELL | ORANGE | BELL | CHERRY |
| 11 | BELL | STRAWBERRY | PLUM | ORANGE | PLUM |
| 12 | ORANGE | PLUM | BELL | PLUM | BELL |
| 13 | STRAWBERRY | BLUE 7 | STRAWBERRY | CHERRY | ORANGE |
| 14 | BLUE 7 | BELL | BLUE 7 | APPLE | APPLE |
| 15 | ORANGE | APPLE | BELL | STRAWBERRY | PLUM |
| 16 | APPLE | BELL | CHERRY | CHERRY | CHERRY |
| 17 | PLUM | STRAWBERRY | PLUM | BELL | ORANGE |
| 18 | ORANGE | PLUM | ORANGE | PLUM | BELL |
| 19 | PLUM | CHERRY | PLUM | ORANGE | ORANGE |
| 20 | BLUE 7 | BELL | ORANGE | CHERRY | PLUM |
| 21 | CHERRY | APPLE | PLUM | PLUM | STRAWBERRY |

FIG. 60

PAYOUT CONTROL TABLE

| WINNING COMBINATION | BASIC GAME |
|---|---|
| PLUM | 5 |
| ORANGE | 8 |
| BELL | 10 |
| CHERRY | 20 |
| STRAWBERRY | 30 |
| BLUE 7 | 40 |

FIG. 61

FREE GAME QUANTITY TABLE

| ACCUMULATED POINTS | NUMBER OF FREE GAMES TO BE PLAYED |
|---|---|
| 0 | 10 |
| 1 | 20 |
| 2 | 40 |
| 3 | 60 |
| 4 | 80 |
| 5 | 100 |
| 6 | 120 |
| 7 | 140 |
| 8 | 160 |
| 9 | 180 |
| 10 | 200 |

FIG. 79

| | FIRST SYMBOL COLUMN | SECOND SYMBOL COLUMN | THIRD SYMBOL COLUMN |
|---|---|---|---|
| CODE NUMBER | SYMBOL | SYMBOL | SYMBOL |
| 00 | JACKPOT 7 | JACKPOT 7 | JACKPOT 7 |
| 01 | BELL | CHERRY | ORANGE |
| 02 | APPLE | ORANGE | PLUM |
| 03 | BELL | APPLE | STRAWBERRY |
| 04 | CHERRY | ORANGE | BELL |
| 05 | ORANGE | PLUM | PLUM |
| 06 | PLUM | ORANGE | APPLE |
| 07 | CHERRY | PLUM | BLUE 7 |
| 08 | BELL | ORANGE | PLUM |
| 09 | APPLE | PLUM | ORANGE |
| 10 | BELL | ORANGE | BELL |
| 11 | STRAWBERRY | PLUM | ORANGE |
| 12 | PLUM | BELL | PLUM |
| 13 | BLUE 7 | STRAWBERRY | CHERRY |
| 14 | BELL | BLUE 7 | APPLE |
| 15 | APPLE | BELL | STRAWBERRY |
| 16 | BELL | CHERRY | CHERRY |
| 17 | STRAWBERRY | PLUM | BELL |
| 18 | PLUM | ORANGE | PLUM |
| 19 | CHERRY | PLUM | ORANGE |
| 20 | BELL | ORANGE | CHERRY |
| 21 | APPLE | PLUM | PLUM |

FIG. 80

PAYOUT CONTROL TABLE

| WINNING COMBINATION | BASIC GAME |
|---|---|
| PLUM | 5 |
| ORANGE | 8 |
| BELL | 10 |
| CHERRY | 20 |
| STRAWBERRY | 30 |
| BLUE 7 | 40 |

FIG. 81

FREE GAME QUANTITY TABLE

| ACCUMULATED POINTS | NUMBER OF FREE GAMES TO BE PLAYED |
|---|---|
| 0 | 10 |
| 1 | 20 |
| 2 | 40 |
| 3 | 60 |
| 4 | 80 |
| 5 | 100 |
| 6 | 120 |
| 7 | 140 |
| 8 | 160 |
| 9 | 180 |
| 10 | 200 |

GAMING MACHINE WITH MECHANICAL REEL ROTATABLE THROUGH PLAYER'S OPERATION AND CONFIRMATION METHOD OF SYMBOL

CROSS REFERENCE TO RELATED APPLICATION

The present application claims priority from provisional application No. 61/037,489, which was filed on Mar. 18, 2008, provisional application No. 61/035,176, which was filed on Mar. 10, 2008, provisional application No. 61/038,612, which was filed on Mar. 21, 2008, provisional application No. 61/035,873, which was filed on Mar. 12, 2008, provisional application No. 61/038,643, which was filed on Mar. 21, 2008, the entire disclosure of which are herein incorporated by reference.

BACKGROUND OF THE INVENTION

1. Field of the Invention

The present invention relates to a gaming machine capable of awarding a payout according to a combination of a plurality of symbols, and a confirmation method of a symbol.

2. Description of Related Art

A known gaming machine, as disclosed in U.S. Pat. No. 5,580,055, has a cabinet, a plurality of cylindrical reels arranged in parallel in the cabinet, a plurality of symbols arranged on an outer circumferential surface of each of the reels, a drive mechanism which rotatably supports each of the reels, and a reel window through which a part of the outer circumferential surface of the reels is visible from outside the cabinet. In this gaming machine, by rotating each of the reels, the symbols on each reel are variably displayed inside the reel window. When each of the reels stop, and the combination of the symbols shown in the reel windows form a predetermined combination, a payout according to the combination of the symbols is awarded. Thus, in a known gaming machine, arrangements or combinations of symbols are closely related to a profit of a player.

The objects of the present invention are to provide a gaming machine which enables a player to easily recognize an arrangement of a symbol on a reel, and a confirmation method of a symbol.

SUMMARY OF THE INVENTION

The present invention deals with a gaming machine including: a game requiring a player's bet; a reel used in the game and mechanically driven to rotate; a plurality of symbols on the reel; a display capable of generating a video image; an input device which receives an input by the player; and a controller which is programmed to carry out the following steps.

Specifically, the controller carries out the steps of: (a1) receiving an input inputted through the input device; (a2) when the input is a rotation command related to the reel, rotating the reel while the rotation command is being inputted; and (a3) successively displaying, on the display, a video image of at least one of the symbols on the reel in sync with the rotation of the reel.

For example, the reel rotates while the player is inputting a rotation command through the input device. In short, the reel rotates in response to an operation by the player. Hence, the player is able to successively confirm the symbols actually arranged on the reel by the player him/herself carrying out an operation to rotate the reel. In addition, a video image of at least one of the symbols on the reel is successively displayed on the display in sync with the rotation of the reel. Thus, a symbol is also able to be confirmed with a video image of a virtual symbol. Thus, the player is able to easily recognize a symbol arrangement.

The present invention deals with a gaming machine including: a game requiring a player's bet; a reel, for use in the game, which is mechanically driven to rotate and whose rotation direction is switchable; a plurality of symbols arranged on the reel; a display capable of generating a video image; an input device disposed so that at least a part of the display area of the display is visible through the input device, for receiving an input through a press operation by the player; and a controller which is programmed to carry out the following steps.

Specifically, the controller carries out the steps of: (b1) displaying a video image of a direction symbol indicating a rotation direction of the reel; (b2) specifying an input position in the input device; (b3) when the input position corresponds to a display position of the direction symbol, determining that a rotation command related to the reel is inputted; (b4) rotating the reel in a rotation direction indicated by the direction symbol while the rotation command is being inputted; and (b5) successively displaying, on the display, a video image of at least one of the symbols on the reel in sync with the rotation of the reel.

The above structure enables a player to input a rotation command related to a reel associated with a direction symbol simply by pressing a specific area, of the input device, corresponding to a display position of the direction symbol, while a video image of the direction symbol is visible on the display. In short, the reel is rotatable in one direction or the other in response to an operation by the player. A rotation direction of a reel is shown as an image. Hence, the player is able to successively confirm the symbols actually arranged on the reel by the player him/herself carrying out an operation to rotate the reel. In addition, a video image of at least one of the symbols on the reel is successively displayed on the display in sync with the rotation of the reel. Thus, a symbol is also able to be confirmed with a video image of a virtual symbol. Thus, the player is able to easily recognize the symbol arrangement. Further, the player who operates the reel is able to easily determine a rotation direction of the reel.

The present invention deals with a gaming machine including: a game requiring a player's bet; a special game separately runnable from the game; a reel used in the game and mechanically driven to rotate; a plurality of symbols on the reel; a display capable of generating a video image; an input device which receives an input by the player; and a controller which is programmed to carry out the following steps.

Specifically, the controller carries out the steps of: (c1) specifying an input position in the input device; (c2) when the input is a rotation command related to the reel, to rotate the reel while the rotation command is being inputted; (c3) successively displaying, on the display, a video image of at least one of the symbols on the reel in sync with the rotation of the reel; (c4) when a predetermined condition is met as a result of the game, running the special game; and (c5) based on the result of the special game, displaying, on the display, a video image of all the symbols arranged on the reel.

According to the above structure, the reel rotates while the player is inputting a rotation command through the input device. In short, the reel rotates in response to an operation by the player. Hence, the player is able to successively confirm the symbols actually arranged on the reel by the player him/herself carrying out an operation to rotate the reel. In addition, a video image of at least one of the symbols on the reel is successively displayed on the display in sync with the rotation of the reel. Thus, a symbol is also able to be confirmed with a video image of a virtual symbol. Thus, a player is able to easily recognize the symbol arrangement. Further, a video image of all the symbols arranged on the reel is displayed on the display based on a result of the special game. Thus, the player is able to recognize all the symbols on the reel more easily while enjoying the special game.

The present invention deals with a gaming machine including: a game requiring a player's bet; a special game separately runnable from the game, a reel, for use in the game, which is mechanically driven to rotate and whose rotation direction is switchable; a plurality of symbols arranged on the reel; a display capable of generating a video image; an input device disposed so that at least a part of a display area of the display is visible through the input device, for receiving an input from a press operation by the player; and a controller which is programmed to carry out the following steps.

Specifically, the controller carries out the steps of: (d1) displaying a video image of a direction symbol indicating a rotation direction of the reel; (d2) specifying an input position in the input device; (d3) when the input position corresponds to a display position of the direction symbol, to determine that a rotation command related to a reel is inputted; (d4) rotating the reel associated with the direction symbol in a rotation direction indicated by the direction symbol while the rotation command is being inputted; (d5) successively displaying, on the display, a video image of at least one of the symbols on the reel in sync with the rotation of the reel; (d6) when a predetermined condition is met as a result of the game, running the special game; and (d7) based on the result of the special game, displaying, on the display, a video image of all the symbols arranged on the reel.

The above structure enables a player to input a rotation command related to a reel associated with a direction symbol simply by pressing a specific area, of the input device, corresponding to a display position of the direction symbol, while a video image of the direction symbol is visible on the display. In short, the reel is rotatable in one direction or the other in response to an operation by the player. A rotation direction of a reel is shown as an image. Hence, the player is able to successively confirm the symbols actually arranged on the reel by the player him/herself carrying out an operation to rotate the reel. In addition, a video image of at least one of the symbols on the reel is successively displayed on the display in sync with the rotation of the reel. Thus, a symbol is also able to be confirmed with a video image of a virtual symbol. Thus, a player is able to easily recognize the symbol arrangement. Moreover, with the gaming machine, the player who operates the reel is able to easily determine a rotation direction of the reel. Further, a video image of all the symbols arranged on the reel is displayed on the display based on a result of the special game. Thus, the player is able to recognize all the symbols on the reel more easily while enjoying the special game.

The present invention deals with a confirmation method of a plurality of symbols arranged on a reel which is mechanically driven to rotate and used in a game requiring a player's bet. The reel rotates while a rotation command is being inputted by the player, and a video image of at least one of the symbols arranged on the reel is successively displayed on the display, in sync with the rotation of the reel.

According to the above structure, the reel rotates while the player is inputting a rotation command. In short, the reel rotates in response to an operation by the player. Thus, the player is able to successively confirm the symbols actually arranged on the reel by the player him/herself carrying out an operation to rotate the reel. Thus, the player is able to easily recognize a symbol arrangement on the reel.

The present invention deals with a gaming machine including: a game requiring a player's bet; a reel used in the game and mechanically driven to rotate; a plurality of symbols on the reel; an input device that is disposed to visibly cover at least the reel and receives an input through a press operation by the player; and a controller that is programmed to operate (a1) to specify an input position in the input device; (a2) when the input position corresponds to a front area of the reel, to determine that a rotation command related to the reel is inputted; and (a3) to rotate the reel in a rotation direction indicated by a rotation direction component of the reel included in a movement direction based on the input position while the rotation command is being inputted.

According to the above structure, when a player presses a front area of a reel in an input device, a rotation command is inputted. When the input position through the press in the front area is moved, the reel is rotated in a rotation direction indicated by a rotation direction component of the reel included in a movement direction based on the input position. In short, the reel rotates in response to the player's operation of moving the input position while pressing the front of the reel. Hence, the player is able to successively confirm the symbols actually arranged on the reels by the player him/herself carrying out an operation to rotate the reel. Thus, the gaming machine enables the player to easily recognize the symbol arrangement on the reel. Moreover, when the input position is moved while pressing the input device disposed at the front of the reel, the reel rotates in response to the movement. Thus, the gaming machine enables the player to feel as if s/he is directly touching and rotating the reel.

The present invention deals with a gaming machine including: a game requiring a player's bet; a reel used in the game and mechanically driven to rotate to change a rotation speed; a plurality of symbols on the reel; an input device that is disposed to visibly cover at least the reel and receives an input through a press operation by the player; and a controller that is programmed to operate (b1) to specify an input position in the input device; (b2) when the input position corresponds to a front area of the reel, to determine that a rotation command related to the reel is inputted; (b3) to extract a rotation direction component of the reel included in a movement direction based on the input position and to obtain a movement speed relative to the rotation direction component; and (b4) to rotate the reel in a rotation direction indicated by the rotation direction component so that the symbols are moved at the movement speed relative to the rotation direction component while the rotation command is being inputted.

According to the above structure, when a player presses a front area of a reel in an input device, a rotation command is inputted. When the input position through the press in the front area is moved, the reel is rotated in a rotation direction indicated by a rotation direction component so that the symbols are moved at movement speed relative to the rotation direction component included in a movement direction based on the input position. In short, the reel rotates in response to the player's operation of moving the input position while pressing the front of the reel. Hence, the player is able to successively confirm the symbols actually arranged on the reels by the player him/herself carrying out an operation to rotate the reel. Thus, the gaming machine enables the player to easily recognize the symbol arrangement on the reel. Moreover, when the input position is moved while pressing the input device disposed at the front of the reel, the reel rotates so that the symbols correctly follow the movement. Thus, the gaming machine enables the player to feel as if s/he is directly touching and rotating the reel.

The present invention deals with a gaming machine including: a game requiring a player's bet; a reel used in the game and mechanically driven to rotate to completely switch a rotation direction; a plurality of symbols on the reel; a display capable of generating a video image; an input device that is disposed to visibly cover the reel and at least a part of a display area of the display and receives an input through a press operation by the player; and a controller that is programmed to operate (c1) to display a video image of a direction symbol indicating a rotation direction of the reel; (c2) to specify an input position in the input device; (c3) when the input position corresponds to a front area of the reel, to determine that a rotation command related to the reel is inputted; (c4) to rotate the reel in a rotation direction indicated by a rotation direction component of the reel included in a movement direction based on the input position while the rotation command is being inputted; (c5) when the input position corresponds to a display position of the direction symbol, to determine that a rotation command related to a reel is inputted, and (c6) to rotate the reel in a rotation direction indicated by the direction symbol while the rotation command is being inputted.

According to the above structure, when a player presses a front area of a reel in an input device, a rotation command is inputted. When the input position through the press in the front area is moved, the reel is rotated in a rotation direction indicated by a rotation direction component of the reel included in a movement direction based on the input position. In short, the reel rotates in response to the player's operation of moving the input position while pressing the front of the reel. Hence, the player is able to successively confirm the symbols actually arranged on the reels by the player him/herself carrying out an operation to rotate the reel. Thus, the gaming machine enables the player to easily recognize the symbol arrangement on the reel. Moreover, when the input position is moved while the player is pressing the front of the reel, the reel rotates in response to the movement. Thus, the gaming machine enables the player to feel as if s/he is directly touching and rotating the reel.

The above structure enables a player to input a rotation command related to a reel associated with a direction symbol simply by pressing a specific area of the input device corresponding to a display position of the direction symbol, while a video image of the direction symbol is visible on the display. In short, the reel is capable of switching the rotation direction through the direction symbol. Further, the rotation direction is shown as an image with the direction symbol. Hence, the player is able to successively confirm the symbols actually arranged on the reels by the player him/herself carrying out an operation to rotate the reel with the direction symbol. Thus, the gaming machine enables the player to easily recognize the symbol arrangement on the reel. Moreover, with the gaming machine, the player who operates the reel is able to easily determine a rotation direction of the reel.

The present invention deals with a gaming machine including: a game requiring a player's bet; a reel used in the game and mechanically driven to rotate to change rotation speed and to switch a rotation direction; a plurality of symbols on the reel; a display capable of generating a video image; an input device that is disposed to visibly cover the reel and at least a part of a display area of the display and receives an input through a press operation by the player; and a controller that is programmed to operate (d1) to display a video image of a direction symbol indicating a rotation direction of the reel; (d2) to specify an input position in the input device; (d3) when the input position corresponds to a front area of the reel, to determine that a rotation command related to a reel is inputted; (d4) to extract a rotation direction component of the reel included in a movement direction based on the input position and to obtain movement speed relative to the rotation direction component; (d5) to rotate the reel in a rotation direction indicated by the rotation direction component so that the symbols are moved at the movement speed relative to the rotation direction component while the rotation command is being inputted; (d6) when the input position corresponds to a display position of the direction symbol, to determine that a rotation command related to a reel is inputted; and (d7) to rotate the reel in a rotation direction indicated by the direction symbol while the rotation command is being inputted.

According to the above structure, when a player presses a front area of a reel in an input device, a rotation command is inputted. When the input position through the press in the front area is moved, the reel is rotated in a rotation direction indicated by a rotation direction component of the reel included in a movement direction based on the input position so that the symbols are moved at the movement speed relative to the rotation direction component. In short, the reel rotates in response to the player's operation of moving the input position while pressing the front of the reel. Hence, the player is able to successively confirm the symbols actually arranged on the reels by the player him/herself carrying out an operation to rotate the reel. Thus, the gaming machine enables the player to easily recognize the symbol arrangement on the reel. Moreover, when the input position is moved while the player is pressing the input device disposed at the front of the reel, the reel rotates so that the symbols correctly follow the movement. Thus, the gaming machine enables the player to feel as if s/he is directly touching and rotating the reel.

The above structure enables a player to input a rotation command related to a reel associated with a direction symbol simply by pressing a specific area, of the input device, corresponding to a display position of the direction symbol, while a video image of the direction symbol is visible on the display. In short, the reel is capable of switching the rotation direction through the direction symbol. Further, the rotation direction is shown as an image with the direction symbol. Hence, the player is able to successively confirm the symbols actually arranged on the reels by the player him/herself carrying out an operation to rotate the reel with the direction symbol. Thus, the gaming machine enables the player to easily recognize the symbol arrangement on the reel. Moreover, with the gaming machine, the player who manually operates the reel is able to easily determine a rotation direction of the reel.

The present invention deals with a confirmation method of a plurality of symbols on a reel that is used in a game requiring a player's bet, and is mechanically driven to rotate. The method includes the steps of: receiving an input by a player; specifying an input position of the input; when the input position corresponds to a front area of the reel, determining that a rotation command related to the reel is inputted; and rotating the reel in a rotation direction indicated by a rotation direction component of the reel included in a movement direction based on the input position while the rotation command is being inputted.

According to the above structure, the reel rotates in response to the player's operation of moving the input position while pressing the front of the reel. Hence, the player is able to successively confirm the symbols actually arranged on the reels by the player him/herself carrying out an operation to rotate the reel. Thus, the gaming machine enables the player to easily recognize the symbol arrangement on the reel. Moreover, when the input position is moved while pressing the front area of the reel, the reel rotates in response to the movement. Thus, the gaming machine enables the player to feel as if s/he is directly touching and rotating the reel.

The present invention relates to a gaming machine including: a game requiring a player's bet; a reel used in the game and mechanically driven to rotate; a plurality of symbols on the reel; an input device which receives an input by the player; and a controller which is programmed to carry out the steps of: (a1) receiving an input inputted through the input device; and (a2) when the input is a rotation command related to the reel, stopping the reel after rotating the reel by an amount equivalent to one symbol.

According to the above structure, the reel moves by an amount equivalent to one symbol when the player inputs a rotation command through an input device. In other words, the reel intermittently rotates by an amount equivalent to one symbol every time a player inputs a rotation command. Thus, the player is able to successively confirm the symbols actually arranged on the reel by the player him/herself carrying out an operation to rotate the reel. Thus, the player is able to easily recognize a symbol arrangement.

The present invention relates to a gaming machine including: a game requiring a player's bet; a reel used in the game and mechanically driven to rotate; a plurality of symbols on the reel; an input device which receives an input by the player; and a controller which is programmed to carry out the steps of: (b1) receiving an input inputted through the input device; (b2) when the input is a rotation command related to the reel, determining whether the rotation command is inputted through tapping or continuous pressing; (b3) when the input is through tapping, stopping the reel after rotating the reel by an amount equivalent to one symbol; and (b4) when the input is through continuous pressing, rotating the reel while the rotation command is being inputted.

According to the above structure, when the player inputs a rotation command through the input device by tapping, the reel moves by an amount equivalent to one symbol. Otherwise the reel rotates while the rotation command is being inputted. In short, the reel rotates intermittently by an amount equivalent to one symbol, as well as continuously in accordance with a player's operation. Thus, the player is able to successively confirm the symbols actually arranged on the reel by the player him/herself carrying out an operation to rotate the reel. Thus, the player is able to easily recognize a symbol arrangement.

The present invention relates to a gaming machine including: a game requiring a player's bet; a reel, for use in the game, which is mechanically driven to rotate and whose rotation direction is switchable; a plurality of symbols on the reel; a display capable of generating a video image; an input device disposed so that at least a part of the display area of the display is visible through the input device, for receiving an input through pressing by the player; a controller which is programmed to carry out the steps of: (c1) displaying a video image of a direction symbol indicating a rotation direction of the reel; (c2) specifying an input position in the input device; (c3) when the input position corresponds to a display position of the direction symbol, to determine that a rotation command related to the reel is inputted; and (c4) stopping the reel after rotating the reel in a direction indicated by the direction symbol by an amount equivalent to one symbol.

The above structure enables a player to input a rotation command related to the reel simply by pressing a specific area, of the input device, corresponding to a display position of the direction symbol, while a video image of the direction symbol is visible on the display. The reel rotates in a direction indicated by the direction symbol by an amount equivalent to one symbol. In short, the reel is intermittently rotatable in one direction or the other by an amount equivalent to one symbol every time a player inputs a rotation command. In addition, a rotation direction of the reel is shown as an image. Thus, a player is able to successively confirm the symbols actually arranged on the reel by the player him/herself carrying out an operation to rotate the reel. Thus, the player is able to easily recognize a symbol arrangement. Further, with the gaming machine, a player who operates the reel is able to easily determine a rotation direction of the reel.

The controller according to the present invention is further programmed to carry out the step of: (c5) successively displaying, on the display, a video image of at least one of the symbols on the reel in sync with the rotation of the reel.

With the above structure, a video image of at least one of the symbols on the reel is successively displayed on the display in sync with the rotation of the reel. Thus, a symbol is also able to be confirmed with a video image of a virtual symbol. Hence, a player is able to recognize a symbol arrangement more easily.

The present invention relates to a gaming machine including: a game requiring a player's bet; a reel, for use in the game, which is mechanically driven to rotate and whose rotation direction is switchable; a plurality of symbols on the reel; a display capable of generating a video image; an input device disposed so that at least a part of the display area of the display is visible through the input device, for receiving an input through a press operation by the player; a controller which is programmed to carry out the steps of: (d1) displaying a video image of a direction symbol indicating a rotation direction of the reel; (d2) specifying an input position in the input device; (d3) when the input position corresponds to a display position of the direction symbol, to determine that a rotation command related to the reel is inputted; (d4) when the rotation command is inputted through tapping, stopping the reel after rotating the reel by an amount equivalent to one symbol; (d5) when the rotation command is inputted through continuous pressing, rotating the reel while the rotation command is being inputted; and (d6) successively displaying, on the display, a video image of at least one of the symbols on the reel in sync with the rotation of the reel.

The above structure enables a player to input a rotation command related to the reel simply by pressing a specific area, of the input device, corresponding to a display position of the direction symbol, while a video image of the direction symbol is visible on the display. When the rotation command is inputted through tapping during this operation, the reel rotates in a direction indicated by a direction symbol by an amount equivalent to one symbol. On the other hand, when the rotation command is inputted through continuous pressing, rotating the reel in a direction indicated by a direction symbol while the rotation command is being inputted. In short, the reel is intermittently rotatable in response to a player's operation. Further, the reel is selectively rotated continuously and intermittently in a desired rotation direction. In addition, a rotation direction of the reel is shown as an image. Thus, the player is able to successively confirm the symbols actually arranged on the reel by the player him/herself carrying out an operation to rotate the reel. Thus, the player is able to easily recognize a symbol arrangement. Further, with the gaming machine, the player who operates the reel is able to easily determine a rotation direction of the reel.

In addition, according to the above structure, a video image of at least one of the symbols on the reel is successively displayed on the display in sync with the rotation of the reel. Thus, a symbol is also able to be confirmed with a video image of a virtual symbol. Hence, a player is able to recognize a symbol arrangement more easily.

The present invention relates to a gaming machine including: a game requiring a player's bet; a reel, for use in the game, which is mechanically driven to rotate and whose rotation direction is switchable; a plurality of symbols on the reel; a display capable of generating a video image; an input device disposed so that at least a part of the display area of the display is visible through the input device, for receiving an input through a press operation by the player; a controller which is programmed to carry out the steps of: (e1) displaying a video image of a direction symbol indicating a rotation direction of the reel; (e2) specifying an input position in the input device; (e3) when the input position corresponds to a display position of the direction symbol, to determine that a rotation command related to the reel is inputted; (e4) when the rotation command is inputted through tapping, counting the number of tapping; (e5) stopping the reel after rotating the reel by an amount equivalent to the number of symbols corresponding to the number of times input has been conducted; (e6) when the rotation command is inputted through continuous pressing, rotating the reel while the rotation command is being inputted; and (e7) successively displaying, on the display, a video image of at least one of the symbols on the reel in sync with the rotation of the reel.

The above structure enables a player to input a rotation command related to the reel simply by pressing a specific area, of the input device, corresponding to a display position of the direction symbol, while a video image of the direction symbol is visible on the display. For example when the rotation command is inputted through one tapping, the reel rotates in a direction indicated by a direction symbol by an amount equivalent to one symbol. Meanwhile, when the rotation command is inputted through continuous pressing, the reel rotates in a direction indicated by a direction symbol while the rotation command is being inputted. In short, the reel is intermittently rotatable in response to a player's operation. Further, the reel is selectively rotated continuously and intermittently in a desired rotation direction. In addition, a rotation direction of the reel is shown as an image. Thus, the player is able to successively confirm the symbols actually arranged on the reel by the player him/herself carrying out an operation to rotate the reel. Thus, the player is able to easily recognize a symbol arrangement. Further, with the gaming machine, the player who operates the reel is able to easily determine a rotation direction of the reel.

Further, according to the above structure, a video image of at least one of the symbols on the reel is successively displayed on the display in sync with the rotation of the reel. Thus, a symbol is also able to be confirmed with a video image of a virtual symbol. Thus, a player is able to recognize a symbol arrangement more easily.

Further, tapping enables the reel to be moved by an amount equivalent to the number of symbols corresponding to the number of times input has been conducted. Thus, tapping offers wider selection of symbol confirmation methods.

The present invention deals with a confirmation method of a plurality of symbols arranged on a reel which is mechanically driven to rotate and used in a game requiring a player's bet, including the steps of: receiving a player's input; and when the input is a rotation command related to the reel, stopping the reel after rotating the reel by an amount equivalent to one symbol.

According to the above structure, the reel moves by an amount equivalent to one symbol when the player inputs a rotation command through the input device. In other words, the reel is intermittently rotatable by an amount equivalent to one symbol every time a player inputs a rotation command. Thus, the player is able to successively confirm the symbols actually arranged on the reel by the player him/herself carrying out an operation to rotate the reel. Thus, the player is able to easily recognize a symbol arrangement.

The present invention deals with a gaming machine including: a game requiring a player's bet; a reel used in the game and mechanically driven to rotate; a plurality of symbols arranged on the reel; an input device that receives an input by the player; a display capable of generating a video image; a speaker that outputs sound to outside; a microphone which inputs at least the player's voice; a special game using the voice outputted from the speaker and the player's voice player inputted into the microphone; and a controller that is programmed to carry out the following steps of (a1) to (a4).

Specifically, the controller carries out the steps of: (a1) receiving an input inputted through the input device; (a2) when the input is a rotation command related to the reel, rotating the reel while the rotation command is being inputted; (a3) when a predetermined condition is met in the game, running the special game; and (a4) when the special game results in a win, displaying a video image on the display, which indicates at least a part of an arrangement of the symbols on the reel.

According to the above structure, the reel rotates while the player is inputting a rotation command through the input device. In short, the reel rotates in response to an operation by the player. Hence, the player is able to successively confirm the symbols actually arranged on the reels by the player him/herself carrying out an operation to rotate the reel. Thus, the gaming machine enables the player to easily recognize the symbol arrangement on the reel.

Moreover, when a predetermined condition is met in the game, a special game is run. The special game enables a player to take part in a game with the voice. When a player participates in a special game and wins the special game, a video image is displayed on the display, which indicates at least a part of an arrangement of the symbols on the reel. Hence, the player can enjoy taking part in the special game. Further, it is possible to enable the player who wins the special game to recognize the symbol arrangement more easily.

In the gaming machine of the present invention, a result of voice recognition process for the player's voice inputted into the microphone may be used to determine a win or loss in the special game.

According to the above structure, a result of voice recognition process for the voice of the player is used in the special game. Thus, the player is able to feel as if s/he is conducting a conversation with the gaming machine in the special game. As a result, it is possible to increase a player's motivation to take part in the special game.

In the gaming machine of the present invention, a player may win the special game when the player guesses an unseen symbol based on a symbol arrangement visible to the player, and the player's guess orally output is correct.

According to the above structure, when a player guesses an unseen symbol based on the symbol arrangement visible to the player, and the player's guess orally output is correct, the player wins the special game. Hence, the gaming machine is capable of having the player actively memorize the symbol arrangement.

The present invention deals with a gaming machine including: a game requiring a player's bet; a reel used in the game and mechanically driven to rotate to switch a rotation direction; a plurality of symbols arranged on the reel; a display capable of generating a video image; an input device that is disposed to visibly cover at least the reel and receives an input through a press operation by the player; a speaker that outputs sound to outside; a microphone which inputs at least the player's voice; a special game using the voice outputted from the speaker and the player's voice inputted into the microphone; and a controller that is programmed to carry out the following steps of (b1) to (b5).

Specifically, the controller carries out the steps of: (b1) specifying an input position in the input device; (b2) when the input position corresponds to a front area of the reel, determining that a rotation command related to the reel is inputted; (b3) to rotate the reel in a rotation direction indicated by a rotation direction component of the reel included in a movement direction based on the input position while the rotation command is being inputted; (b4) when a predetermined condition is met in the game, to run the special game; and (b5) when the special game results in a win, displaying a video image on the display, which indicates at least a part of an arrangement of the symbols on the reel.

According to the above structure, when a player presses a front area of a reel in an input device, a rotation command is inputted. When the input position through the press in the front area is moved, the reel is rotated in a rotation direction indicated by a rotation direction component of the reel included in a movement direction based on the input position. In short, the reel rotates in response to the player's operation of moving the input position while pressing the front of the reel. Hence, the player is able to successively confirm the symbols actually arranged on the reels by the player him/herself carrying out an operation to rotate the reel. Thus, the gaming machine enables the player to easily recognize the symbol arrangement on the reel. Moreover, when the input position is moved while the player is pressing the front of the reel, the reel rotates in response to the movement. Thus, the gaming machine enables the player to feel as if s/he is directly touching and rotating the reel.

Moreover, when a predetermined condition is met in the game, a special game is run. The special game enables a player to take part in a game with the voice. When a player participates in a special game and the player wins the special game, a video image is displayed on the display, which indicates at least a part of an arrangement of the symbols on the reel. Hence, the player can enjoy taking part in the special game. Further, it is possible to enable the player who wins the special game to recognize the symbol arrangement more easily.

The present invention deals with a gaming machine including: a game requiring a player's bet; a reel used in the game and mechanically driven to rotate to switch a rotation direction; a plurality of symbols arranged on the reel; a display capable of generating a video image; an input device that is disposed to visibly cover the reel and at least a part of a display area of the display and receives an input through a press operation by the player; and a controller that is programmed to carry out the following steps of (c1) to (c8).

Specifically, the controller carries out the steps of: (c1) displaying a video image of a direction symbol indicating a rotation direction of the reel; (c2) specifying an input position in the input device; (c3) when the input position corresponds to a front area of the reel, determining that a rotation command related to the reel is inputted; (c4) rotating the reel in a rotation direction indicated by a rotation direction component of the reel included in a movement direction based on the input position while the rotation command is being inputted; (c5) when the input position corresponds to a display position of the direction symbol, determining that a rotation command related to a reel is inputted; (c6) rotating the reel in a rotation direction indicated by the direction symbol while the rotation command is being inputted; (c7) when a predetermined condition is met in the game, running a special game; and (c8) when the special game results in a win, displaying a video image on the display, which indicates at least a part of an arrangement of the symbols on the reel.

According to the above structure, when a player presses a front area of a reel in an input device, a rotation command is inputted. When the input position through the press in the front area is moved, the reel is rotated in a rotation direction indicated by a rotation direction component of the reel included in a movement direction based on the input position. In short, the reel rotates in response to the player's operation of moving the input position while pressing the front of the reel. Hence, the player is able to successively confirm the symbols actually arranged on the reels by the player him/herself carrying out an operation to rotate the reel. Thus, the gaming machine enables the player to easily recognize the symbol arrangement on the reel. Moreover, when the input position is moved while the player is pressing the front of the reel, the reel rotates in response to the movement. Thus, the gaming machine enables the player to feel as if s/he is directly touching and rotating the reel.

The above structure enables a player to input a rotation command related to a reel associated with a direction symbol simply by pressing a specific area, of the input device, corresponding to a display position of the direction symbol, while a video image of the direction symbol is visible on the display. In short, the reel is capable of switching the rotation direction through the direction symbol. Further, the rotation direction is shown as an image with the direction symbol. Hence, the player is able to successively confirm the symbols actually arranged on the reels by the player him/herself carrying out an operation to rotate the reel with the direction symbol. Thus, the gaming machine enables the player to easily recognize the symbol arrangement on the reel. Moreover, with the gaming machine, the player who operates the reel is able to easily determine a rotation direction of the reel.

Moreover, when a predetermined condition is met in the game, a special game is run. The special game enables a player to take part in a game with the voice. When a player participates in a special game and wins the special game, a video image is displayed on the display, which indicates at least a part of an arrangement of the symbols on the reel. Hence, the player can enjoy taking part in the special game. Further, it is possible to enable the player who wins the special game to recognize the symbol arrangement more easily.

The present invention deals with a confirmation method of a plurality of symbols on a reel that is used in a game requiring a player's bet and is mechanically driven to rotate. The method includes the steps of: receiving an input by a player; specifying an input position of the input; when the input position corresponds to a front area of the reel, determining that a rotation command related to the reel is inputted; rotating the reel in a rotation direction indicated by a rotation direction component of the reel included in a movement direction based on the input position while the rotation command is being inputted; when a predetermined condition is met in the game, running a special game using at least the player's voice; and when the special game results in a win, displaying a video image on the display, which indicates at least a part of an arrangement of the symbols on the reel.

Hence, the player is able to successively confirm the symbols actually arranged on the reels by the player him/herself carrying out an operation to rotate the reel. Thus, the gaming machine enables the player to easily recognize the symbol arrangement on the reel. Moreover, the player can enjoy taking part in the special game. Further, it is possible to enable the player who wins the special game to recognize the symbol arrangement more easily.

The present invention relates to a gaming machine including: a game requiring a player's bet; a reel used in the game and mechanically driven to rotate; a plurality of symbols on the reel; an input device which receives an input by the player; and a controller which is programmed to carry out the following steps of (a1) to (a4)

(a1) receiving an input inputted through the input device; (a2) when the input is a rotation command related to the reel, counting the number of rotation commands inputted; (a3) stopping the reel after rotating the reel by an amount equivalent the number of symbols corresponding to the number of rotation commands inputted; and (a4) when the rotation command is inputted more than once, rotating the reel at rotation speed corresponding to an interval between rotation command inputs.

According to the above structure, when a player inputs a rotation command through the input device, the reel moves by an amount equivalent to the number of symbols corresponding to the number rotation commands inputted. In short, the reel rotates in accordance with the number of rotation commands inputted in response to an operation by the player. Hence, the player is able to successively confirm the symbols actually arranged on the reel by the player him/herself carrying out an operation to rotate the reel. Further, when a rotation command is inputted more than once, the reel rotates at rotation speed corresponding to an interval between rotation command inputs. Thus, a player is able to change a moving speed of a symbol as s/he intends. Thus, a moving speed of a symbol can be adapted according to a preference and confirmation skill of a player when a player successively confirms a symbol. Hence, a player is able to easily recognize a symbol arrangement.

The present invention relates to a gaming machine including: a game requiring a player's bet; a reel used in the game and mechanically driven to rotate; a plurality of symbols on the reel; an input device which receives an input by the player; and a controller which is programmed to carry out the following steps of (b1) to (b6);

(b1) receiving an input inputted through the input device; (b2) when the input is a rotation command related to the reel, determining whether the rotation command is inputted through tapping or continuous pressing; (b3) when the rotation command is inputted through continuous pressing, rotating the reel while the rotation command is being inputted; (b4) when the rotation command is inputted through tapping, counting the number of rotation commands inputted; (b5) rotating the reel by an amount equivalent to the number of symbols corresponding to the number of rotation commands inputted; and (b6) when the rotation command is inputted more than once, rotating the reel at rotation speed corresponding to an interval between rotation command inputs.

According to the above structure, when a player inputs a rotation command through the input device through tapping, the reel moves by an amount equivalent to the number of symbols corresponding to the number of times input is conducted. Meanwhile, when a player inputs a rotation command through the input device through continuous pressing, the reel rotates while the rotation command is being inputted. In short, the reel is rotatable intermittently according to the number of times input is conducted, as well as continuously in accordance with a player's operation. Thus, the player is able to successively confirm the symbols actually arranged on the reel by the player him/herself carrying out an operation to rotate the reel. Thus, the player is able to easily recognize a symbol arrangement on the reel.

Further, when the rotation command is inputted through tapping more than once, the reel rotates at rotation speed corresponding to an interval between rotation command inputs. Thus, a player is able to change a moving speed of a symbol as s/he intends. Thus, a moving speed of a symbol can be adapted according to a preference and confirmation skill of a player when a player successively confirms a symbol. As a result, a player is able to easily recognize a symbol arrangement.

The present invention relates to a gaming machine including: a game requiring a player's bet; a reel, for use in the game, which is mechanically driven to rotate and whose rotation direction is switchable; a plurality of symbols on the reel; a display capable of generating a video image; an input device disposed so that at least a part of the display area of the display is visible through the input device, for receiving an input through a press operation by the player; a controller which is programmed to carry out the following steps of (c1) to (c5);

(c1) displaying a video image of a direction symbol indicating a rotation direction of the reel; (c2) specifying an input position in the input device; (c3) when the input position corresponds to a display position of the direction symbol, determining that a rotation command related to a reel is inputted, and counting the number of rotation commands inputted; (c4) stopping the reel after rotating the reel in a direction indicated by the direction symbol by an amount equivalent to the number of symbols corresponding to the number of rotation commands inputted; and (c5) when the rotation command is inputted more than once, rotating the reel at rotation speed corresponding to an interval between rotation command inputs.

The above structure enables a player to input a rotation command related to a reel associated with a direction symbol simply by pressing a specific area, of the input device, corresponding to a display position of the direction symbol, while a video image of the direction symbol is visible on the display. Then, the reel rotates in a direction corresponding to the direction symbol by an amount equivalent to the number of symbols corresponding to the number of times input is conducted. In other words, the reel is rotatable in one direction or the other in response to a player's operation. Thus, the reel is capable of moving by an amount equivalent to the number of symbols corresponding to the number of rotation command inputs. Further, a rotation direction of the reel is shown as an image. Thus, the player is able to successively confirm the symbols actually arranged on the reel by the player him/herself carrying out an operation to rotate the reel. Thus, the player is able to easily recognize a symbol arrangement on the reel. Further, the player who operates the reel is able to easily determine a rotation direction of the reel.

The controller according to the present invention is further programmed to carry out the step of: (C5) successively displaying, on the display, a video image of at least one of the symbols on the reel in sync with the rotation of the reel.

According to the above structure, a video image of at least one of the symbols on the reel is successively displayed on the display in sync with the rotation of the reel. Thus, a symbol is also able to be confirmed with a video image of a virtual symbol. Hence, a player is able to recognize a symbol arrangement more easily.

The present invention relates to a gaming machine including: a game requiring a player's bet; a reel, for use in the game, which is mechanically driven to rotate and whose rotation direction is switchable; a plurality of symbols on the reel; a display capable of generating a video image; an input device disposed so that at least a part of the display area of the display is visible through the input device, for receiving an input through a press operation by the player; a controller which is programmed to carry out the following steps of (d1) to (d8).

(d1) displaying a video image of a direction symbol indicating a rotation direction of the reel; (d2) specifying an input position in the input device; (d3) when the input position corresponds to a display position of the direction symbol, to determine that a rotation command related to a reel is inputted; (d4) when the rotation command is inputted through tapping, counting the number of rotation commands inputted; (d5) rotating the reel by an amount equivalent to the number of symbols corresponding to the number of rotation commands inputted; (d6) when the rotation command is inputted more than once, rotating the reel at rotation speed corresponding to an interval between rotation command inputs; (d7) when the rotation command is inputted through continuous pressing, rotating the reel while the rotation command is being inputted; (d8) successively displaying, on the display, a video image of at least one of the symbols on the reel in sync with the rotation of the reel.

The above structure enables a player to input a rotation command related to a reel associated with a direction symbol simply by pressing a specific area, of the input device, corresponding to a display position of the direction symbol, while a video image of the direction symbol is visible on the display. When the rotation command is inputted through tapping, the reel rotates in a direction corresponding to the direction symbol by an amount equivalent to the number of symbols corresponding to the number of times input is conducted. Meanwhile, when the rotation command is inputted through continuous pressing, the reel rotates in a direction corresponding to the direction symbol while the rotation command is being inputted. In short, the reel is intermittently rotatable in response to a player's operation. Further, the reel is selectively rotated continuously and intermittently in a desired rotation direction. Further, a rotation direction of the reel is shown as an image. Thus, the player is able to successively confirm the symbols actually arranged on the reel by the player him/herself carrying out an operation to rotate the reel. Thus, the player is able to easily recognize a symbol arrangement on the reel. Further, the player who operates the reel is able to easily determine a rotation direction of the reel.

According to the above structure, a video image of at least one of the symbols on the reel is successively displayed on the display in sync with the rotation of the reel. Thus, a symbol is also able to be confirmed with a video image of a virtual symbol. Thus, a player is able to recognize a symbol arrangement more easily.

The present invention relates to a confirmation method of a plurality of symbols on a reel which is mechanically driven to rotate, and used in a game requiring a player's bet, including the steps of: receiving an input by the player; when the input is a rotation command related to the reel, counting the number of rotation commands inputted; stopping the reel after rotating the reel by an amount equivalent to the number of symbols corresponding to the number of rotation commands inputted; when the rotation command is inputted more than once, rotating the reel at rotation speed corresponding to an interval between rotation command inputs.

According to the above structure, when a player inputs a rotation command through the input device, the reel moves by an amount equivalent to the number of symbols corresponding to the number of times input is conducted. In short, the reel rotates in accordance with the number of times a rotation command is inputted in response to an operation by the player. Hence, the player is able to successively confirm the symbols actually arranged on the reel by the player him/herself carrying out an operation to rotate the reel. In addition, when the rotation command is inputted more than once, the reel rotates at rotation speed corresponding to an interval between rotation command inputs. Thus, a player is able to change a moving speed of a symbol as s/he intends. Thus, a moving speed of a symbol can be adapted according to a preference and confirmation skill of a player when a player successively confirms a symbol. As a result, a player is able to easily recognize a symbol arrangement.

BRIEF DESCRIPTION OF THE DRAWINGS

FIG. 6 is an explanatory drawing of a data table showing symbols and code numbers of each of the symbols.

FIG. 7 is an explanatory drawing of a data table of a payout control table.

FIG. 8 is an explanatory drawing of a data table of a free game quantity table.

FIG. 23 is an explanatory view of a data table showing symbols and code numbers of each of the symbols.

FIG. 24 is an explanatory view of a data table of a payout control table.

FIG. 25 is an explanatory view of a data table of a free game quantity table.

FIG. 41 is an explanatory drawing of a data table showing symbols and code numbers of each of the symbols.

FIG. 42 is an explanatory drawing of a data table of a payout control table.

FIG. 43 is an explanatory drawing of a data table of a free game quantity table.

FIG. 59 is an explanatory view of a data table showing symbols and code numbers of each of the symbols.

FIG. 60 is an explanatory view of a data table of a payout control table.

FIG. 61 is an explanatory view of a data table of a free game quantity table.

FIG. 79 is an explanatory drawing of a data table showing symbols and code numbers of each of the symbols.

FIG. 80 is an explanatory drawing of a data table of a payout control table.

FIG. 81 is an explanatory drawing of a data table of a free game quantity table.

DESCRIPTION OF THE PREFERRED EMBODIMENTS

First Embodiment

The following describes a first embodiment of a gaming machine according to the present invention with reference to FIGS. 1 to 17. Note that the numerals assigned to each member of the FIGures, and the symbols indicating a step in a flowchart (e.g., S), and the descriptions thereof are valid only in the present embodiment, and thus do not indicate members or steps of another embodiment.

The following describes a preferred embodiment of a gaming machine according to the present invention.

(Overview of the Gaming Machine)

Figure 1:
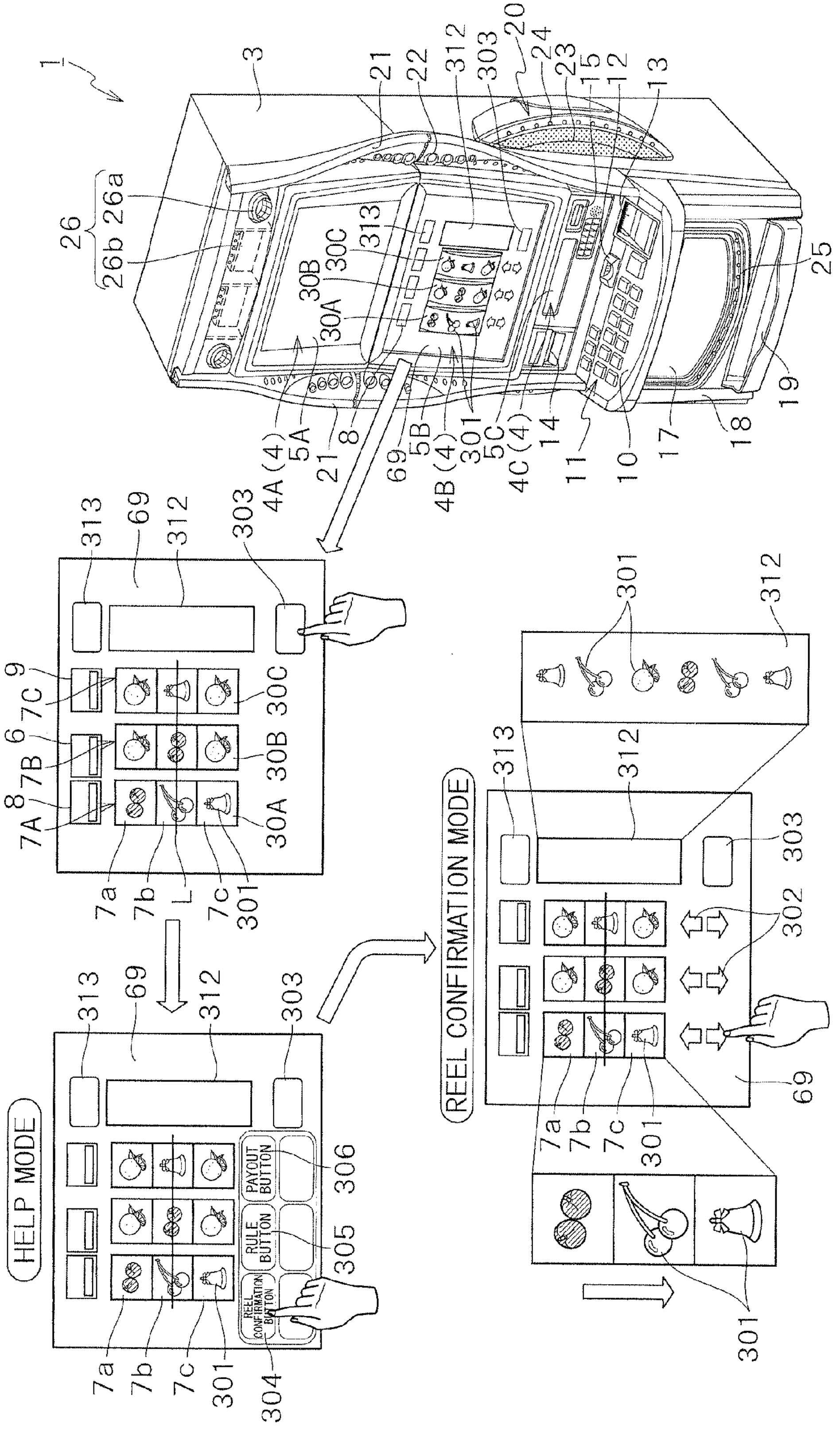
FIG. 1 is an explanatory drawing showing a playing method of a gaming machine.

As shown in FIG. 1, a gaming machine (slot machine 1) has a first structure where one or more mechanical reels 30A, 30B, and 30C rotate in response to a player's operation, and a second structure where one or more symbols 301 are displayable.

Specifically, the gaming machine includes: a game requiring a player's bet; reels 30A to 30C used in the game and mechanically driven to rotate, symbols 301 on the reels 30A to 30C, a display capable of generating a video image, an input device which receives an input by the player, and a controller that is programmed to carry out the following steps.

Specifically, the controller carries out the steps of: (a1) receiving an input inputted through the input device; (a2) when the input is a rotation command related to one or more of the reels 30A to 30C, rotating the one or more of the reels 30A to 30C while the rotation command is being inputted; and (a3) successively displaying, on the display, a video image of at least one of the symbols 301 on the reels 30A to 30C in sync with the rotation of the reel(s).

The gaming machine may be a machine such as a slot machine 1 or the like for one player, or multiple players. For instance, a gaming machine for multiple players may include several slot machines 1 which are connected to one another and are capable of carrying out data communication with one another.

In addition to a function of running a game with mechanical reels 30A to 30C, the gaming machine may have a function of running one or more games through another mechanical operation, an electrical operation, or through a combination of mechanical and electrical operations. An example of an electrically operated gaming machine is a slot machine 1 which displays an image of reels 30A to 30C on a display of liquid crystal or the like, and virtually rotates or moves reels 30A to 30C. Note that a slot machine 1 is shown as an example of a gaming machine in the present embodiment; however, the gaming machine is not limited to this.

An input device is not specifically limited as long as the input device enables a player's operation to input information therethrough. Specifically, an input device may be a touch panel 69 disposed on an upper surface of a central liquid crystal panel 5B, or an operation button 11 which enables an input by connection/disconnection of mechanical contact points. Moreover, an input device may be a device which enables input of information through a data communication using wireless signals such as sound, light, radio wave, or the like.

Examples of an electrical structure are a liquid crystal display device, a CRT (cathode-ray tube) device, a plasma display device, or the like. Moreover, either one display or plural displays may be provided to the slot machine 1. As for a gaming machine for multiple players, a display may be provided to each slot machine 1, or a large screen display shared by all the slot machines 1 may be provided in addition to the slot machines 1. In the present embodiment, an upper liquid crystal panel 5A and a central liquid crystal panel 5B fall under the category of a display.

According to the above structure, the reels 30A to 30C rotate while a player is inputting a rotation command through the input device. In short, the reels 30A to 30C rotate in response to an operation by the player. Thus, the player is able to successively confirm the symbols 301 actually arranged on the reels 30A to 30C when the reels 30A to 30C rotate in response to an operation by the player. In addition, a video image of at least one of the symbols 301 on the reels is successively displayed on the display in sync with the rotation of the reels 30A to 30C. Thus, a symbol is also able to be confirmed with a video image of a virtual symbol 301. As a result, the player is able to easily recognize a symbol arrangement.

A gaming machine with such structures realizes a below mentioned confirmation method of a symbol 301. In other words, a confirmation method of a symbol 301 is to rotate the reels 30A to 30C while a rotation command is being inputted, and to successively display a video image of one or more of the symbols 301 on the reels 30A to 30C in sync with the rotation of the reels 30A to 30C, when a rotation command related to the reels 30A to 30C is inputted by a player.

More specifically, the gaming machine realizes a confirmation method of a symbol 301 having: a first step of receiving an input inputted through the input device; a second step of, when a rotation command related to one or more of the reels 30A to 30C is inputted, rotating the one or more of the reels 30A to 30C while the rotation command is being inputted; and a third step of successively displaying, on the display, a video image of one or more of the symbols 301 on the one or more of the reels 30A to 30C in sync with the rotation of the reel(s).

In addition to the first and the second structures, the gaming machine has a third structure of selectively rotating the mechanical reels 30A to 30C in response to a player's operation to the touch panel 69.

Specifically, the gaming machine includes; a game requiring a player's bet; reels 30A to 30C, for use in the game, which are mechanically driven to rotate and whose rotation directions are switchable; symbols 301 on each of the reels 30A to 30C; a display capable of generating a video image; an input device disposed so that at least a part of a display area of the display is visible through the input device, for receiving an input through a press operation by the player; and a controller which is programmed to carry out the following steps.

Specifically, the controller carries out the steps of: (b1) displaying video images of direction symbols 302 respectively indicating rotation directions of the reels 30A to 30C; (b2) specifying an input position in the input device; (b3) when the input position corresponds to a display position of a direction symbol 302, determining that a rotation command related to one or more of the reels 30A to 30C is inputted; (b4) rotating the one or more of the reels 30A to 30C in a rotation direction indicated by the direction symbol 302 while the rotation command is being inputted; and (b5) successively displaying, on the display, a video image of at least one of the symbols 301 on the one or more of the reels 30A to 30C in sync with the rotation of the reel(s).

The above structure enables a player to input a rotation command related to one or more of the reels 30A to 30C associated with a direction symbol 302 simply by pressing a specific area, of the input device, corresponding to a display position of the direction symbol 302, while a video image of the direction symbol 302 is visible on the display. In short, the reels 30A to 30C are rotatable in one direction or the other in response to an operation by the player. A rotation direction of a reel is shown as an image. Thus, the player is able to successively confirm the symbols 301 actually arranged on the reels 30A to 30C when the reels 30A to 30C rotate in response to an operation by the player. In addition, a video image of at least one of the symbols 301 on the reels 30A to 30C is successively displayed on the display in sync with the rotation of the reels 30A to 30C. Thus, a symbol is also able to be confirmed with a video image of a virtual symbol 301. Hence, a player is able to easily recognize a symbol arrangement. Moreover, with the gaming machine, the player who operates the reels 30A to 30C is able to easily determine a rotation direction of the reels 30A to 30C.

In addition to the first and the second structures, the gaming machine has a fourth structure where a symbol 301 is displayable with a special game.

Specifically, the gaming machine includes; a game requiring a player's bet; a special game separately runnable from the game; reels 30A to 30C used in the game and mechanically driven to rotate, symbols 301 on the reels 30A to 30C, a display capable of generating a video image; an input device which receives an input by the player, and a controller that carries out the following steps.

Specifically, the controller carries out the steps of: (c1) receiving an input inputted through the input device; (c2) when the input is a rotation command related to one or more of the reels 30A to 30C, rotating the one or more reels while the rotation command is being inputted; (c3) successively displaying, on the display, a video image of at least one of the symbols 301 on the reels 30A to 30C in sync with the rotation of the reel(s); (c4) when a predetermined condition is met as a result of the game, running the special game; and (c5) based on the result of the special game, displaying, on the display, a video image of all the symbols 301 arranged on the reels 30A to 30C.

A special game is a sub game different from the main game (basic game) of the gaming machine. An example of a special game in the present embodiment is a below mentioned mini game.

According to the above structures, the reels 30A to 30C rotate while the player is inputting a rotation command through the input device. In short, the reels 30A to 30C rotate in response to an operation by the player. Thus, the player is able to successively confirm the symbols 301 actually arranged on the reels 30A to 30C when the reels 30A to 30C rotate in response to an operation by the player. In addition, a video image of at least one of the symbols 301 on the reels 30A to 30C is successively displayed on the display in sync with the rotation of the reels 30A to 30C. Thus, a symbol is also able to be confirmed with a video image of a virtual symbol 301. Thus, a player is able to easily recognize a symbol arrangement. Further, a video image of all the symbols 301 arranged on the reels 30A to 30C are displayed on the display based on a result of the special game. Thus, the player is able to recognize all the symbols 301 on the reels 30A to 30C more easily while enjoying the special game.

The gaming machine has the first, second, third, and fourth structures.

Specifically, the gaming machine includes; a game requiring a player's bet; a special game separately runnable from the game; reels 30A to 30C, for use in the game, which are mechanically driven to rotate and whose rotation directions are switchable; symbols 301 arranged on each of the reels 30A to 30C; a display capable of generating a video image; an input device disposed so that at least a part of a display area of the display is visible through the input device, for receiving an input through a press operation by the player; and a controller which is programmed to carry out the following steps.

Specifically, the controller carries out the steps of: (d1) displaying video images of direction symbols 302 respectively indicating rotation directions of the reels 30A to 30C; (d2) specifying an input position in the input device; (d3) when the input position corresponds to a display position of a direction symbol 302, determining that a rotation command related to one or more of the reels 30A to 30C is inputted; (d4) rotating the one or more of the reels in a rotation direction indicated by the direction symbol while the rotation command is being inputted; (d5) successively displaying, on the display, a video image of at least one of the symbols 301 on the reels 30A to 30C in sync with the rotation of the reel(s); (d6) when a predetermined condition is met as a result of the game, running the special game; and (d7) based on a result of the special game, displaying, on the display, a video image of all the symbols 301 arranged on the reels 30A to 30C.

The above structure realizes a gaming machine having all the functions and effects of the first to the fourth structures.

(Functional Block of the Gaming Machine)

Figure 2:
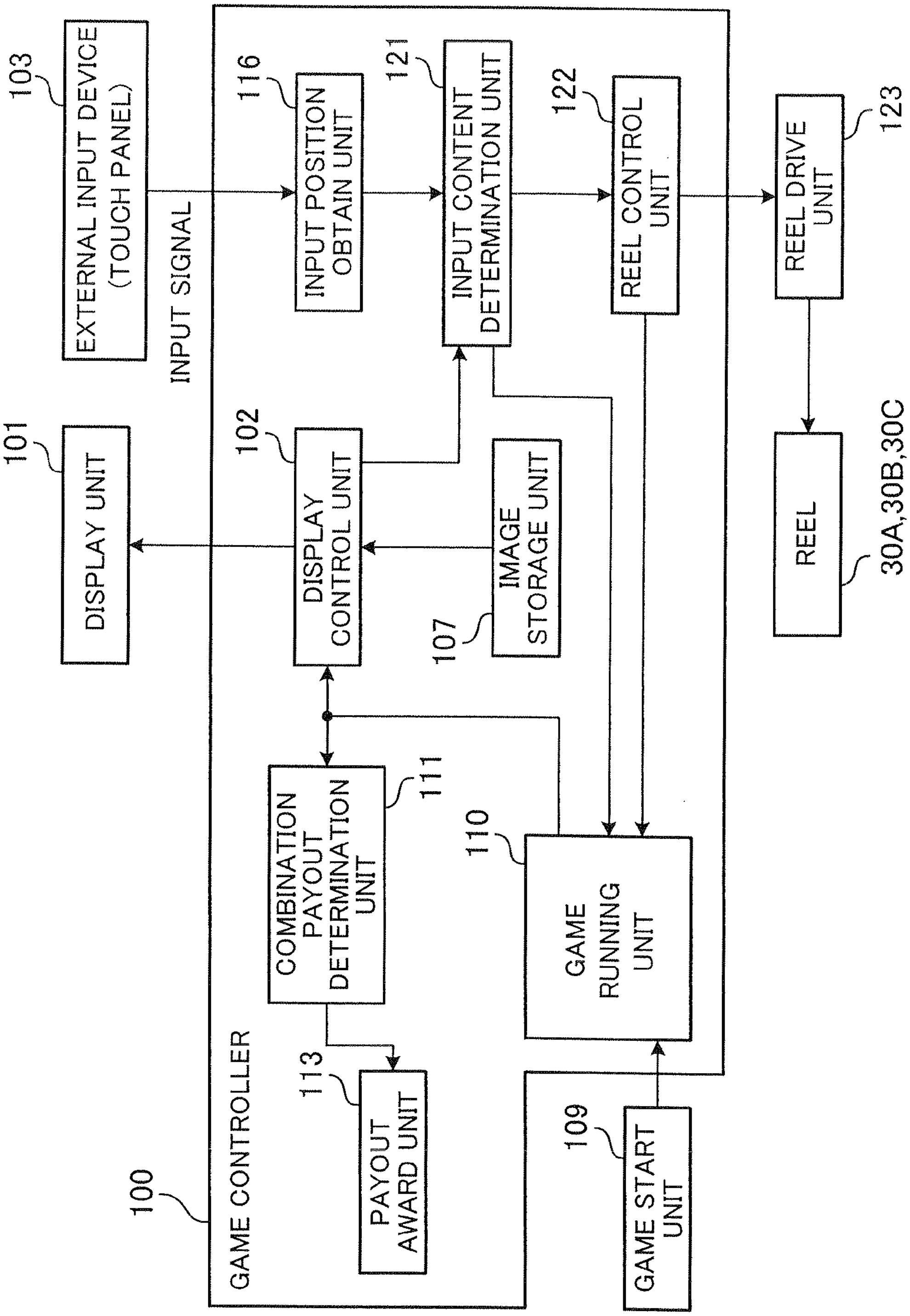
FIG. 2 is a block diagram of a gaming machine.

As shown in FIG. 2, the gaming machine with one of the above structures has a game controller 100, a display unit 101, an external input unit 103, a game start unit 109, a reel drive unit 123, and mechanical reels 30A to 30C.

(Display Unit 101)

The display unit 101 has functions of generating a video image and arranging/rearranging symbols 301 in a matrix with reels 30A to 30C. Note that the wording "arrange" is a state where the symbols 301 can be visually observed by a player. To "rearrange" means that the symbols 301 are arranged again after releasing them.

The reels 30A to 30C of the display unit 101 may be partially substituted with a video reel displayed as an image. In other words, the display unit 101 may adopt a combination of mechanical (reel) and electrical (video reel) structures. Examples of an electrical structure are a liquid crystal displayer, a CRT (cathode-ray tube) device, a plasma display device, or the like.

(Game Controller 100)

The game controller 100 has an image storage unit 107 which stores image data such as a mini game screen, a help screen, or the like. The image storage unit 107 is accessed by a display control unit 102. The display control unit 102 reads out various kinds of image data of the image storage unit 107 under the control of a game running unit 110. The display control unit 102 then displays various kinds of images related to the game in the display unit 101. A specific displaying mode is mentioned below.

The game controller 100 is connected to the game start unit 109. The game start unit 109 has a function of outputting a game start signal in response to a player's operation. The game controller 100 has a game running unit 110, a combination payout determination unit 111, and a payout award unit 113. The combination payout determination unit 111 determines a payout according to a combination of symbols 301 rearranged on a payline L in a unit game. The payout award unit 113 awards each payout determined in the combination payout determination unit 111.

The game running unit 110 has a function of running various kinds of games such as a basic game, a mini game, a free game, or the like. Further, the game running unit 110 has a function of running a unit game where symbols 301 are rearranged, triggered by a start signal from the game start unit 109. Further, the game running unit 110 has a function of displaying, on the display unit 101, a video image of all the symbols on the reels 30A to 30C based on a result of a mini game.

A unit game starts from receiving a bet and includes a series of operations until a win or loss is resulted. For example, a unit game of the basic game includes a bet time to receive a bet, a game time to rearrange stopped symbols 301, and a payout time of a payout process to award payout.

A basic game is a main game which the gaming machine is originally intended for, and is run during an ordinary game mode. For instance in slot machine 1, a slot game which is run during an ordinary game mode is a basic game. Note that a slot game offers a chance of acquiring a game value according to symbols 301 stopped and displayed after variable displaying of the symbols 301. Examples of a game value are a medal, a coin, a game ball, money, paper money, a magnetic card, or the like.

A mini game is a sub game (special game) different from the main game of the gaming machine. The mini game is run in parallel with the basic game, or during a period of time while the basic game is not being played. In the present invention, for example, a penalty shootout game run during a slot game is a mini game. In the penalty shootout game, continuous penalty kicks may be automatically taken. This game may allow a player to operate kicking directions or strength of the ball.

A free game can be played for a predetermined number of times without betting a coin. A free game is a kind of bonus game. A bonus game is more advantageous than a basic game. Note that a bonus game is not specifically limited as long as it is an advantageous game for a player, that is, more advantageous than a basic game. Examples of a bonus game are, a state where more game media are obtainable than a basic game, a state where a possibility of obtaining a game medium is higher than that of the basic game, a state where fewer game media are consumed than a basic game, and so on.

The game controller 100 includes an input position obtain unit 116, an input content determination unit 121, and a reel control unit 122. The input position obtain unit 116 is connected to an external input unit 103. The external input unit 103 is disposed separately from the game controller 100, and receives a signal input from outside by a player. Although a touch panel is used as an external input unit 103 in the present embodiment, the external input unit is not limited to this. The external input unit 103 maybe a mouse or an operation button.

The input position obtain unit 116 has a function of specifying an input position based on a signal from the external input unit 103. The input content determination unit 121 has functions of: receiving an input position from the input position obtain unit 116 and determining a command based on a relation of the input position to the image display area in the display unit 101; and outputting a command signal corresponding to the command to the reel control unit 122 and the game running unit 110. More specifically, the input content determination unit 121 has a function of determining that, when the input position corresponds to a display position of a direction symbol, a rotation command related to a reel is inputted.

The game running unit 110 operates according to a command of a command signal. For example, when the command signal is a help command, it carries out a help process such as displaying a help screen as an image at a predetermined timing. Moreover, the reel control unit 122 enters an operation mode when the command signal is a rotation command related to the reels, and has a function of outputting a drive signal to the reel drive unit 123 to rotate reels 30A to 30C. Specifically, the reel control unit 122 has a function of outputting a drive signal to rotate at least one of the reels 30A to 30C in a rotation direction indicated by the associated direction symbol while the rotation command related to the one or more of the reels is being inputted.

Each block of the game controller 100 may be formed with hardware, or software as needed.

(Operation of Game Controller 100)

The following describes operations of the game controller 100. First, symbols 301 are arranged into a matrix of three columns and three rows in the display unit 101. When the game running unit 110 runs a unit game through an operation by the game start unit 109, the reels 30A to 30C rotate and stop to rearrange the symbols 301. Then, the combination payout determination unit 111 determines a payout in accordance with a combination of symbols 301 rearranged on a payline, and the payout determined is awarded by the payout award unit 113.

When a player carries out a press operation to the external input unit 103, an input signal showing an input position in the external input unit 103 is outputted to the input position obtain unit 116. After extracting input position data included in the input signal in the input position obtain unit 116, the input signal is outputted to the input content determination unit 121. Afterwards, a command signified by the input signal is determined by comparing the input position data and a display area of the display unit 101. Then, a command signal including the command is respectively outputted to the game running unit 110 and the reel control unit 122.

When the game running unit 110 and the reel control unit 122 receive the command signal, they operate according to the command. For example, when the command is a reel rotation command through a player's operation, the reel control unit 122 is activated, and at least one of the reels 30A to 30C rotates in a rotation direction indicated by the associated direction symbol displayed on the display unit 101 while a rotation command related to the one or more of the reels is being inputted.

Further, the game running unit 110 runs a mini game when a predetermined condition is met in a game such as a basic game. When a predetermined condition is met as a result of a mini game, the game running unit 110 displays, on the display unit 101, a video image of all the symbols 301 on the reels 30A to 30C.

(Mechanical Structure)

Figure 3:
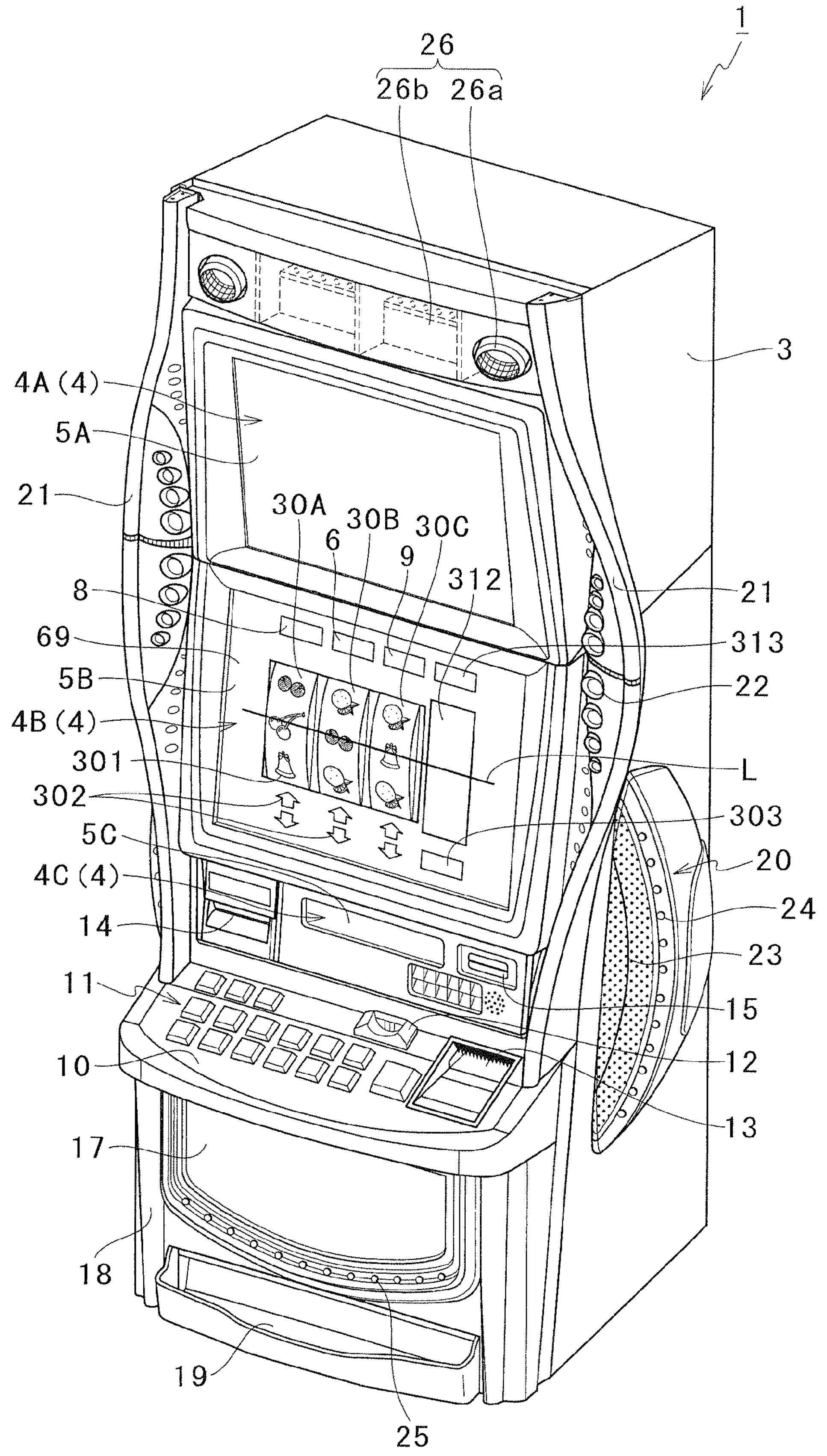
FIG. 3 is a perspective view showing an exterior of a gaming machine.

The following describes an embodiment where a gaming machine is specifically a slot machine 1. As shown in FIGS. 1 and 3, a slot machine 1 is an upright slot machine. The slot machine 1 has a cabinet 3 housing an electrical component and a mechanical component for running a predetermined game. The cabinet 3 has a longer length in the vertical direction. On the front side of the cabinet 3 facing a player is a display 4. The display 4 displays a basic game, a mini game, and game information based on a game operation by the player.

Specifically, the display 4 has an upper variable display unit 4A, a middle variable display unit 4B, and a lower variable display 4C. The upper variable display unit 4A has a transparent upper liquid crystal panel 5A. The upper liquid crystal panel 5A is fixed on a front door of the cabinet 3. The upper liquid crystal panel 5A displays a soccer game screen or a penalty kick standby screen during basic, mini, and free games. In other words, the upper liquid crystal panel 5A displays a soccer game screen when the mini game is not running, and a penalty kick standby screen while the mini game is running.

The middle variable display unit 4B is a rotation symbol display panel on which a player directs the eyes at all times. The middle variable display unit 4B has a transparent central liquid crystal panel 5B fixed on the front door of the cabinet 3. The central liquid crystal panel 5B has three display windows 7A, 7B, and 7C presenting an internal state to the outside. Inside the display windows 7A to 7C, are reels 30A to 30C respectively arranged.

Figure 10:
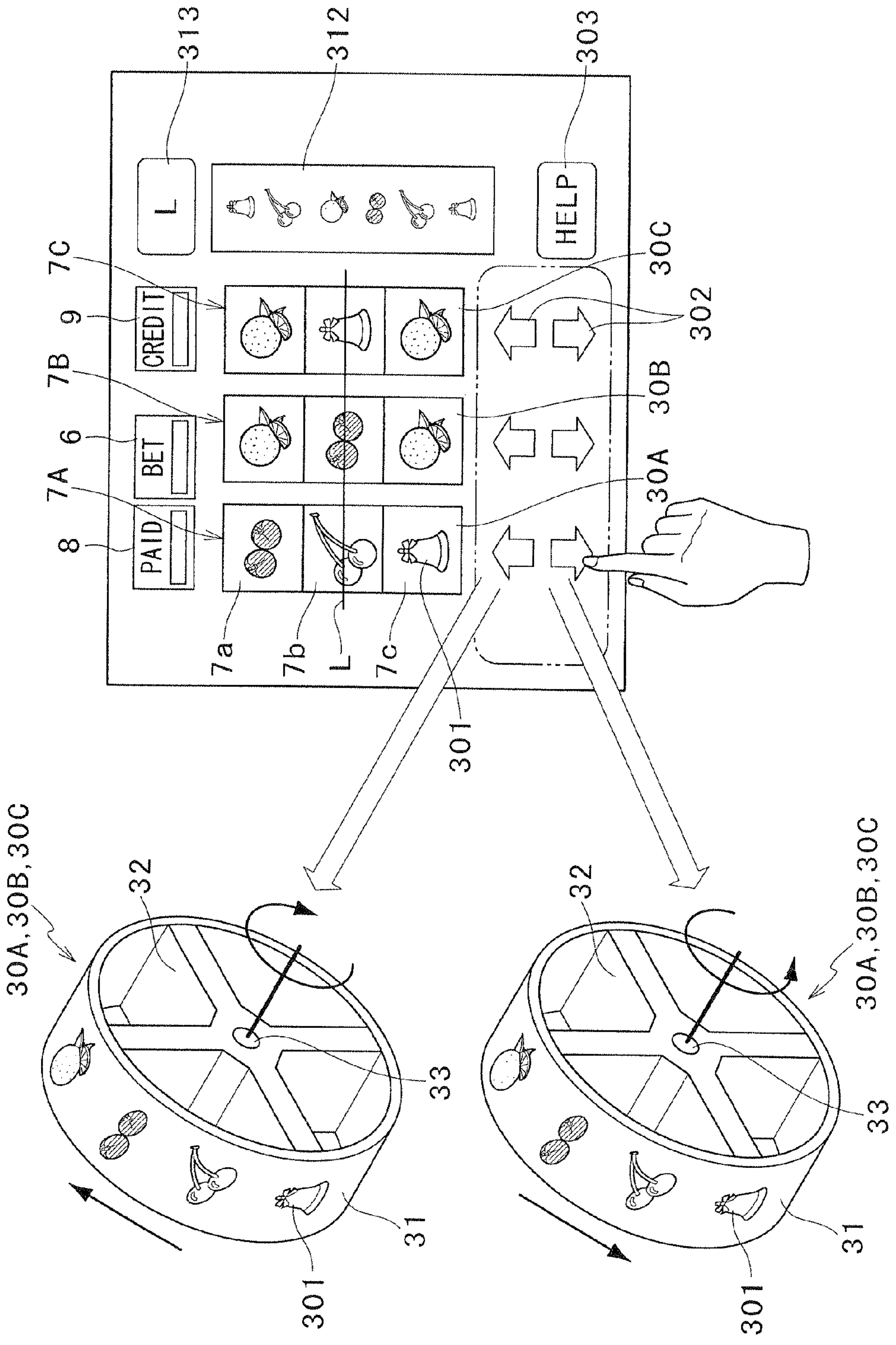
FIG. 10 is an explanatory drawing of a display screen in a reel confirmation mode.

As shown in FIG. 10, each of the reels 30A to 30C has a circular cylindrical member 31, a rotation axis 32 arranged at the center of the cylindrical member 31, and a support member 33 which communicates the rotation axis 32 and the cylindrical member 31. The rotation axis 32 communicates with a rotation drive mechanism (not shown). The rotation drive mechanism enables the reels 30A to 30C to rotate and stop at a predetermined angle by providing a rotation drive force to the rotation axis 32 at any given timing.

On the outer cabinet surface of the cylindrical member 31 is a symbol column. The symbol column has a combination of symbols 301, including a "JACKPOT 7," a "BLUE 7," a "BELL," a "CHERRY," a "STRAWBERRY," a "PLUM," an "ORANGE," and an "APPLE." Further, the symbol column is set so that three successive symbols 301 on the symbol column are visible through associated one of the display windows 7A to 7C.

The reels 30A to 30C described above enable the symbol columns to respectively rotate in a vertical direction through mechanical drive. Thus, the slot machine 1 is capable of rearranging three columns and three rows of symbols 301 in display windows 7A to 7C by rotating and stopping the reels 30A to 30C.

The central liquid crystal panel 5B displays one payline L. The payline L horizontally crosses the three display windows, 7A to 7C. Note that the payline is for determining a combination of the symbols 301. In other words, when symbols 301 are rearranged on and outside the payline L, only a combination of the symbols 301 rearranged on the payline L is considered. When the combination is recognized as a winning combination, a process such as paying out a coin according to the winning combination or the like is carried out.

The central liquid crystal panel 5B displays a moving image effect or the like in an effect display unit when a player wins a game. The central liquid crystal panel 5B also displays, on its upper area, images of a bet display unit 6, a payout display unit 8, and a credit display unit 9. The entire surface of the central liquid crystal panel 5B is covered with the touch panel 69. The touch panel 69 is made of a transparent material including a transparent electrode or the like. Through the touch panel 69, an image of the each display unit displayed by the central liquid crystal panel 5B, and the symbols 301 on the reels 30A to 30C are visible. Thus, the images on the central liquid crystal panel 5B, and the symbols 301 on the reels 30A to 30C, are visible to the player through the touch panel 69.

In addition, the touch panel 69 has a function of outputting, as an input signal, two-dimensional position data of horizontal axis and vertical axis directions when receiving a pressing force. Hence, through the touch panel 69, the each display unit of the central crystal panel 5B and the reels 30A to 30C are visible to the player. Further, the touch panel 69 outputs, to a below mentioned main body PCB 260, an input signal including information indicated by the each display unit when the player presses the each display unit.

The lower variable display unit 4C has a lower liquid crystal panel 5C which displays a point stored in a card, or a point of a game. A number displayed on the lower liquid crystal panel 5C is based on a result displayed of the middle variable display unit 4B. When a winning combination is formed on the middle variable display unit 4B, a point based on the winning combination is added to the game point/s displayed on the lower liquid crystal panel 5C. On the left side of the lower liquid crystal panel 5C is a ticket printer 14. On the right side of the lower liquid crystal panel 5C is a card reader 15.

Below the lower variable display unit 4C is an operation table 10. The operation table 10 projects forward from the front surface of the cabinet 3. The operation table 10 has an operation button 11. The operation button 11 is structured with, for instance, a bet button, a collect button, a start button, a stop button, or the like. The operation table 10 also has a coin insertion slot 12 and a bill insertion slot 13. With the above structure, the operation table 10 functions as an operation unit enabling a player to carry out a game related operation.

Below the operation table 10 is a waist panel 17. The waist panel 17 is a plastic panel on which an image related to a game is printed. The waist panel 17 is fixed on a lower front door 18, and is illuminated by a cold cathode tube. Below the waist panel 17 is a coin receiving portion 19. The coin receiving portion 19 is formed so as to store the coins paid out according to the game result.

The cabinet 3 has a light emitting section 20. The light emitting section 20 includes light emitting components such as lamps, LED, or the like. The light emitting section 20 is formed and disposed so as to surround a game area including the upper variable display unit 4A, the middle variable display unit 4B, the lower variable display unit 4C, and the operation table 10.

The lamps in the light emitting section 20 are a side lamp 22, a speaker lamp 24, an under lamp 25, a top lamp 26, or the like. The side lamps 22 are disposed to inclined units 21. These inclined units 21 are respectively disposed to the left and the right sides of the front surface side of the cabinet 3. The inclined units 21 are projected in bow shapes, and are disposed so as to sandwich the upper variable display unit 4A, the middle variable display unit 4B, the lower variable display unit 4C.

The speaker lamps 24 are projected sideways at the right and left ends of the cabinet 3 adjacent to the operation table 10. The speaker lamps 24 are provided on arc-shaped speakers 23, and are aligned along edges of the speakers 23. The under lamps 25 are provided on the lower front door 18, and are aligned along a lower edge of the waist panel 17. The top lamp 26 is provided above the upper variable display unit 4A. The top lamps 26 has power lamps 26*a* arranged at both sides respectively and a band-type lamp 26*b* horizontally arranged between the power lamps.

(Electrical Structure)

Figure 4:
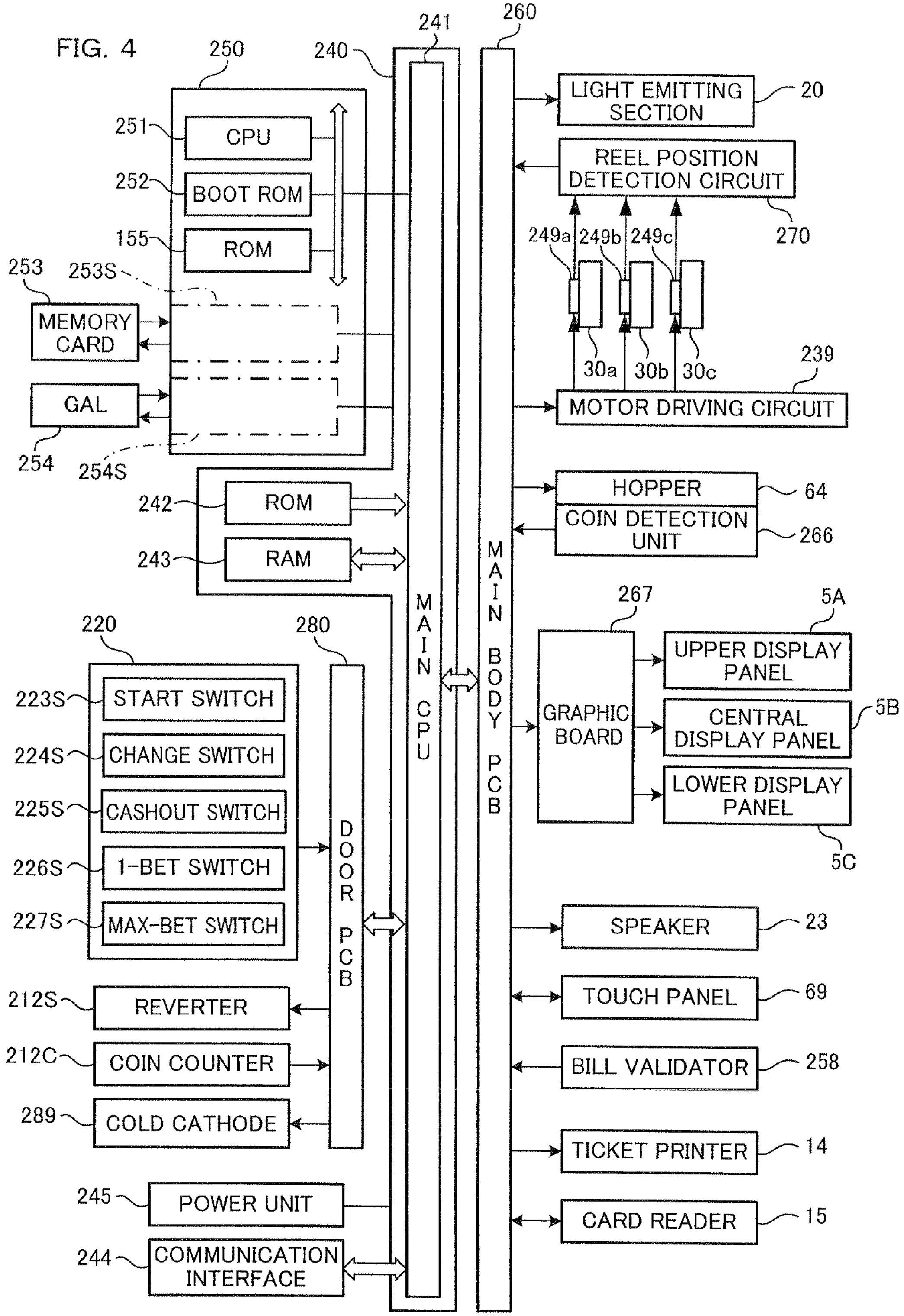
FIG. 4 is a block diagram showing a control circuit of a gaming machine.

FIG. 4 is a block diagram showing an electrical structure of the entire slot machine 1. A control unit having a controller 100 shown in FIG. 2 is disposed inside the cabinet 3. As shown in FIG. 4, the control unit has such components as a motherboard 240, a main body PCB (Printed Circuit Board) 260, a gaming board 250, a door PCB 280, various kinds of switches, a sensor, or the like.

The gaming board 250 has a CPU (Central Processing Unit) 251, a ROM 255, a boot ROM 252, a card slot 253S corresponding to a memory card 253, and an IC socket 254S corresponding to a GAL (Generic Array Logic) 254, connected to one another through an internal bus.

The memory card 253 stores a game program and a game system program. The game program includes a stop symbol determination program. The stop symbol determination program is for determining the symbols 301 to be stopped on the payline L (a code number corresponding to the symbols). The stop symbol determination program includes symbol weighing data corresponding to each of kinds of payout rates (e.g. 80%, 84%, and 88%). The symbol weighting data shows a corresponding relationship between a code number of each symbol and one or more random number values in a predetermined value range (0 to 256), for each of the display windows 7A to 7C.

The memory card 253 stores a program which samples a random number. The random number sample program is read out by a RAM 243 in time of carrying out a game running process, a bonus game process, or the like. This program is run by a main CPU 241. A random number is sampled by a program in the present embodiment; however, the method of sampling a random number is not limited to this. For example, it is possible to adopt a structure including: a random number generating circuit which generates a random number (random numbers) of a certain range, and a sampling circuit which samples a random number from the random number(s) generated by the random number generating circuit.

A payout rate is set according to the payout rate setting data outputted from the GAL 254. Symbols to be stopped are determined according to the symbol weighed data corresponding to the payout rate.

The memory card 253 stores various kinds of data used in the game program and the game system program. For example, the data showing a relationship between the random number range and the symbols 301 displayed in the display windows 7A to 7C shown in FIG. 1, is stored as a table in the memory card 253. The data is transferred to the RAM 243 of the motherboard 240 in time of running the game program.

The memory card 253 is attachable/detachable to/from the card slot 253S. The card slot 253S is connected to the motherboard 240 by an IDE bus. Thus, the gaming board 250 enables a player to change the types and contents of games to be run in the slot machine 1 through an switching operation including the steps of removing the memory card 253 from the card slot 253S, writing a different game program and a game system program in the memory card 253, and inserting the memory card 253 to the card slot 253S.

The game program includes a program according to a game progress, and a program for shifting into a bonus game. The game program also includes image data and sound data outputted during a game.

The GAL 254 has input ports and output ports. When data is inputted to the input ports, the GAL 254 outputs, from the output ports, the data corresponding to the inputted data. The data outputted from the output ports is the above-mentioned payout rate setting data.

The GAL 254 is attachable/detachable to/from the IC socket 254S. The IC socket 254S is connected to the motherboard 240 by a PCI bus. Thus, the gaming board 250 enables the payout rate setting data outputted from the GAL 254 to be changed through an switching operation including the steps of removing the GAL 254 from the IC socket 254S, rewriting a program stored in the GAL 254, and attaching the GAL 254 to the IC socket 254S.

The CPU 251, ROM 255, and boot ROM 252 connected to one another by an internal bus, are connected to the motherboard 240 by a PCI bus. The PCI bus transmits a signal between the motherboard 240 and the gaming board 250. The PCI bus also supplies power to the gaming board 250 from the motherboard 240. The ROM 255 stores country identification information and an authentication program. The boot ROM 252 stores a preliminary authentication program, a program for the CPU 251 to start the preliminary authentication program (boot code), or the like.

An authentication program is for authenticating a game program and a game system program (modification check program). The authentication program is for confirming and authenticating that the game program or the game system program is not modified. In other words, the authentication program is described in accordance with the authentication procedure of the game program and the game system program. A preliminary authentication program is for authenticating the authentication program. The preliminary authentication program is described in accordance with a procedure for verifying that the authentication program to be authenticated is not falsified. In short, the preliminary authentication program authenticates the authentication program.

The motherboard 240 has a main CPU 241(controller), a ROM (Read Only Memory) 242, a RAM (Random Access Memory) 243, and a communication interface 244.

The main CPU 241 functions as a controller to control the entire slot machine 1. Specifically, the main CPU 241 controls (i) when the start button is pushed after a credit is bet, to output a command signal to rotate and stop the reels 30A to 30C to start a variable display in the display windows 7A to 7C, (ii) after a variable display has started, to determine the symbols to be stopped, and (iii) to still-display the determined symbols in the display windows 7A to 7C.

In other words, the main CPU 241 functions as an arrangement controller for carrying out an arrangement control by which, among various kinds of symbols 301, the symbols to be stopped in a symbol matrix are selected and determined, and then scrolling of the symbols is stopped so that the determined symbol matrix appears. With this function, symbols 301 displayed after being scrolled by a rotation of the reels 30A to 30C on the central liquid crystal panel 5B are rearranged in a new symbol matrix.

The ROM 242 stores a program such as a BIOS (Basic Input/Output System) or the like run by the main CPU 241. The ROM 242 also stores data which is permanently used. When the main CPU 241 runs the BIOS, each peripheral device is initialized, and a reading process via the gaming board 250 for a game program and a game system program stored in the memory card 253, is started. The RAM 243 stores data and a program used when the main CPU 241 carries out the process.

The communication interface 244 is for communicating, through a telecommunication circuit, with a host computer or the like provided in the arcade. The main body PCB (Printed Circuit Board) 260 and the door PCB 280 are respectively connected with the motherboard 240 through a USB (Universal Serial Bus). Moreover, the motherboard 240 is connected to a power unit 245. The power unit 245 supplies power to the motherboard 240 to boot the main CPU 241 of the motherboard 240, and supplies power to the gaming board 250 through the PCI bus to boot the CPU 251.

The main body PCB 260 and the door PCB 280 are connected to equipment or a device which generates an input signal to be inputted into the main CPU 241, and equipment or a device whose operation is controlled by a control signal outputted from the main CPU 241. The main CPU 241 runs a game program and a game system program stored in the RAM 243 in accordance with the input signal inputted to the main CPU 241. Thus, the main CPU 241 is capable of carrying out various kinds of processes such as storing a result of a calculation process to the RAM 243, and controlling each equipment and device by transmitting a control signal to the each equipment and device.

The main body PCB 260 is connected to the light emitting section 20, a hopper 64, a coin detection unit 266, a graphic board 267, the speakers 23, a bill validator 258, the ticket printer 14, and the card reader 15. The light emitting section 20 has lamps including the side lamps 22, the speaker lamps 24, the under lamps 25, the top lamps 26 and an LED.

Turning on and off the light emitting section 20 is controlled according to a control signal outputted by the main CPU 241. The hopper 64 is disposed in the cabinet 3, and pays out a predetermined number of coins from a coin payout opening 16 to the coin receiving portion 19 in accordance with a control signal outputted by the main CPU 241. The coin detection unit 266 is disposed in the coin payout opening 16. The coin detection unit 266 outputs an input signal to the main CPU 241 upon detecting that a predetermined number of coins have been paid out from the coin payout opening 16 the unit 266.

The coin detection unit 266 counts the number of coins paid out by the hopper 64, and outputs the data of the resulting number to the main body PCB 260. According to the data of the number of coins paid out (by the hopper 64), the main body PCB outputs a signal to notify completion of payout of a coin or coins to the main CPU 241, when a set number of coins are paid out.

Figure 5:
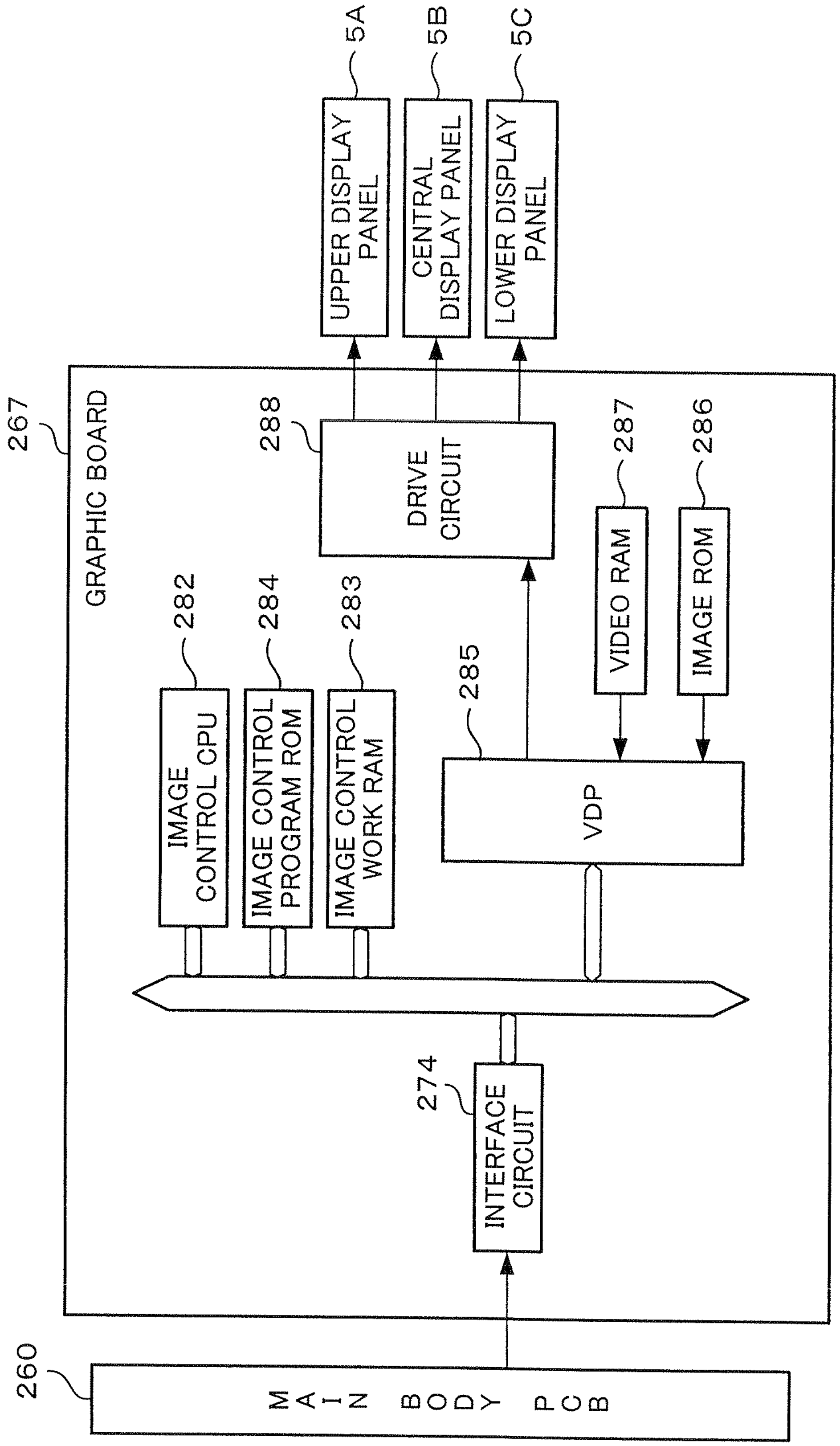
FIG. 5 is a block diagram of a graphic board.

The graphic board 267 controls display of an image on the upper liquid crystal panel 5A, the central liquid crystal panel 5B, and the lower liquid crystal panel 5C, in accordance with a control signal outputted from the main CPU 241. As shown in FIG. 5, the graphic board 267 has an interface circuit 281, an image control CPU 282, an image control work RAM 283, an image control program ROM 284, a VDP (Video Display Processor) 285, an image ROM 286, a video RAM 287, and a drive circuit 288.

The image control CPU 282 receives a control signal outputted from the main CPU 241 via the interface circuit 281. In response to the control signal from the main CPU 241, the image control CPU 282 runs the image control program stored in the image control program ROM 284 to determine an image to be displayed on the upper liquid crystal panel 5A, the central liquid crystal panel 5B, and the lower liquid crystal panel 5C.

The image control program ROM 284 stores various kinds of selection tables and an image control program related to displays on the upper liquid crystal panel 5A, the central liquid crystal panel 5B, and the lower liquid crystal panel 5C. The image control work RAM 283 functions as a temporary storage means when the image control CPU 282 runs the image control program.

The VDP 285 forms image data corresponding to a determination made in the image control CPU 282. The image ROM 286 stores dot data for forming an image such as a symbol 301. The video RAM 287 functions as a temporary storage means when an image is formed in the VDP 285. The drive circuit 288 outputs image data formed by the VDP 285 to the upper liquid crystal panel 5A, the central liquid crystal panel 5B, and the lower liquid crystal panel 5C. The image data used when the VDP generates image data is stored in the memory card 253, and is included in the game program read by the memory card 253 and temporarily stored in the RAM 243.

As shown in FIG. 4, the speakers 23 generate various kinds of sound effects when various kinds of effects are applied according to an output signal from the main body PCB 260. The bill validator 258 carries out at least the following processes: a process of reading an image of a bill, a process of determining whether or not the bill is genuine, and a process of, when the bill is genuine, accepting the bill into the cabinet 3. Further, when the bill validator 258 accepts a genuine bill, the bill validator outputs an input signal indicating the value of the accepted bill to the main CPU 241. The main CPU 241 stores, in the RAM 243, a credit/credits corresponding to the value of paper money transmitted by the input signal.

According to a control signal outputted by the main CPU 241, the ticket printer 14 prints a barcode on a ticket, and then outputs the ticket with a barcode. The barcode contains encoded data of credits stored in the RAM 243, date and time, an identification number of the slot machine 1, or the like. The card reader 15 reads data from a smart card and transmits the data to the main CPU 241. In addition, the card reader 15 writes data into a smart card according to a control signal from the main CPU 241.

The main body PCB 260 is connected to a motor driving circuit 239 and a reel position detection circuit 270. The motor driving circuit 239 is connected to stepping motors 249*a*, 249*b*, and 249*c*. With the pulsed power supplied by the motor driving circuit 239, the stepping motors 249*a* to 249*c* respectively rotate the reels 30A to 30C at any given rotation speed, and position the reels 30A to 30C.

The reel position detection circuit 270 receives a pulse signal from a reel rotation sensor. In response to the pulse signal, the reel position detection circuit 270 outputs, to the main body PCB 260, a reel position signal to detect a position of the each reel 30A to 30C. The reel position signal is assigned to a code number of a below mentioned data table for a symbol, so as to enable detection of a rotation angle of the reels 30A to 30C, and rearranging of specified symbols 301 in specific positions.

The door PCB 280 is connected to a control panel 220, a reverter 212S, a coin counter 212C, and a cold cathode tube 289. In the control panel 220 are a switch 223S corresponding to the start button, a change switch 224S corresponding to a change button, a cash-out switch 225S corresponding to a cash-out button, a 1-bet switch 226S corresponding to a 1-bet button, and a maximum bet switch 227S corresponding to a maximum bet button. Each of the switches 223S to 227S outputs an input signal to the main CPU 241 when the player presses corresponding one of the buttons.

The coin counter 212C is disposed inside the coin insertion slot 12, and validates whether or not the coin inserted by the player to the coin insertion slot 12 is genuine. Anything other than a genuine coin is discharged to the coin receiving tray 16. The coin counter 212C outputs an input signal to the main CPU 241 when detecting a genuine coin.

The reverter 212S operates in accordance with the control signal outputted by the main CPU 241. The reverter 212S distributes a coin recognized as genuine by the coin counter 212C to a cash enclosure (not shown) or the hopper 64 disposed inside the slot machine 1. That is, when the hopper 64 is filled with coins, the genuine coin will be distributed to a cash enclosure by the reveter 212S. To the contrary, when the hopper 64 is not filled with coins, the genuine coin will be distributed to the hopper 64. The cold cathode 289 functions as a backlight mounted to rear sides of the upper liquid crystal panel 5A, the central liquid crystal panel 5B, and the lower liquid crystal panel 5C. The cold cathode 289 lights up in accordance with a control signal outputted by the main PCU 241.

(Symbol, Combination, or the Like)

The symbols 301 displayed in the display windows 7A to 7C of the slot machine 1 forms symbol columns, each of which having twenty-two symbols. As shown in FIG. 6, one of code numbers 0 to 21 is assigned to each of the symbols constituting each column. Each of the symbol columns is constituted with a combination of symbols of "JACKPOT 7," "BLUE 7," "BELL," "CHERRY," "STRAWBERRY," "PLUM," "ORANGE," and "APPLE."

Three successive symbols in each of the symbol columns are respectively displayed (arranged) on an upper stage 7*a*, a middle stage 7*b*, and a lower stage 7*c* of each of the display windows 7A to 7C, to form a symbol matrix of three columns and three rows. When the start button is pressed to start a game after the bet button is pressed, the symbols forming a symbol matrix start scrolling. This scrolling of the symbols stops (rearrangement) after a predetermined period from the beginning of the scrolling.

Various kinds of winning combinations are set in advance for each symbol. A winning combination is a combination of stopped symbols on the payline L which puts the player in an advantageous state. Examples of an advantageous state include: a state where coins according to a winning combination is paid out, a state where the number of coins to be paid out is added to a credit, a state where a bonus game is started.

For example, a combination on the payline L including an "APPLE" symbol serves as a bonus trigger which causes a transition of a gaming mode from a basic game to a bonus game. Further, when a combination including a "CHERRY" symbol is formed on the payline L in a basic game, twenty coins (values) are paid out for one bet. When a combination including a "PLUM" symbol is formed on the payline L in a basic game, five coins are paid out for one bet.

Here, a bonus game is a gaming state which provides a larger advantage than a base game. Note that another bonus game may be employed in combination, provided that the other bonus game is advantageous to a player, i.e., the other bonus game is more advantageous than a basic game. For example, a bonus game may be a state where more coins are possibly obtained than the basic game, a state where the probability of obtaining coins is higher than in the basic game, a state where fewer coins are consumed than the basic game, free game, or the like.

The following describes each table stored in the ROM 242 of a main control board 71, with reference to FIGS. 7 and 8.

(Payout Control Table)

FIG. 7 is a payout control table which controls a payout awarded in accordance to a winning combination. The payout control table is stored in the ROM 242 of the main control board 71, and a piece of information of a payout is assigned to a type of winning combination. For example, a payout assigned to a winning combination including a "BELL" symbol is "10." A payout assigned to a winning combination including a "BLUE 7" is "40." Note that payouts for a basic game and a free game are set to be the same in the present embodiment.

(Free Game Quantity Table)

FIG. 8 is a table referred to when determining the number of free games to be played for the number of points acquired in a mini game of a basic game. The points awarded in a mini game correspond to the number of free games to be played in the free game quantity table. For example, when the accumulated points are 4, the free games are run eighty (80) times. When the accumulated points are 8, the free games are run a hundred sixty (160) times. Thus, by succeeding in a mini game in a basic game and acquiring many points, it is possible to continue a free game for a long period of time.

(Display State)

The following specifically describes an example of a display state of the display 4 in an operation of the slot machine 1.

(Help Mode Screen)

Figure 9:
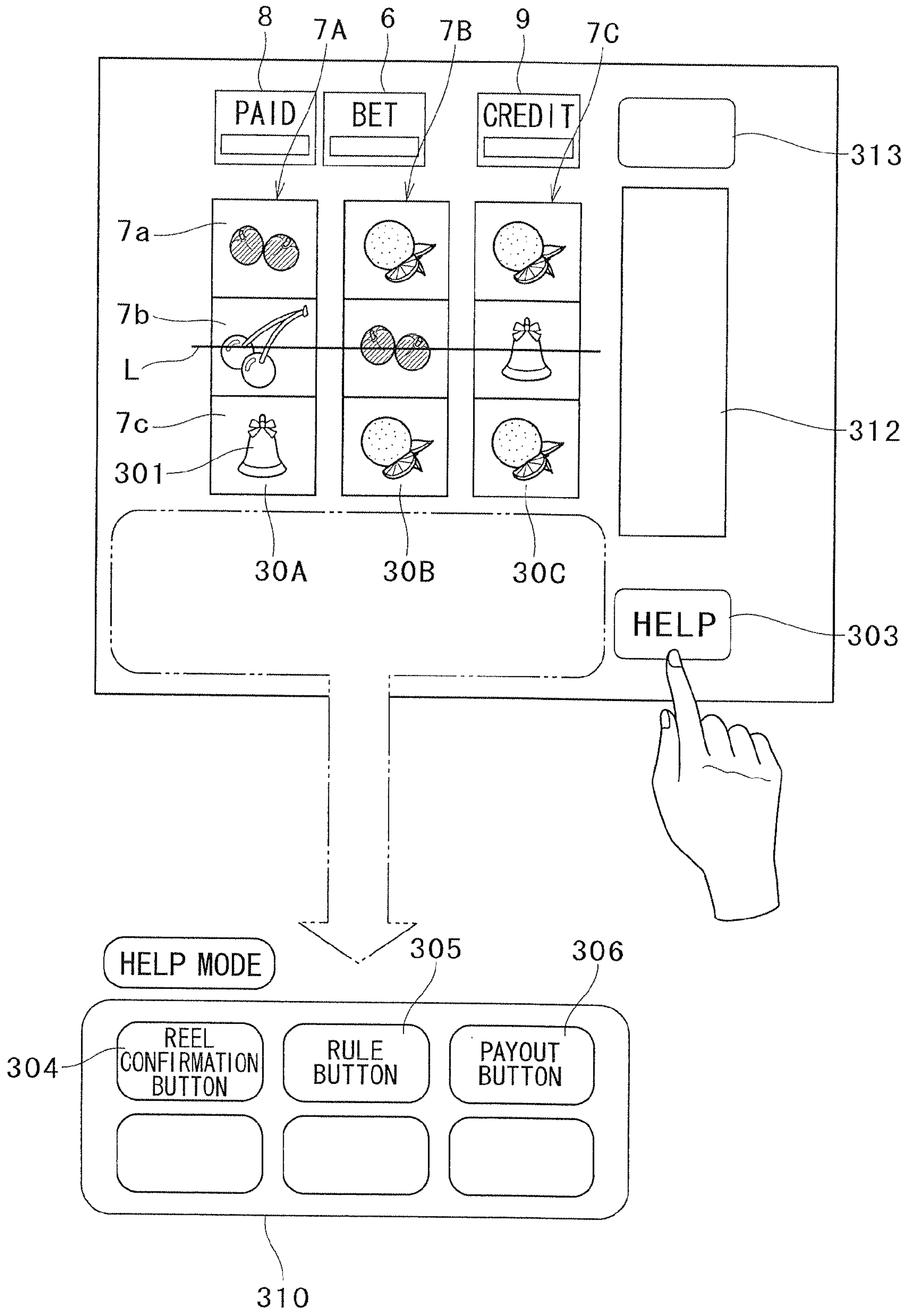
FIG. 9 is an explanatory drawing of a display screen in a help mode.

FIG. 9 shows a display state of the display 4 when modes switch from a game mode to a help mode. That is, the bet display unit 6, the payout display unit 8, and the credit display unit 9 are displayed in the upper part of the central liquid crystal panel 5B constituting a part of the display 4. In addition, in the center of the central liquid crystal panel 5B, window frames of the display windows 7A to 7C are displayed. When a basic game or a free game starts, all the symbols 301 on the reels 30A to 30C visible through the display windows 7A to 7C are variably displayed.

Moreover, in the lower part of the central liquid crystal panel 5B, a help button 303 is displayed. The help button 303, upon being pressed, activates the help mode. The help mode provides a player with troubleshooting information regarding a game.

A help mode screen has a help button frame 310. The help button frame 310 is provided to the right corner part of the help mode screen. The help button frame 310 has a reel confirmation button 304, a rule button 305, and a payout button 306 inside. The reel confirmation button 304 is for activating a reel confirmation mode which enables a player to confirm the symbols 301. The rule button 305 is for activating a rule guidance mode which provides a player with an introduction to a game or guidance on a method of playing a game. The payout button 306 is for activating a payout guidance mode which provides a player with guidance on payouts.

(Reel Confirmation Mode Screen)

FIG. 10 shows a display mode of the display 4 during a reel confirmation mode. That is, in the lower part of the central liquid crystal panel 5B constituting a part of the display 4, direction symbols 302 are displayed. Each of the direction symbols 302 has an arrow shape. One direction symbol and another paired with the former are symmetrically disposed so that one points out the upward direction and the other, the downward direction. Each pair of upper and lower direction symbols 302 are arranged below each of the display windows 7A to 7C. These pairs of direction symbols 302 function as command buttons to output a command to rotation drive each of the reels 30A to 30C in upward or downward directions.

Thus, pressing of a direction symbol 302 pointing an upward direction causes upward rotation of at least one of the corresponding reels 30A to 30C positioned above the direction symbols 302. On the other hand, pressing of a direction symbol 302 pointing a downward direction causes downward rotation of, at least one of the reels 30A to 30C corresponding to the direction symbol 302.

The reel confirmation mode screen has a symbol display frame and a reel specifying frame 313. The symbol display frame 312 and the reel specifying frame 313 are also provided to the game mode screen and the help mode screen. The reel specifying frame 313 is provided to the upper right corner part of the screen. The symbol display frame 312 has a vertically long rectangular shape, and provided between the reel specifying frame 313 and the help button 303.

The reel specifying frame 313 is a display unit for displaying a code to specify one of the reels 30A to 30C, which has a symbol column to be displayed in a symbol display frame 312. Specifically, when the symbol column of the left reel 30A is displayed in the symbol display frame 312, a code "L" is displayed in the reel specifying frame 313. When the symbol column of the central reel 30B is displayed in the symbol display frame 312, a code "C" is displayed in the reel specifying frame 313. When the symbol column of the right reel 30C is displayed in the symbol display frame 312, a code "R" is displayed in the reel specifying frame 313.

The symbol display frame 312 displays a video image of the symbols 301 of one of the reels 30A to 30C corresponding to the code indicated in the reel specifying frame 313. The symbol display frame 312 displays an alignment of the symbols 301 identical to the symbol column on one of the reels 30A to 30C. Note that the symbol display frame 312 may display all the symbols of the symbol column, or a part of the symbol column.

The symbol display frame 312 successively displays a video image of the symbols 301 on one of the reels 30A to 30C having disappeared from corresponding one of the display windows 7A to 7C in sync with the rotation of the reel. Thus, the player is able to confirm a symbol alignment with a video image of virtual symbols 301 successively displayed on the symbol display frame 312 in sync with a rotation of one of the reels 30A to 30C.

(Mini Game Screen)

Figure 11:
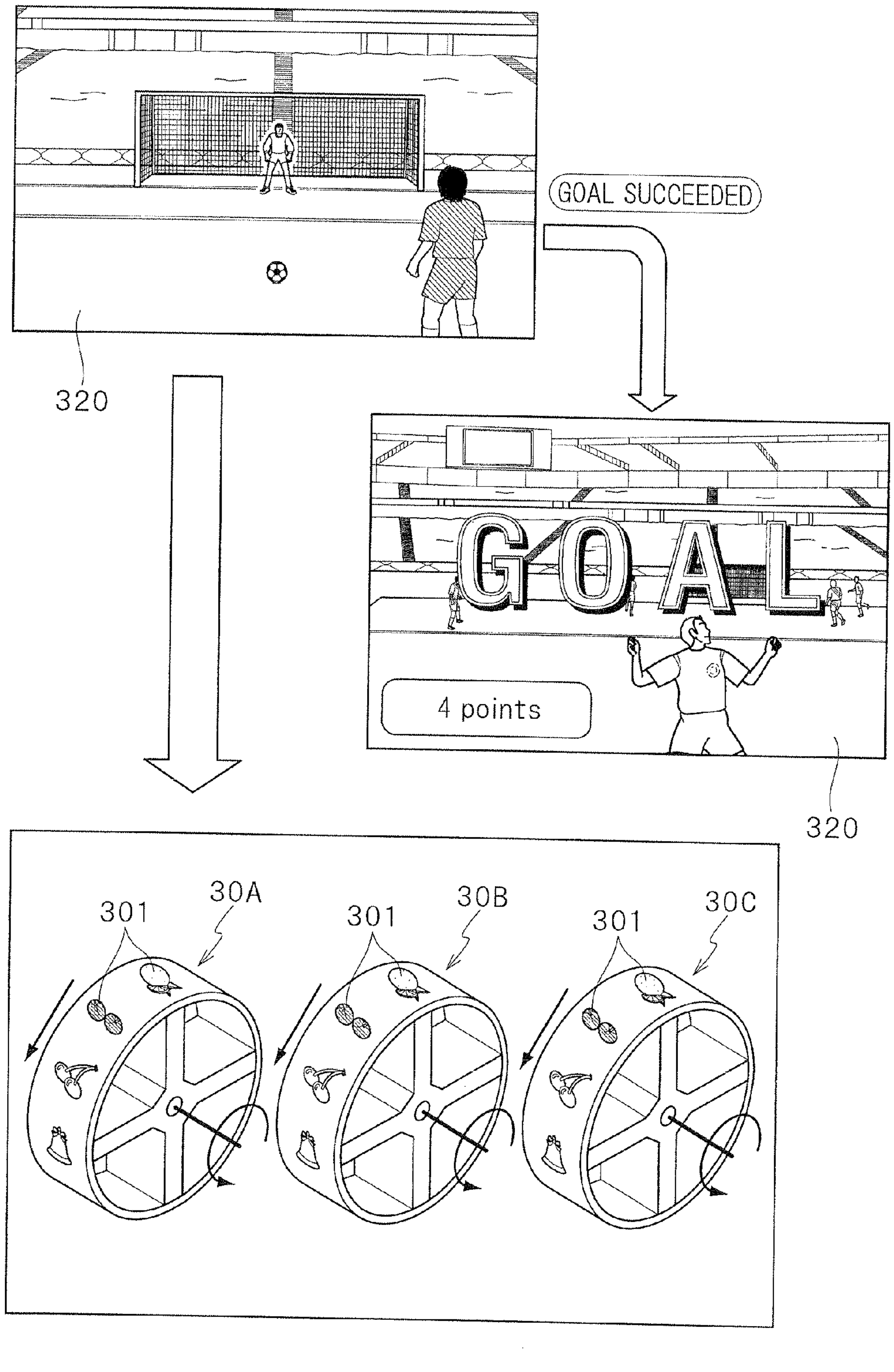
FIG. 11 is an explanatory drawing of a mini game screen.
Figure 12:
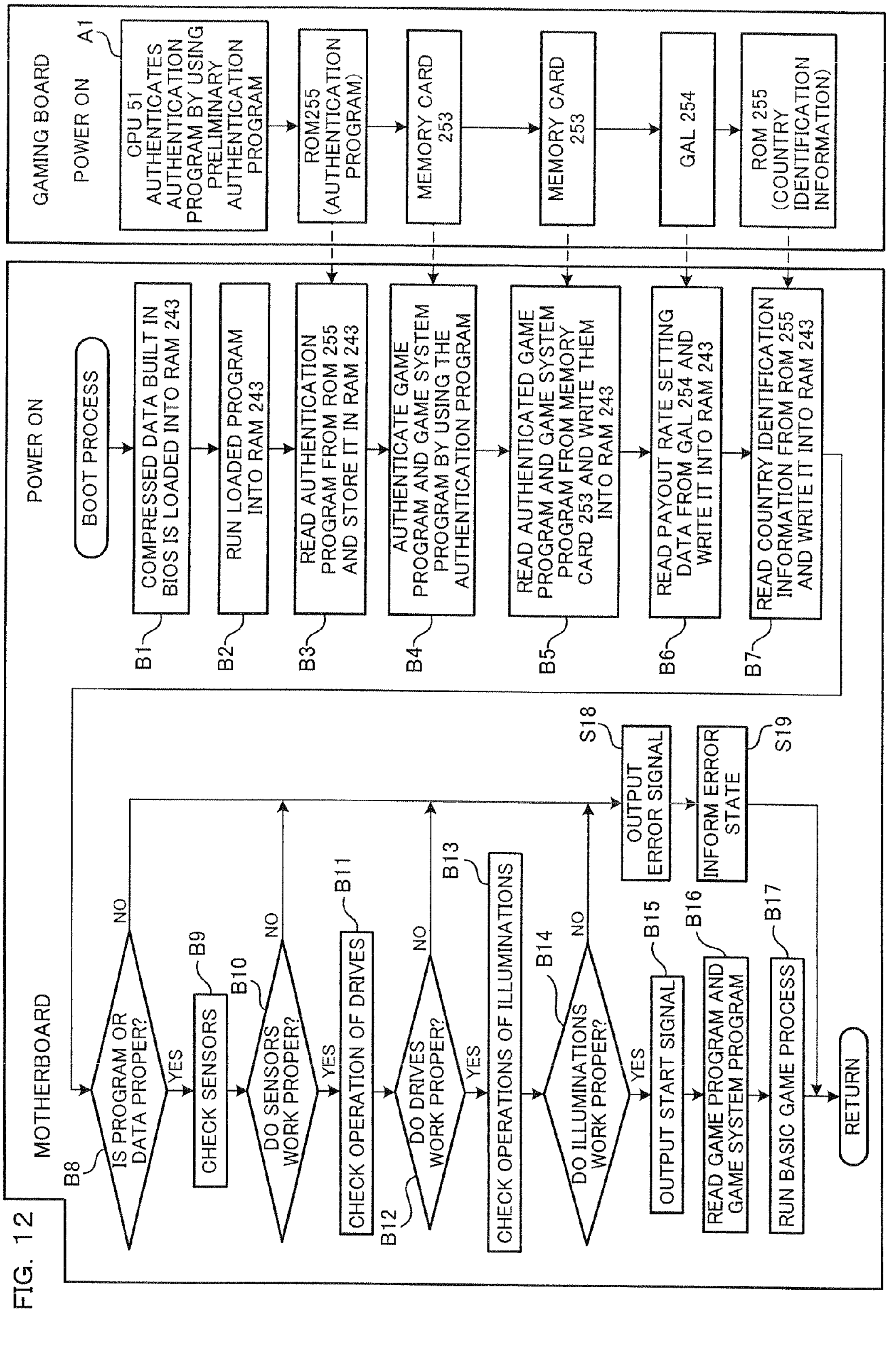
FIG. 12 is a flow chart of a boot process.

FIG. 11 shows a display state of the display 4 during a mini game. In other words, when a mini game starts, a mini game screen 320 is displayed on the entire upper liquid crystal panel 5A. A mini game screen 320 shows a penalty shootout of a soccer game. Specifically, a kicker who kicks a ball and a goal keeper who defends a goal are displayed as an initial screen. After predetermined standby time, the kicker kicks the ball. When the ball goes into the goal, an image reading "GOAL" and accumulated points are displayed. This allows a player to confirm the points acquired. To the contrary, when the ball does not go into the goal, the screen goes back to an initial screen of a next penalty shootout. Note that there will be no points generated in this case.

When the mini game ends, the display shifts from the mini game screen to an image of simulation reels 30A to 30C. Specifically, an image of all the simulation reels 30A to 30C is displayed. These simulation reels are displayed rotating at a constant speed. Thus, when the simulation reels rotate once, all the symbols of each of the reels 30A to 30C are displayed to be confirmed. The duration of the display time of the simulation reels is limited according to the point(s) acquired in the mini game. In other words, the duration of the video image of the simulation reels 30A to 30C is set according to the point(s) acquired in the mini game. Thus, the more points acquired, the longer the duration of the display time. As a result, it becomes easier to confirm all the symbols 301.

(Process Operation of the Slot Machine 1: Booting Process)

The following describes a booting process taking place in the slot machine 1. When power is supplied to the slot machine 1, a booting process routine shown in FIG. 12 takes place in the motherboard 240 and the gaming board 250. In the present embodiment, a memory card is inserted into the card slot 253S of the gaming board 250, and the GAL 254 is attached to the IC socket 254S.

First, when a power switch is turned on (power is supplied) in the power unit 245, the motherboard 240 and the gaming board 250 are booted. When the motherboard 240 and the gaming board 250 are booted, different processes are respectively carried out in parallel. That is, in the gaming board 250, the CPU 251 carries out processes of reading a preliminary authentication program stored in the boot ROM 252, and carrying out preliminary authentication by the preliminary authentication program. Note that the preliminary authentication is a process in which the preliminary authentication program is run to confirm and authenticate that authentication program is not modified in advance before importing the program into the motherboard 240 (A1).

Meanwhile, in the motherboard 240, the main CPU 241 runs BIOS stored in the ROM 242. As a result, the compressed data built in the BIOS is loaded into the RAM 243 (B1). Then, the main CPU 241 runs the BIOS loaded into the RAM 243, and diagnoses and initializes various kinds of peripheral devices (B2).

Afterwards, the main CPU 241 reads out, via PCI bus, the authentication program stored in the ROM 255, and stores the read out authentication program to the RAM 243 (B3). During this step, the main CPU 241 drives a checksum through an ADDSUM method (a standard check function) which is adopted in standard BIOS. Thus, it is confirmed whether or not the authentication program is stored in the RAM 243 without an error.

The main CPU 241 then confirms a component connected to the IDE bus. Then, the main CPU 241 accesses to the memory card 253 inserted into the card slot 253S via the IDE bus, to read out the game program and the game system program from the memory card 253. In this case, data constituting the game program and the game system program are read in units of four bytes. Then, the main CPU 241 confirms and authenticates, according to the authentication program stored in the RAM 243, that the read game program and the game system program are not modified (B4).

When the authentication process ends properly, the main CPU 241 writes and stores the authenticated game program and the game system program in the RAM 243 (B5).

The main CPU 241 then accesses to the GAL 254 attached to the IC socket 254S to read out payout rate setting data from the GAL 254, and stores the data in the RAM 243 (B6). Afterwards, the main CPU 241 reads out the country identification information stored in the ROM 255 of the gaming board 250, and stores the information to the RAM 243 (B7).

With a result of the above authentication process, the main CPU 241 determines whether the program or data is proper (B8). When the program or data is not proper (B8, NO), an error signal including ID information to specify a slot machine 1 is outputted to a centralized control device (not shown). The centralized control device specifies a slot machine 1 in an error state based on the error signal. The centralized control device then instructs a staff standing by near the slot machine 1 to deal with the error, and stores an error history information containing a time and date and a place when/where the error has occurred, or the like (B18). Then, the error state is informed in the form of an audio output from the speaker 23 of the slot machine 1, and in the form of light emitted from the light emitting section 20. Afterwards, the routine in the motherboard 240 ends.

On the other hand, when the program or data is proper (B8, YES), operations of sensors disposed to the slot machine 1 are checked successively (B9). Then, whether or not all the sensors operate properly is determined (B10). When an error is detected in at lest one sensor (B10, NO), the above mentioned B18 and B19 are carried out, and the routine ends thereafter.

On the other hand, when all the sensors operate properly (B10, Yes), operations of all drive mechanisms are checked successively (B11). Then, it is determined whether or not all the drive mechanisms operate properly (B12). When an error is detected in at least one drive mechanisms (B12, NO), the above mentioned B18 and B19 are carried out, and the routine ends thereafter. On the other hand, when all the drive mechanisms operate properly (B12, Yes), operations of all illuminations are checked successively (B13). Then, it is determined whether or not all the illuminations operate properly (B14). When an error is detected in at least one illumination (B14, No), the above mentioned B18 and B19 are carried out, and the routine ends thereafter.

On the other hand, when all the illuminations operate properly (B14, Yes), a boot signal indicating that all the illuminations have been booted properly is outputted to the centralized control device (not shown) or the like (B15). Afterwards, a basic game process is carried out (B16), and this routine ends. The following describes the basic game process in detail.

(Basic Game Process)

Figure 13A:
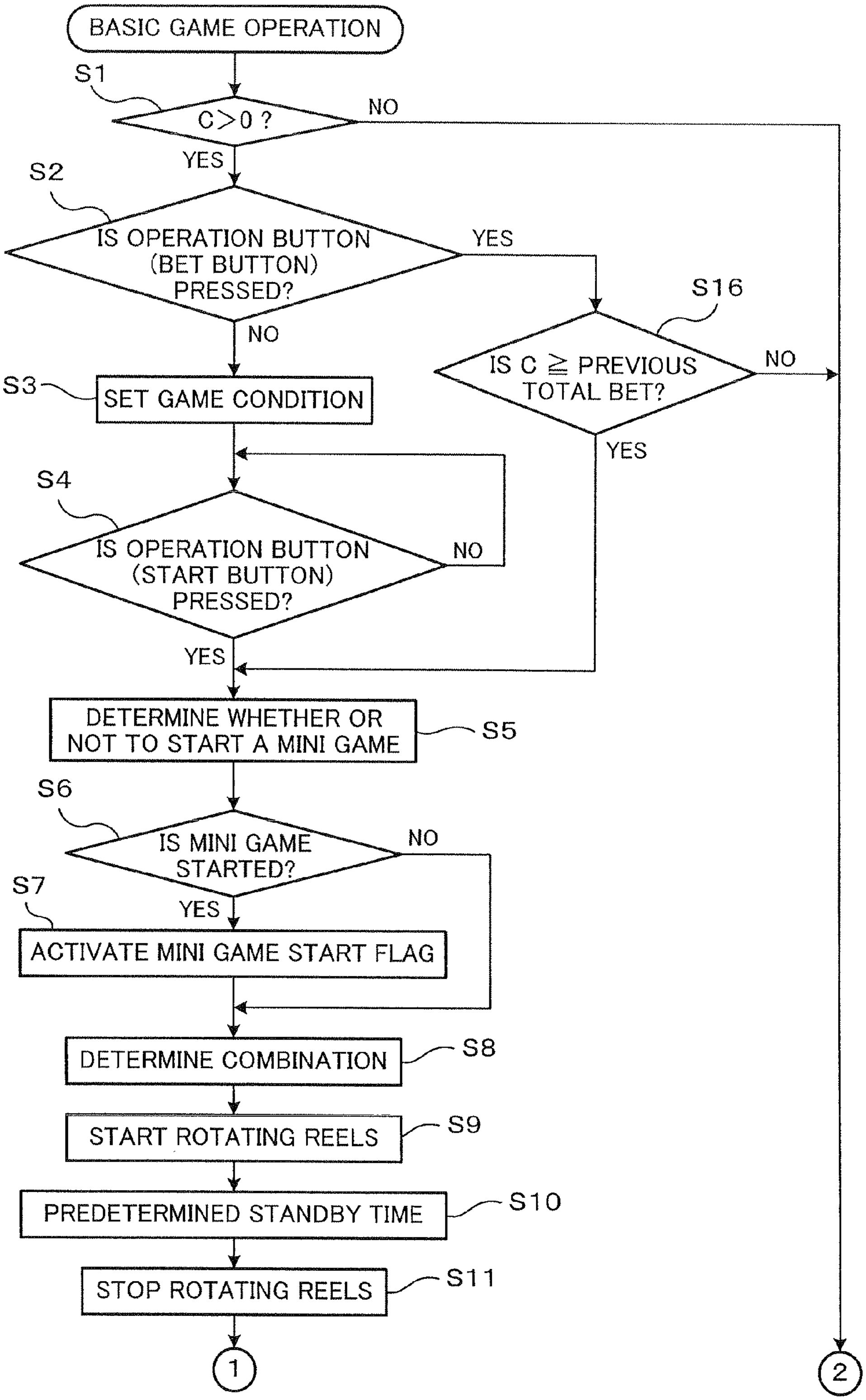
FIG. 13A is a flow chart showing part of a basic game process.
Figure 13B:
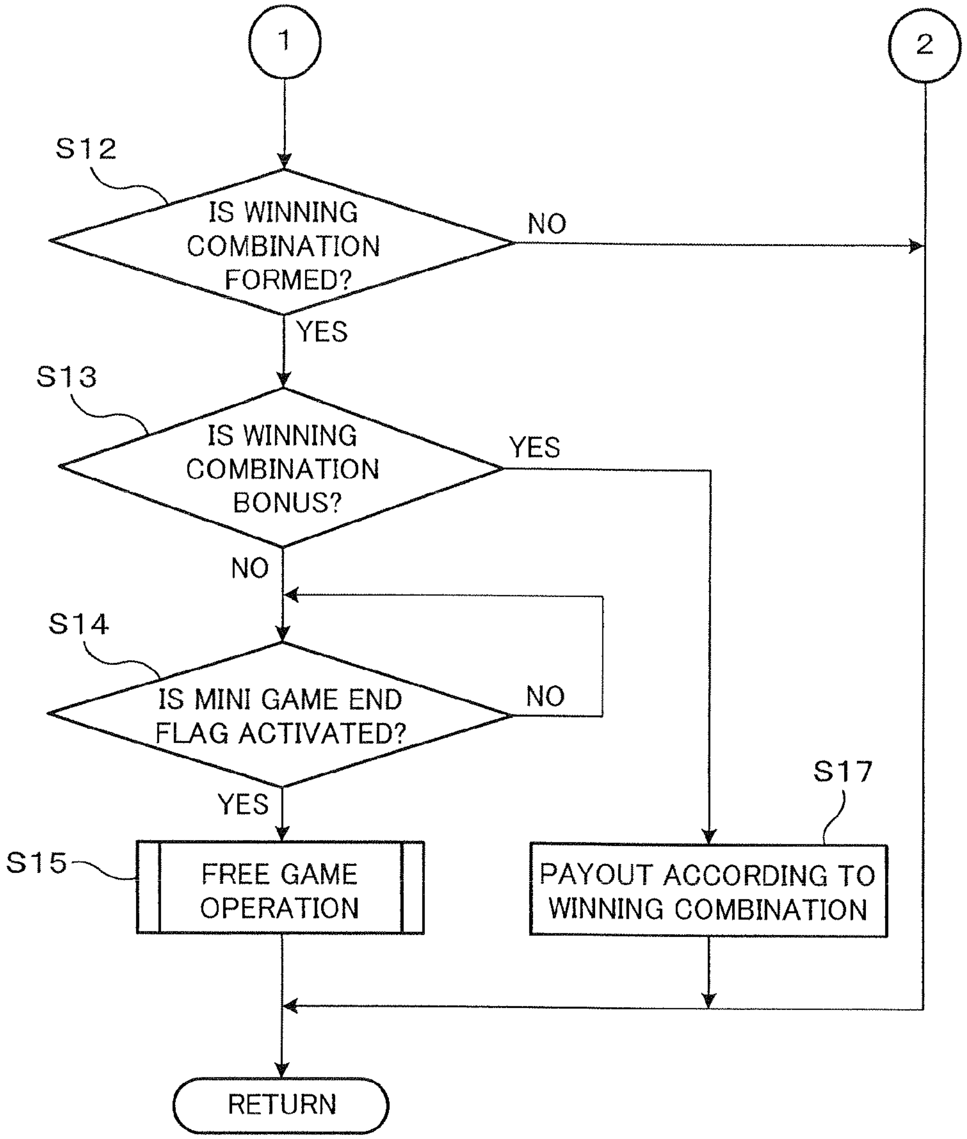
FIG. 13B is a flow chart showing another part of a basic game process.

FIGS. 13A and 13B are flow charts showing a process carried out by the main CPU 241 of the slot machine 1 during a basic game of the slot machine 1. A unit game includes a routine shown in FIGS. 13A and 13B. Note that the slot machine 1 is booted in advance, and a variable used in the CPU 241 on the other side, i.e. in the game controller 1 side, is initialized at a predetermined value. Accordingly, the slot machine 1 is constantly operated.

First, it is determined if there is a remaining credit, i.e., the remaining number of coins having been inserted by the player (S1). Specifically, a credit C stored in the RAM 243 is read out, and a process according to the read credit C is carried out. When the credit C is zero (S1, NO), the routine ends without any operation of a process since a game cannot be started. Meanwhile, when the credit C is equal to or more than one (S1, Yes), it is determined that there is at least one credit remaining and the process moves to S2.

In S2, it is determined whether or not the operation button 11 (bet button) is pressed (S2). When the operation button 11 (bet button) is not pressed for a predetermined time (S2, NO), a game condition is set (S3). Specifically, the number of coins to be bet on the payline L in the game is determined according to the operation of the operation button 11 (bet button). During this operation, an operation signal sent upon an operation of the operation button 11 is received. According to the number of times that the operation signal is received, the bet on the payline L is stored in a predetermined memory area of the RAM 243. A credit C stored in a predetermined memory area of the RAM 243 is then read out. A total bet where the above bet is added is subtracted from the read credit C. The resulting number is stored in the predetermined memory area of the RAM 243.

Afterwards, it is determined whether or not an operation button 11 (start button) is pressed (S4). If the operation button 11 (start button) is not pressed (S4, NO), S4 is repeated until the bet button 11 is pressed. When the operation button 11 (start button) is pressed (S4, YES), it is determined whether or not to start a mini game (S5).

On the other hand, when the operation button 11 (bet button) is pressed in S2 (S2, YES), it is determined whether or not a value of the credit C is equal to or more than the value of the total bet in the previous game. In other words, it is determined whether or not it is possible to start a game with the operation button 11 (bet button) being pressed. Specifically, pressing of the operation button 11 (bet button) causes reading out of a bet on the payline L in the previous game and a credit C written in a predetermined memory area of the RAM 243. According to a relation of the read credit C to the bet, a process branches as follows depending on whether the value of the credit C is equal to or more than the value of total bet in the previous game. When it is determined that the value of the credit C is less than the value of the total bet of the previous game (S16, NO), the routine ends without any operation of a process since a game cannot be started.

Meanwhile, when it is determined that the value of the credit C is equal to or more than the value of the total bet of the previous game (S16, YES), the value of the total bet of the previous game is subtracted from the value of the credit C. Then, the resulting value is stored in a predetermined memory area of the RAM 243. Afterwards, it is determined whether or not to start a mini game (S5).

When it is determined to start a mini game (S6, YES), a mini game start flag is activated (S7). Specifically, data showing that the game start flag activated is written into a storage area of a mini game start flag of the RAM 243. Meanwhile, when it is determined not to start a mini game (S6, NO), a combination determination process is carried out (S8).

In the combination determination process, a combination of symbols to be stopped on the payline L is determined first. Specifically, a command to generate a random number is sent to the random number generation circuit. Then, a random number within a predetermined range which is generated by the random number generation circuit, is sampled. The sampled random number is stored in a predetermined memory area of the RAM 243. Although a random number is generated in the random number generation circuit disposed outside the main CPU 241 in the present embodiment, a random number may be generated through a calculation by the main CPU 241, without the random number generating circuit.

Afterwards, a winning combination table for awarding a payout and a random number table stored in the ROM 242 are read out. Those read winning combination table and random number table are stored in a predetermined memory area of the RAM 243. Still-displaying of symbols are controlled for each reel in accordance with the random number table.

Then, the random number table and the winning combination table stored in the predetermined memory area of the RAM 243 are read out. Then, the random number written into the predetermined memory area of the RAM 243 is used as a parameter to refer to the random number table. A combination of symbols to be stopped on the payline L is then determined.

When a winning combination is determined, the winning combination table is stored into a predetermined memory area of the RAM 243. The random number and the winning combination table written in the predetermined memory area of the RAM 243 are read. In accordance with the random number and the winning combination table, a combination of symbols to be stopped and still-displayed are determined. During this process, the main CPU 241 reads out a symbol arrangement table stored from the ROM 242 and stores the table in a predetermined memory area of the RAM 243. The table is then used as a reference. The determined stop symbol data is stored in a predetermined memory area of the RAM 243. Alternatively, symbols to be stopped may be determined for each reel by using the random number table.

When a combination of symbols to be stopped on the payline L is determined, it is determined whether or not the combination is a winning combination. When the combination of symbols to be stopped on the payline L is a winning combination, a flag which indicates that a payout corresponding to the type of the winning combination will be awarded, is activated to generate the payout corresponding to the combination of symbols on the payline L forming the determined winning combination. The activated flag indicating that a payout will be awarded, is stored in a predetermined memory area of the RAM 243. To the contrary, when a combination of symbols to be stopped on the payline L is another combination, that is, a losing combination, the flag indicating that a payout will be awarded is not activated.

After the above combination determination process is carried out, reels 30A to 30C rotate so as to move symbols 301 in the display windows 7A to 7C (S9). Then, the rotation continues for a predetermined time (S10). Then, the rotation of reels 30A to 30C automatically stops (S11).

Then, it is determined whether or not a winning combination is formed through the combination determination process in S8 (S12). Specifically, this is done based on a status of the flag stored in the predetermined memory area of the RAM 243, which flag indicates a prize according to a combination of symbols on the payline L is awarded. When the flag is not activated (S12, NO), it is determined that a winning combination is not formed, and the routine ends.

Meanwhile, when the flag is activated (S12, YES), it is determined whether or not the winning combination formed in the combination determination process in S8 includes a "BLUE 7." Specifically, when the winning combination includes a "BLUE 7" (S13, YES), the routine ends after the number of coins are paid out in accordance to the winning combination (S17).

Meanwhile, when the winning combination does not include a "BLUE 7" (S13, NO), it is determined whether or not a mini game end flag is activated (S14). Specifically, it is determined whether or not data showing that the mini game end flag is activated is written into a mini game end flag area of the RAM 243. S14 is repeated when the mini game end flag is not activated (S14, NO). When the mini game end flag is activated (S14, YES), a free game process is carried out (S15). Then, the routine ends.

(Free Game Process)

Figure 14:
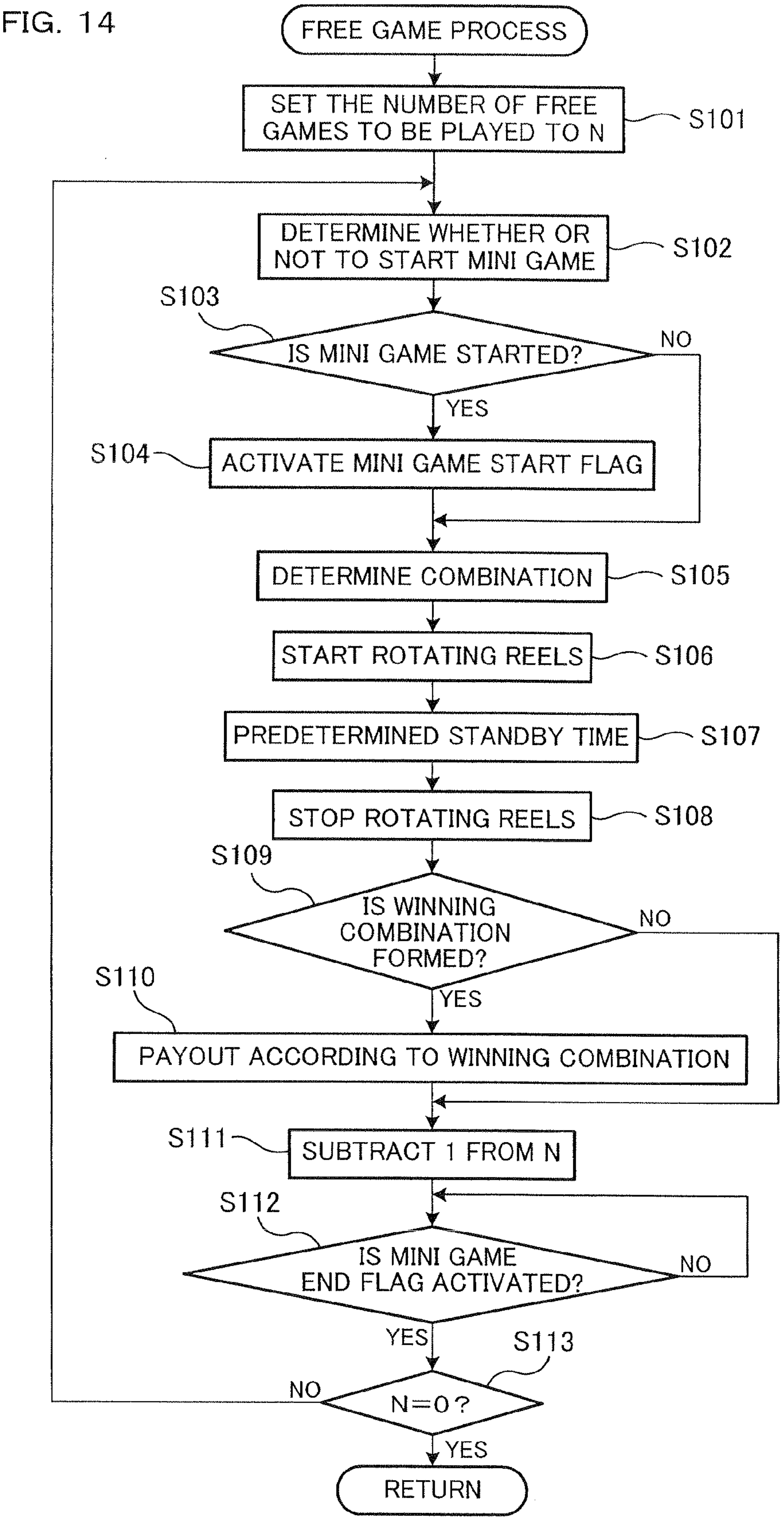
FIG. 14 is a flow chart showing a free game process.

The following describes a free game process with reference to FIG. 14.

First, N denotes the number of free games (S101). The number of free games is determined according to accumulated points acquired in a mini game of a basic game.

Then, whether or not to start a mini game is determined (S102). When a mini game is determined to start (S103, YES), a mini game start flag is activated (S104). Specifically, data indicating that the mini game start flag is activated is written into a storage area of the RAM 243 for storing the mini game start flag. Afterwards, the process moves to S105.

Meanwhile, when a mini game is determined not to start (S103, NO), the process immediately moves to S105. Thus, a combination determination process same as above is carried out (S105). A difference in this combination determination process is that the referred random number table is a free game random number table (not shown). Then, reels 30A to 30C start to rotate (S106). After a predetermined standby time (S107), each reels 30A to 30C stops rotating (S108).

Then, whether or not a winning combination is formed is determined (S109). When a winning combination is not formed (S109, NO), the process moves to S111. Meanwhile, when a winning combination is formed (S109, YES), a game medium according to the winning combination is paid out (S110). Specifically, the number of coins to be paid out for the winning combination is calculated, referring to the payout control table of FIG. 7. A credit stored in a predetermined memory area of the RAM 243 is then read out. The payout value calculated above is added to the credit. The sum is stored in a predetermined memory area of the RAM 243, and the stored value is displayed on the credit display unit 9.

In S111, 1 is subtracted from N (S111). Then, whether or not a mini game end flag is activated is determined (S112). Specifically, it is determined whether or not data showing that the mini game end flag is activated is written into a mini game end flag area of the RAM 243. S112 is repeated when the mini game end flag is not activated (S112, NO).

When the mini game end flag is activated (S112, YES), whether N is 0 is determined (S113). When N is not 0 (S113, NO), the operation is carried out again from S102. On the other hand, when N is 0 (S113, YES), the routine ends.

(Mini Game Process)

Figure 15:
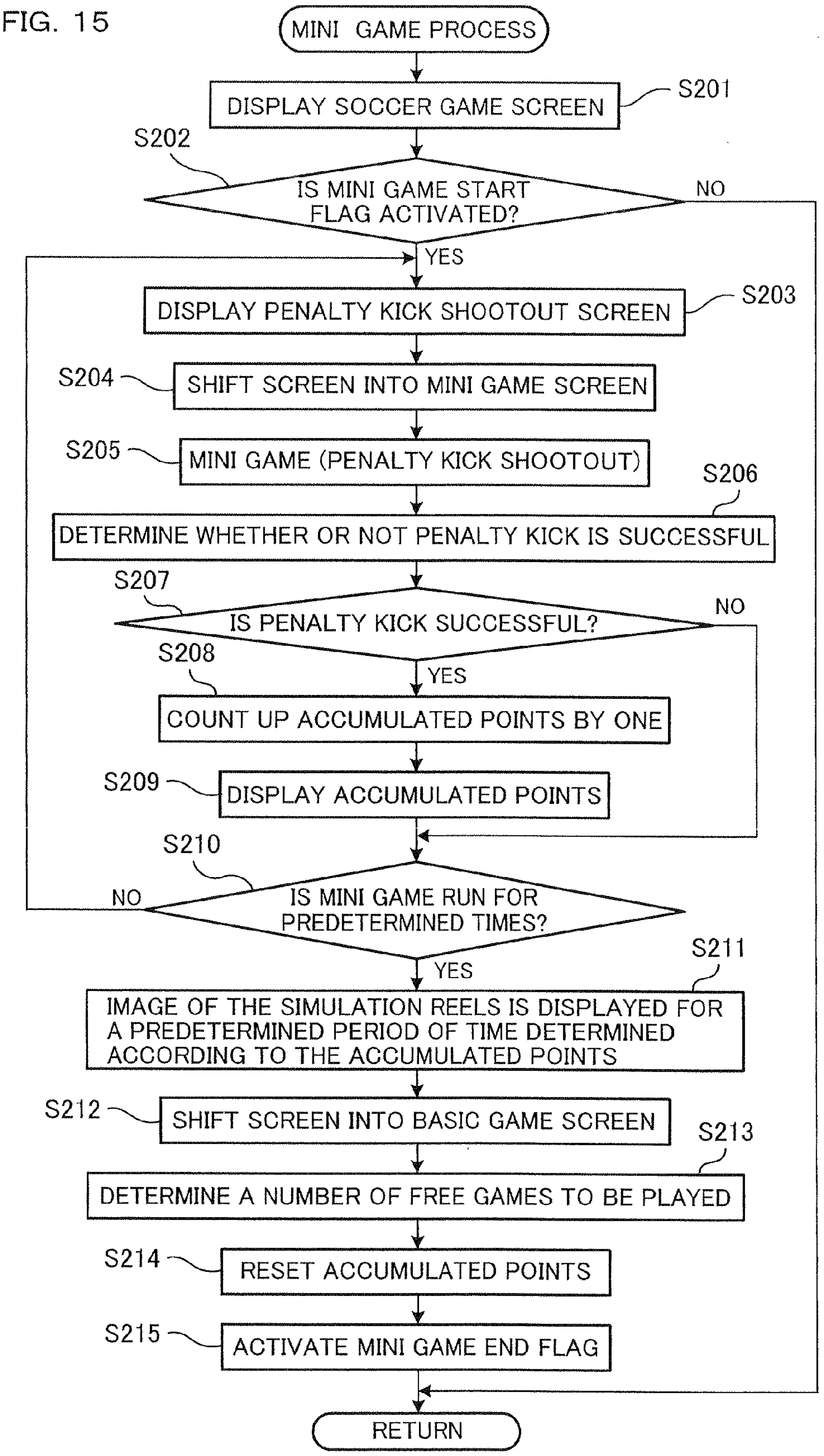
FIG. 15 is flow chart showing a mini game process.

The following describes a mini game process with reference to FIG. 15.

First, a soccer game screen, which is an effect screen displayed when a mini game is not run, is displayed on the upper liquid crystal panel 5A (S201). Then, whether or not the mini game start flag is activated is determined. Specifically, it is determined whether data showing that the mini game start flag is activated is written into the game start flag area or the RAM 243 (S202).

When the mini game start flag is not activated (S202, NO), the routine ends. Meanwhile, when the mini game start flag is activated (S202, YES), screens on the upper liquid crystal panel 5A switches, as shown in FIG. 1, from a soccer game screen to a penalty kick standby screen which is an effect screen displayed during a mini game. Then, with a mini game screen 320 displayed on the central liquid crystal panel 5B, the display windows 7A to 7C and a mini game screen 320 are displayed one atop the other (S204).

Then, a penalty kick shootout as a mini game is started (S205). That is, an image of a goal keeper and a kicker facing each other is displayed, and a cheering sound of audience members is outputted. Then, when the kicker places a ball and intends to kick it, whether or not a penalty kick is successful, i.e., whether or not the mini game is successful, is determined (S206). Specifically, a random number is used to determine whether or not the mini game is successful.

Then, it is determined whether or not a penalty kick shootout (mini game) is successful (S207). When the penalty kick shootout is successful (S207, YES), the total number of accumulated points is counted up by one (S208), and the total number of accumulated points is displayed (S209). Then, it is determined whether or not the mini game is run a predetermined number of times (S210). Meanwhile, when the penalty kick shootout is unsuccessful (S207, NO), the total number of accumulated points is not counted up, and it is determined whether or not the mini game is played for predetermined number of times (S210).

When the mini game is not played for predetermined number of times (S210, NO), the process is carried out again from S203, and a next penalty shootout starts. For example, when a penalty shootout is repeated for ten times or the like (S210, YES), an image of the simulation reels 30A to 30C is displayed as shown in FIG. 11. An image of the simulation reels is displayed for a predetermined period of time determined according to the accumulated points (S211). Afterwards, the screen switches to a basic game screen (S212). After determining the number of times the free game is run (S212), the accumulated points are reset (S214). Then, after setting the mini game end flag active (S215), this routine ends.

(Help Process)

Figure 16:
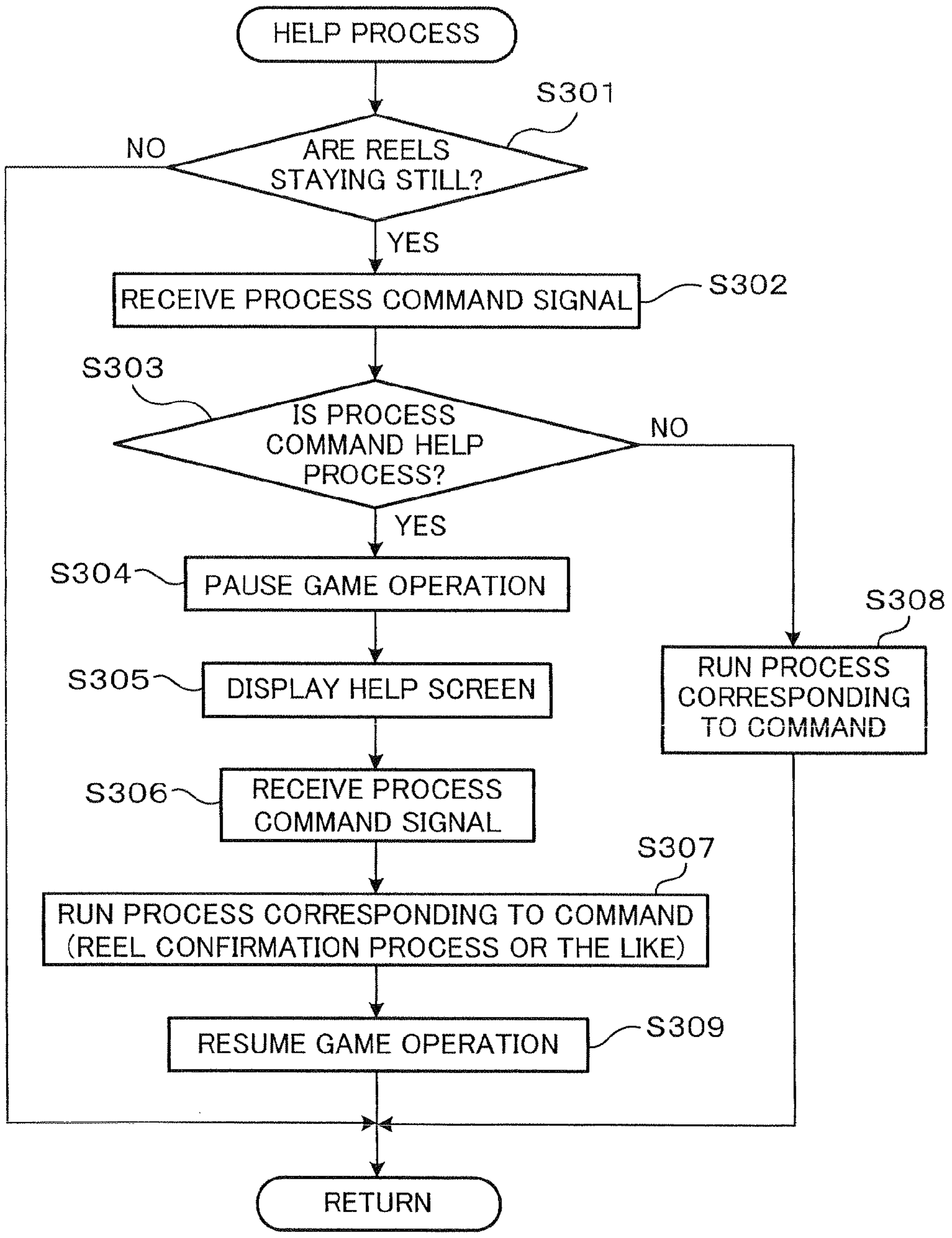
FIG. 16 is a flow chart of a help process.

The slot machine 1 is capable of carrying out a help process shown in FIG. 16 aside from a basic game process and a free game process. Specifically, it is determined whether or not the reels 30A to 30C are staying still (S301). When the reels 30A to 30C are not staying still due to an operation of a basic game or the like (S301, NO), the routine ends. In short, a help screen is not displayed. Meanwhile, when the reels 30A to 30C are staying still (S301, YES), an input signal outputted when a player presses the touch panel 69 shown in FIG. 4, the outputted signal is received as a process command signal (S302). Then, it is determined whether or not the process command signal is related to a help process (S303). When it is not related to a help process (S303, NO), a process corresponding to the command is carried out (S308). Afterwards, this routine ends.

Meanwhile, when the command is related to a help process (S303, YES), after a game process such as a basic game or the like is paused (S304), the display changes into a help screen. In other words, the help button frame 310 is displayed on the central liquid crystal panel 5B, and various kinds of help item buttons including a reel confirmation button 304, a rule button 305 and a payout button 306 are displayed in the help button frame 310 (S305).

Then, reception of a next command signal is started (S306). For example, when a reel confirmation button 304 is pressed, an input signal is received as a process command signal starting a reel confirmation process (S307). After a game process is resumed (S309), this routine ends.

(Reel Confirmation Process)

Figure 17:
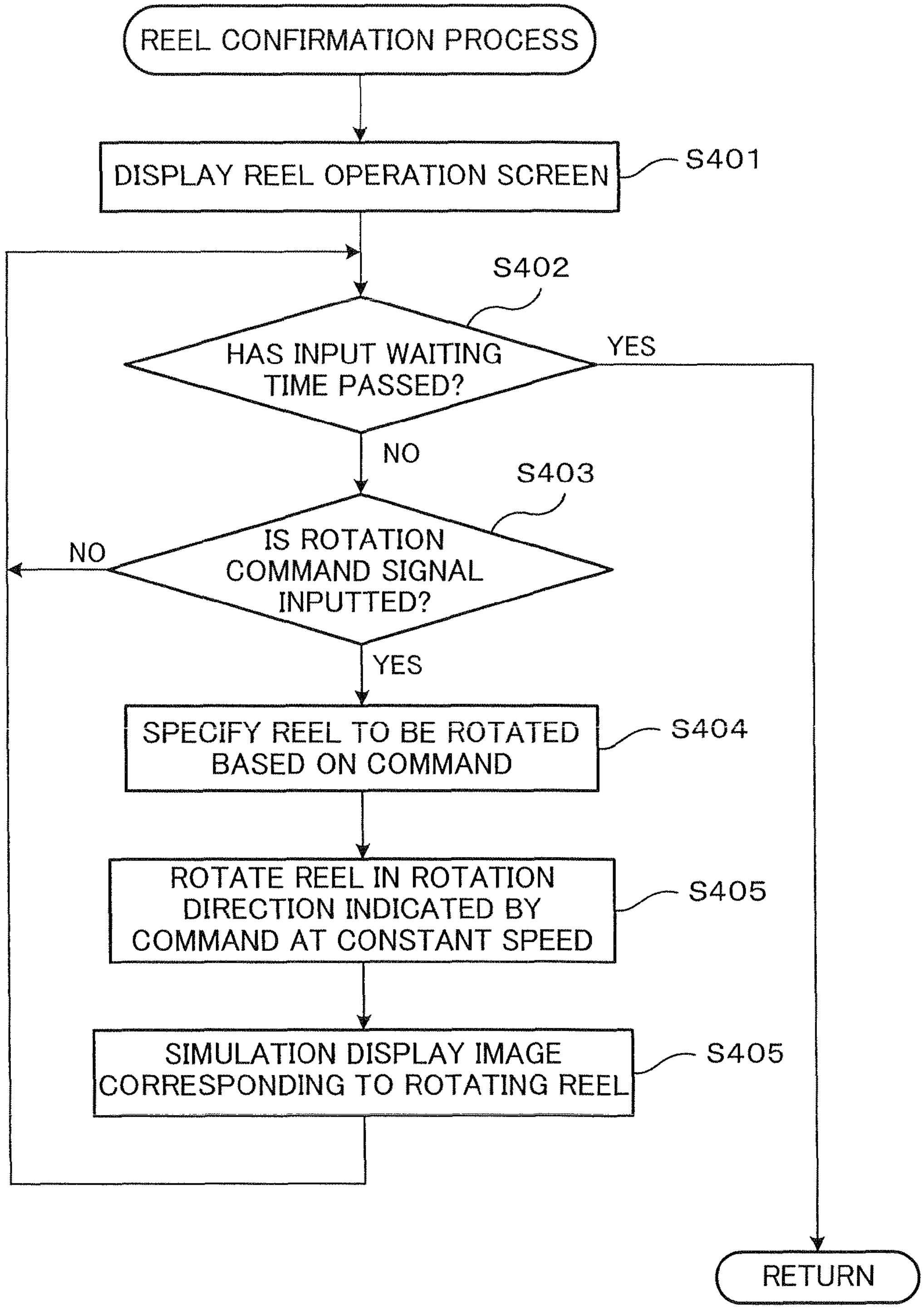
FIG. 17 is a flow chart of a reel confirmation process.

As shown in FIG. 17, when a reel confirmation process is carried out, a display switches to a reel operation screen shown in FIG. 10. In other words, direction symbols pointing upward or downward directions assigned to each of the reels 30A to 30C are displayed (S401).

Then, it is determined whether or not an input waiting time has passed (S402). When the input waiting time has passed (S402, YES), this routine ends. During the input waiting time (S402, NO), whether or not a rotation command signal is inputted is determined. Specifically, as shown in FIG. 10, an input signal outputted in response to a press operation of the touch panel 69, is received. Then, based on press position data and display position data of the direction symbol 302 in the input signal, it is determined whether or not the signal inputted is a rotation command signal (S403). When the signal inputted is not a rotation command signal (S403, NO), this routine ends. Meanwhile, when the signal inputted is a rotation command signal (S403, YES), one or more of the reels 30A to 30C positioned above the pressed position are specified as rotation target(s), based on a command included in the rotation command signal, i.e., pressed position data (S404)

Then, the one or more of the specified reels 30A to 30C rotate at a constant speed in a direction indicated by the direction symbol 302 (S405). When the one or more of the reels 30A to 30C rotate, the symbols 301 of the rotating reel are displayed on the symbol display frame 312. Thus, a player is able to confirm symbols with the actually rotating one or more of the reels 30A to 30C, as well as with the virtual symbols 301 displayed on the symbol display frame 312.

Thus, a player is able to rotate the reels 30A to 30C in a direction indicated by the direction symbols 302 while s/he is pressing the direction symbols 302. Thus, a player is able to easily confirm, through the eyes, the symbols 301 on the reels 30A to 30C.

Although the reels 30A to 30C rotate at a constant speed when the direction symbols 302 are pressed in the present embodiment, the present invention however is not limited to this. In other words, the reels 30A to 30C may rotate at a speed corresponding to the pressed area of the direction symbols 302 when the direction symbols 302 are pressed. In this case, when a player presses the touch panel 69 with a strong pressing force, the reels 30A to 30C rotate at a high speed. On the other hand, when a player presses the touch panel 69 with a small pressing force, the reels 30A to 30C rotate at a constant speed. Thus, a player is capable of changing the rotation speed of the reels 30A to 30C.

The detailed description of the present invention provided hereinabove mainly focused on characteristics thereof for the purpose of easier understanding; however, the scope of the present invention shall be construed as broadly as possible, encompassing various forms of other possible embodiments, and therefore the present invention shall not be limited to the above description. Further, the terms and phraseology used in the present specification are adopted solely to provide specific illustration of the present invention, and in no case should the scope of the present invention be limited by such terms and phraseology. Further, it will be obvious for those skilled in the art that the other structures, systems, methods or the like are possible, within the spirit of the invention described in the present specification. The description of claims therefore shall encompass structures equivalent to the present invention, unless otherwise such structures are regarded as to depart from the spirit and scope of the present invention. Further, the abstract is provided to allow, through a simple investigation, quick analysis of the technical features and essences of the present invention by an intellectual property office, a general public institution, or one skilled in the art who is not fully familiarized with patent and legal or professional terminology. It is therefore not an intention of the abstract to limit the scope of the present invention which shall be construed on the basis of the description of the claims. To fully understand the object and effects of the present invention, it is strongly encouraged to sufficiently refer to disclosures of documents already made available.

The detailed description of the present invention provided hereinabove includes a process executed on a computer or computer network. The above descriptions and expressions are provided to allow the one skilled in the art to most efficiently understand the present invention. A process carried out in or by respective steps yielding one result or blocks with a predetermined processing function described in the present specification shall be understood as a process with no self-contradiction. Further, the electrical or magnetic signal is transmitted/received and written in the respective steps or blocks. It should be noted that such a signal is expressed in the form of bit, value, symbol, text, terms, number, or the like solely for the sake of convenience. Although the present specification occasionally personifies the processes carried out in the steps or blocks, these processes are essentially executed by various devices. Further, the other structures necessary for the steps or blocks are obvious from the above descriptions.

Second Embodiment

The following describes a second embodiment of a gaming machine according to the present invention with reference to FIGS. 18 to 35. Note that the numerals assigned to each member of the FIGures, and the symbols indicating a step in a flowchart (e.g., S), and the descriptions thereof are valid only in the present embodiment, and thus do not indicate members or steps of another embodiment.

(Overview of Gaming Machine)

Figure 18:
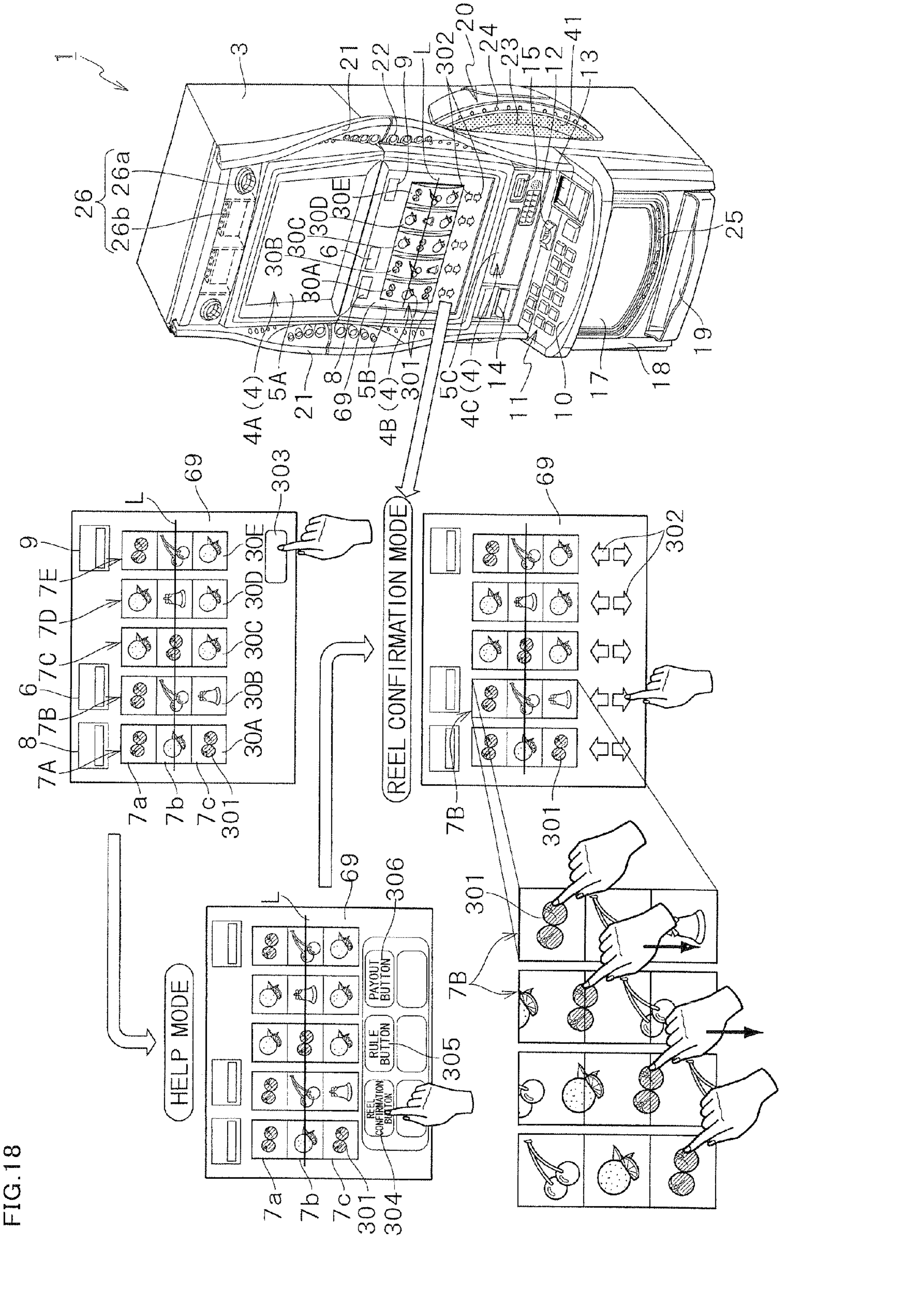
FIG. 18 is an explanatory view showing a playing method of a gaming machine.

As shown in FIG. 18, a gaming machine (slot machine 1) has one or more mechanical reels 30A, 30B, 30C, 30D, and 30E which rotate in response to a player's operation. To be more specific, the gaming machine has a first structure of rotating the reels 30A to 30E by flicking a touch panel 69 disposed before the mechanical reels 30A to 30E.

To be more specific, the gaming machine includes: a game requiring a player's bet; reels 30A to 30E used in the game and mechanically driven to rotate; symbols 301 on the reels 30A to 30E; an input device (touch panel 69) that is disposed to visibly cover at least the reels 30A to 30E and receives an input through a press operation by the player; and a controller that carries out the following steps of (a1) to (a3).

Specifically, the controller carries out the steps of: (a1) specifying an input position in the input device. (a2) When the input position corresponds to a front area of one or more of the reels 30A to 30E, determining that a rotation command related to the one or more of the reels 30A to 30E is inputted. (a3) Rotating the one or more of the reels 30A to 30E in a rotation direction indicated by a rotation direction component of the one or more of the reels 30A to 30E included in a movement direction based on the input position while the rotation command is being inputted.

The "gaming machine" may be a machine such as a slot machine 1 or the like for one player, or multiple players. For instance, a gaming machine for multiple players may include several slot machines 1 which are connected to one another and are capable of carrying out data communication with each other.

In addition to a function of running a game with mechanical reels 30A to 30E, the gaming machine may have a function of running one or more games through another mechanical operation, an electrical operation, or through a combination of mechanical and electrical operations. An example of an electrically operated gaming machine is a slot machine 1 which displays an image of reels 30A to 30E on a display of liquid crystal or the like, and virtually rotates or moves the reels 30A to 30E. Note that a slot machine 1 is shown as an example of a gaming machine in the present embodiment; however, the gaming machine is not limited to this.

The "input device" is not particularly limited as long as it enables the reels 30A to 30E to be visible through the input device, and enables an input through an operation by a player. Specifically, an input device may be a touch panel 69 disposed on an upper surface of a middle liquid crystal panel 5B, or an operation button 11 which enables an input by connection/disconnection of mechanical contact points. Moreover, an input device may be a device which enables input of information through a data communication using wireless signals such as sound, light, radio wave, or the like.

The gaming machine structured as described above is used in a game requiring a player's bet and realizes a confirmation method of the symbols 301 on the reels 30A to 30E that are mechanically driven to rotate.

In other words, the confirmation method of the symbols 301 includes the steps of: receiving an input by a player; specifying an input position of the input; when the input position corresponds to a front area of one or more of the reels 30A to 30E, determining that a rotation command related to the one or more of the reels 30A to 30E is inputted; and rotating the one or more of the reels 30A to 30E in a rotation direction indicated by a rotation direction component of the one or more of the reels 30A to 30E included in a movement direction based on the input position while the rotation command is being inputted.

Hence, when a player presses a front area of one or more of the reels 30A to 30E in the input device, a rotation command is inputted. When the input position through the press in the front area is moved, the reels 30A to 30E are rotated in a rotation direction indicated by a rotation direction component of the reels 30A to 30E included in a movement direction based on the input position. In short, one or more of the reels 30A to 30E rotate in response to the player's operation of moving the input position while pressing the front of the one or more of the reels 30A to 30E.

Hence, the player is able to successively confirm the symbols 301 actually arranged on the reels 30A to 30E by the player him/herself carrying out an operation to rotate the reels 30A to 30E. Thus, the gaming machine enables the player to easily recognize the symbol arrangement on the reels 30A to 30E. Moreover, when the player moves the input position on the input device dispsed in front of the reels 30A to 30E while pressing the input device, one or more of the reels 30A to 30E rotate in response to the movement. Thus, the gaming machine enables the player to feel as if s/he is directly touching and rotating the one or more of the reels 30A to 30E.

In addition to the first structure, the gaming machine has a second structure of rotating the reels 30A to 30E at a rotation speed corresponding to the drag speed.

To be more specific, the gaming machine includes: a game requiring a player's bet; reels 30A to 30E used in the game and mechanically driven to rotate to change rotation speed; symbols 301 on the reels 30A to 30E; an input device that is disposed to visibly cover at least the reels 30A to 30E and receives an input through a press operation by the player; and a controller that carries out the following steps of (b1) to (b4).

Specifically, the controller carries out the steps of: (b1) specifying an input position in the input device. (b2) When the input position corresponds to a front area of one or more of the reels 30A to 30E, determining that a rotation command related to the one or more of the reels 30A to 30E is inputted. (b3) Extracting a rotation direction component of the one or more of the reels 30A to 30E included in a movement direction based on the input position and obtaining movement speed relative to the rotation direction component. (b4) Rotating the one or more of the reels 30A to 30E in a rotation direction indicated by the rotation direction component so as to move the symbols 301 at the movement speed relative to the rotation direction component while the rotation command is being inputted.

Hence, when a player presses a front area of one or more of the reels 30A to 30E in the input device, a rotation command is inputted. When the input position through the press in the front area is moved, the reels 30A to 30E are rotated in a rotation direction indicated by a rotation direction component so that the symbols 301 are moved at a movement speed relative to the rotation direction component included in a movement direction based on the input position. In short, the reels 30A to 30E rotate in response to the player's operation of moving the input position while the player is pressing the front of the reels 30A to 30E.

Hence, the player is able to successively confirm the symbols 301 actually arranged on the reels 30A to 30E by the player him/herself carrying out an operation to rotate the reels 30A to 30E. Thus, the gaming machine enables the player to easily recognize the symbol arrangement on the reels 30A to 30E. Moreover, when the player moves the input position on the input device dispsed in front of the reels 30A to 30E while pressing the input device, one or more of the reels 30A to 30E rotate so that the symbols 301 correctly follow the movement. Thus, the gaming machine enables the player to feel as if s/he is directly touching and rotating the one or more of the reels 30A to 30E.

In addition to the first structure, the gaming machine has a third structure of rotating the reels 30A to 30E in a direction indicated by a direction symbol 302.

To be more specific, a gaming machine includes: a game requiring a player's bet; reels 30A to 30E used in the game and mechanically driven to rotate to switch a rotation direction; symbols 301 on the reels 30A to 30E; a display capable of generating a video image; an input device that is disposed to visibly cover the reels 30A to 30E and at least a part of a display area of the display and receives an input through a press operation by the player; and a controller that carries out the following steps of (c1) to (c6).

Specifically, the controller carries out the steps of: (c1) displaying a video image of a direction symbol indicating a rotation direction of the reels 30A to 30E; (c2) specifying an input position in the input device; (c3) when the input position corresponds to a front area of one or more of the reels 30A to 30E, determining that a rotation command related to the one or more of the reels 30A to 30E is inputted; (c4) rotating the one or more of the reels 30A to 30E in a rotation direction indicated by a rotation direction component of the one or more of the reels 30A to 30E included in a movement direction based on the input position while the rotation command is being inputted; (c5) when the input position corresponds to a display position of the direction symbol 302, determining that a rotation command related to one or more of the reels 30A to 30E is inputted; (c6) rotating the one or more of the reels 30A to 30E in a rotation direction indicated by the direction symbol 302 while the rotation command is being inputted.

Here, the "display" may include a liquid crystal display device, a CRT (cathode-ray tube) device, a plasma display or the like. In addition, one or more display 1 may be provided to the slot machine 1. In addition, for a gaming machine for multiple players, the display may be provided to each slot machine 1. Alternatively, a large screen display shared by all the slot machines 1 may be provided separately from the slot machines 1.

The above structure enables a player to input a rotation command related to the reels 30A to 30E associated with a direction symbol 302 simply by pressing a specific area, of the input device, corresponding to a display position of the direction symbol 302, while a video image of the direction symbol 302 is visible on the display. In short, the reels 30A to 30E are capable of switching their rotation directions through the direction symbol 302, and each rotation direction is shown as an image with the direction symbol 302. Hence, the player is able to successively confirm the symbols 301 actually arranged on the reels 30A to 30E by the player him/herself carrying out an operation to rotate the reels 30A to 30E with the direction symbol 302. Thus, the gaming machine enables the player to easily recognize the symbol arrangement on the reels 30A to 30E. Moreover, with the gaming machine, the player who operates the reels 30A to 30E is able to easily determine a rotation direction of the reels 30A to 30E.

In addition, the gaming machine has the first structure, the second structure and the third structure. To be more specific, a gaming machine includes: a game requiring a player's bet; reels 30A to 30E used in the game and mechanically driven to rotate to change rotation speed and to switch a rotation direction; symbols 301 on the reels 30A to 30E; a display capable of generating a video image; an input device that is disposed to visibly cover the reels 30A to 30E and at least a part of a display area of the display and receives an input through a press operation by the player; and a controller that carries out the following steps of (d1) to (d6).

Specifically, the controller carries out the steps of: (d1) displaying a video image of a direction symbol 302 indicating a rotation direction of the reels 30A to 30E; (d2) specifying an input position in the input device; (d3) when the input position corresponds to a front area of one or more of the reels 30A to 30E, determining that a rotation command related to the one or more of the reels 30A to 30E is inputted; (d4) extracting a rotation direction component of the one or more of the reels 30A to 30E included in a movement direction based on the input position and obtaining movement speed relative to the rotation direction component; (d5) rotating the one or more of the reels 30A to 30E in a rotation direction indicated by the rotation direction component so that the symbols 301 are moved at movement speed relative to the rotation direction component while the rotation command is being inputted; (d6) when the input position corresponds to a display position of the direction symbol 302, determining that a rotation command related to one or more of the reels 30A to 30E is inputted; and (d7) rotating the one or more of the reels 30A to 30E in a rotation direction indicated by the direction symbol 302 while the rotation command is being inputted.

(Functional Block of the Gaming Machine)

Figure 19:
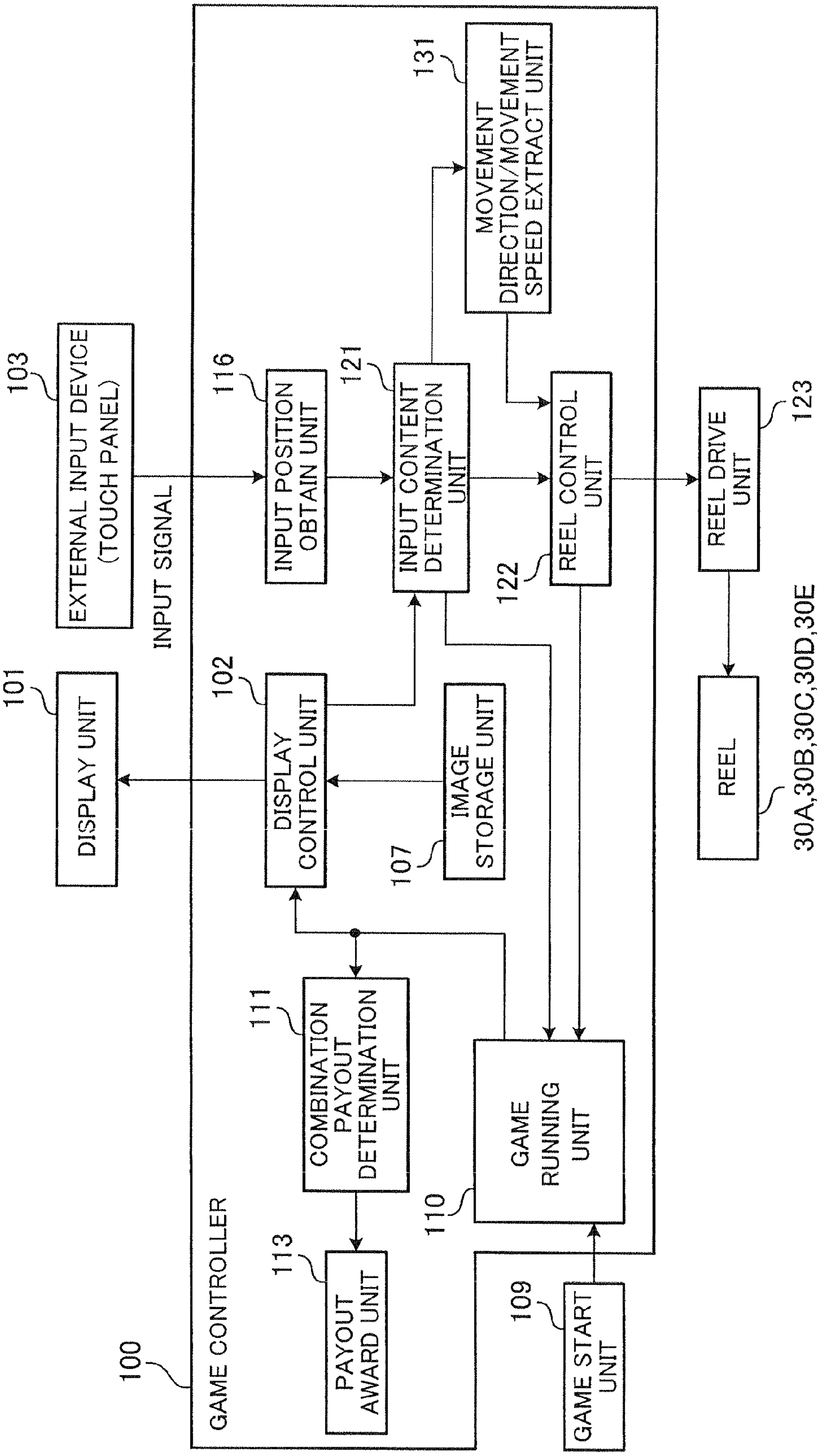
FIG. 19 is a block diagram of a gaming machine.

As shown in FIG. 19, the gaming machine with one of the above structures has a game controller 100, a display unit 101, an external input unit 103, a game start unit 109, a reel drive unit 123, and mechanical reels 30A to 30E.

(Display Unit 101)

The display unit 101 has functions of generating a video image and arranging/rearranging symbols 301 in a matrix with the reels 30A to 30E. Note that the wording "arrange" means a state where the symbols 301 can be visually observed by a player. To "rearrange" means to arrange the symbols 301 again after releasing them.

A video reel displayed as an image may substitute for the reels 30A to 30E of the display unit 101. In other words, the display unit 101 may adopt a combination of mechanical (reel) and electrical (video reel) structures. Examples of an electrical structure are a liquid crystal display, a CRT (cathode-ray tube) device, a plasma display device, or the like.

(Game Controller 100)

The game controller 100 has an image storage unit 107 which stores image data such as a mini game screen, a help screen, or the like. The image storage unit 107 is accessed by a display control unit 102. The display control unit 102 reads various kinds of image data of the image storage unit 107 under control of a game running unit 110. The display control unit 102 then displays various kinds of images related to the game in the display unit 101. A specific displaying mode is mentioned below.

The game controller 100 is connected to the game start unit 109. The game start unit 109 has a function of outputting a game start signal in response to a player's operation. The game controller 100 has a game running unit 110, a combination payout determination unit 111, and a payout award unit 113. The combination payout determination unit 111 determines a payout according to a combination of symbols 301 rearranged on a payline L in a unit game. The payout award unit 113 awards each payout determined in the combination payout determination unit 111.

The game running unit 110 has a function of running various kinds of games such as a basic game, a mini game, a free game, or the like. Moreover, the game running unit 110 has a function of running a unit game where symbols 301 are rearranged, triggered by a start signal from the game start unit 109.

Note that a unit game starts from receiving a bet and includes a series of operations until a win or loss is resulted. For example, a unit game of the basic game includes a bet time to receive a bet, a game time to rearrange stopped symbols 301, and a payout time of a payout process to award payout.

A basic game is a main game for which the gaming machine is originally intended, and is run during an ordinary game mode. For instance in slot machine 1, a slot game which is run during an ordinary game mode is a basic game. Note that a slot game offers a chance of acquiring a game value according to symbols 301 stopped and displayed after variable displaying of the symbols 301. Examples of a game value are a medal, a coin, a game ball, money, paper money, a magnetic card, or the like.

A mini game is a sub game different from the main game of the gaming machine. It is run in parallel with the basic game, or during a period of time while the basic game is not being played. In the present invention, for example, a penalty kick shootout game run during a slot game is a mini game. In the penalty kick shootout game, continuous penalty kicks may be automatically taken. This game may allow a player to operate kicking directions or strength of the ball.

A free game can be played for a predetermined number of times without betting a coin. Free game is a kind of bonus game. A bonus game is more advantageous than a basic game. Note that a bonus game is not specifically limited as long as it is an advantageous game for a player, that is, more advantageous than a basic game. Examples of advantageous state are, a state where more game media are obtainable than a basic game, a state where a possibility of obtaining a game medium is higher than that of the basic game, a state where fewer game media are consumed than a basic game, and so on.

The game controller 100 includes an input position obtain unit 116, an input contents determination unit 121, and a reel control unit 122. The input position obtain unit 116 is connected to an external input unit 103. The external input unit 103 is disposed separately from the game controller 100, and receives a signal input from outside by a player. Although a touch panel is used as an external input unit 103 in the present embodiment, it is not limited to a touch panel. The external input unit 103 may be a mouse or an operation button.

The input position obtain unit 116 has a function of specifying an input position based on a signal from the external input unit 103. The input contents determination unit 121 has functions of: receiving an input position from the input position obtain unit 116 and determining a command based on a relation of the input position to the image display area in the display unit 101; and outputting a command signal corresponding to the command to the reel control unit 122, the game running unit 110 and a movement direction/movement speed extract unit 131. To be more specific, the input contents determination unit 121 has a function of determining that a rotation command related to one or more of the reels 30A to 30E is inputted, when the input position corresponds to a display position of the direction symbol 302.

The game running unit 110 operates according to a command of a command signal. For example, when the command signal is a help command, it carries out a help process such as displaying a help screen as an image at a predetermined timing. The movement direction/movement speed extract unit 131 is run when a command signal is a reel rotation command. The movement direction/movement speed extract unit 131 has functions of: detecting a movement direction and movement speed based on an input position of a command signal; detecting a movement direction in accordance with the direction symbol 302; outputting rotation direction data corresponding to the movement direction to the reel control unit 122; and outputting rotation speed data corresponding to the movement speed to the reel control unit 122.

The reel control unit 122 is run when a command signal is a reel rotation command. The reel control unit 122 has functions of: forming a drive signal, based on the rotation direction data and the rotation speed data from the movement direction/movement speed extract unit 131; and outputting a drive signal to the reel drive unit 123 so as to rotate the reels 30A to 30E.

Each block of the game controller 100 may be formed with hardware, or software as needed.

(Operation of Game Controller 100)

The following describes operations of the game controller 100. First, symbols 301 are arranged into a matrix of five columns and three rows in the display unit 101. When the game running unit 110 runs a unit game through an operation by the game start unit 109, the reels 30A to 30E rotate and stop to rearrange the symbols 301. Then, the combination payout determination unit 111 determines a payout in accordance with a combination of symbols 301 rearranged on a payline, and the payout determined is awarded by the payout award unit 113.

When a player carries out a press operation to the external input unit 103, an input signal showing an input position in the external input unit 103 is outputted to the input position obtain unit 116. After extracting input position data included in the input signal in the input position obtain unit 116, the input signal is outputted to the input contents determination unit 121. Then, the input position data and a display area of the display unit 101 are compared to determine a command indicated by the input signal. The command signal including the command is outputted to the game running unit 110, the reel control unit 122 and the movement direction/movement speed extract unit 131, respectively.

When the command signal is received in the respective units 110, 122, 131, the game running unit 110 and the reel control unit 122 operate according to the command contents. In addition, when the command is a reel rotation command, the movement direction/movement speed extract unit 131 determines whether the command is a reel rotation command inputted through a press operation for the direction symbol 302 or a reel rotation command inputted through flicking the touch panel 69. For the reel rotation command based on the direction symbol 302, a direction indicated by the direction symbol 302 is outputted, as rotation direction data, to the reel control unit 122. In the meantime, for the reel rotation command inputted through a drag for the touch panel 69, rotation direction data obtained on the basis of a flicking direction, and rotation speed data obtained on the basis of flicking speed are outputted to the reel control unit 122.

When the command is a reel rotation command, the reel control unit 122 rotates one or more the reels 30A to 30E while the reel rotation command is being inputted. Specifically, when the rotation direction data and the rotation speed data are inputted, the reel control unit 122 rotates one or more the reels 30A to 30E at rotation speed corresponding to the rotation speed data in a rotation direction corresponding to the rotation direction data. In addition, when only the rotation direction data is inputted, the reel control unit 122 rotates the reels 30A to 30E at a predetermined rotation speed in a rotation direction corresponding to the rotation direction data.

(Mechanical Structure)

Figure 20:
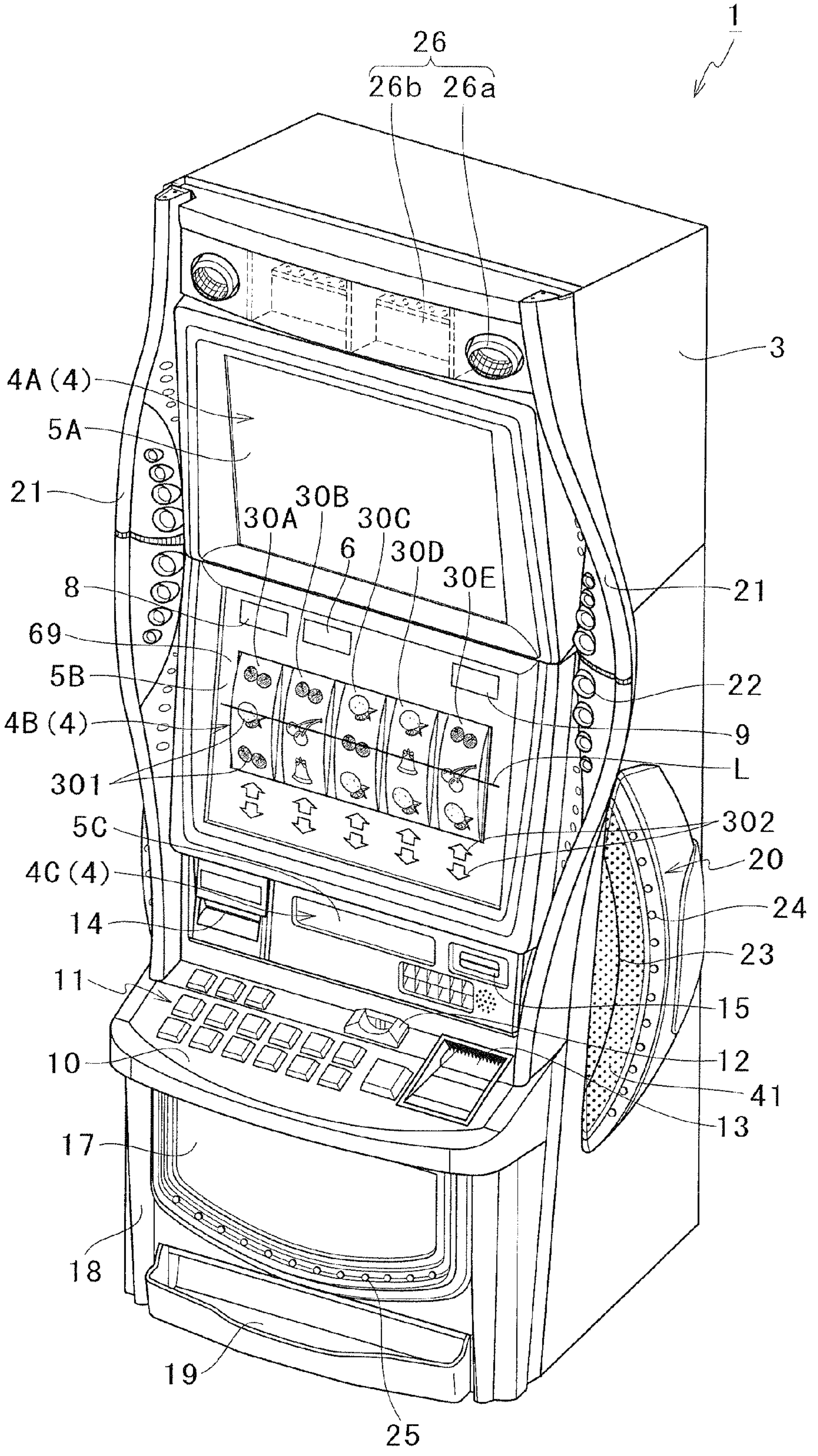
FIG. 20 is a perspective view showing an exterior of a gaming machine.

The following describes an embodiment where a gaming machine is specifically a slot machine 1. As shown in FIGS. 18 and 20, the slot machine 1 is an upright slot machine. The slot machine 1 has a cabinet 3 that houses therein electrical and mechanical parts for running a predetermined game. The cabinet 3 has a longer length in the vertical direction. On the front side of the cabinet 3 facing a player is a display 4. The display 4 displays a basic game, a mini game, and game information based on a game operation by the player.

Specifically, the display 4 has an upper variable display unit 4A, a middle variable display unit 4B, and a lower variable display 4C. The upper variable display unit 4A has a transparent upper liquid crystal panel 5A. The upper liquid crystal panel 5A is fixed on a front door of the cabinet 3. The upper liquid crystal panel 5A displays a soccer game screen or a penalty kick standby screen during basic, mini, and free games. In other words, the upper liquid crystal panel 5A displays a soccer game screen when the mini game is not running, and a penalty kick standby screen while the mini game is running.

The middle variable display unit 4B is a rotation symbol display panel on which a player directs the eyes at all times. The middle variable display unit 4B has a transparent central liquid crystal panel 5B fixed on the front door of the cabinet 3. The central liquid crystal panel 5B has five display windows 7A, 7B, 7C, 7D, 7E presenting an internal state to the outside. Inside the display windows 7A to 7E, are reels 30A to 30E respectively arranged.

Figure 27:
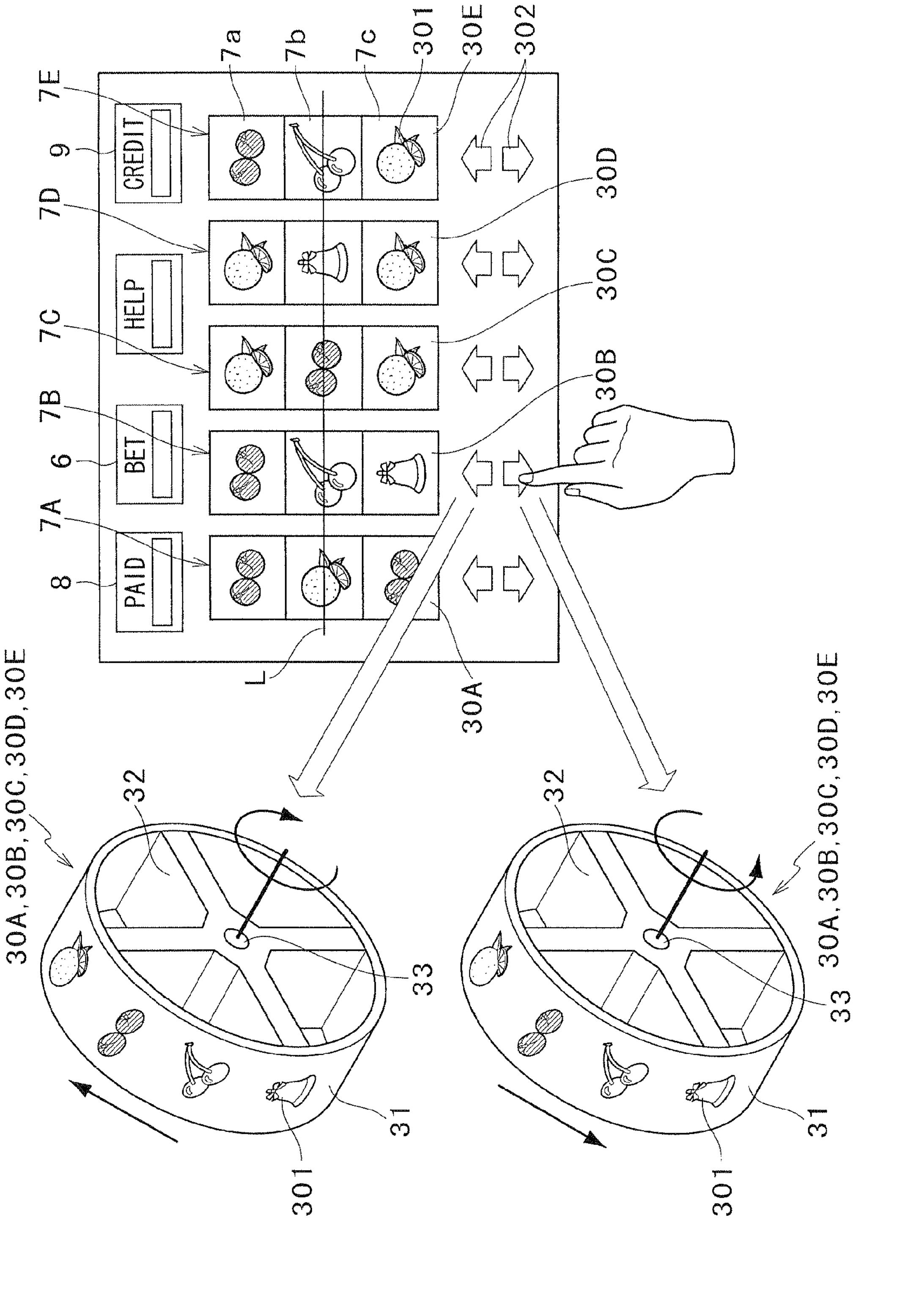
FIG. 27 is an explanatory view of a display screen in a reel confirmation mode.

As shown in FIG. 27, each of the reels 30A to 30E has a circular cylindrical member 31, a rotation axis 32 arranged at the center of the cylindrical member 31, and a support member 33 which connects the rotation axis 32 and the cylindrical member 31. The rotation axis 32 is connected to a rotation drive mechanism (not shown). The rotation drive mechanism enables the reels 30A to 30E to rotate and stop at a predetermined angle by providing a rotation drive force to the rotation axis 32 at any given timing.

On the outer cabinet surface of the cylindrical member 31 is a symbol column. The symbol column has a combination of symbols 301, including a "JACKPOT 7," a "BLUE 7," a "BELL," a "CHERRY," a "STRAWBERRY," a "PLUM," an "ORANGE," and an "APPLE." Moreover, the symbol column is set so that three successive symbols 301 on the symbol column are visible through associated one of the display windows 7A, 7B, 7C, 7D, 7E.

The reels 30A to 30E described above enable the symbol columns to respectively rotate in a vertical direction through mechanical drive. Thus, the slot machine 1 is capable of rearranging five columns and three rows of symbols 301 in display windows 7A to 7E by rotating and stopping the reels 30A to 30E.

The central liquid crystal panel 5B displays one payline L. The payline L horizontally crosses the five display windows 7A to 7E. Note that the payline is for determining a combination of the symbols 301. In other words, when symbols 301 are rearranged on and outside the payline L, only a combination of the symbols 301 rearranged on the payline L is considered. When the combination is recognized as a winning combination, a process such as paying out a coin according to the winning combination or the like is carried out.

The central liquid crystal panel 5B displays a moving image effect or the like in an effect display unit when a player wins a game. The central liquid crystal panel 5B also displays, on its upper area, images of a bet display unit 6, a payout display unit 8 and a credit display unit 9. The entire surface of the central liquid crystal panel 5B is covered with the touch panel 69. The touch panel 69 is made of a transparent material including a transparent electrode or the like. Through the touch panel 69, an image of the each display unit displayed by the central liquid crystal panel 5B, and the symbols 301 on the reels 30A to 30E are visible. Thus, the images on the central liquid crystal panel 5B and the symbols 301 on the reels 30A to 30E are visible to the player through the touch panel 69.

In addition, the touch panel 69 has a function of outputting, as an input signal, two-dimensional position data of horizontal axis and vertical axis directions when receiving a pressing force. Hence, through the touch panel 69, the each display unit of the central crystal panel 5B and the symbols 310 on the reels 30A to 30E are visible to the player. Moreover, the touch panel 69 outputs, to a below mentioned main body PCB 260, an input signal including information indicated by the each display unit when the player presses the each display unit.

The lower variable display unit 4C has a lower liquid crystal panel 5C which displays a point stored in a card, or a point of a game. A number displayed on the lower liquid crystal panel 5C is based on a display result of the middle variable display unit 4B. When a winning combination is formed on the middle variable display unit 4B, a point based on the winning combination is added to the game points displayed on the lower liquid crystal panel 5C. On the left side of the lower liquid crystal panel 5C is a ticket printer 14. On the right side of the lower liquid crystal panel 5C is a card reader 15.

Below the lower variable display unit 4C is an operation table 10. The operation table 10 projects forward from the front surface of the cabinet 3. The operation table 10 has an operation button 11. The operation button 11 is structured with, for instance, a bet button, a collect button, a start button, a stop button, or the like. The operation table 10 also has a coin insertion slot 12 and a paper money insertion slot 13. With the above structure, the operation table 10 functions as an operation unit enabling a player to carry out a game related operation.

Below the operation table 10 is a waist panel 17. The waist panel 17 is a plastic panel on which an image related to a game is printed. The waist panel 17 is fixed on a lower front door 18, and is illuminated by a cold cathode tube. Below the waist panel 17 is a coin receiving portion 19. The coin receiving portion 19 is formed so as to store the coins paid out according to the game result.

The cabinet 3 has a light emitting unit 20. The light emitting unit 20 includes light emitting components such as lamps, LED, or the like. The light emitting unit 20 is formed and disposed so as to surround a game area including the upper variable display unit 4A, the middle variable display unit 4B, the lower variable display unit 4C and the operation table 10.

The lamps in the light emitting unit 20 are a side lamp 22, a speaker lamp 24, an under lamp 25, a top lamp 26, or the like. The side lamps 22 are disposed to inclined parts 21. These inclined parts 21 are respectively disposed to the left and the right sides of the front surface side of the cabinet 3. The inclined parts 21 are projected in bow shapes, and are disposed so as to sandwich the upper variable display unit 4A, the middle variable display unit 4B, the lower variable display unit 4C.

The speaker lamps 24 are projected sideways at the right and left ends of the cabinet 3 adjacent to the operation table 10. The speaker lamps 24 are provided to the arched speakers 23 and are aligned along edges of the speakers 23. The under lamps 25 are provided on the lower front door 18, and are aligned along a lower edge of the waist panel 17. The top lamps 26 are provided above the upper variable display unit 4A. The top lamps 26 has power lamps 26*a* arranged at both sides respectively and a band-type lamp 26*b* horizontally arranged between the power lamps.

(Electrical Structure)

Figure 21:
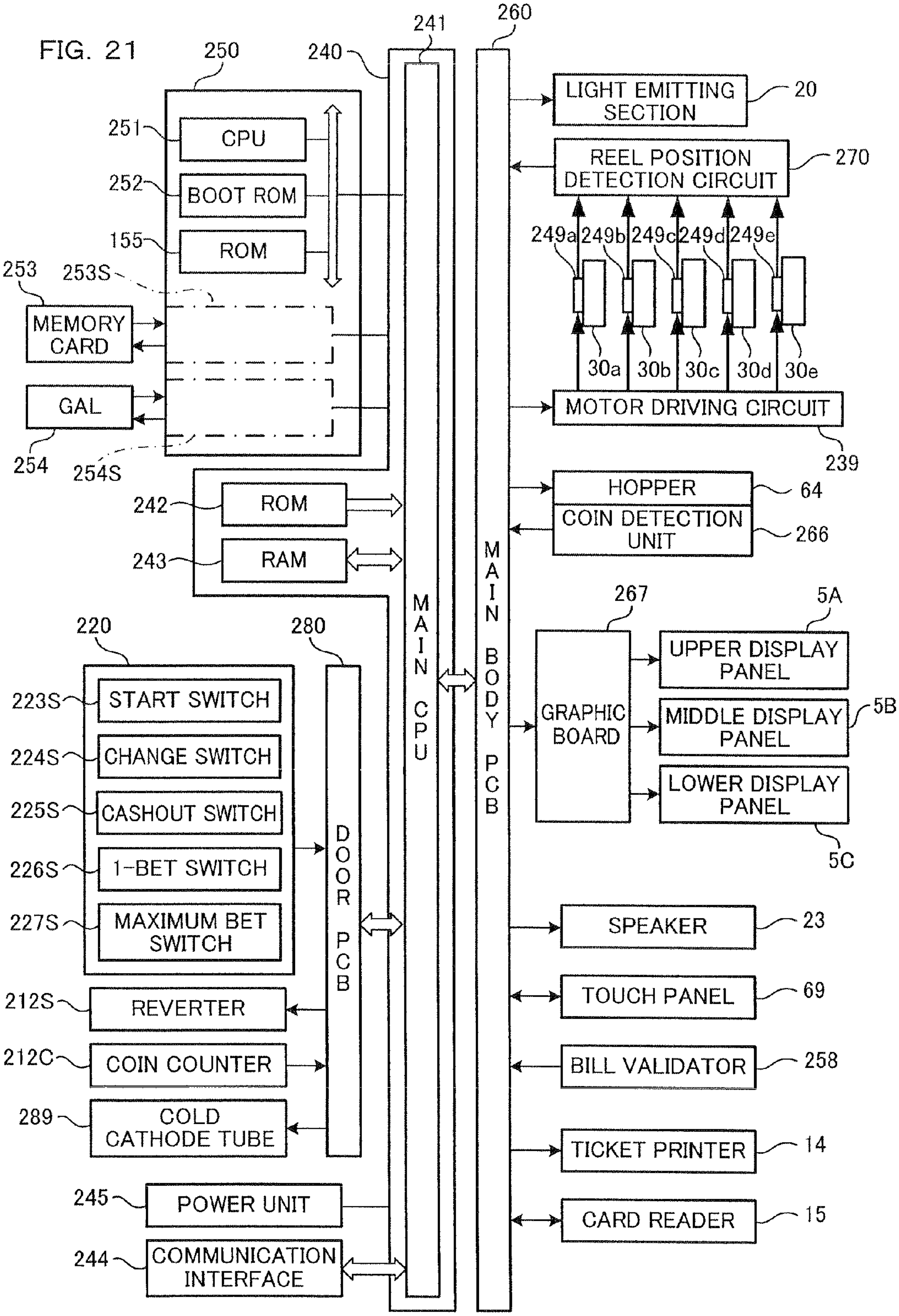
FIG. 21 is a block diagram showing a control circuit of a gaming machine.

FIG. 21 is a block diagram showing an electrical structure of the entire slot machine 1. A control unit having a controller 100 shown in FIG. 19 is disposed inside the cabinet 3. As shown in FIG. 21, the control unit has such components as a motherboard 240, a main body PCB (Printed Circuit Board) 260, a gaming board 250, a door PCB 280, various kinds of switches, a sensor, or the like.

The gaming board 250 has a CPU (Central Processing Unit) 251, a ROM 255, a boot ROM 252, a card slot 253S corresponding to a memory card 253, and an IC socket 254S corresponding to a GAL (Generic Array Logic) 254, connected to one another through an internal bus.

The memory card 253 stores a game program and a game system program. The game program includes a stop symbol determination program. The stop symbol determination program is for determining the symbols 301 to be stopped on the payline L (a code number corresponding to the symbols). The stop symbol determination program includes symbol weighting data corresponding to each of kinds of payout rates (e.g. 80%, 84%, and 88%). The symbol weighting data shows a corresponding relationship between a code number of each symbol and one or more random number values in a predetermined value range (0 to 256), for each of the display windows 7A, 7B, 7C, 7D, and 7E.

The memory card 253 stores a program which samples a random number. The random number sample program is read by a RAM 243 in time of carrying out a game running process, a bonus game process, or the like. This program is run by a main CPU 241. A random number is sampled by a program in the present embodiment; however, the method of sampling a random number is not limited to this. For example, it is possible to adopt a structure including: a random number generating circuit which generates a random number (random numbers) of a certain range, and a sampling circuit which samples a random number from the random number(s) generated by the random number generating circuit.

A payout rate is set according to the payout rate setting data outputted from the GAL 254. Symbols to be stopped are determined according to the symbol weighed data corresponding to the payout rate.

The memory card 253 stores various kinds of data used in the game program and the game system program. For example, the data showing a relationship between the random number range and the symbols 301 displayed in the display windows 7A to 7E in FIG. 18, is stored as a table in the memory card 253. The data is transferred to the RAM 243 of the motherboard 240 in time of running the game program.

The memory card 253 is attachable/detachable to/from the card slot 253S. The card slot 253S is connected to the motherboard 240 by an IDE bus. Thus, the gaming board 250 enables a player to change the types and contents of games to be run in the slot machine 1 through a switching operation including the steps of removing the memory card 253 from the card slot 253S, writing a different game program and a game system program in the memory card 253, and inserting the memory card 253 to the card slot 253S.

The game program includes a program according to a game progress, and a program for shifting into a bonus game. The game program also includes image data and sound data outputted during a game.

The GAL 254 has input ports and output ports. When data is inputted to the input ports, the GAL 254 outputs, from the output ports, the data corresponding to the inputted data. The data outputted from the output ports is the above-mentioned payout rate setting data.

The GAL 254 is attachable/detachable to/from the IC socket 254S. The IC socket 254S is connected to the motherboard 240 by a PCI bus. Thus, the gaming board 250 enables the payout rate setting data outputted from the GAL 254 to be changed through a switching operation including the steps of removing the GAL 254 from the IC socket 254S, rewriting a program stored in the GAL 254, and attaching the GAL 254 to the IC socket 254S.

The CPU 251, ROM 255, and boot ROM 252 connected to one another by an internal bus, are connected to the motherboard 240 by a PCI bus. The PCI bus transmits a signal between the motherboard 240 and the gaming board 250. The PCI bus also supplies power to the gaming board 250 from the motherboard 240. The ROM 255 stores country identification information and an authentication program. The boot ROM 252 stores a preliminary authentication program, a program for the CPU 251 to start the preliminary authentication program (boot code), or the like.

An authentication program is for authenticating a game program and a game system program (falsification check program). The authentication program is for confirming and authenticating that the game program or the game system program is not modified. In other words, the authentication program is described in accordance with the authentication procedure of the game program and the game system program. A preliminary authentication program is for authenticating the authentication program. The preliminary authentication program is described in accordance with a procedure for verifying that the authentication program to be authenticated is not falsified. In short, the preliminary authentication program authenticates the authentication program.

The motherboard 240 has a main CPU 241(controller), a ROM (Read Only Memory) 242, a RAM (Random Access Memory) 243, and a communication interface 244.

The main CPU 241 functions as a controller to control the entire slot machine 1. Specifically, the main CPU 241 controls (i) when the start button is pushed after a credit is bet, to output a command signal to rotate and stop the reels 30A to 30E to start a variable display in the display windows 7A to 7E, (ii) after a variable display has started, to determine the symbols to be stopped, and (iii) to still-display the determined symbols in the display windows 7A to 7E.

In other words, the main CPU 241 functions as an arrangement controller for carrying out an arrangement control by which, among various kinds of symbols 301, the symbols to be stopped in a symbol matrix are selected and determined, and then scrolling of the symbols is stopped so that the determined symbol matrix appears. With this function, symbols 301 displayed after being scrolled by a rotation of the reels 30A, 30B, 30C, 30D, and 30E on the central liquid crystal panel 5B are rearranged in a new symbol matrix.

The ROM 242 stores a program such as a BIOS (Basic Input/Output System) or the like run by the main CPU 241. The ROM 242 also stores data which is permanently used. When the main CPU 241 runs the BIOS, each peripheral device is initialized, and a reading process via the gaming board 250 for a game program and a game system program stored in the memory card 253, is started. The RAM 243 stores data and a program used when the main CPU 241 carries out the process.

The communication interface 244 is for communicating, through a telecommunication circuit, with a host computer or the like provided in the arcade. The main body PCB (Printed Circuit Board) 260 and the door PCB 280 are respectively connected with the motherboard 240 through a USB (Universal Serial Bus). Moreover, the motherboard 240 is connected to a power unit 245. The power unit 245 supplies power to the motherboard 240 to boot the main CPU 241 of the motherboard 240, and supplies power to the gaming board 250 through the PCI bus to boot the CPU 251.

The main body PCB 260 and the door PCB 280 are connected to an equipment or a device which generates an input signal to be inputted into the main CPU 241, and an equipment or a device whose operation is controlled by a control signal outputted from the main CPU 241. The main CPU 241 runs a game program and a game system program stored in the RAM 243 in accordance with the input signal inputted to the main CPU 241. Thus, the main CPU 241 is capable of carrying out various kinds of processes such as storing a result of a calculation process to the RAM 243, and controlling each equipment and device by transmitting a control signal to the each equipment and device.

The main body PCB 260 is connected to a light emitting unit 20, a hopper 64, a coin detection unit 266, a graphic board 267, the speakers 23, a bill validator 258, the ticket printer 14, and the card reader 15. The light emitting unit 20 has lamps including the side lamps 22, the speaker lamps 24, the under lamps 25, the top lamps 26 and an LED.

Turning on and off the light emitting unit 20 is controlled according to a control signal outputted by the main CPU 241. The hopper 64 is disposed in the cabinet 3, and pays out a predetermined number of coins from a coin payout opening 16 to the coin receiving portion 19 in accordance with a control signal outputted by the main CPU 241. The coin detection unit 266 is disposed in the coin payout opening 16. The coin detection unit 266 outputs an input signal to the main CPU 241 upon detecting that a predetermined number of coins have been paid out from the coin payout opening 16.

The coin detection unit 266 counts the number of coins paid out by the hopper 64, and outputs the data of the resulting number to the main body PCB 260. According to the data of the number of coins paid out (by the hopper 64), the main body PCB outputs a signal to notify completion of payout of a coin or coins to the main CPU 241, when a set number of coins are paid out.

Figure 22:
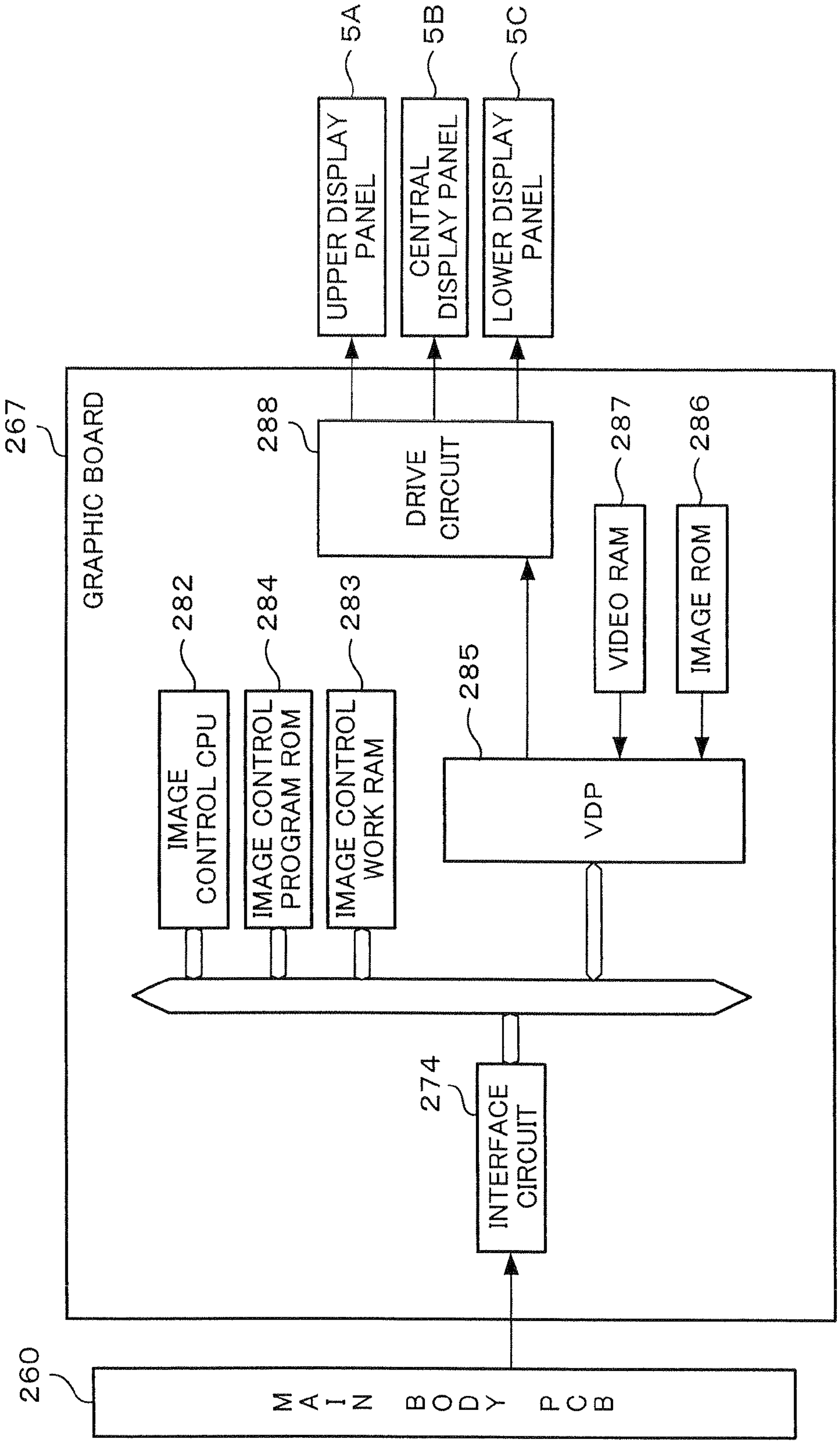
FIG. 22 is a block diagram of a graphic board.

The graphic board 267 controls display of an image on the upper liquid crystal panel 5A, the central liquid crystal panel 5B, and the lower liquid crystal panel 5C, in accordance with a control signal outputted from the main CPU 241. As shown in FIG. 22, the graphic board 267 has an interface circuit 281, an image control CPU 282, an image control work RAM 283, an image control program ROM 284, a VDP (Video Display Processor) 285, an image ROM 286, a video RAM 287, and a drive circuit 288.

The image control CPU 282 receives a control signal outputted from the main CPU 241 via the interface circuit 281. In response to the control signal from the main CPU 241, the image control CPU 282 runs the image control program stored in the image control program ROM 284 to determine an image to be displayed on the upper liquid crystal panel 5A, the central liquid crystal panel 5B, and the lower liquid crystal panel 5C.

The image control program ROM 284 stores various kinds of selection tables and an image control program related to displays on the upper liquid crystal panel 5A, the central liquid crystal panel 5B, and the lower liquid crystal panel 5C. The image control work RAM 283 functions as a temporary storage means when the image control CPU 282 runs the image control program.

The VDP 285 forms image data corresponding to a determination made in the image control CPU 282. The image ROM 286 stores dot data for forming an image such as a symbol 301. The video RAM 287 functions as a temporary storage means when an image is formed in the VDP 285. The drive circuit 288 outputs image data formed by the VDP 285 to the upper liquid crystal panel 5A, the central liquid crystal panel 5B, and the lower liquid crystal panel 5C. The image data used when the VDP generates image data is stored in the memory card 253, and is included in the game program read by the memory card 253 and temporarily stored in the RAM 243.

As shown in FIG. 21, the speakers 23 generate various kinds of sound effects when various kinds of effects are applied according to an output signal from the main body PCB 260. The bill validator 258 carries out at least the following processes: a process of reading an image of a bill, a process of determining whether or not the bill is genuine, and a process of, when the bill is genuine, accepting the bill into the cabinet 3. Moreover, when the bill validator 258 accepts a genuine bill, the bill validator outputs an input signal indicating the value of the accepted bill to the main CPU 241. The main CPU 241 stores, in the RAM 243, a credit/credits corresponding to the value of bill transmitted by the input signal.

According to a control signal outputted by the main CPU 241, the ticket printer 14 prints a barcode on a ticket, and then outputs the ticket with a barcode. The barcode contains encoded data of credits stored in the RAM 243, date and time, an identification number of the slot machine 1, or the like. The card reader 15 reads data from a smart card and transmits the data to the main CPU 241. In addition, the card reader 15 writes data into a smart card according to a control signal from the main CPU 241.

The main body PCB 260 is connected to a motor driving circuit 239 and a reel position detection circuit 270. The motor driving circuit 239 is connected to stepping motors 249*a*, 249*b*, 249*c*, 249*d*, and 249*e*. With the pulsed power supplied by the motor driving circuit 239, the stepping motors 249*a* to 249*e* respectively rotate the reels 30A to 30E at any given rotation speed, and position the reels 30A to 30E.

The reel position detection circuit 270 receives a pulse signal from a reel rotation sensor. In response to the pulse signal, the reel position detection circuit 270 outputs, to the main body PCB 260, a reel position signal to detect a position of the each reel 30A to 30E. The reel position signal is assigned to a code number of a below mentioned data table for a symbol, so as to enable detection of a rotation angle of the reels 30A to 30E, and rearranging of specified symbols 301 in specific positions.

The door PCB 280 is connected to a control panel 220, a reverter 212S, a coin counter 212C, and a cold cathode tube 289. In the control panel 220 are a switch 223S corresponding to the start button, a change switch 224S corresponding to a change button, a cash-out switch 225S corresponding to a cash-out button, a 1-bet switch 226S corresponding to a 1-bet button, and a maximum bet switch 227S corresponding to a maximum bet button. Each of the switches 223S to 227S outputs an input signal to the main CPU 241 when the player presses corresponding one of the buttons.

The coin counter 212C is disposed inside the coin insertion slot 12, and validates whether or not the coin inserted by the player to the coin insertion slot 12 is genuine. Anything other than a genuine coin is discharged from the coin payout opening 16. In addition, the coin counter 212C outputs an input signal to the main CPU 241 when it detects a genuine coin.

The reverter 212S operates in accordance with the control signal outputted by the main CPU 241. The reverter 212S distributes a coin recognized as genuine by the coin counter 212C to a cash enclosure (not shown) or the hopper 64 disposed inside the slot machine 1. That is, when the hopper 64 is filled with coins, the genuine coin will be distributed to a cash enclosure by the reveter 212S. To the contrary, when the hopper 64 is not filled with coins, the genuine coin will be distributed to the hopper 64. The cold cathode tube 289 functions as a backlight mounted to rear sides of the upper liquid crystal panel 5A, the central liquid crystal panel 5B, and the lower liquid crystal panel 5C. The cold cathode tube 289 lights up in accordance with a control signal outputted by the main PCU 241.

(Symbol, Combination, or the Like)

The symbols 301 displayed in the display windows 7A to 7E of the slot machine 1 form symbol columns, each of which having twenty-two symbols. As shown in FIG. 23, one of code numbers 0 to 21 is assigned to each of the symbols constituting each column. Each of the symbol columns is constituted with a combination of symbols of "JACKPOT 7," "BLUE 7," "BELL," "CHERRY" "STRAWBERRY," "PLUM," "ORANGE," and "APPLE."

Three successive symbols in each of the symbol columns are respectively displayed (arranged) on an upper stage 7*a*, a middle stage 7*b*, and a lower stage 7*c* of each of the display windows 7A, 7B, 7C, 7D, and 7E, to form a symbol matrix of five columns and three rows in the display windows 7A to 7E. When the start button is pressed to start a game after the bet button is pressed, the symbols forming a symbol matrix start scrolling. This scrolling of the symbols stops (rearrangement) after a predetermined period from the beginning of the scrolling.

Various kinds of winning combinations are set in advance for each symbol. A winning combination is a combination of stopped symbols on the payline L which puts the player in an advantageous state. Examples of an advantageous state include: a state where coins according to a winning combination is paid out, a state where the number of coins to be paid out is added to a credit, a state where a bonus game is started.

For example, a combination on the payline L including an "APPLE" symbol serves as a bonus trigger which causes a transition of a gaming mode from a basic game to a bonus game. Further, when a combination including a "CHERRY" symbol is formed on the payline L in a basic game, twenty coins (game values) are paid out for one bet. When a combination including a "PLUM" symbol is formed on the payline L in a basic game, five coins are paid out for one bet.

Here, a bonus game is a gaming state which provides a larger advantage than a base game. Note that another bonus game may be employed in combination, provided that the other bonus game is advantageous to a player, i.e., the other bonus game is more advantageous than a basic game. For example, a bonus game may be a state where more coins are possibly obtained than the basic game, a state where the probability of obtaining coins is higher than in the basic game, a state where fewer coins are consumed than the basic game, free game, or the like.

The following describes each table stored in the ROM 242 of a main control board 71, with reference to FIGS. 24 and 25.

(Payout Control Table)

FIG. 24 is a payout control table which controls a payout awarded in accordance to a winning combination. The payout control table is stored in the ROM 242 of the main control board 71, and a piece of information of a payout is assigned to a type of winning combination. For example, a payout corresponding to a winning combination including a "BELL" is 10. A payout corresponding to a winning combination including a "BLUE 7" is 40. Note that payouts for a basic game and a free game are set to be the same in the present embodiment.

(Free Game Quantity Table)

FIG. 25 is a table referred to when determining the number of free games to be played for the number of points acquired in a mini game of a basic game. The points awarded in a mini game correspond to the number of free games to be played in the free game quantity table. For example, when the accumulated points are 4, the free games are run eighty (80) times. When the accumulated points are 8, the free games are run a hundred sixty (160) times. Thus, by succeeding in a mini game in a basic game and acquiring many points, it is possible to continue a free game for a long period of time.

(Display State)

The following specifically describes an example of a display state of the display 4 in an operation of the slot machine 1.

(Help Mode Screen)

Figure 26:
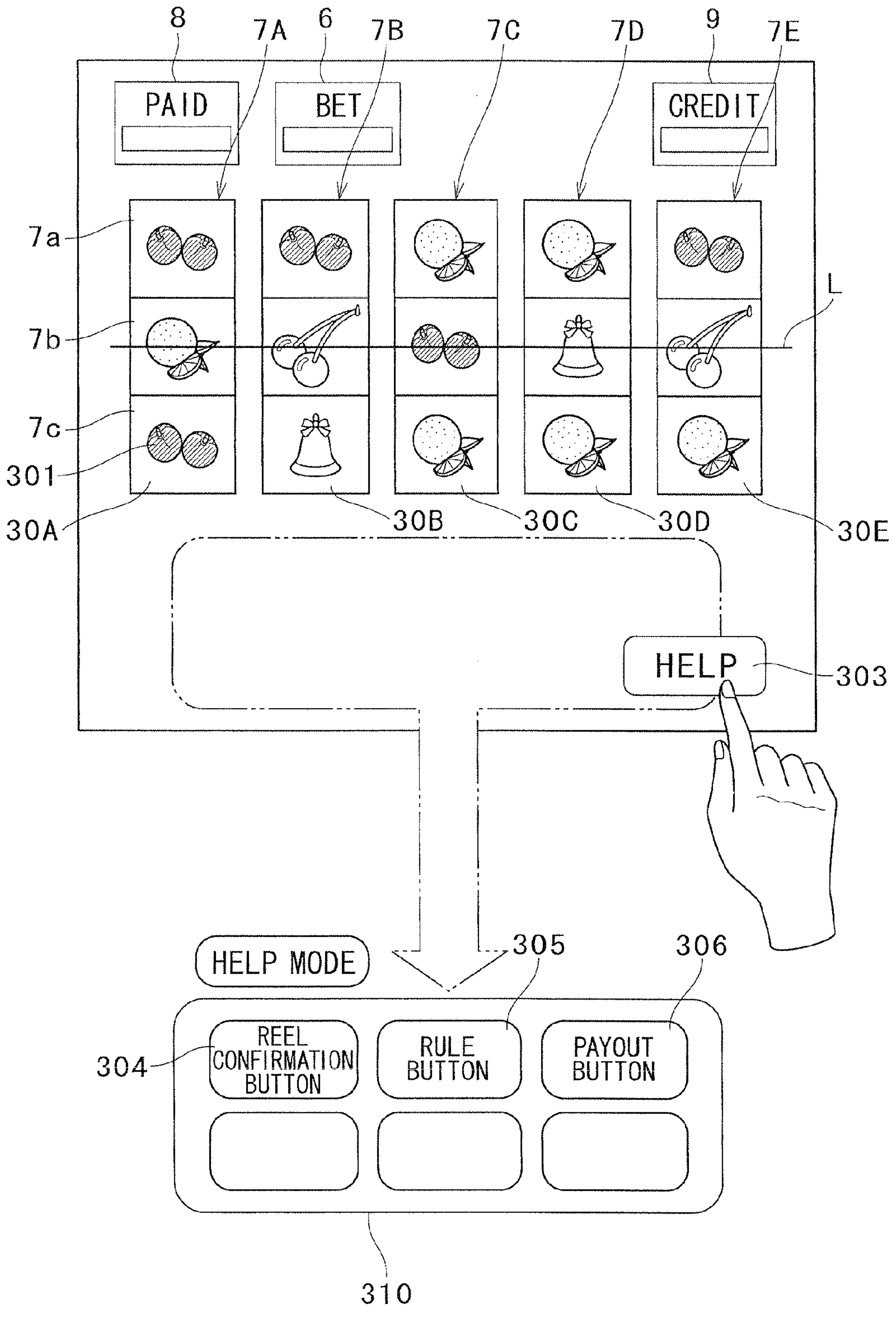
FIG. 26 is an explanatory view of a display screen in a help mode.

FIG. 26 shows a display state of the display 4 when a mode switches from a game mode to a help mode. That is, the bet display unit 6, the payout display unit 8, and the credit display unit 9 are displayed in the upper part of the central liquid crystal panel 5B constituting a part of the display 4. In addition, in the center of the central liquid crystal panel 5B, window frames of the display windows 7A to 7E are displayed. When a basic game or a free game starts, all the symbols 301 on the reels 30A to 30E visible through the display windows 7A to 7E are variably displayed.

Moreover, in the lower part of the central liquid crystal panel 5B, a help button 303 is displayed. The help button 303, upon being pressed, activates the help mode. The help mode provides a player with troubleshooting information regarding a game.

A help mode screen has a help button frame 310 arranged below the display windows 7A to 7E. The help button frame 310 has a reel confirmation button 304, a rule button 305, and a payout button 306 inside. The reel confirmation button 304 is for activating a reel confirmation mode which enables a player to confirm the symbols 301. The rule button 305 is for activating a rule guidance mode which provides a player with an introduction to a game or guidance on a method of playing a game. The payout button 306 is for activating a payout guidance mode which provides a player with guidance on payouts.

(Reel Confirmation Mode Screen)

FIG. 27 shows a display state of the display 4 when a reel confirmation mode is activated by pressing the direction symbol 302. That is, in the lower part of the central liquid crystal panel 5B constituting a part of the display 4, direction symbols 302 are displayed. Each of the direction symbols 302 has an arrow shape. One direction symbol and another paired with the former are symmetrically disposed so that one points out the upward direction and the other, the downward direction. Each pair of upper and lower direction symbols 302 is arranged below each of the display windows 7A to 7E. These pairs of direction symbols 302 function as command buttons to output command information to rotation-drive each of the reels 30A to 30E in upward and downward directions.

Thus, pressing of a direction symbol 302 pointing an upward direction causes upward rotation of at least one of the corresponding reels 30A, 30B, 30C, 30D, and 30E positioned above the direction symbols 302 during while the direction symbol 302 is pressed. On the other hand, pressing of a direction symbol 302 pointing a downward direction causes downward rotation of at least one of the reels 30A, 30B, 30C, 30D, and 30E positioned above the direction symbol 302 during while the direction symbol 302 is pressed.

Figure 28:
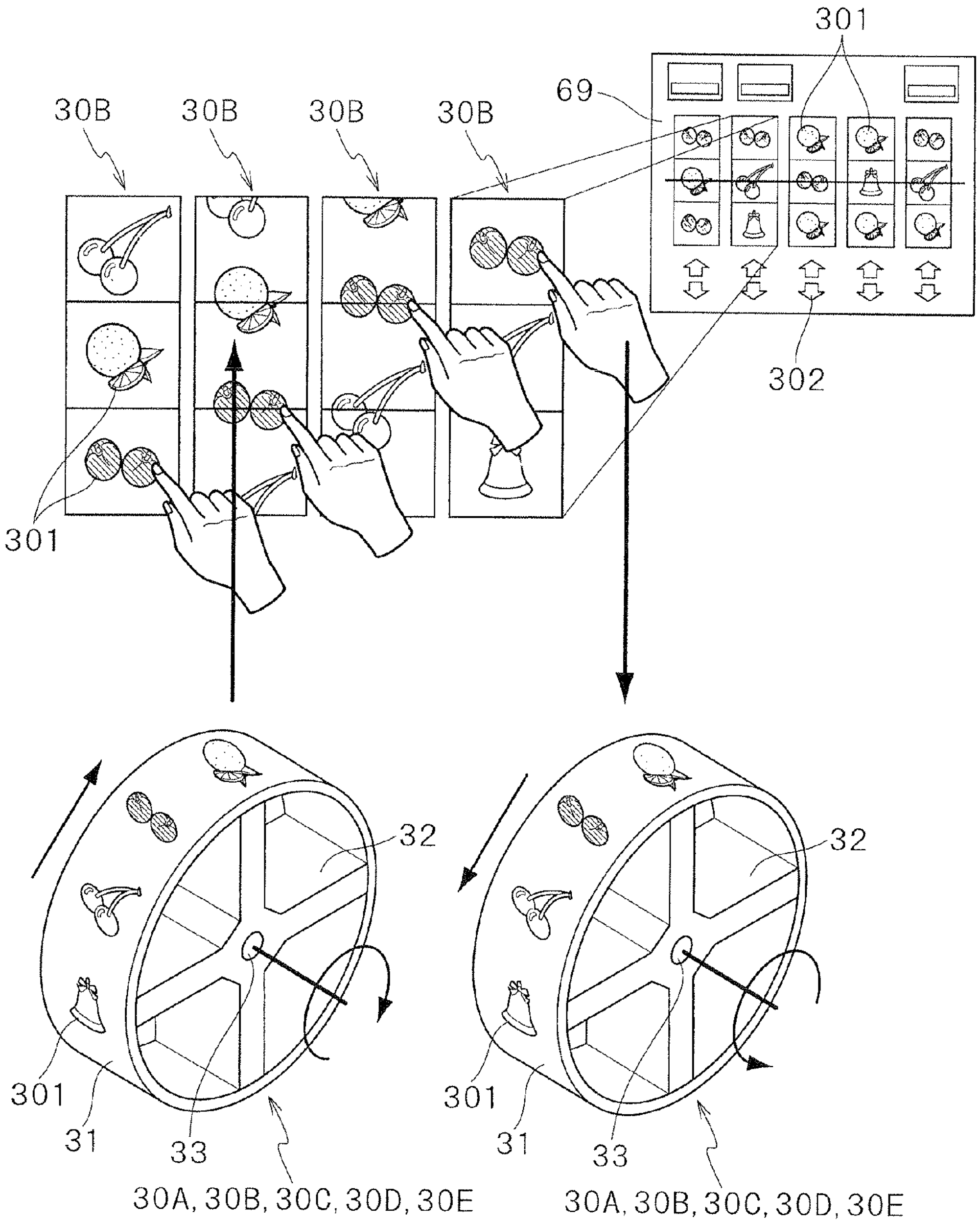
FIG. 28 is an explanatory view of a display screen in a reel confirmation mode.

FIG. 28 shows a display state of the display 4 when a reel confirmation mode is activated through a flicking operation. Meanwhile, the reel confirmation mode activated through the flicking operation is completely the same as the display state of the display 4 when a reel confirmation mode is activated through pressing the direction symbol 302.

In the reel confirmation mode activated through the flicking operation, when a player presses a front area of the reels 30A to 30E in the touch panel 69, a rotation command related to the reel is inputted. Then, when the player carries out a flicking operation, a rotation direction component included in a drag movement direction and movement speed included in the rotation direction component are extracted. The rotation direction component and the movement speed are associated with a rotation direction and a rotation speed of the reels 30A to 30E, so that the symbol 301 positioned at a tip of the player's finger is moved while following the drag operation.

(Mini Game Screen)

Figure 29:
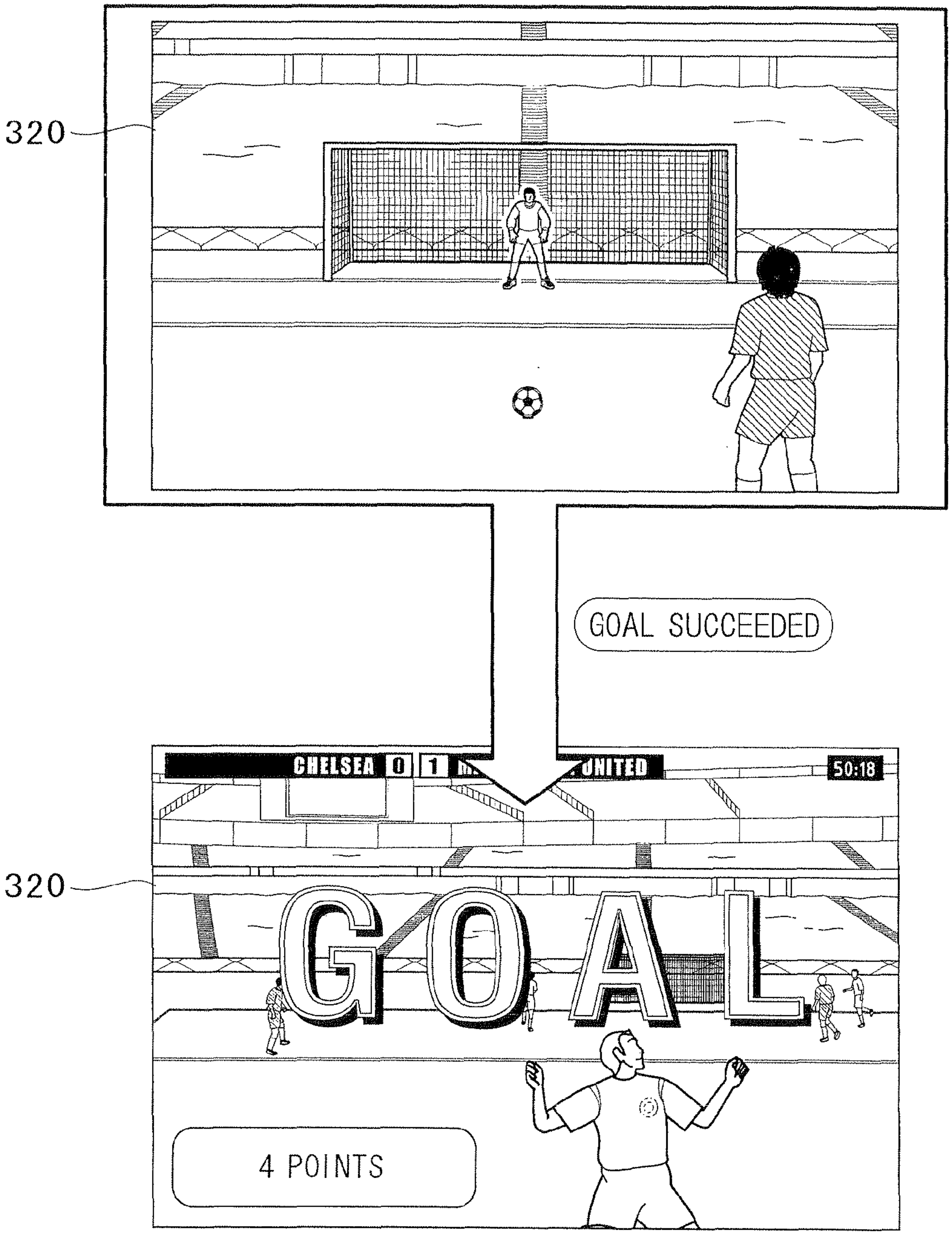
FIG. 29 is an explanatory view of a mini game screen.

FIG. 29 shows a display state of the display 4 during a mini game. In other words, when a mini game starts, a mini game screen 320 is displayed on the entire upper liquid crystal panel 5A. A mini game screen 320 shows a penalty kick shootout of a soccer game. Specifically, a kicker who kicks a ball and a goal keeper who defends a goal are displayed as an initial screen. After a predetermined standby time, the kicker kicks the ball. When the ball goes into the goal, an image reading "GOAL" and accumulated points are displayed. This allows a player to confirm the points acquired. To the contrary, when the ball does not go into the goal, the screen goes back to an initial screen of a next penalty kick shootout. Note that there will be no points generated in this case.

(Process Operation of the Slot Machine 1: Booting Process)

Figure 30:
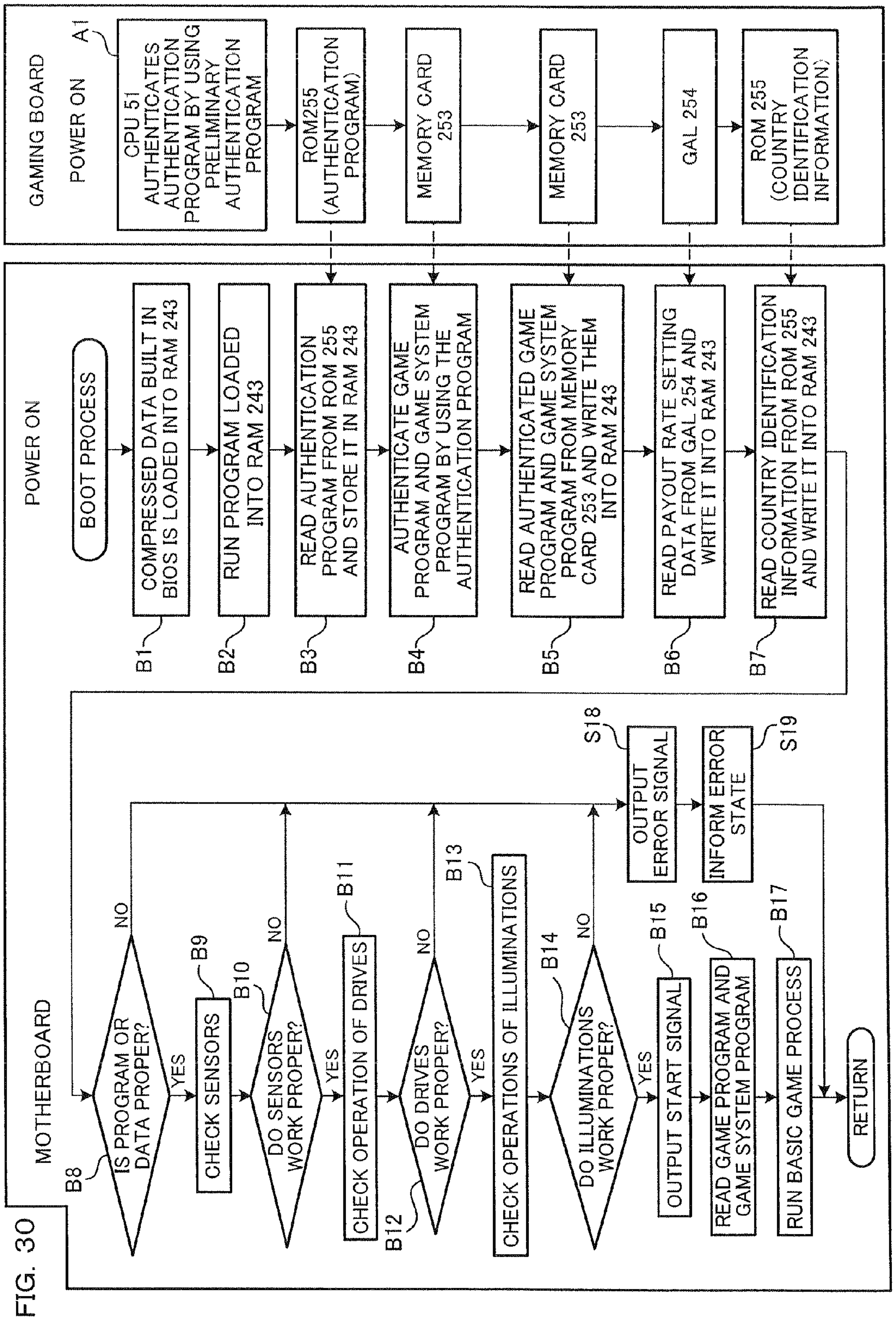
FIG. 30 is a flow chart of a boot process.

The following describes a booting process taking place in the slot machine 1. When power is supplied to the slot machine 1, a booting process routine shown in FIG. 30 is run in the motherboard 240 and the gaming board 250. In the present embodiment, a memory card 253 is inserted into the card slot 253S of the gaming board 250, and the GAL 254 is attached to the IC socket 254S.

First, when a power switch is turned on (power is supplied) in the power unit 245, the motherboard 240 and the gaming board 250 are booted. When the motherboard 240 and the gaming board 250 are booted, different processes are respectively carried out in parallel. That is, in the gaming board 250, the CPU 241 carries out processes of reading a preliminary authentication program stored in the boot ROM 252, and carrying out preliminary authentication by the preliminary authentication program. Note that the preliminary authentication is a process in which the preliminary authentication program is run to confirm and authenticate that authentication program is not modified in advance before importing the program into the motherboard 240 (A1).

In the motherboard 240, the main CPU 241 runs the BIOS stored in the ROM 242. As a result, the compressed data incorporated in the BIOS is loaded into the RAM 243 (B1). Then, the main CPU 241 runs the BIOS loaded into the RAM 243, and diagnoses and initializes various kinds of peripheral devices (B2).

Afterwards, the main CPU 241 reads, via PCI bus, the authentication program stored in the ROM 255, and stores the read authentication program into the RAM 243 (B3). During this step, the main CPU 241 drives a checksum through an ADDSUM method (a standard check function) which is adopted in a standard BIOS. Thus, it is confirmed whether or not the authentication program is stored in the RAM 243 without an error.

The main CPU 241 then confirms a component connected to the IDE bus. Then, the main CPU 241 accesses to the memory card 253 inserted into the card slot 253S via the IDE bus, to read the game program and the game system program from the memory card 253. In this case, data constituting the game program and the game system program are read in a unit of four bytes. Then, the main CPU 241 confirms and authenticates, according to the authentication program stored in the RAM 243, that the read game program and the game system program are not modified (B4).

When the authentication process ends properly, the main CPU 241 writes and stores the authenticated game program and the game system program in the RAM 243 (B5).

The main CPU 241 then accesses to the GAL 254 attached to the IC socket 254S to read payout rate setting data from the GAL 254, and stores the data in the RAM 243 (B6). Afterwards, the main CPU 241 reads the country identification information stored in the ROM 255 of the gaming board 250, and stores the information in the RAM 243 (B7).

With a result of the above authentication process, the main CPU 241 determines whether the program or data is proper (B8). When the program or data is not proper (B8, NO), an error signal including ID information to specify a slot machine 1 is outputted to a centralized control device (not shown). The centralized control device specifies a slot machine 1 in an error state based on the error signal. The centralized control device then instructs a staff standing by near the slot machine 1 to deal with the error, and stores error history information containing a time and date and a place when/where the error has occurred, or the like (B18). Then, the error state is informed in the form of an audio output from the speaker 23 of the slot machine 1, and in the form of light emitted from the light emitting unit 20. Afterwards, the routine in the motherboard 240 ends.

On the other hand, when the program or data is proper (B8, YES), operations of sensors disposed to the slot machine 1 are checked sequentially (B9). Then, whether or not all the sensors operate properly is determined (B10). When an error is detected in at least one sensor (B10, NO), the above mentioned B18 and B19 are carried out, and the routine ends thereafter.

On the other hand, when all the sensors operate properly (B10, Yes), operations of all drive mechanisms are checked sequentially (B11). Then, it is determined whether or not all the drive mechanisms operate properly (B12). When an error is detected in at least one drive mechanisms (B12, NO), the above mentioned B18 and B19 are carried out, and the routine ends thereafter. On the other hand, when all the drive mechanisms operate properly (B12, Yes), operations of all illuminations are checked sequentially (B13). Then, it is determined whether or not all the illuminations operate properly (B14). When an error is detected in at least one illumination (B14, No), the above mentioned B18 and B19 are carried out, and the routine ends thereafter.

On the other hand, when all the illuminations operate properly (B14, Yes), a boot signal indicating that all the illuminations have been booted properly is outputted to the centralized control device (not shown) or the like (B15). Afterwards, a basic game process is carried out (B16), and this routine ends. The following describes a basic game process in detail.

(Basic Game Process)

Figure 31A:
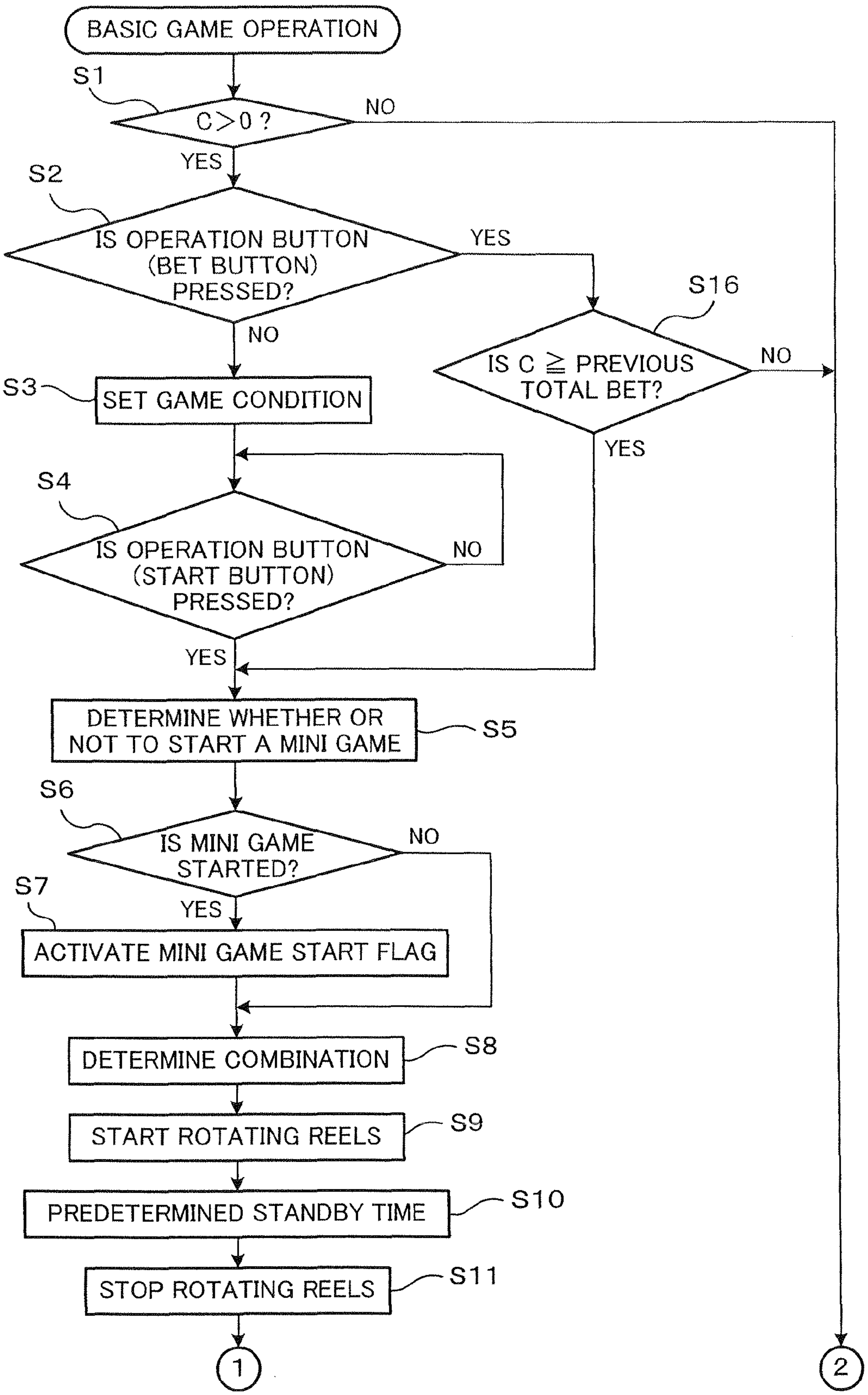
FIG. 31A is a flow chart of a part of a basic game process.
Figure 31B:
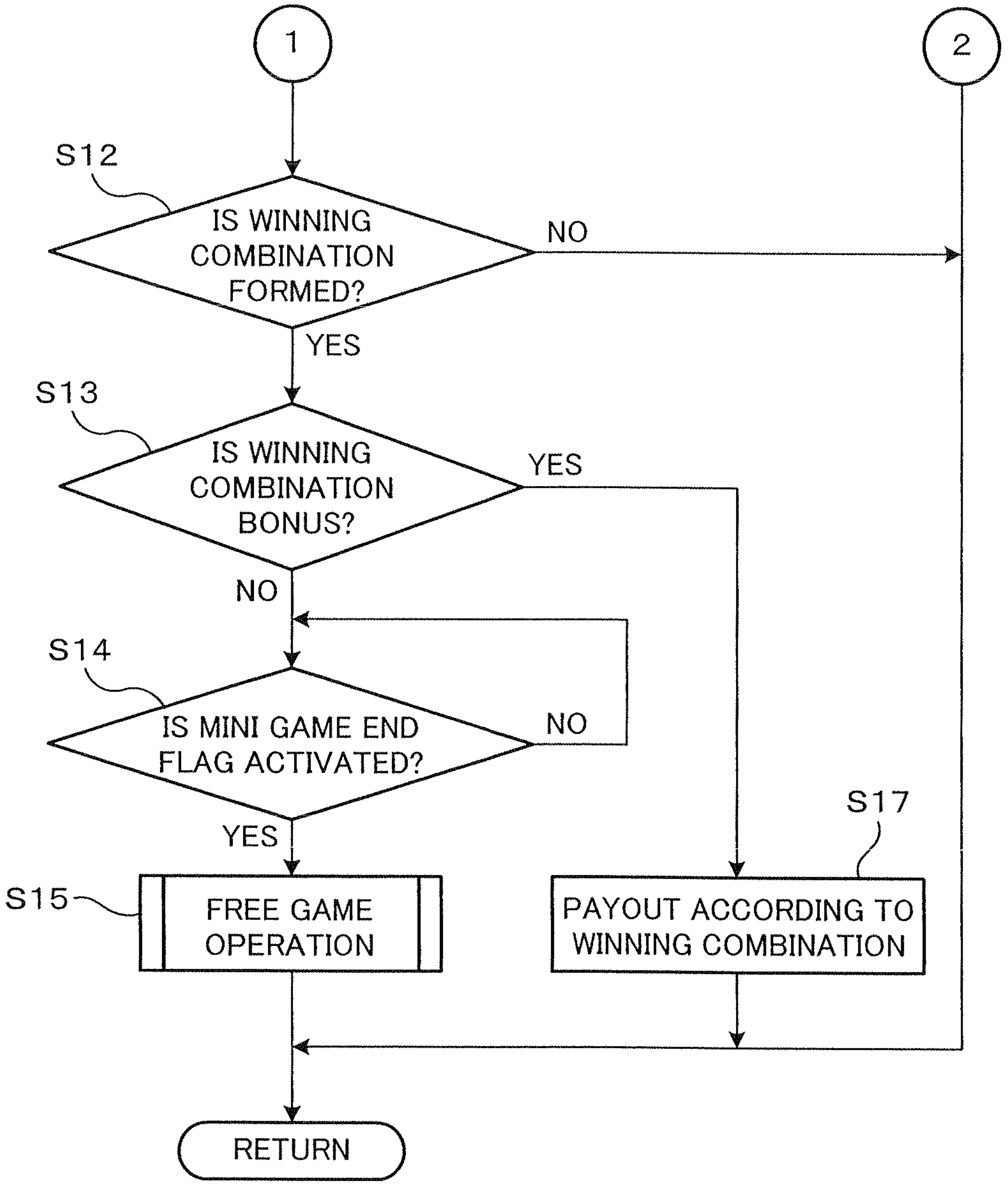
FIG. 31B is a flow chart of another part of a basic game process.

FIGS. 31A and 31B are flow charts showing a process carried out by the main CPU 241 of the slot machine 1 during a basic game of the slot machine 1. A unit game includes a routine shown in FIGS. 31A and 31B. Note that the slot machine 1 is booted in advance, and a variable used in the CPU 241 on the other side, i.e. in the game controller 1 side, is initialized at a predetermined value. Accordingly, the slot machine 1 is constantly operated.

First, it is determined whether there is a remaining credit, i.e., the remaining number of coins having been inserted by the player (S1). Specifically, a credit C stored in the RAM 243 is read, and a process according to the read credit C is carried out. When the credit C is zero (S1, NO), the routine ends without any operation of a process since a game cannot be started. Meanwhile, when the credit C is one or more (S1, Yes), it is determined that there is one or more credit remaining and the process moves to S2.

In S2, it is determined whether or not the operation button 11 (bet button) is pressed (S2). When the operation button 11 (bet button) is not pressed for a predetermined time (S2, NO), a game condition is set (S3). Specifically, the number of coins to be bet on the payline L in the game is determined according to the operation of the operation button 11 (bet button). During this operation, an operation signal sent upon an operation of the operation button 11 is received. According to the number of times that the operation signal is received, the bet on the payline L is stored in a predetermined memory area of the RAM 243. Then, the credit C written in a predetermined memory area of the RAM 243 is read out. A total bet having added the above bet is subtracted from the credit C read out. The resulting number is stored in the predetermined memory area of the RAM 243.

Afterwards, it is determined whether or not an operation button 11 (start button) is pressed (S4). When the operation button 11 (start button) is not pressed (S4, NO), S4 is repeated until the bet button 11 is pressed. When the operation button 11 (start button) is pressed (S4, YES), it is determined whether or not to start a mini game (S5).

On the other hand, when the operation button 11 (bet button) is pressed in S1 (S2, YES), it is determined whether or not a value of the credit C is equal to or more than the value of the total bet in the previous game. In other words, it is determined whether or not to start a game through a press operation of the operation button 11 (bet button). Specifically, pressing of the operation button 11 (bet button) causes reading out of a bet on the payline L in the previous game and a credit C written in a predetermined memory area of the RAM 243. According to a relation of the read credit C to the bet, a process branches as follows depending on whether the value of the credit C is equal to or more than the value of total bet in the previous game. When it is determined that the value of the credit C is less than the value of the total bet of the previous game (S16, NO), the routine ends without any operation of a process since a game cannot be started.

Meanwhile, when it is determined that the value of the credit C is equal to or more than the value of the total bet of the previous game (S16, YES), the value of the total bet of the previous game is subtracted from the value of the credit C. Then, the resulting value is stored in a predetermined memory area of the RAM 243. Afterwards, it is determined whether or not to start a mini game (S5).

When it is determined to start a mini game (S6, YES), a mini game start flag is set as "ON" (S7). Specifically, data showing that the game start flag is "ON" is written into a storage area of a mini game start flag of the RAM 243. Meanwhile, when it is determined not to start a mini game (S6, NO), a combination determination process is carried out (S8).

In the combination determination process, a combination of symbols to be stopped on the payline L is determined first. Specifically, a command to generate a random number is sent to the random number generation circuit. Then, a random number within a predetermined range which is generated by the random number generation circuit, is sampled. The sampled random number is stored in a predetermined memory area of the RAM 243. Although a random number is generated in the random number generation circuit disposed outside the main CPU 241 in the present embodiment, a random number may be generated through a calculation by the main CPU 241, without the random number generating circuit.

Afterwards, a winning combination table for awarding a prize and a random number table stored in the ROM 242 are read. These read winning combination table and random number table are stored in a predetermined memory area of the RAM 243. Still-displaying (of symbols) are controlled for each reel in accordance with the random number table.

Then, the random number table and the winning combination table stored in the predetermined memory area of the RAM 243 are read. Then, the random number value written into the predetermined memory area of the RAM 243 is used as a parameter to refer to the random number table. A combination of symbols to be stopped on the payline L is then determined.

When a winning combination is determined, the winning combination table is stored into a predetermined memory area of the RAM 243. The random number and the winning combination table written in the predetermined memory area of the RAM 243 are read. In accordance with the random number and the winning combination table, a combination of symbols to be stopped and still-displayed are determined. During this process, the main CPU 241 reads out a symbol arrangement table stored in the ROM 242 and stores the table in a predetermined memory area of the RAM 243. The table is then used as a reference. The determined stop symbol data is stored in a predetermined memory area of the RAM 243. Alternatively, symbols to be stopped may be determined for each reel by using the random number table.

When a combination of symbols to be stopped on the payline L is determined, it is determined whether or not the combination is a winning combination. When the combination of symbols to be stopped on the payline L is a winning combination, a flag which indicates that a prize corresponding to the type of the winning combination will be awarded, is activated to generate the prize corresponding to the combination of symbols on the payline L forming the determined winning combination. The activated flag indicating that a prize will be awarded, is stored in a predetermined memory area of the RAM 243. To the contrary, when a combination of symbols to be stopped on the payline L is another combination, that is, a losing combination, the flag indicating that a prize will be awarded is not activated.

After the above combination determination process is carried out, reels 30A to 30E rotate so as to move symbols 301 in the display windows 7A to 7E (S9). Then, the rotation continues for a predetermined time (S10). Then, the rotation of reels 30A to 30E automatically stops (S11).

Then, it is determined whether or not a winning combination is formed through the combination determination process in S8 (S12). Specifically, this is done based on a status of the flag stored in the predetermined memory area of the RAM 243, which flag indicates a prize according to a combination of symbols on the payline L is awarded. When the flag indicating that a prize is awarded is not activated (S12, NO), it is determined that a winning combination is not formed, and the routine ends.

On the other hand, when the flag indicating that a prize is awarded is activated (S12, YES), it is determined whether or not the winning combination formed in the combination determination process of S8 includes a “BLUE 7” (S13). To be more specific, when the winning combination includes a “BLUE 7” (S13, YES), the number of coins according to the winning combination is paid out (S17), and this routine ends.

Meanwhile, when the winning combination does not include a “BLUE 7” (S13, NO), it is determined whether or not a mini game end flag is activated (S14). Specifically, it is determined whether or not data showing that the mini game end flag is activated is written into a mini game end flag area of the RAM 243. When the mini game end flag is not activated (S14, NO), S14 is repeated until the mini game end flag is activated. On the other hand when the mini game end flag is activated (S14, YES), a free game process is run (S15). Then, the routine ends.

(Free Game Process)

Figure 32:
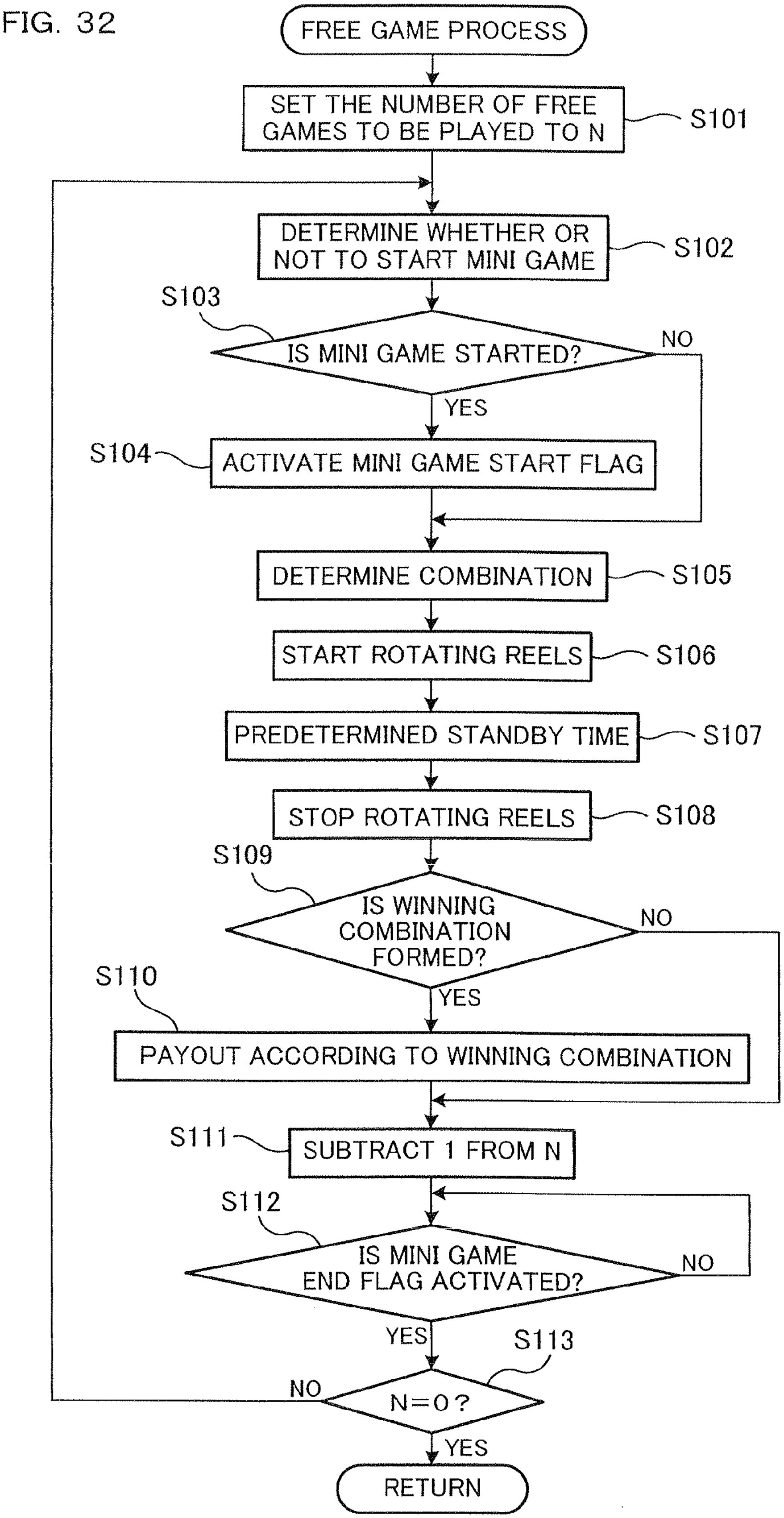
FIG. 32 is a flow chart of a free game process.

The following describes a free game process with reference to FIG. 32.

First, N denotes the number of free games (S101). The number of free games is determined according to accumulated points acquired in a mini game of a basic game.

Then, whether or not to start a mini game is determined (S102). When a mini game is determined to start (S103, YES), a mini game start flag is set as “ON” (S104). Specifically, data indicating that the mini game start flag is activated is written into a storage area of the RAM 243 for storing the mini game start flag. Afterwards, the process moves to S105.

Meanwhile, when a mini game is determined not to start (S103, NO), the process immediately moves to S105. Thus, a combination determination process same as above is carried out (S105). A difference in this combination determination process is that the referred random number table is a free game random number table (not shown). Then, reels 30A to 30E start to rotate (S106). After a predetermined standby time (S107), each reels 30A to 30E stops rotating (S108).

Then, whether or not a winning combination is formed is determined (S109). When a winning combination is not formed (S109, NO), the process moves to S111. Meanwhile, when a winning combination is formed (S109, YES), a game medium according to the winning combination is paid out (S110). Specifically, the number of coins to be paid out for the winning combination is calculated, referring to the payout control table of FIG. 24. A credit stored in a predetermined memory area of the RAM 243 is then read out. The payout value calculated above is added to the credit. The sum is stored in a predetermined memory area of the RAM 243, and the stored value is displayed on the credit display unit 9.

In S111, 1 is subtracted from N (S111). Then, whether or not a mini game end flag is activated is determined (S112). Specifically, it is determined whether or not data showing that the mini game end flag is activated is written into a mini game end flag area of the RAM 243. S112 is repeated when the mini game end flag is not activated (S112, NO).

When the mini game end flag is activated (S112, YES), whether N is 0 is determined (S113). When N is not 0 (S113, NO), the operation is carried out again from S102. On the other hand, when N is 0 (S113, YES), the routine ends.

(Mini Game Process)

Figure 33:
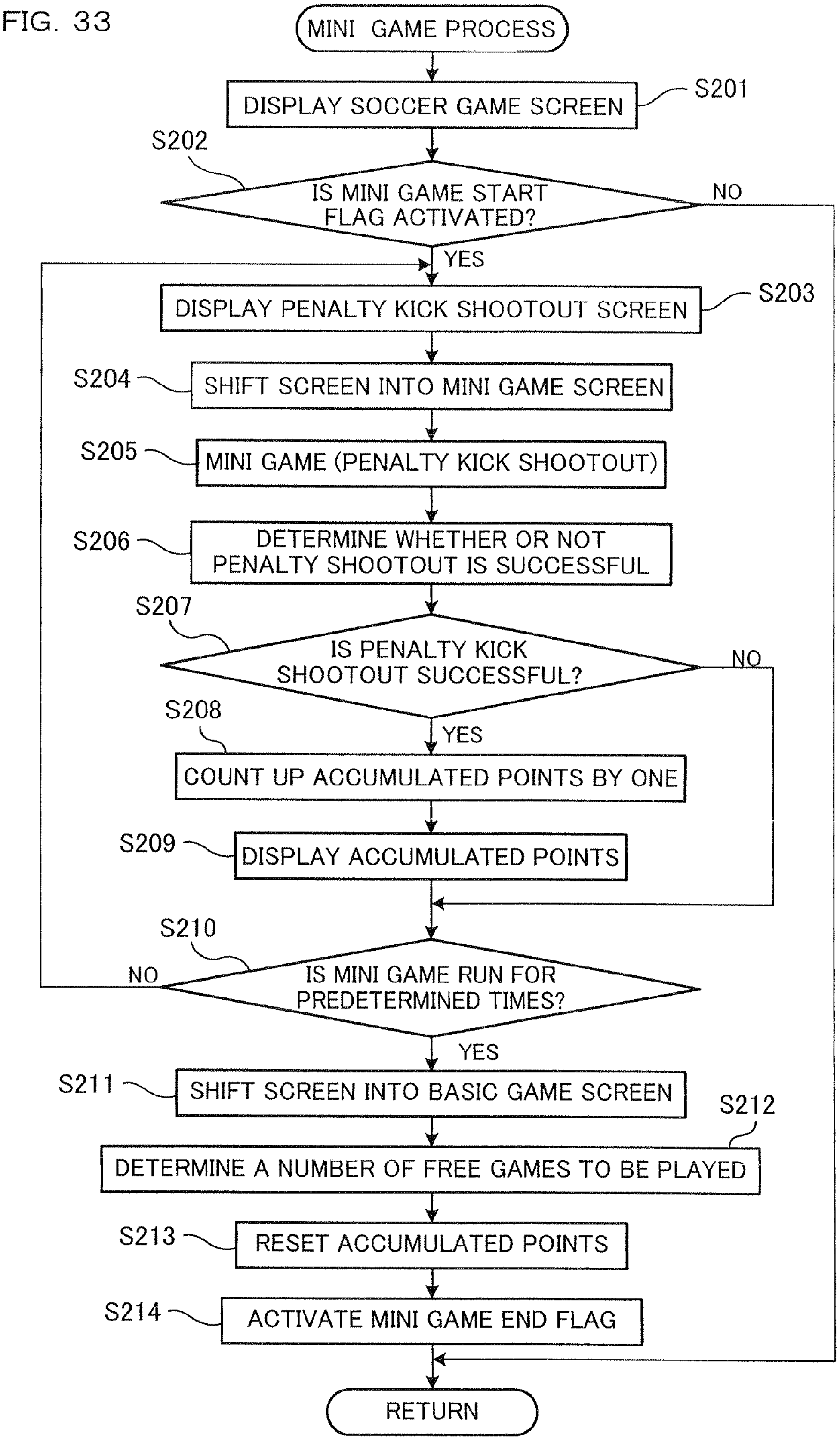
FIG. 33 is a flow chart of a mini game process.

The following describes a mini game process with reference to FIG. 33.

First, a soccer game screen, which is an effect screen displayed when a mini game is not run, is displayed on the upper liquid crystal panel 5A (S201). Then, whether or not the mini game start flag is activated is determined. Specifically, it is determined whether data showing that the mini game start flag is activated is written into the game start flag area or the RAM 243 (S202).

When the mini game start flag is not activated (S202, NO), the routine ends. Meanwhile, when the mini game start flag is activated (S202, YES), screens on the upper liquid crystal panel 5A switches, as shown in FIG. 18, from a soccer game screen to a penalty kick standby screen which is an effect screen displayed during a mini game. Then, with a mini game screen 320 displayed on the central liquid crystal panel 5B, the display windows 7A to 7E and a mini game screen 320 are displayed one atop the other (S204).

Then, a penalty kick shootout as a mini game is started (S205). That is, an image of a goal keeper and a kicker facing each other is displayed, and a cheering sound of audience members is outputted. Then, when the kicker places a ball and intends to kick it, whether or not a penalty kick is successful, i.e., whether or not the mini game is successful, is determined (S206). Specifically, a random number is used to determine whether or not the mini game is successful.

Then, it is determined whether or not a penalty kick shootout (mini game) is successful (S207). When the penalty kick shootout is successful (S207, YES), the number of accumulated points is counted up by 1 (S208), and the number of accumulated points is displayed (S209). Then, it is determined whether or not the mini game is run for a predetermined number of times (S210). Meanwhile, when the penalty kick shootout is unsuccessful (S207, NO), the accumulated number of points is not counted up, and it is determined whether or not the mini game is played for predetermined number of times (S210).

When the mini game is not played for predetermined number of times (S210, NO), the process is carried out again from S203, and a next penalty kick shootout starts. When a penalty kick shootout is repeated for ten times or the like (S210, YES), the screen switches to a basic game screen (S211). After determining the number of the free games (S212), the accumulated number of points is reset (S213). Then, after setting the mini game end flag activated (S214), this routine ends.

(Help Process)

Figure 34:
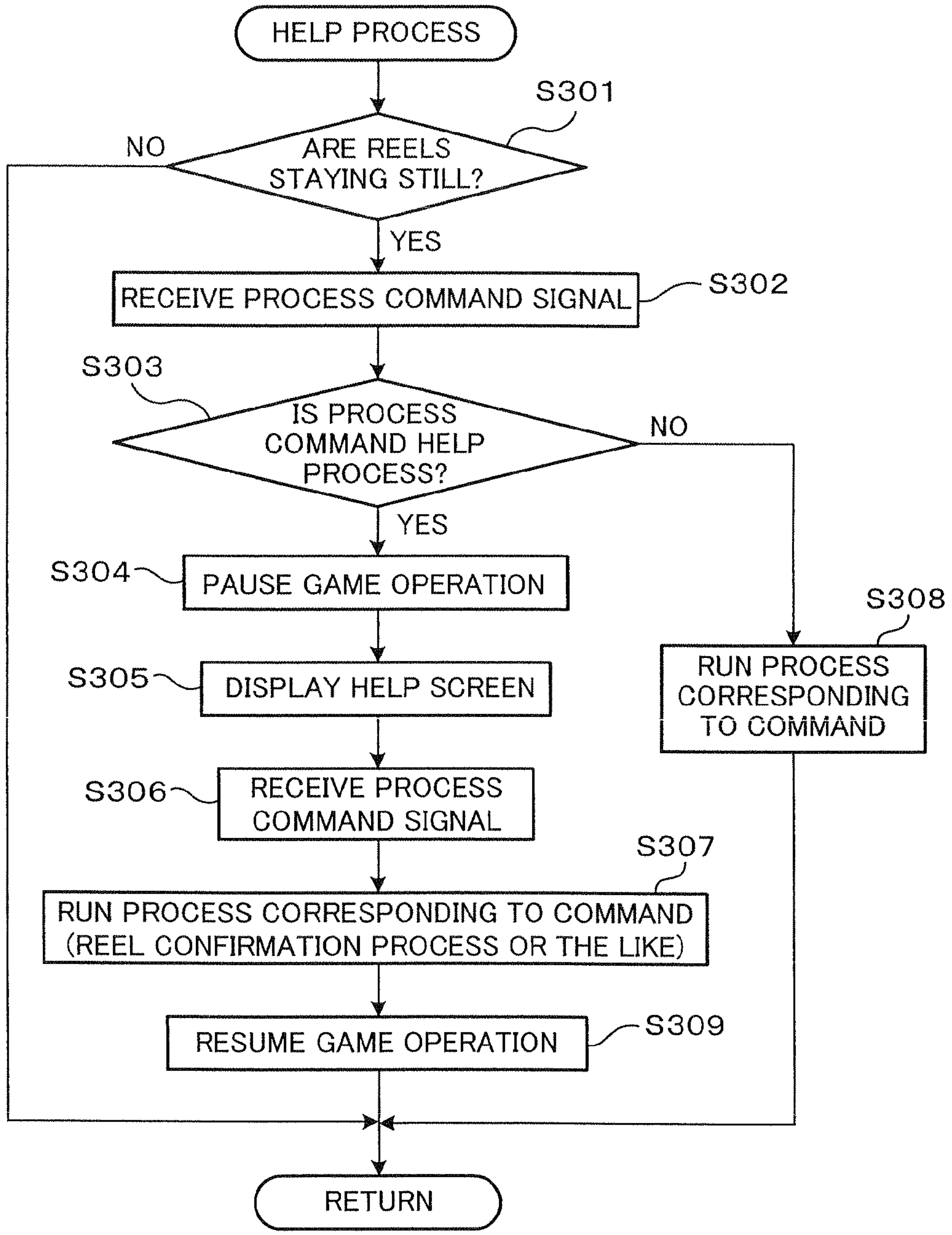
FIG. 34 is a flow chart of a help process.

The slot machine 1 is capable of carrying out a help process shown in FIG. 34 aside from a basic game process and a free game process. Specifically, it is determined whether or not the reels 30A to 30E are staying still (S301). When the reels 30A to 30E are not staying still due to an operation of a basic game or the like (S301, NO), the routine ends. In short, a help screen is not displayed. Meanwhile, when the reels 30A to 30E are staying still (S301, YES), an input signal outputted when a player presses the touch panel 69 shown in FIG. 21, is received as a process command signal (S302). Then, it is determined whether or not the process command signal is related to a help process (S303). When it is not related to a help process (S303, NO), a process corresponding to the command is carried out (S308). Afterwards, this routine ends.

Meanwhile, when the command is related to a help process (S303, YES), after a game process such as a basic game or the like is paused (S304), the display changes into a help screen. In other words, the help button frame 310 is displayed on the central liquid crystal panel 5B, and various kinds of help item buttons including a reel confirmation button 304, a rule button 305 and a payout button 306 are displayed in the help button frame 310 (S305).

Then, reception of a next command signal is started (S306). For example, when a reel confirmation button 304 is pressed, an input signal is received as a process command signal starting a reel confirmation process (S307). After a game process is resumed (S309), this routine ends.

(Reel Confirmation Process)

Figure 35:
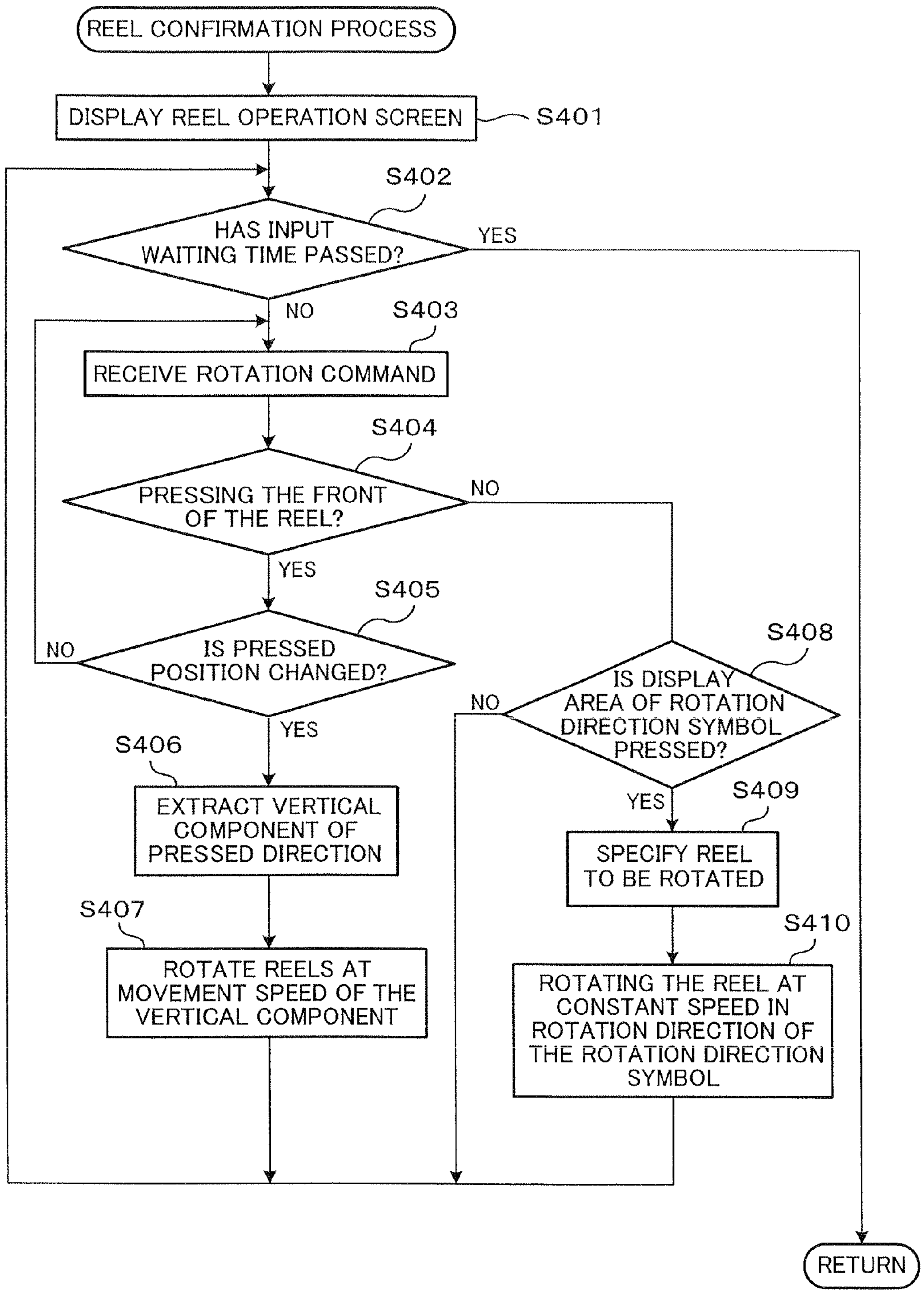
FIG. 35 is a flow chart of a reel confirmation process.

As shown in FIG. 35, when a reel confirmation process is carried out, a display switches to a reel operation screen shown in FIG. 27. In other words, direction symbols pointing upward or downward directions assigned to each of the reels 30A to 30E are displayed (S401).

Then, it is determined whether or not an input waiting time has passed (S402). When the input waiting time has passed (S402, YES), this routine ends. When the input waiting time has not passed (S402, NO), whether or not a rotation command signal is inputted is determined. Specifically, as shown in FIG. 28, an input signal outputted in response to a press operation of the touch panel 69 is received. Based on a relation between the pressed position data included in the input signal to the front area data of the reels 30A to 30E, it is determined whether a front area of the reels 30A to 30E is pressed (S404).

When a front area of the reels 30A to 30E is pressed (S404, YES), it is determined that a rotation command signal is inputted. Then, it is determined whether a pressed position is changed or not (S405). When a pressed position is not changed (S405, NO), the process is carried out again from S403 and the reception of a rotation command signal is resumed until a pressed position is changed. On the other hand, when a pressed position is changed (S405, YES), it is determined that a flicking operation is taken place and a vertical direction component based on a press direction that is a flicking direction is extracted (S406).

Afterwards, a movement speed of the vertical direction component is extracted and rotation speed of the reels 30A to 30E so as to make a movement speed of the symbols 301 is calculated. The reels 30A to 30E positioned below the pressed position are rotated at the rotation speed in a direction based on the press direction (S407). Thus, the symbols 301 are moved following the flicking operation. Hence, a player can confirm the symbols 301, feeling as if s/he is directly touching and rotating the reels 30A to 30E.

Meanwhile, when a front area of the reels 30A to 30E is not pressed (S404, NO), it is determined whether a rotation command signal is inputted, based on the pressed position data and the display position data of the direction symbol 302 (S408). When the signal inputted is not a rotation command signal (S408, NO), this routine ends. Meanwhile, when the signal inputted is a rotation command signal (S408, YES), one or more of the reels 30A to 30E positioned above the pressed position are specified as rotation target(s), based on a command included in the rotation command signal, i.e., pressed position data (S409). Then, one or more or more of the specified reels 30A to 30E rotate at a constant speed in a direction indicated by the direction symbol 302 (S410). Thus, a player is able to rotate the reels 30A to 30E in a direction indicated by the direction symbols 302 while she/he is pressing the direction symbols 302. Thus, a player is able to easily confirm, through the eyes, the symbols 301 on the reels 30A to 30E.

When a player releases the press operation, S402 is re-run and a standby state is made for an input standby period. When a press operation is resumed in an input standby period, the symbols 301 are moved through a flicking operation in accordance with a pressed position, or the symbols 301 are moved by the direction symbol 302.

Although the reels 30A to 30E rotate at a constant speed when the direction symbols 302 are pressed in the present embodiment, the present invention is not limited to this. In other words, the reels 30A to 30E may rotate at a speed corresponding to the pressed area of the direction symbols 302 when the direction symbols 302 are pressed. In this case, when a player presses the touch panel 69 with a strong pressing force, the reels 30A to 30E rotate at a high speed. On the other hand, when a player presses the touch panel 69 with a small pressing force, the reels 30A to 30E rotate at a constant speed. Thus, a player is capable of changing the rotation speed of the reels 30A to 30E.

The detailed description of the present invention provided hereinabove mainly focused on characteristics thereof for the purpose of easier understanding; however, the scope of the present invention shall be construed as broadly as possible, encompassing various forms of other possible embodiments, and therefore the present invention shall not be limited to the above description. Further, the terms and phraseology used in the present specification are adopted solely to provide specific illustration of the present invention, and in no case should the scope of the present invention be limited by such terms and phraseology. Further, it will be obvious for those skilled in the art that the other structures, systems, methods or the like are possible, within the spirit of the invention described in the present specification. The description of claims therefore shall encompass structures equivalent to the present invention, unless otherwise such structures are regarded as to depart from the spirit and scope of the present invention. Further, the abstract is provided to allow, through a simple investigation, quick analysis of the technical features and essences of the present invention by an intellectual property office, a general public institution, or one skilled in the art who is not fully familiarized with patent and legal or professional terminology. It is therefore not an intention of the abstract to limit the scope of the present invention which shall be construed on the basis of the description of the claims. To fully understand the object and effects of the present invention, it is strongly encouraged to sufficiently refer to disclosures of documents already made available.

The detailed description of the present invention provided hereinabove includes a process executed on a computer or computer network. The above descriptions and expressions are provided to allow the one skilled in the art to most efficiently understand the present invention. A process carried out in or by respective steps yielding one result or blocks with a predetermined processing function described in the present specification shall be understood as a process with no self-contradiction. Moreover, an electrical or magnetic signal is transmitted/received and written in each step or block. In the process of each step or block, the signal is expressed as a bit, a value, a symbol, a character, a term, a number or the like. However, it should be noted that these are used for the convenience of explanation. Although the present specification occasionally personifies the processes carried out in the steps or blocks, these processes are essentially executed by various devices. Further, the other structures necessary for the steps or blocks are obvious from the above descriptions.

Third Embodiment

The following describes a third embodiment of a gaming machine according to the present invention with reference to FIGS. 36 to 53. Note that the numerals assigned to each member of the FIGures, and the symbols indicating a step in a flowchart (e.g., S), and the descriptions thereof are valid only in the present embodiment, and thus do not indicate members or steps of another embodiment.

(Overview of the Gaming Machine)

Figure 36:
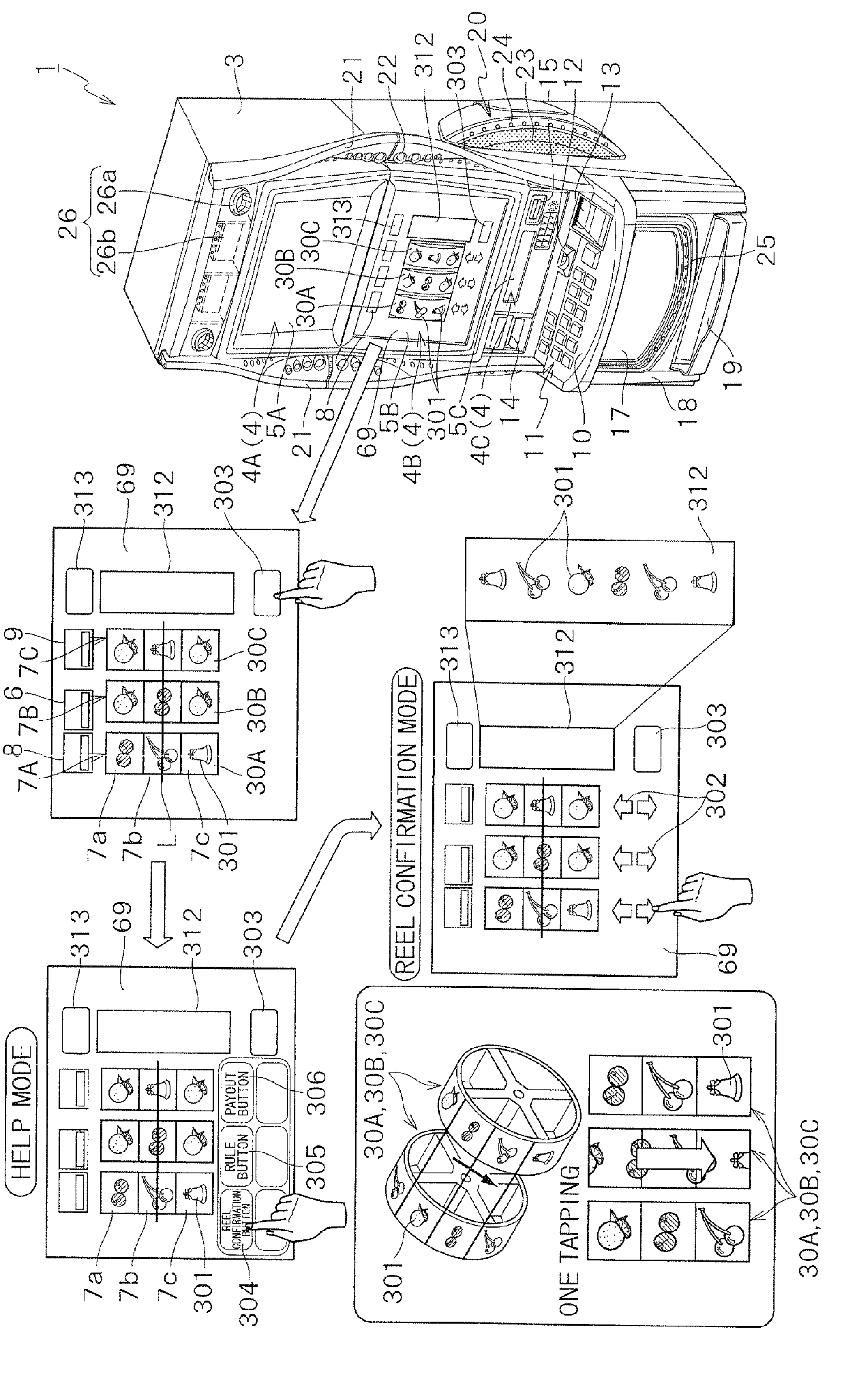
FIG. 36 is an explanatory drawing showing a playing method of a gaming machine.

As shown in FIG. 36, a gaming machine (slot machine 1) has a first structure where one or more mechanical reels 30A, 30B, and 30C rotate in response to a player's operation by an amount equivalent to one symbol.

Specifically, the gaming machine includes: a game requiring a player's bet; reels 30A to 30C used in the game and mechanically driven to rotate; symbols 301 on the reels 30A to 30C; an input device which receives an input by the player; and a controller that is programmed to carry out the following steps of (a1) to (a2).

Specifically, the controller operates in the steps of: (a1) receiving an input inputted through the input device; and (a2) when the input is a rotation command related to one out of the reels 30A to 30C, stopping the one reel (30A to 30C) after rotating the one reel (30A to 30C) by an amount equivalent to one symbol.

The gaming machine may be a machine such as a slot machine 1 or the like for one player, or multiple players. For instance, a gaming machine for multiple players may include several slot machines 1 which are connected to one another and are capable of carrying out data communication with one another.

In addition to a function of running a game with mechanical reels 30A to 30C, the gaming machine may have a function of running one or more games through another mechanical operation, an electrical operation, or through a combination of mechanical and electrical operations. An example of an electrically operated gaming machine is a slot machine 1 which displays an image of reels 30A to 30C on a display of liquid crystal or the like, and virtually rotates or moves reels 30A to 30C. Note that a slot machine 1 is shown as an example of a gaming machine in the present embodiment; however, the gaming machine is not limited to this.

An input device is not specifically limited as long as the input device enables a player's operation to input information therethrough. Specifically, an input device may be a touch panel 69 disposed on an upper surface of a central liquid crystal panel 5B, or an operation button 11 which enables an input by connection/disconnection of mechanical contact points. Moreover, an input device may be a device which enables input of information through a data communication using wireless signals such as sound, light, radio wave, or the like.

According to the above structure, a reel moves by an amount equivalent to one symbol when the player inputs a rotation command through an input device. In other words, the reel is intermittently rotatable by an amount equivalent to one symbol every time a player inputs a rotation command. Thus, the player is able to successively confirm the symbols 301 actually arranged on the reel (30A, 30B, 30C) by the player him/herself carrying out an operation to rotate one out of the reels 30A, 30B, and 30C. Thus, the player is able to easily recognize a symbol arrangement on the one reel (30A to 30C).

A gaming machine with such structures realizes a below mentioned confirmation method of a symbol 301. In other words, the confirmation method of a symbol 301 is to confirm a plurality of symbols 301 on one out of the reels 30A to 30C which are mechanically driven to rotate and used in a game requiring a player's bet, by stopping the one reel (30A to 30C) after rotating the one reel (30A to 30C) by an amount equivalent to one symbol.

More specifically, the gaming machine realizes a confirmation method of a symbol 301 having: a first step of receiving an input inputted through the input device; a second step of, when a rotation command related to one out of the reels 30A to 30C is inputted, stopping the one reel (30A to 30C) after rotating the one reel (30A to 30C) by an amount equivalent to one symbol.

In addition to the first structure, the gaming machine has a second structure where a rotation mode of the reels 30A to 30C is changed depending on whether the operation is tapping or continuous pressing.

Specifically, the gaming machine includes: a game requiring a player's bet; reels 30A to 30C used in the game and mechanically driven to rotate; symbols 301 on the reels 30A to 30C, an input device which receives an input by the player; and a controller that is programmed to operate in the following steps.

Specifically, the controller carries out steps of: (b1) receiving an input inputted through the input device; (b2) when the input is a rotation command related to one out of the reels 30A to 30C, determining whether the rotation command is inputted through tapping or continuous pressing; (b3) when the input is inputted through tapping, stopping the one reel (30A to 30C) after rotating the one reel (30A to 30C) by an amount equivalent to one symbol; and (b4) when the input is inputted through continuous pressing, rotating the one reel (30A to 30C) while the rotation command is being inputted.

Here, "tapping" is an operation which stops inputting information immediately after starting the same through the input device. In a case that the input device is a mouse, clicking applies to tapping. Meanwhile, "continuous pressing" is an operation where a continuous input through the input device takes place without intermittence.

According to the above structure, when a player inputs a rotation command through the input device by tapping, one out of the reels 30A to 30C moves by an amount equivalent to one symbol. Otherwise the one reel (30A to 30C) rotates while the rotation command is being inputted. In short, the reels 30A to 30C are rotatable intermittently by an amount equivalent to one symbol, as well as continuously in accordance with a player's operation. Thus, the player is able to successively confirm the symbols 301 actually arranged on one out of the reels 30A to 30C by the player him/herself carrying out an operation to rotate the one reel (30A to 30C). Thus, the player is able to easily recognize a symbol arrangement.

In addition to the first structure, the gaming machine has a third structure where rotation directions of the reels 30A to 30C are switchable with a use of a touch panel as an input device.

Specifically, the gaming machine includes; a game requiring a player's bet; reels 30A to 30C, for use in the game, which are mechanically driven to rotate and whose rotation directions are switchable; symbols 301 on each of the reels 30A to 30C; a display capable of generating a video image; a touch panel 69 which is an input device disposed so that at least a part of a display area of the display is visible through the touch panel 69, for receiving an input through a press operation by the player; and a controller which is programmed to carry out the following steps.

Specifically, the controller carries out the steps of: (c1) displaying a video image of a direction symbol 302 indicating a rotation direction of the reels 30A to 30C; (c2) specifying an input position in the touch panel 69; (c3) when the input position corresponds to a display position of the direction symbol 302, determining that a rotation command related to one out of the reels 30A to 30C is inputted; and (c4) stopping the one reel (30A to 30C) after rotating the one reel (30A to 30C) in a direction indicated by the direction symbol 302 by an amount equivalent to one symbol.

Examples of an electrical structure are a liquid crystal display device, a CRT (cathode-ray tube) device, a plasma display device, or the like. Further, either one display or plural displays may be provided to the slot machine 1. As for a gaming machine for multiple players, a display may be provided to each slot machine 1, or a large screen display shared by all the slot machines 1 may be provided in addition to the slot machines 1. In the present embodiment, an upper liquid crystal panel 5A and a central liquid crystal panel 5B applies to a display.

The above structure enables a player to input a rotation command related to one out of the reels 30A to 30C simply by pressing a specific area, of the touch panel 69, corresponding to a display position of the direction symbol, while a video image of the direction symbol is visible on the display. Then, the one reel (30A to 30C) rotates in a direction indicated by the direction symbol 302 by an amount equivalent to one symbol. In other words, the reels 30A to 30C are intermittently rotatable in one direction or the other by an amount equivalent to one symbol every time a player inputs a rotation command. Further, a rotation direction is shown as an image. Thus, the player is able to successively confirm the symbols 301 actually arranged on one out of the reels 30A to 30C by the player him/herself carrying out an operation to rotate the one reel (30A to 30C). Thus, the player is able to easily recognize a symbol arrangement on the reel. Further, the player who operates the reels 30A to 30C is able to easily determine a rotation direction of the reels 30A to 30C.

In addition to the first and the second structures, the gaming machine has a fourth structure where a video image of a symbol 301 is displayable.

Further, the controller of the gaming machine having the first and the second structures has a third structure where a video image of at least one of the symbols 301 on one out of the reels 30A to 30C is successively displayed on the display in sync with rotation of the one reel (30A to 30C).

According to the above structure, a video image of at least one of the symbols 301 on one out of the reels 30A to 30C is successively displayed on the display in sync with the rotation of the one reel (30A to 30C). Thus, a symbol 301 is also able to be confirmed with a video image of a virtual symbol 301. Hence, a player is able to recognize a symbol arrangement more easily.

The gaming machine has the first, second, third, and fourth structures.

Specifically, the gaming machine includes; a game requiring a player's bet; reels 30A to 30C, for use in the game, which are mechanically driven to rotate and whose rotation directions are switchable; symbols 301 on each of the reels 30A to 30C; a display capable of generating a video image; a touch panel 69 which is an input device disposed so that at least a part of a display area of the display is visible through the touch panel 69, for receiving an input through a press operation by the player; and a controller which is programmed to carry out the following steps.

Specifically, the controller carries out the steps of: (d1) displaying video images of direction symbols 302 indicating a rotation direction of the reels 30A to 30E; (d2) specifying an input position in the touch panel 69; (d3) when the input position corresponds to a display position of a direction symbol 302, determining that a rotation command related to one out of the reels 30A to 30C is inputted; (d4) when the rotation command is inputted through tapping, stopping the one reel (30A to 30C) after rotating the one reel (30A to 30C) by an amount equivalent to one symbol; (d5) when the rotation command is inputted through continuous pressing, rotating the one reel (30A to 30C) while the rotation command is being inputted; and (d6) successively displaying, on the display, a video image of at least one of the symbols 301 on the one reel (30A to 30C) in sync with the rotation of the one reel (30A to 30C).

The first, second, third, and fourth structures realize the effect of each structure.

In addition to the first, second, third, and fourth structures, the gaming machine has a fifth structure where a reel rotates by an amount equivalent to the number of symbols corresponding to the number of times input has been conducted.

Specifically, the gaming machine includes; a game requiring a player's bet; reels 30A to 30C, for use in the game, which are mechanically driven to rotate and whose rotation directions are switchable; symbols 301 on each of the reels 30A to 30C; a display capable of generating a video image; a touch panel 69 which is an input device disposed so that at least a part of a display area of the display is visible through the touch panel 69, for receiving an input through a press operation by the player; and a controller which is programmed to carry out the following steps.

Specifically, the controller carries out the steps of: (e1) displaying a video image of a direction symbol 302 indicating a rotation direction of the reels 30A to 30C; (e2) specifying an input position in the touch panel 69; (d3) when the input position corresponds to a display position of the direction symbol 302, determining that a rotation command related to one out of the reels 30A to 30C is inputted; (e4) when the rotation command is inputted through tapping, counting the number of tapping; (e5) stopping the one reel (30A to 30C) 30A to 30C after rotating the one reel (30A to 30C) by an amount equivalent to the number of symbols corresponding to the number of times input has been conducted; (e6) when the rotation command is inputted through continuous pressing, rotating the one reel (30A to 30C) while the rotation command is being inputted; and (e7) successively displaying, on the display, a video image of at least one of the symbols 301 on the one reel (30A to 30C) in sync with the rotation of the reel.

The first, second, third, and fourth structures realize the effects of each structure. Further, the fifth structure enables, when an operation is tapping, a reel to rotate by an amount equivalent to the number of symbols corresponding to the number of times input has been conducted. Thus, wider selections of symbol confirmation methods are realized.

(Game Controller 100)

The game controller 100 has an image storage unit 107 which stores image data such as a mini game screen, a help screen, or the like. The image storage unit 107 is accessed by a display control unit 102. The display control unit 102 reads out various kinds of image data of the image storage unit 107 under the control of a game running unit 110. The display control unit 102 then displays various kinds of images related to the game in the display unit 101. A specific displaying mode is mentioned below.

The game controller 100 is connected to the game start unit 109. The game start unit 109 has a function of outputting a game start signal in response to a player's operation. The game controller 100 has a game running unit 110, a combination payout determination unit 111, and a payout award unit 113. The combination payout determination unit 111 determines a payout according to a combination of symbols 301 rearranged on a payline L in a unit game. The payout award unit 113 awards each payout determined in the combination payout determination unit 111.

The game running unit 110 has a function of running various kinds of games such as a basic game, a mini game, a free game, or the like. Further, the game running unit 110 has a function of running a unit game where symbols 301 are rearranged, triggered by a start signal from the game start unit 109. Further, the game running unit 110 has a function of displaying, on the display unit 101, a video image of all the symbols on the reels 30A to 30C based on a result of a mini game.

A unit game starts from receiving a bet and includes a series of operations until a win or loss is resulted. For example, a unit game of the basic game includes a bet time to receive a bet, a game time to rearrange stopped symbols 301, and a payout time of a payout process to award payout.

A basic game is a main game which the gaming machine is originally intended for, and is run during an ordinary game mode. For instance in slot machine 1, a slot game which is run during an ordinary game mode is a basic game. Note that a slot game offers a chance of acquiring a game value according to symbols 301 stopped and displayed after variable displaying of the symbols 301. Examples of a game value are a medal, a coin, a game ball, money, paper money, a magnetic card, or the like.

A mini game is a sub game (special game) different from the main game of the gaming machine. The mini game is run in parallel with the basic game, or during a period of time while the basic game is not being played. In the present invention, for example, a penalty shootout game run during a slot game is a mini game. In the penalty shootout game, continuous penalty kicks may be automatically taken. This game may allow a player to operate kicking directions or strength of the ball.

A free game can be played for a predetermined number of times without betting a coin. A free game is a kind of bonus game. A bonus game is more advantageous than a basic game. Note that a bonus game is not specifically limited as long as it is an advantageous game for a player, that is, more advantageous than a basic game. Examples of a bonus game are, a state where more game media are obtainable than a basic game, a state where a possibility of obtaining a game medium is higher than that of the basic game, a state where fewer game media are consumed than a basic game, and so on.

The game controller 100 includes an input position obtain unit 116, an input content determination unit 121, an input mode determination unit 125, and a reel control unit 122. The input position obtain unit 116 is connected to an external input unit 103. The external input unit 103 is disposed separately from the game controller 100, and receives a signal input from outside by a player. Although a touch panel is used as an external input unit 103 in the present embodiment, the external input unit is not limited to this. The external input unit 103 maybe a mouse or an operation button.

The input position obtain unit 116 has a function of specifying an input position based on a signal from the external input unit 103. The input content determination unit 121 has functions of: receiving an input position from the input position obtain unit 116 and determining a command based on a relation of the input position to the image display area in the display unit 101; and outputting a command signal corresponding to the command to the input mode determination unit 125 and the game running unit 110. More specifically, the input content determination unit 121 has a function of determining that, when the input position corresponds to a display position of a direction symbol, a rotation command related to a reel is inputted.

An input mode determination unit 125 has functions of: determining whether or not the input from the input content determination unit 121 is a rotation command related to one out of the reels 30A to 30C; when the input is a rotation command related to the one reel (30A to 30C), determining whether the rotation command is inputted through tapping or continuous pressing; when the input is through tapping, running the reel control unit 122 to stop the one reel (30A to 30C) after rotating the one reel (30A to 30C) by an amount equivalent to one symbol; counting the number of tapping, and running the reel control unit 122 to stop the one reel (30A to 30C) after rotating the one reel (30A to 30C) by an amount equivalent to the number of symbols corresponding to the number of times input has been conducted; and when the input is through continuous pressing, running the reel control unit 122 to rotate the one reel (30A to 30C) while the rotation command is being inputted.

The game running unit 110 operates according to a command of a command signal. For example, when the command signal is a help command, it carries out a help process such as displaying a help screen as an image at a predetermined timing. Further, the game running unit 110 has a function of, when a rotation command related to one out of the reels 30A to 30C is inputted, outputting a drive signal to stop the one reel (30A to 30C) after rotating the one reel (30A to 30C) by an amount equivalent to one symbol. Further, the game running unit 110 has functions of: displaying a video image of a direction symbol indicating a rotation direction of a reel; when the input position in the touch panel 69 corresponds to the display position of the direction symbol, determining that a rotation command related to one out of the reels 30A to 30C is inputted; rotating the one reel (30A to 30C) in a direction indicated by the direction symbol; and successively displaying, on the display unit 101, a video image of at least one of the symbols 301 on the one reel (30A to 30C) in sync with the rotation of the one reel (30A to 30C). Further, the reel control unit 122 enters an operation mode when the command signal is a reel rotation command, and has a function of outputting a drive signal to the reel drive unit 123 to rotate one out of the reels 30A to 30C. Specifically, the reel control unit 122 has a function of outputting a drive signal to rotate one out of the reels 30A to 30C in a rotation direction indicated by the associated direction symbol while the rotation command related to the one reel (30A to 30C) is being inputted.

Each block of the game controller 100 may be formed with hardware, or software as needed.

(Operation of Game Controller 100)

The following describes operations of the game controller 100. First, symbols 301 are arranged into a matrix of three columns and three rows in the display unit 101. When the game running unit 110 runs a unit game through an operation by the game start unit 109, one out of the reels 30A to 30C rotates and stops to rearrange the symbols 301. Then, the combination payout determination unit 111 determines a payout in accordance with a combination of symbols 301 rearranged on a payline, and the payout determined is awarded by the payout award unit 113.

When a player carries out a press operation to the external input unit 103, an input signal showing an input position in the external input unit 103 is outputted to the input position obtain unit 116. After extracting input position data included in the input signal in the input position obtain unit 116, the input signal is outputted to the input content determination unit 121. Afterwards, a command signified by the input signal is determined by comparing the input position data and a display area of the display unit 101. Then, a command signal including the command is respectively outputted to the game running unit 110 and the input mode determination unit 125.

When the game running unit 110 and the input mode determination unit 125 receive the command signal, they operate according to the command. For instance, when the command is a reel rotation command, it is determined, in the input mode determination unit 125, whether the command is inputted through tapping or continuous pressing. When the command is inputted through tapping, one out of the reels 30A to 30C rotates by an amount equivalent to the number of symbols corresponding to the number of times input has been conducted.

When the command is inputted through continuous pressing, one out of the reels 30A to 30C rotates while the rotation command is being inputted. Meanwhile, the game running unit 110 extracts a rotation direction indicated by a direction symbol which is included in the command, and determines a rotation direction of one out of the reels 30A to 30C rotated through tapping or continuous pressing. Thus, one out of the reels 30A to 30C intermittently or continuously rotates in a direction indicated by the direction symbol. Further, the game running unit 110 successively displays, on the display unit 101, a video image of at least one of the symbols 301 on the one reel (30A to 30C) in sync with the rotation of the one reel (30A to 30C). Thus, a player is able to confirm a symbol with a video image of a virtual symbol.

Further, the game running unit 110 runs a mini game when a predetermined condition is met in a game such as a basic game. When a predetermined condition is met as a result of a mini game, the game running unit 110 displays, on the display unit 101, a video image of all the symbols 301 on the reels 30A to 30C.

(Mechanical Structure)

Figure 38:
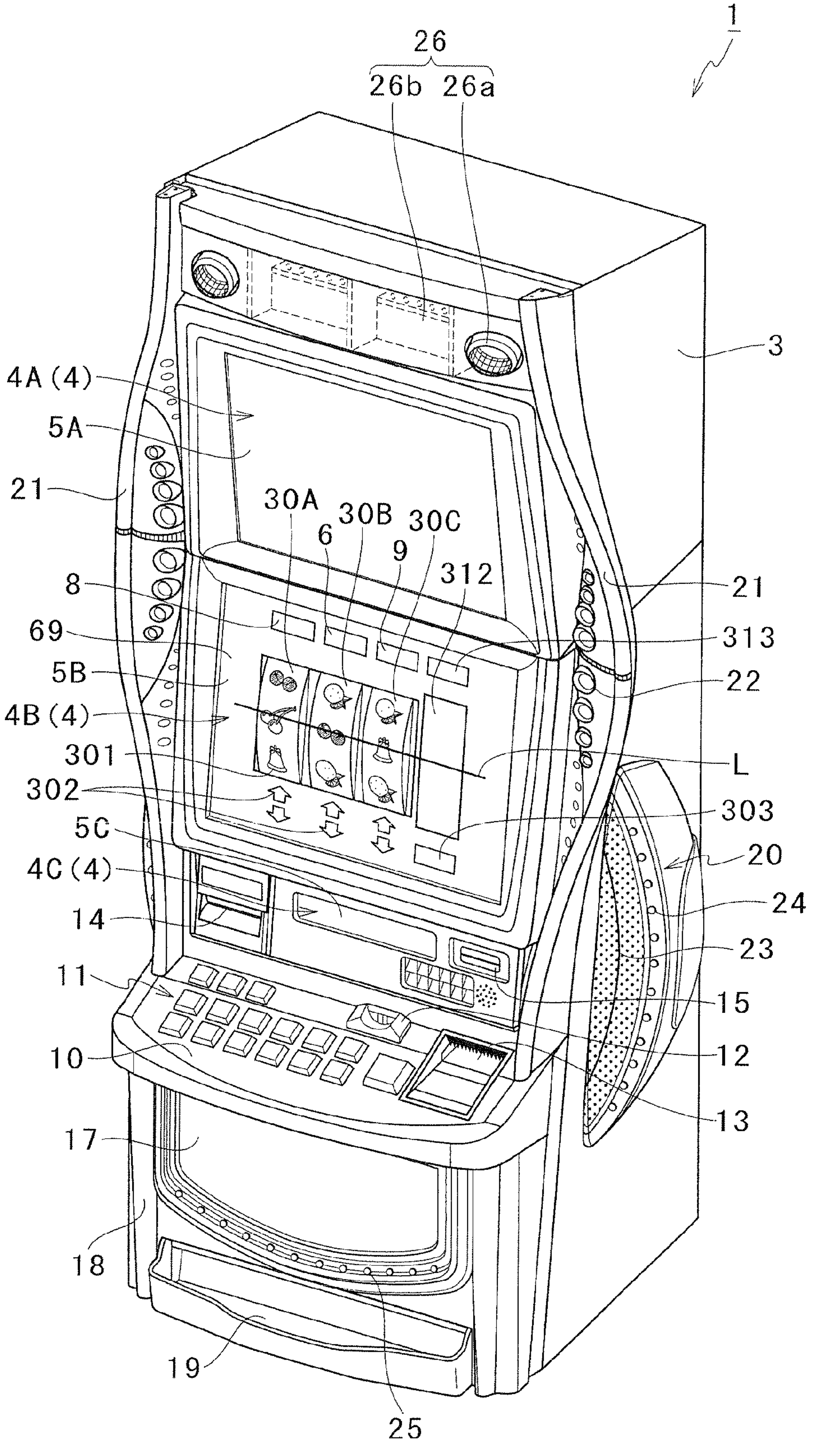
FIG. 38 is a perspective view showing an exterior of a gaming machine.

The following describes an embodiment where a gaming machine is specifically a slot machine 1. As shown in FIGS. 36 and 38, a slot machine 1 is an upright slot machine. The slot machine 1 has a cabinet 3 housing an electrical component and a mechanical component for running a predetermined game. The cabinet 3 has a longer length in the vertical direction. On the front side of the cabinet 3 facing a player is a display 4. The display 4 displays a basic game, a mini game, and game information based on a game operation by the player.

Specifically, the display 4 has an upper variable display unit 4A, a middle variable display unit 4B, and a lower variable display 4C. The upper variable display unit 4A has a transparent upper liquid crystal panel 5A. The upper liquid crystal panel 5A is fixed on a front door of the cabinet 3. The upper liquid crystal panel 5A displays a soccer game screen or a penalty kick standby screen during basic, mini, and free games. In other words, the upper liquid crystal panel 5A displays a soccer game screen when the mini game is not running, and a penalty kick standby screen while the mini game is running.

The middle variable display unit 4B is a rotation symbol display panel on which a player directs the eyes at all times. The middle variable display unit 4B has a transparent central liquid crystal panel 5B fixed on the front door of the cabinet 3. The central liquid crystal panel 5B has three display windows 7A, 7B, and 7C presenting an internal state to the outside. Inside the display windows 7A to 7C, are reels 30A to 30C respectively arranged.

Figure 45:
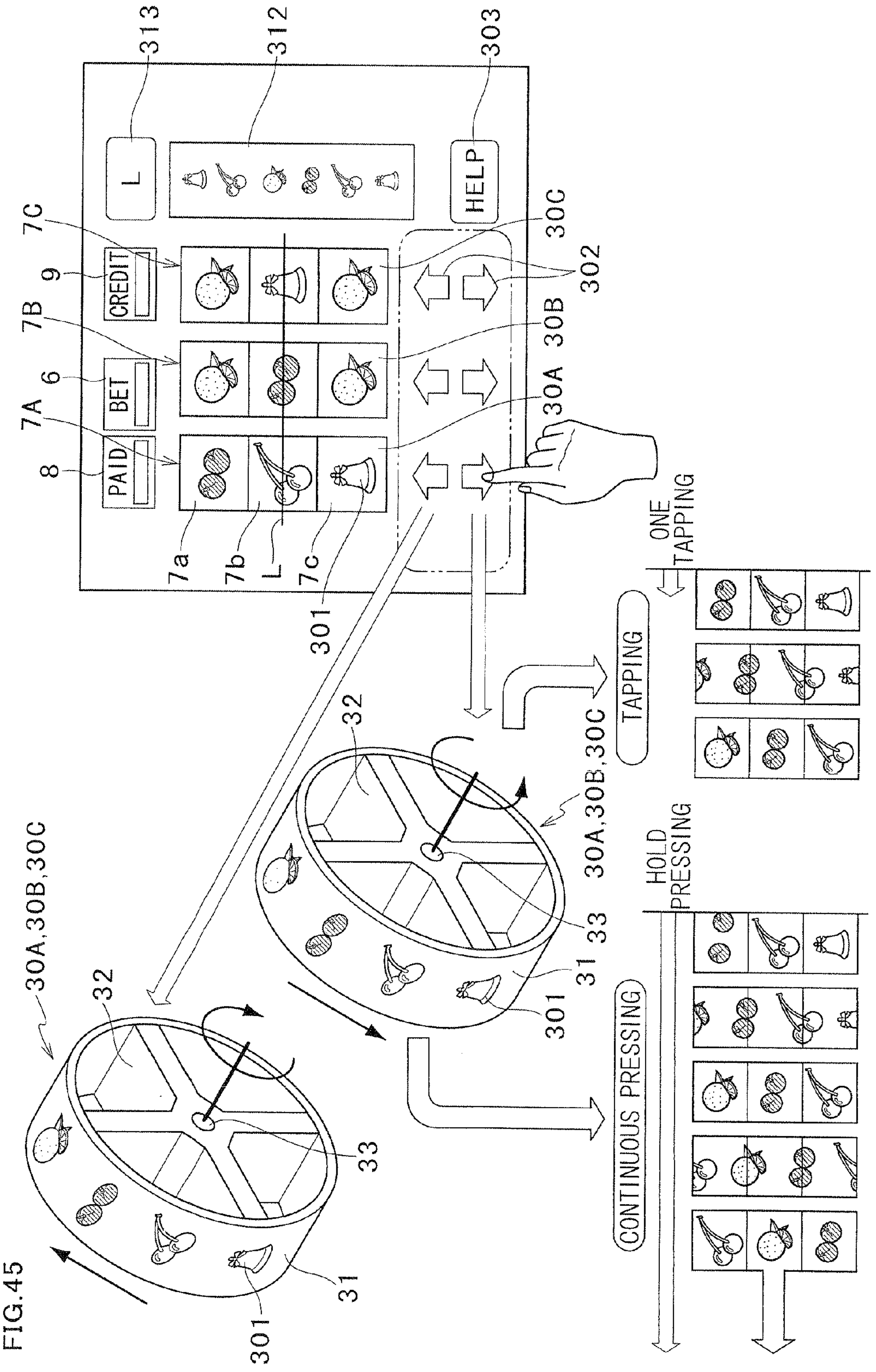
FIG. 45 is an explanatory drawing of a display screen in a reel confirmation mode.

As shown in FIG. 45, each of the reels 30A to 30C has a circular cylindrical member 31, a rotation axis 32 arranged at the center of the cylindrical member 31, and a support member 33 which communicates the rotation axis 32 and the cylindrical member 31. The rotation axis 32 communicates with a rotation drive mechanism (not shown). The rotation drive mechanism enables the reels 30A to 30C to rotate and stop at a predetermined angle by providing a rotation drive force to the rotation axis 32 at any given timing.

On the outer cabinet surface of the cylindrical member 31 is a symbol column. The symbol column has a combination of symbols 301, including a "JACKPOT 7," a "BLUE 7," a "BELL," a "CHERRY," a "STRAWBERRY," a "PLUM," an "ORANGE," and an "APPLE." Further, the symbol column is set so that three successive symbols 301 on the symbol column are visible through associated one of the display windows 7A to 7C.

The reels 30A to 30C described above enable the symbol columns to respectively rotate in a vertical direction through mechanical drive. Thus, the slot machine 1 is capable of rearranging three columns and three rows of symbols 301 in display windows 7A to 7C by rotating and stopping the reels 30A to 30C.

The central liquid crystal panel 5B displays one payline L. The payline L horizontally crosses the three display windows, 7A to 7C. Note that the payline is for determining a combination of the symbols 301. In other words, when symbols 301 are rearranged on and outside the payline L, only a combination of the symbols 301 rearranged on the payline L is considered. When the combination is recognized as a winning combination, a process such as paying out a coin according to the winning combination or the like is carried out.

The central liquid crystal panel 5B displays a moving image effect or the like in an effect display unit when a player wins a game. The central liquid crystal panel 5B also displays, on its upper area, images of a bet display unit 6, a payout display unit 8, and a credit display unit 9. The entire surface of the central liquid crystal panel 5B is covered with the touch panel 69. The touch panel 69 is made of a transparent material including a transparent electrode or the like. Through the touch panel 69, an image of the each display unit displayed by the central liquid crystal panel 5B, and the symbols 301 on the reels 30A to 30C are visible. Thus, the images on the central liquid crystal panel 5B, and the symbols 301 on the reels 30A to 30C, are visible to the player through the touch panel 69.

In addition, the touch panel 69 has a function of outputting, as an input signal, two-dimensional position data of horizontal axis and vertical axis directions when receiving a pressing force. Hence, through the touch panel 69, the each display unit of the central crystal panel 5B and the reels 30A to 30C are visible to the player. Further, the touch panel 69 outputs, to a below mentioned main body PCB 260, an input signal including information indicated by the each display unit when the player presses the each display unit.

The lower variable display unit 4C has a lower liquid crystal panel 5C which displays a point stored in a card, or a point of a game. A number displayed on the lower liquid crystal panel 5C is based on a result displayed of the middle variable display unit 4B. When a winning combination is formed on the middle variable display unit 4B, a point based on the winning combination is added to the game point/s displayed on the lower liquid crystal panel 5C. On the left side of the lower liquid crystal panel 5C is a ticket printer 14. On the right side of the lower liquid crystal panel 5C is a card reader 15.

Below the lower variable display unit 4C is an operation table 10. The operation table 10 projects forward from the front surface of the cabinet 3. The operation table 10 has an operation button 11. The operation button 11 is structured with, for instance, a bet button, a collect button, a start button, a stop button, or the like. The operation table 10 also has a coin insertion slot 12 and a bill insertion slot 13. With the above structure, the operation table 10 functions as an operation unit enabling a player to carry out a game related operation.

Below the operation table 10 is a waist panel 17. The waist panel 17 is a plastic panel on which an image related to a game is printed. The waist panel 17 is fixed on a lower front door 18, and is illuminated by a cold cathode tube. Below the waist panel 17 is a coin receiving portion 19. The coin receiving portion 19 is formed so as to store the coins paid out according to the game result.

The cabinet 3 has a light emitting section 20. The light emitting section 20 includes light emitting components such as lamps, LED, or the like. The light emitting section 20 is formed and disposed so as to surround a game area including the upper variable display unit 4A, the middle variable display unit 4B, the lower variable display unit 4C, and the operation table 10.

The lamps in the light emitting section 20 are a side lamp 22, a speaker lamp 24, an under lamp 25, a top lamp 26, or the like. The side lamps 22 are disposed to inclined units 21. These inclined units 21 are respectively disposed to the left and the right sides of the front surface side of the cabinet 3. The inclined units 21 are projected in bow shapes, and are disposed so as to sandwich the upper variable display unit 4A, the middle variable display unit 4B, the lower variable display unit 4C.

The speaker lamps 24 are projected sideways at the right and left ends of the cabinet 3 adjacent to the operation table 10. The speaker lamps 24 are provided on arc-shaped speakers 23, and are aligned along edges of the speakers 23. The under lamps 25 are provided on the lower front door 18, and are aligned along a lower edge of the waist panel 17. The top lamp 26 is provided above the upper variable display unit 4A. The top lamps 26 has power lamps 26*a* arranged at both sides respectively and a band-type lamp 26*b* horizontally arranged between the power lamps.

(Electrical Structure)

Figure 37:
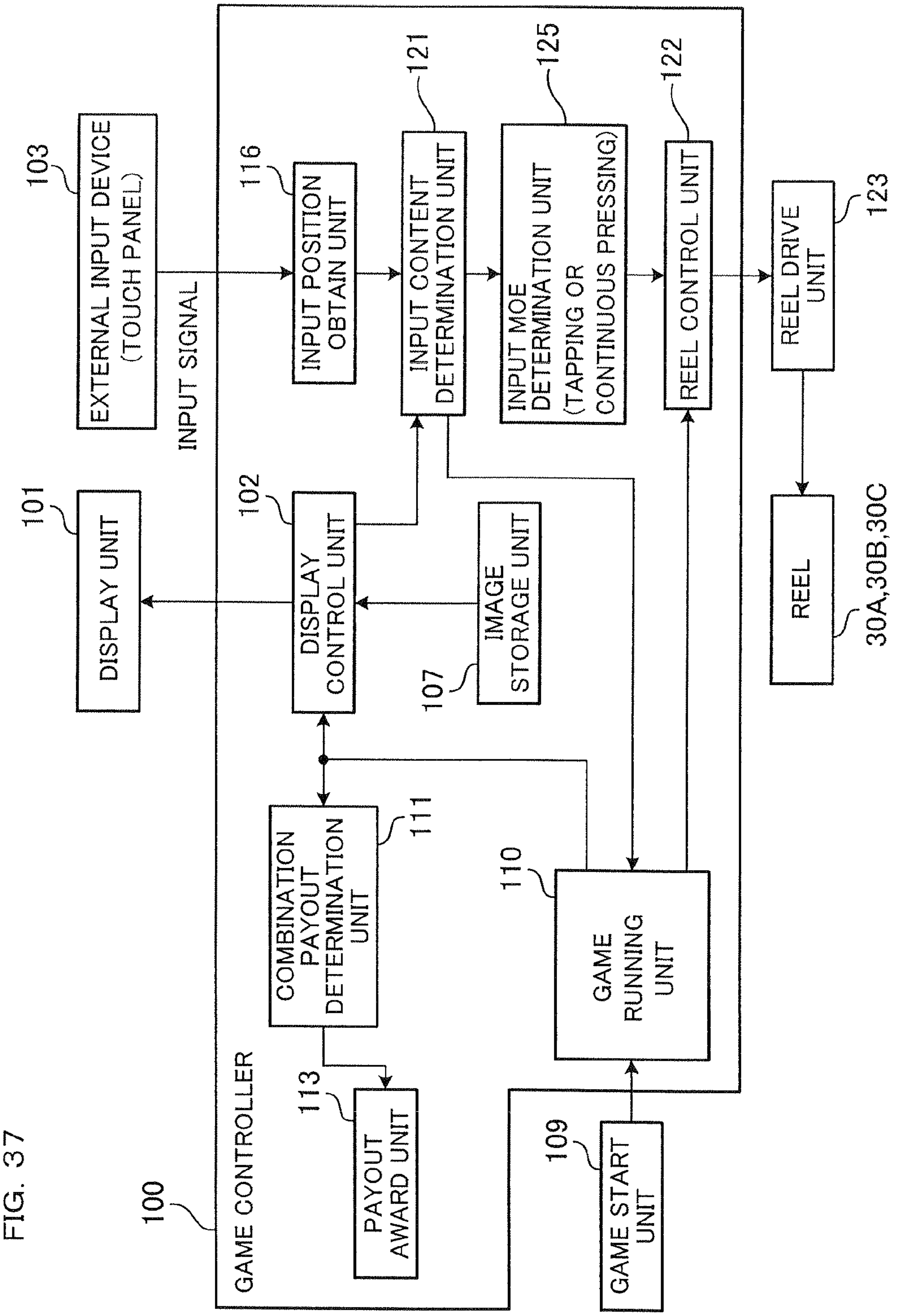
FIG. 37 is a block diagram of a gaming machine.
Figure 39:
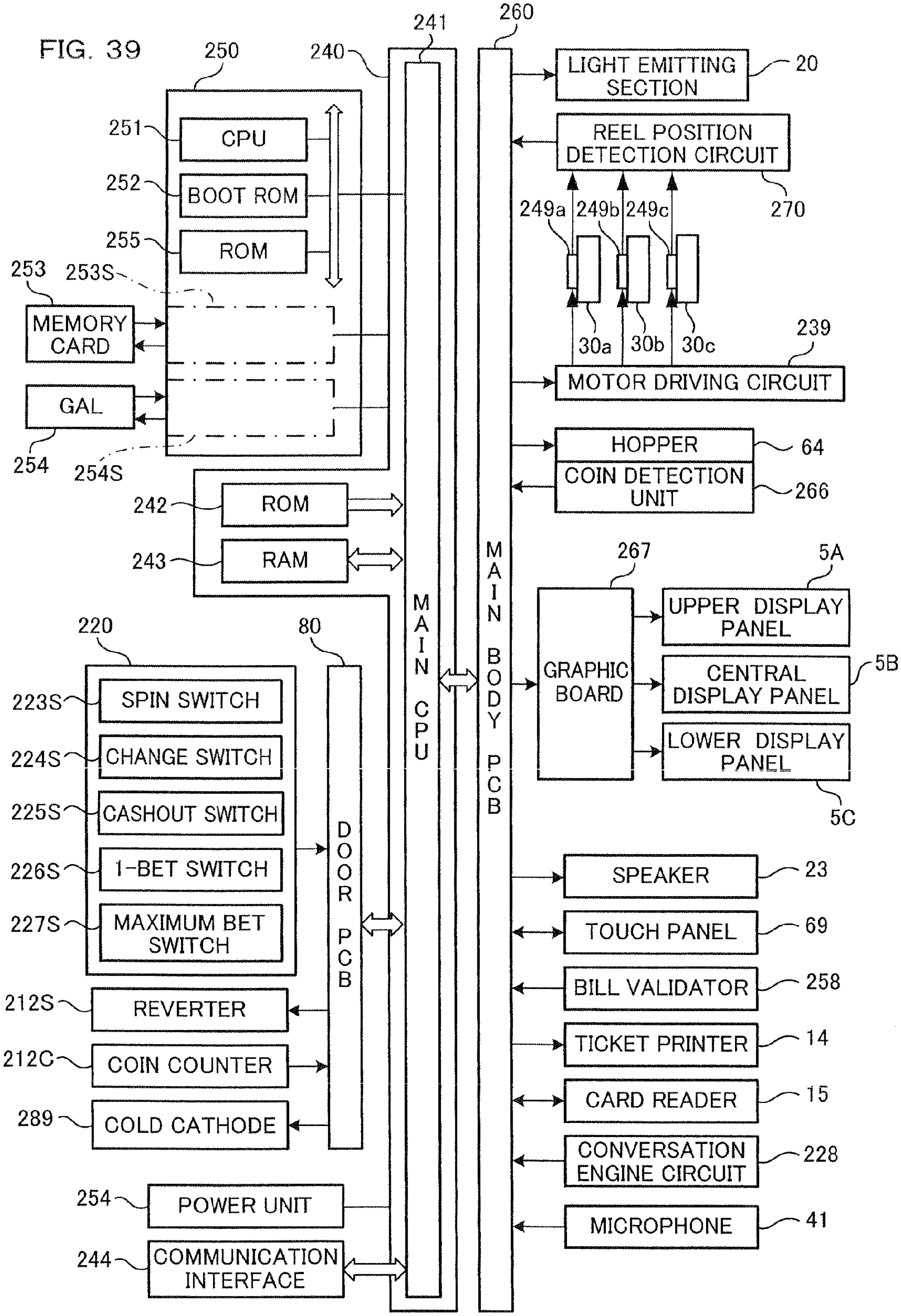
FIG. 39 is a block diagram showing a control circuit of a gaming machine.

FIG. 39 is a block diagram showing an electrical structure of the entire slot machine 1. A control unit having a controller 100 shown in FIG. 37 is disposed inside the cabinet 3. As shown in FIG. 39, the control unit has such components as a motherboard 240, a main body PCB (Printed Circuit Board) 260, a gaming board 250, a door PCB 280, various kinds of switches, a sensor, or the like.

The gaming board 250 has a CPU (Central Processing Unit) 251, a ROM 255, a boot ROM 252, a card slot 253S corresponding to a memory card 253, and an IC socket 254S corresponding to a GAL (Generic Array Logic) 254, connected to one another through an internal bus.

The memory card 253 stores a game program and a game system program. The game program includes a stop symbol determination program. The stop symbol determination program is for determining the symbols 301 to be stopped on the payline L (a code number corresponding to the symbols). The stop symbol determination program includes symbol weighing data corresponding to each of kinds of payout rates (e.g. 80%, 84%, and 88%). The symbol weighting data shows a corresponding relationship between a code number of each symbol and one or more random number values in a predetermined value range (0 to 256), for each of the display windows 7A to 7C.

The memory card 253 stores a program which samples a random number. The random number sample program is read out by a RAM 243 in time of carrying out a game running process, a bonus game process, or the like. This program is run by a main CPU 241. A random number is sampled by a program in the present embodiment; however, the method of sampling a random number is not limited to this. For example, it is possible to adopt a structure including: a random number generating circuit which generates a random number (random numbers) of a certain range, and a sampling circuit which samples a random number from the random number(s) generated by the random number generating circuit.

A payout rate is set according to the payout rate setting data outputted from the GAL 254. Symbols to be stopped are determined according to the symbol weighed data corresponding to the payout rate.

The memory card 253 stores various kinds of data used in the game program and the game system program. For example, the data showing a relationship between the random number range and the symbols 301 displayed in the display windows 7A to 7C shown in FIG. 36, is stored as a table in the memory card 253. The data is transferred to the RAM 243 of the motherboard 240 in time of running the game program.

The memory card 253 is attachable/detachable to/from the card slot 253S. The card slot 253S is connected to the motherboard 240 by an IDE bus. Thus, the gaming board 250 enables a player to change the types and contents of games to be run in the slot machine 1 through an switching operation including the steps of removing the memory card 253 from the card slot 253S, writing a different game program and a game system program in the memory card 253, and inserting the memory card 253 to the card slot 253S.

The game program includes a program according to a game progress, and a program for shifting into a bonus game. The game program also includes image data and sound data outputted during a game.

The GAL 254 has input ports and output ports. When data is inputted to the input ports, the GAL 254 outputs, from the output ports, the data corresponding to the inputted data. The data outputted from the output ports is the above-mentioned payout rate setting data.

The GAL 254 is attachable/detachable to/from the IC socket 254S. The IC socket 254S is connected to the motherboard 240 by a PCI bus. Thus, the gaming board 250 enables the payout rate setting data outputted from the GAL 254 to be changed through an switching operation including the steps of removing the GAL 254 from the IC socket 254S, rewriting a program stored in the GAL 254, and attaching the GAL 254 to the IC socket 254S.

The CPU 251, ROM 255, and boot ROM 252 connected to one another by an internal bus, are connected to the motherboard 240 by a PCI bus. The PCI bus transmits a signal between the motherboard 240 and the gaming board 250. The PCI bus also supplies power to the gaming board 250 from the motherboard 240. The ROM 255 stores country identification information and an authentication program. The boot ROM 252 stores a preliminary authentication program, a program for the CPU 251 to start the preliminary authentication program (boot code), or the like.

An authentication program is for authenticating a game program and a game system program (modification check program). The authentication program is for confirming and authenticating that the game program or the game system program is not modified. In other words, the authentication program is described in accordance with the authentication procedure of the game program and the game system program. A preliminary authentication program is for authenticating the authentication program. The preliminary authentication program is described in accordance with a procedure for verifying that the authentication program to be authenticated is not falsified. In short, the preliminary authentication program authenticates the authentication program.

The motherboard 240 has a main CPU 241(controller), a ROM (Read Only Memory) 242, a RAM (Random Access Memory) 243, and a communication interface 244.

The main CPU 241 functions as a controller to control the entire slot machine 1. Specifically, the main CPU 241 controls (i) when the start button is pushed after a credit is bet, to output a command signal to rotate and stop the reels 30A to 30C to start a variable display in the display windows 7A to 7C, (ii) after a variable display has started, to determine the symbols to be stopped, and (iii) to still-display the determined symbols in the display windows 7A to 7C.

In other words, the main CPU 241 functions as an arrangement controller for carrying out an arrangement control by which, among various kinds of symbols 301, the symbols to be stopped in a symbol matrix are selected and determined, and then scrolling of the symbols is stopped so that the determined symbol matrix appears. With this function, symbols 301 displayed after being scrolled by a rotation of the reels 30A to 30C on the central liquid crystal panel 5B are rearranged in a new symbol matrix.

The ROM 242 stores a program such as BIOS (Basic Input/Output System) or the like run by the main CPU 241. The ROM 242 also stores data which is permanently used. When the main CPU 241 runs the BIOS, each peripheral device is initialized, and a reading process via the gaming board 250 for a game program and a game system program stored in the memory card 253, is started. The RAM 243 stores data and a program used when the main CPU 241 carries out the process.

The communication interface 244 is for communicating, through a telecommunication circuit, with a host computer or the like provided in the arcade. The main body PCB (Printed Circuit Board) 260 and the door PCB 280 are respectively connected with the motherboard 240 through a USB (Universal Serial Bus). Further, the motherboard 240 is connected to a power unit 245. The power unit 245 supplies power to the motherboard 240 to boot the main CPU 241 of the motherboard 240, and supplies power to the gaming board 250 through the PCI bus to boot the CPU 251.

The main body PCB 260 and the door PCB 280 are connected to equipment or a device which generates an input signal to be inputted into the main CPU 241, and equipment or a device whose operation is controlled by a control signal outputted from the main CPU 241. The main CPU 241 runs a game program and a game system program stored in the RAM 243 in accordance with the input signal inputted to the main CPU 241. Thus, the main CPU 241 is capable of carrying out various kinds of processes such as storing a result of a calculation process to the RAM 243, and controlling each equipment and device by transmitting a control signal to the each equipment and device.

The main body PCB 260 is connected to the light emitting section 20, a hopper 64, a coin detection unit 266, a graphic board 267, the speakers 23, a bill validator 258, the ticket printer 14, and the card reader 15. The light emitting section 20 has lamps including the side lamps 22, the speaker lamps 24, the under lamps 25, the top lamps 26 and an LED.

Turning on and off the light emitting section 20 is controlled according to a control signal outputted by the main CPU 241. The hopper 64 is disposed in the cabinet 3, and pays out a predetermined number of coins from a coin payout opening 16 to the coin receiving portion 19 in accordance with a control signal outputted by the main CPU 241. The coin detection unit 266 is disposed in the coin payout opening 16. The coin detection unit 266 outputs an input signal to the main CPU 241 upon detecting that a predetermined number of coins have been paid out from the coin payout opening 16 the unit 266.

The coin detection unit 266 counts the number of coins paid out by the hopper 64, and outputs the data of the resulting number to the main body PCB 260. According to the data of the number of coins paid out (by the hopper 64), the main body PCB outputs a signal to notify completion of payout of a coin or coins to the main CPU 241, when a set number of coins are paid out.

Figure 40:
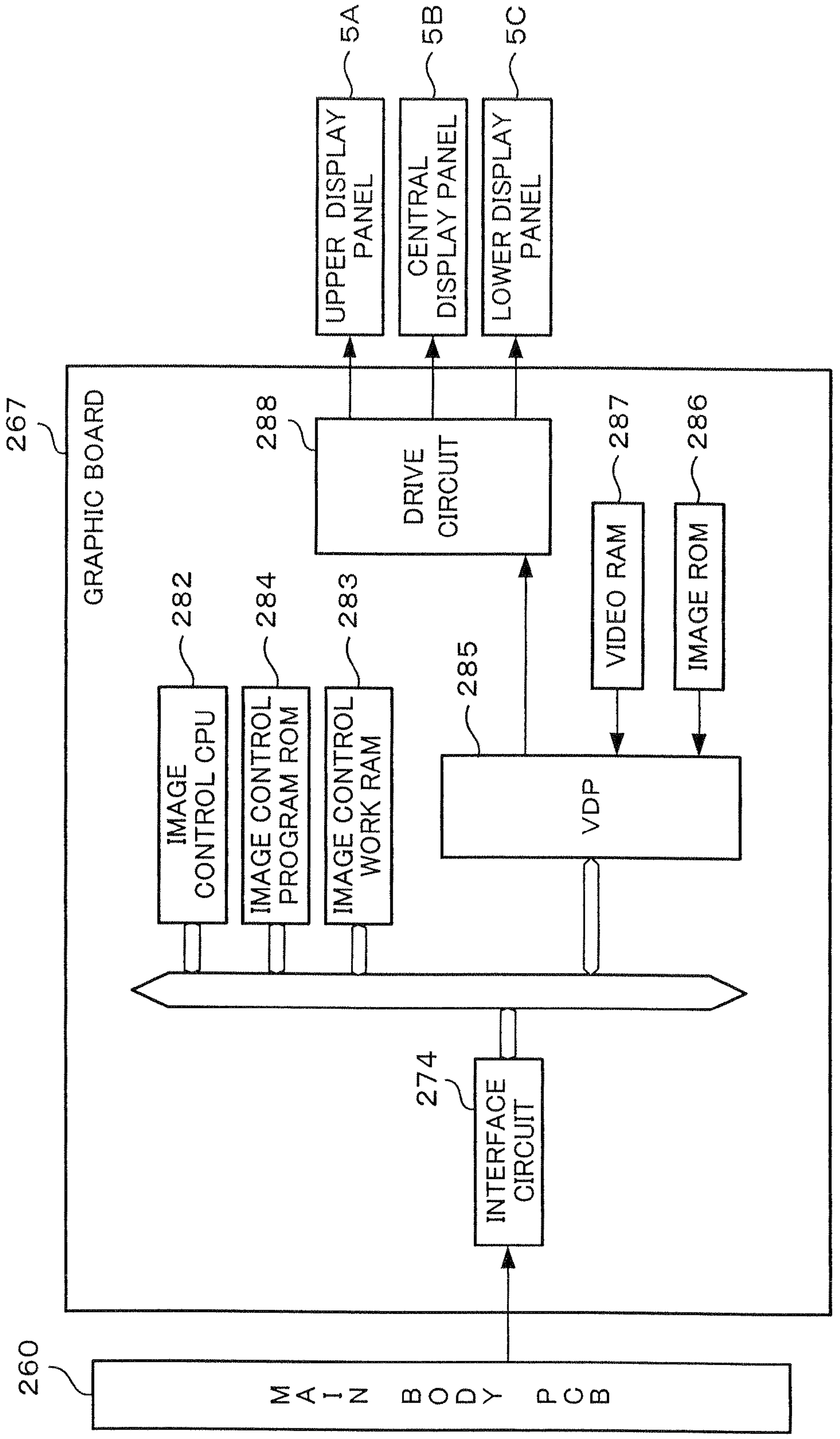
FIG. 40 is a block diagram of a graphic board.

The graphic board 267 controls display of an image on the upper liquid crystal panel 5A, the central liquid crystal panel 5B, and the lower liquid crystal panel 5C, in accordance with a control signal outputted from the main CPU 241. As shown in FIG. 40, the graphic board 267 has an interface circuit 281, an image control CPU 282, an image control work RAM 283, an image control program ROM 284, a VDP (Video Display Processor) 285, an image ROM 286, a video RAM 287, and a drive circuit 288.

The image control CPU 282 receives a control signal outputted from the main CPU 241 via the interface circuit 281. In response to the control signal from the main CPU 241, the image control CPU 282 runs the image control program stored in the image control program ROM 284 to determine an image to be displayed on the upper liquid crystal panel 5A, the central liquid crystal panel 5B, and the lower liquid crystal panel 5C.

The image control program ROM 284 stores various kinds of selection tables and an image control program related to displays on the upper liquid crystal panel 5A, the central liquid crystal panel 5B, and the lower liquid crystal panel 5C. The image control work RAM 283 functions as a temporary storage means when the image control CPU 282 runs the image control program.

The VDP 285 forms image data corresponding to a determination made in the image control CPU 282. The image ROM 286 stores dot data for forming an image such as a symbol 301. The video RAM 287 functions as a temporary storage means when an image is formed in the VDP 285. The drive circuit 288 outputs image data formed by the VDP 285 to the upper liquid crystal panel 5A, the central liquid crystal panel 5B, and the lower liquid crystal panel 5C. The image data used when the VDP generates image data is stored in the memory card 253, and is included in the game program read by the memory card 253 and temporarily stored in the RAM 243.

As shown in FIG. 39, the speakers 23 generate various kinds of sound effects when various kinds of effects are applied according to an output signal from the main body PCB 260. The bill validator 258 carries out at least the following processes: a process of reading an image of a bill, a process of determining whether or not the bill is genuine, and a process of, when the bill is genuine, accepting the bill into the cabinet 3. Further, when the bill validator 258 accepts a genuine bill, the bill validator outputs an input signal indicating the value of the accepted bill to the main CPU 241. The main CPU 241 stores, in the RAM 243, a credit/credits corresponding to the value of paper money transmitted by the input signal.

According to a control signal outputted by the main CPU 241, the ticket printer 14 prints a barcode on a ticket, and then outputs the ticket with a barcode. The barcode contains encoded data of credits stored in the RAM 243, date and time, an identification number of the slot machine 1, or the like. The card reader 15 reads data from a smart card and transmits the data to the main CPU 241. In addition, the card reader 15 writes data into a smart card according to a control signal from the main CPU 241.

The main body PCB 260 is connected to a motor driving circuit 239 and a reel position detection circuit 270. The motor driving circuit 239 is connected to stepping motors 249*a*, 249*b*, and 249*c*. With the pulsed power supplied by the motor driving circuit 239, the stepping motors 249*a* to 249*c* respectively rotate the reels 30A to 30C at any given rotation speed, and position the reels 30A to 30C.

The reel position detection circuit 270 receives a pulse signal from a reel rotation sensor. In response to the pulse signal, the reel position detection circuit 270 outputs, to the main body PCB 260, a reel position signal to detect a position of the each reel 30A to 30C. The reel position signal is assigned to a code number of a below mentioned data table for a symbol, so as to enable detection of a rotation angle of the reels 30A to 30C, and rearranging of specified symbols 301 in specific positions.

The door PCB 280 is connected to a control panel 220, a reverter 212S, a coin counter 212C, and a cold cathode tube 289. In the control panel 220 are a switch 223S corresponding to the start button, a change switch 224S corresponding to a change button, a cash-out switch 225S corresponding to a cash-out button, a 1-bet switch 226S corresponding to a 1-bet button, and a maximum bet switch 227S corresponding to a maximum bet button. Each of the switches 223S to 227S outputs an input signal to the main CPU 241 when the player presses corresponding one of the buttons.

The coin counter 212C is disposed inside the coin insertion slot 12, and validates whether or not the coin inserted by the player to the coin insertion slot 12 is genuine. Anything other than a genuine coin is discharged to the coin receiving tray 16. The coin counter 212C outputs an input signal to the main CPU 241 when detecting a genuine coin.

The reverter 212S operates in accordance with the control signal outputted by the main CPU 241. The reverter 212S distributes a coin recognized as genuine by the coin counter 212C to a cash enclosure (not shown) or the hopper 64 disposed inside the slot machine 1. That is, when the hopper 64 is filled with coins, the genuine coin will be distributed to a cash enclosure by the reveter 212S. To the contrary, when the hopper 64 is not filled with coins, the genuine coin will be distributed to the hopper 64. The cold cathode 289 functions as a backlight mounted to rear sides of the upper liquid crystal panel 5A, the central liquid crystal panel 5B, and the lower liquid crystal panel 5C. The cold cathode 289 lights up in accordance with a control signal outputted by the main CPU 241.

(Symbol, Combination, or the Like)

The symbols 301 displayed in the display windows 7A to 7C of the slot machine 1 forms symbol columns, each of which having twenty-two symbols. As shown in FIG. 41, one of code numbers 0 to 21 is assigned to each of the symbols constituting each column. Each of the symbol columns is constituted with a combination of symbols of "JACKPOT 7," "BLUE 7," "BELL," "CHERRY" "STRAWBERRY" "PLUM," "ORANGE," and "APPLE."

Three successive symbols in each of the symbol columns are respectively displayed (arranged) on an upper stage 7*a*, a middle stage 7*b*, and a lower stage 7*c* of each of the display windows 7A to 7C, to form a symbol matrix of three columns and three rows. When the start button is pressed to start a game after the bet button is pressed, the symbols forming a symbol matrix start scrolling. This scrolling of the symbols stops (rearrangement) after a predetermined period from the beginning of the scrolling.

Various kinds of winning combinations are set in advance for each symbol. A winning combination is a combination of stopped symbols on the payline L which puts the player in an advantageous state. Examples of an advantageous state include: a state where coins according to a winning combination is paid out, a state where the number of coins to be paid out is added to a credit, a state where a bonus game is started.

For example, a combination on the payline L including an "APPLE" symbol serves as a bonus trigger which causes a transition of a gaming mode from a basic game to a bonus game. Further, when a combination including a "CHERRY" symbol is formed on the payline L in a basic game, twenty coins (values) are paid out for one bet. When a combination including a "PLUM" symbol is formed on the payline L in a basic game, five coins are paid out for one bet.

Here, a bonus game is a gaming state which provides a larger advantage than a base game. Note that another bonus game may be employed in combination, provided that the other bonus game is advantageous to a player, i.e., the other bonus game is more advantageous than a basic game. For example, a bonus game may be a state where more coins are possibly obtained than the basic game, a state where the probability of obtaining coins is higher than in the basic game, a state where fewer coins are consumed than the basic game, free game, or the like.

The following describes each table stored in the ROM 242 of a main control board 71, with reference to FIGS. 42 and 43.

(Payout Control Table)

FIG. 42 is a payout control table which controls a payout awarded in accordance to a winning combination. The payout control table is stored in the ROM 242 of the main control board 71, and a piece of information of a payout is assigned to a type of winning combination. For example, a payout assigned to a winning combination including a "BELL" symbol is "10." A payout assigned to a winning combination including a "BLUE 7" is "40." Note that payouts for a basic game and a free game are set to be the same in the present embodiment.

(Free Game Quantity Table)

FIG. 43 is a table referred to when determining the number of free games to be played for the number of points acquired in a mini game of a basic game. The points awarded in a mini game correspond to the number of free games to be played in the free game quantity table. For example, when the accumulated points are 4, the free games are run eighty (80) times. When the accumulated points are 8, the free games are run a hundred sixty (160) times. Thus, by succeeding in a mini game in a basic game and acquiring many points, it is possible to continue a free game for a long period of time.

(Display State)

The following specifically describes an example of a display state of the display 4 in an operation of the slot machine 1.

(Help Mode Screen)

Figure 44:
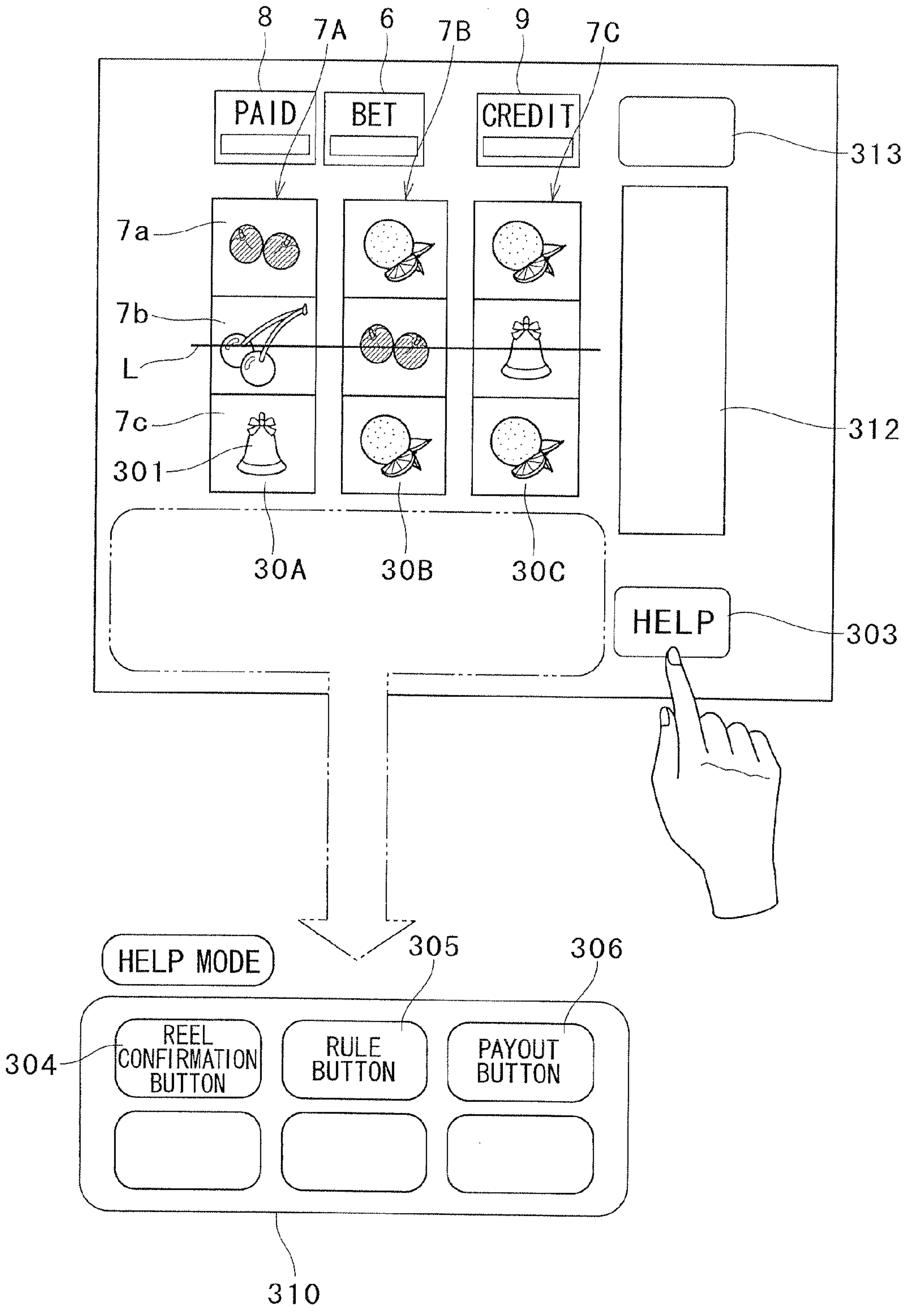
FIG. 44 is an explanatory drawing of a display screen in a help mode.

FIG. 44 shows a display state of the display 4 when modes switch from a game mode to a help mode. That is, the bet display unit 6, the payout display unit 8, and the credit display unit 9 are displayed in the upper part of the central liquid crystal panel 5B constituting a part of the display 4. In addition, in the center of the central liquid crystal panel 5B, window frames of the display windows 7A to 7C are displayed. When a basic game or a free game starts, all the symbols 301 on the reels 30A to 30C visible through the display windows 7A to 7C are variably displayed.

Moreover, in the lower part of the central liquid crystal panel 5B, a help button 303 is displayed. The help button 303, upon being pressed, activates the help mode. The help mode provides a player with troubleshooting information regarding a game.

A help mode screen has a help button frame 310. The help button frame 310 is provided to the right corner part of the help mode screen. The help button frame 310 has a reel confirmation button 304, a rule button 305, and a payout button 306 inside. The reel confirmation button 304 is for activating a reel confirmation mode which enables a player to confirm the symbols 301. The rule button 305 is for activating a rule guidance mode which provides a player with an introduction to a game or guidance on a method of playing a game. The payout button 306 is for activating a payout guidance mode which provides a player with guidance on payouts.

(Reel Confirmation Mode Screen)

Figure 53:
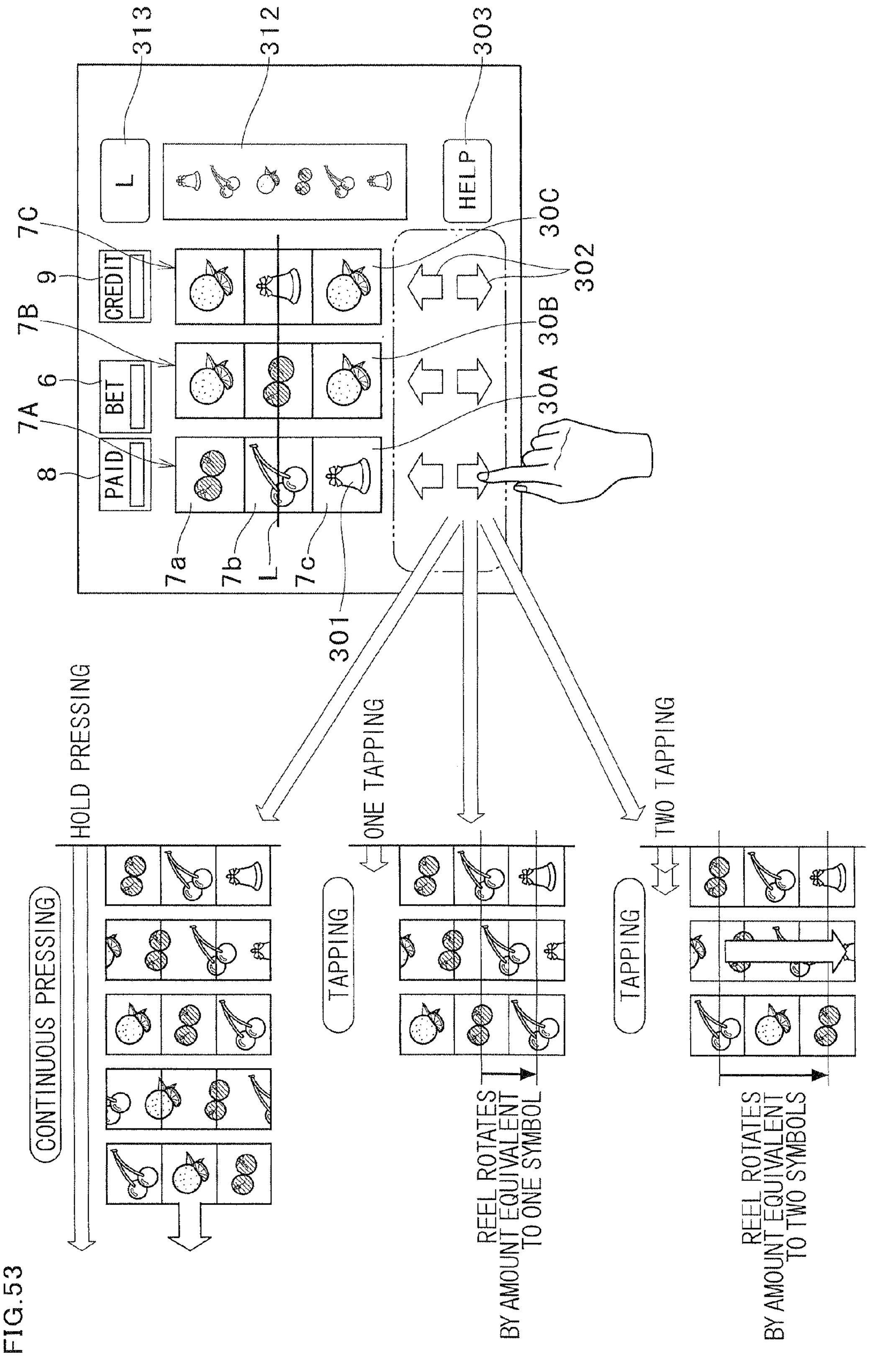
FIG. 53 is an explanatory drawing of a display screen in a reel confirmation mode.

FIGS. 45 and 53 respectively show display modes of the display 4 during a reel confirmation mode. That is, in the lower part of the central liquid crystal panel 5B constituting a part of the display 4, direction symbols 302 are displayed. Each of the direction symbols 302 has an arrow shape. One direction symbol and another paired with the former are symmetrically disposed so that one points out the upward direction and the other, the downward direction. Each pair of upper and lower direction symbols 302 are arranged below each of the display windows 7A to 7C. These pairs of direction symbols 302 function as command buttons to output a command to rotation drive each of the reels 30A to 30C in upward or downward directions.

Thus, when a player presses a direction symbol 302 indicating upward direction by tapping, a reel rotates by an amount equivalent to the number of symbols corresponding to the number of times input has been conducted. Specifically, as shown in FIG. 45, when the direction symbol is tapped once, the reel rotates by an amount equivalent to one symbol. Further, as shown in FIG. 53, when the direction symbol is tapped twice, the reel rotates by an amount equivalent to two symbols.

On the other hand, when the direction symbol is not pressed by tapping, that is, when the direction symbol is continuously pressed, one out of the reels 30A to 30C rotates while the direction symbol is being pressed. Such intermittent rotation or continuous rotation is in a direction indicated by the direction symbol 302 pressed by the player. In other words, pressing of a direction symbol 302 indicating upward direction causes intermittent or continuous upward rotation of one out of the reels 30A to 30C associated with the direction symbol 302. On the other hand, pressing of a direction symbol 302 indicating a downward direction causes downward rotation of one out of the reels 30A to 30C associated with the direction symbol 302.

The reel confirmation mode screen has a symbol display frame and a reel specifying frame 313. The symbol display frame 312 and the reel specifying frame 313 are also provided to the game mode screen and the help mode screen. The reel specifying frame 313 is provided to the upper right corner part of the screen. The symbol display frame 312 has a vertically long rectangular shape, and provided between the reel specifying frame 313 and the help button 303.

The reel specifying frame 313 is a display unit for displaying a code to specify one of the reels 30A to 30C, which has a symbol column to be displayed in a symbol display frame 312. Specifically, when the symbol column of the left reel 30A is displayed in the symbol display frame 312, a code "L" is displayed in the reel specifying frame 313. When the symbol column of the central reel 30B is displayed in the symbol display frame 312, a code "C" is displayed in the reel specifying frame 313. When the symbol column of the right reel 30C is displayed in the symbol display frame 312, a code "R" is displayed in the reel specifying frame 313.

The symbol display frame 312 displays a video image of the symbols 301 of one of the reels 30A to 30C corresponding to the code indicated in the reel specifying frame 313. The symbol display frame 312 displays an alignment of the symbols 301 identical to the symbol column on one of the reels 30A to 30C. Note that the symbol display frame 312 may display all the symbols of the symbol column, or a part of the symbol column.

The symbol display frame 312 successively displays a video image of the symbols 301 on one of the reels 30A to 30C having disappeared from corresponding one of the display windows 7A to 7C in sync with the rotation of the reel. Thus, the player is able to confirm a symbol alignment with a video image of virtual symbols 301 successively displayed on the symbol display frame 312 in sync with a rotation of one of the reels 30A to 30C.

(Mini Game Screen)

Figure 46:
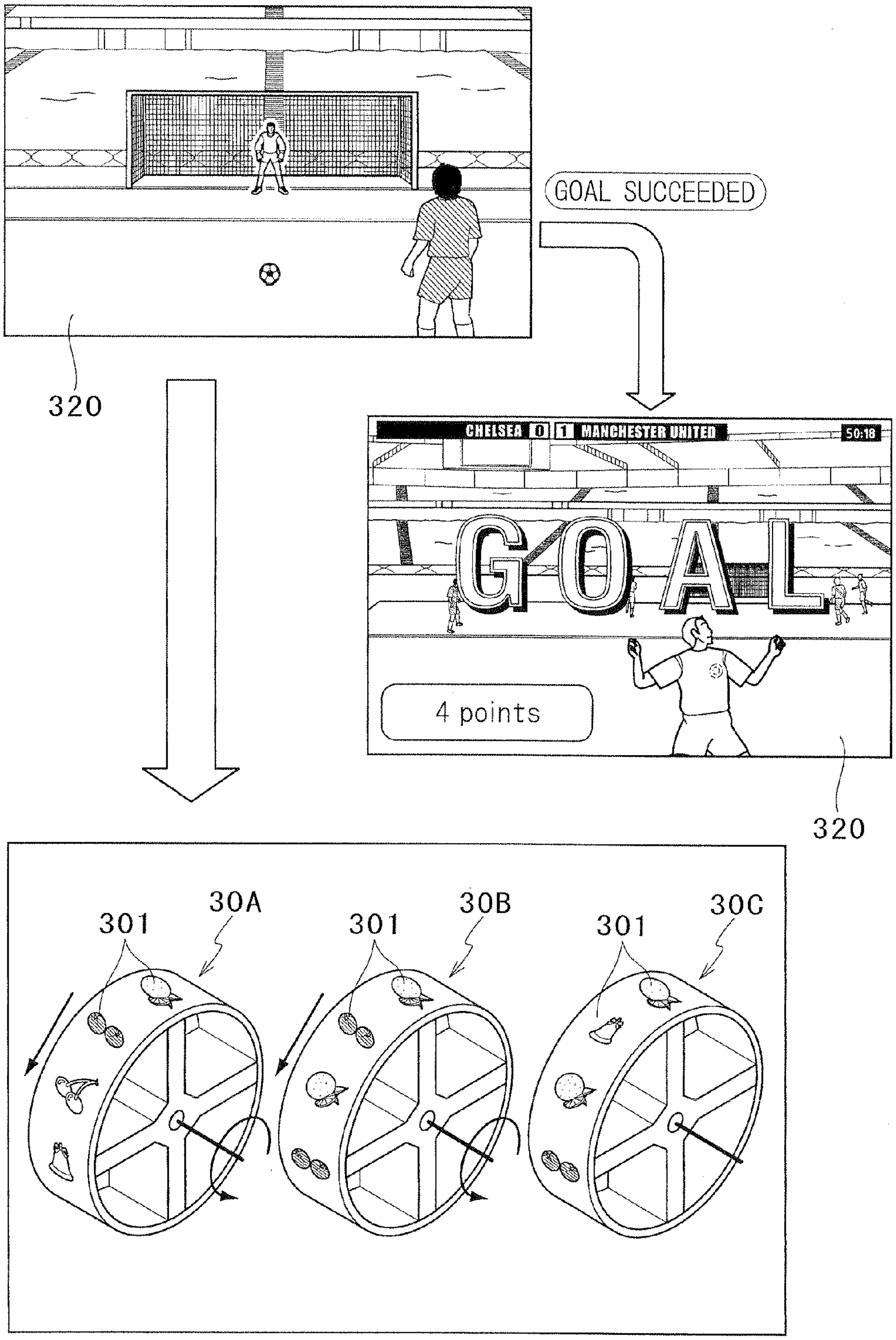
FIG. 46 is an explanatory drawing of a mini game screen.
Figure 47:
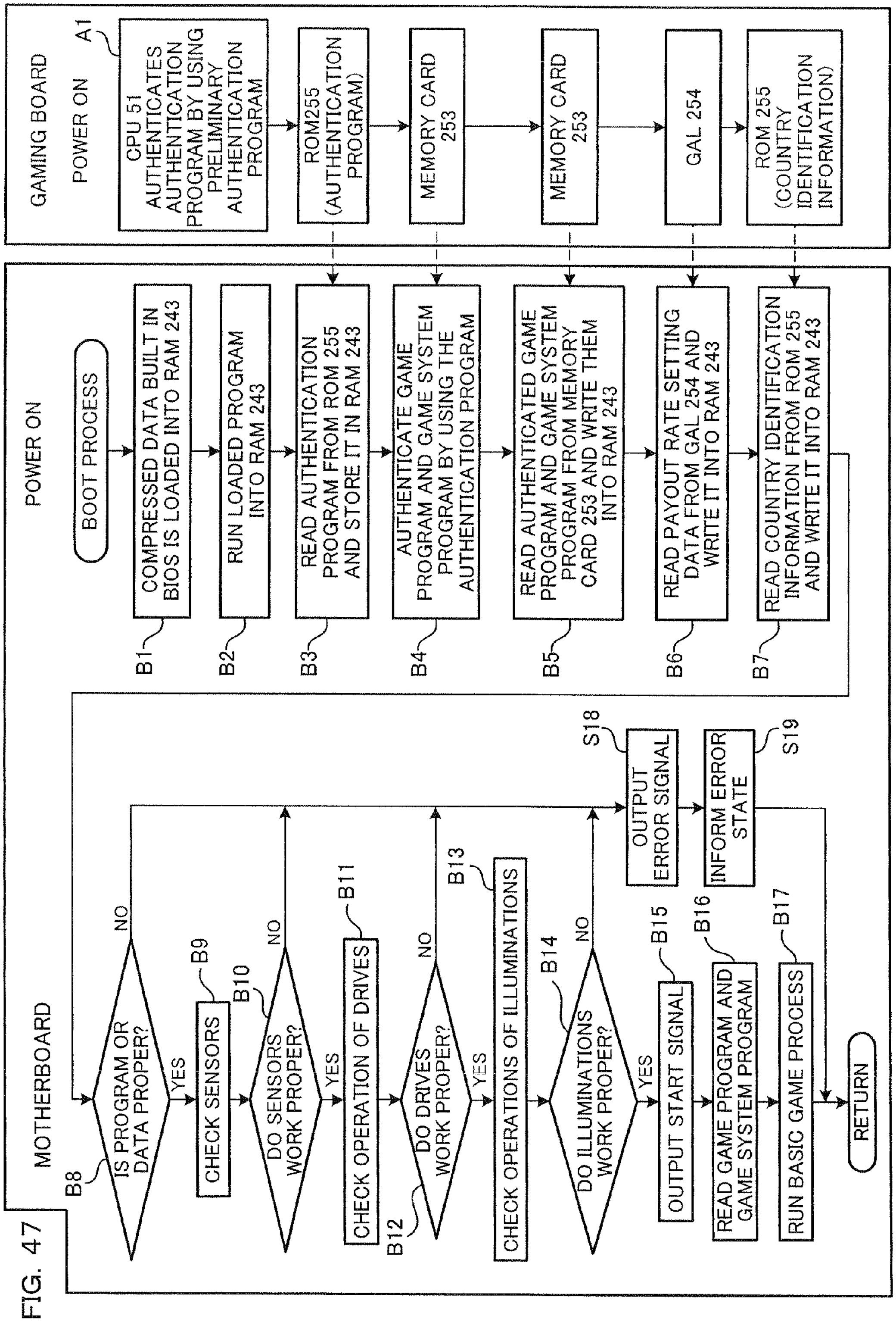
FIG. 47 is a flow chart of a boot process.

FIG. 46 shows a display state of the display 4 during a mini game. In other words, when a mini game starts, a mini game screen 320 is displayed on the entire upper liquid crystal panel 5A. A mini game screen 320 shows a penalty shootout of a soccer game. Specifically, a kicker who kicks a ball and a goal keeper who defends a goal are displayed as an initial screen. After a predetermined standby time, the kicker kicks the ball. When the ball goes into the goal, an image reading "GOAL" and accumulated points are displayed. This allows a player to confirm the points acquired. To the contrary, when the ball does not go into the goal, the screen goes back to an initial screen of a next penalty shootout. Note that there will be no points generated in this case.

When the mini game ends, the display shifts from the mini game screen to an image of simulation reels 30A to 30C. Specifically, an image of all the simulation reels 30A to 30C is displayed. These simulation reels are displayed rotating at a constant speed. Thus, when the simulation reels rotate once, all the symbols of each of the reels 30A to 30C are displayed to be confirmed. The duration of the display time of the simulation reels is limited according to the number of points acquired in the mini game. In other words, the duration of the video image of the simulation reels 30A to 30C is set according to the number of points acquired in the mini game. Thus, the more points acquired, the longer the duration of the display time. As a result, it becomes easier to confirm all the symbols 301.

(Process Operation of the Slot Machine 1: Booting Process)

The following describes a booting process taking place in the slot machine 1. When power is supplied to the slot machine 1, a booting process routine shown in FIG. 47 takes place in the motherboard 240 and the gaming board 250. In the present embodiment, a memory card is inserted into the card slot 253S of the gaming board 250, and the GAL 254 is attached to the IC socket 254S.

First, when a power switch is turned on (power is supplied) in the power unit 245, the motherboard 240 and the gaming board 250 are booted. When the motherboard 240 and the gaming board 250 are booted, different processes are respectively carried out in parallel. That is, in the gaming board 250, the CPU 251 carries out processes of reading a preliminary authentication program stored in the boot ROM 252, and carrying out preliminary authentication by the preliminary authentication program. Note that the preliminary authentication is a process in which the preliminary authentication program is run to confirm and authenticate that authentication program is not modified in advance before importing the program into the motherboard 240 (A1).

Meanwhile, in the motherboard 240, the main CPU 241 runs BIOS stored in the ROM 242. As a result, the compressed data built in the BIOS is loaded into the RAM 243 (B1). Then, the main CPU 241 runs the BIOS loaded into the RAM 243, and diagnoses and initializes various kinds of peripheral devices (B2).

Afterwards, the main CPU 241 reads out, via PCI bus, the authentication program stored in the ROM 255, and stores the read out authentication program to the RAM 243 (B3). During this step, the main CPU 241 drives a checksum through an ADDSUM method (a standard check function) which is adopted in standard BIOS. Thus, it is confirmed whether or not the authentication program is stored in the RAM 243 without an error.

The main CPU 241 then confirms a component connected to the IDE bus. Then, the main CPU 241 accesses to the memory card 253 inserted into the card slot 253S via the IDE bus, to read out the game program and the game system program from the memory card 253. In this case, data constituting the game program and the game system program are read in units of four bytes. Then, the main CPU 241 confirms and authenticates, according to the authentication program stored in the RAM 243, that the read game program and the game system program are not modified (B4).

When the authentication process ends properly, the main CPU 241 writes and stores the authenticated game program and the game system program in the RAM 243 (B5).

The main CPU 241 then accesses to the GAL 254 attached to the IC socket 254S to read out payout rate setting data from the GAL 254, and stores the data in the RAM 243 (B6). Afterwards, the main CPU 241 reads out the country identification information stored in the ROM 255 of the gaming board 250, and stores the information to the RAM 243 (B7).

With a result of the above authentication process, the main CPU 241 determines whether the program or data is proper (B8). When the program or data is not proper (B8, NO), an error signal including ID information to specify a slot machine 1 is outputted to a centralized control device (not shown). The centralized control device specifies a slot machine 1 in an error state based on the error signal. The centralized control device then instructs a staff standing by near the slot machine 1 to deal with the error, and stores an error history information containing a time and date and a place when/where the error has occurred, or the like (B18). Then, the error state is informed in the form of an audio output from the speaker 23 of the slot machine 1, and in the form of light emitted from the light emitting section 20. Afterwards, the routine in the motherboard 240 ends.

On the other hand, when the program or data is proper (B8, YES), operations of sensors disposed to the slot machine 1 are checked successively (B9). Then, whether or not all the sensors operate properly is determined (B10). When an error is detected in at lest one sensor (B10, NO), the above mentioned B18 and B19 are carried out, and the routine ends thereafter.

On the other hand, when all the sensors operate properly (B10, Yes), operations of all drive mechanisms are checked successively (B11). Then, it is determined whether or not all the drive mechanisms operate properly (B12). When an error is detected in at least one drive mechanisms (B12, NO), the above mentioned B18 and B19 are carried out, and the routine ends thereafter. On the other hand, when all the drive mechanisms operate properly (B12, Yes), operations of all illuminations are checked successively (B13). Then, it is determined whether or not all the illuminations operate properly (B14). When an error is detected in at least one illumination (B14, No), the above mentioned B18 and B19 are carried out, and the routine ends thereafter.

On the other hand, when all the illuminations operate properly (B14, Yes), a boot signal indicating that all the illuminations have been booted properly is outputted to the centralized control device (not shown) or the like (B15). Afterwards, a basic game process is carried out (B16), and this routine ends. The following describes the basic game process in detail.

(Basic Game Process)

Figure 48A:
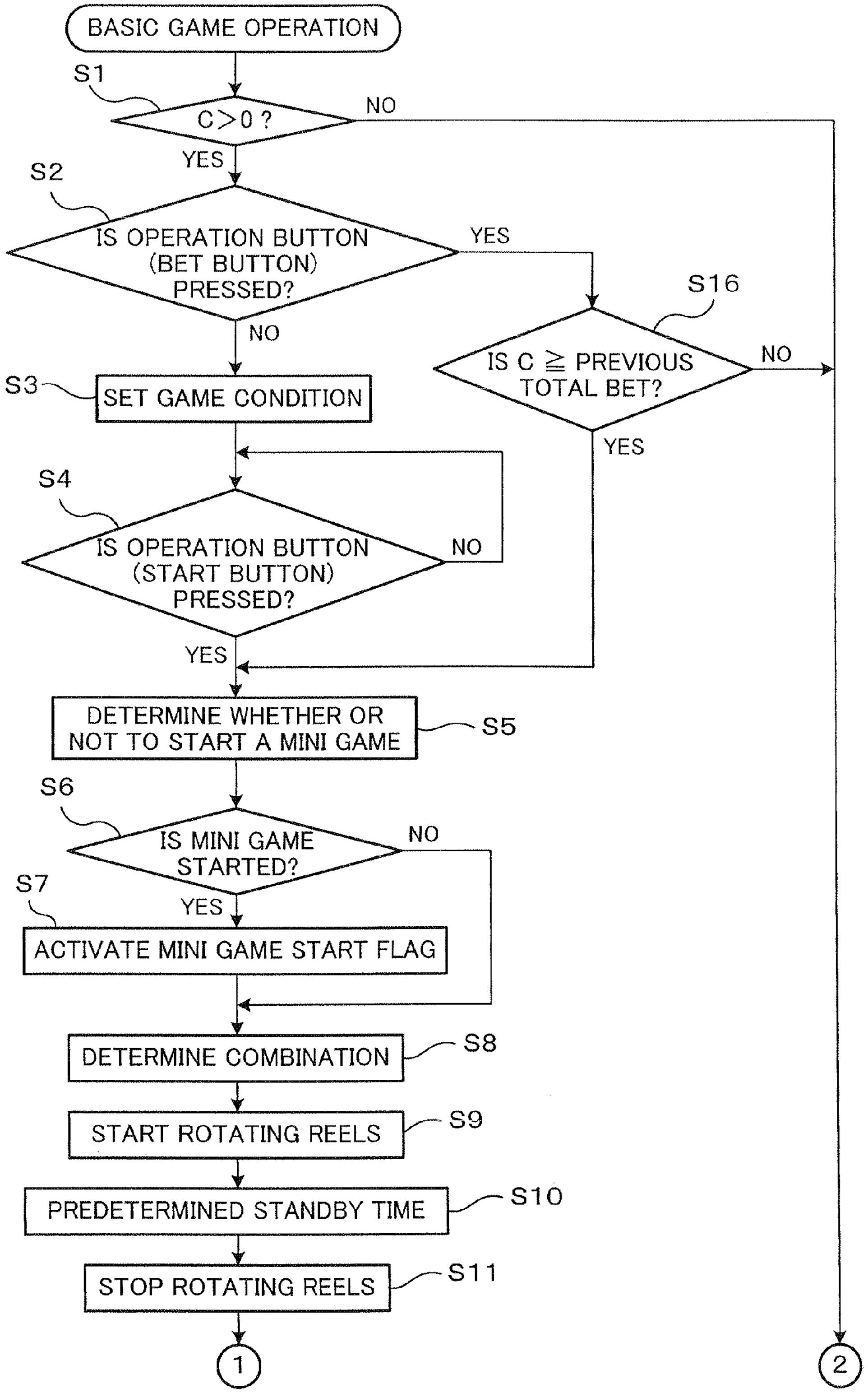
FIG. 48A is a flow chart showing part of a basic game process.
Figure 48B:
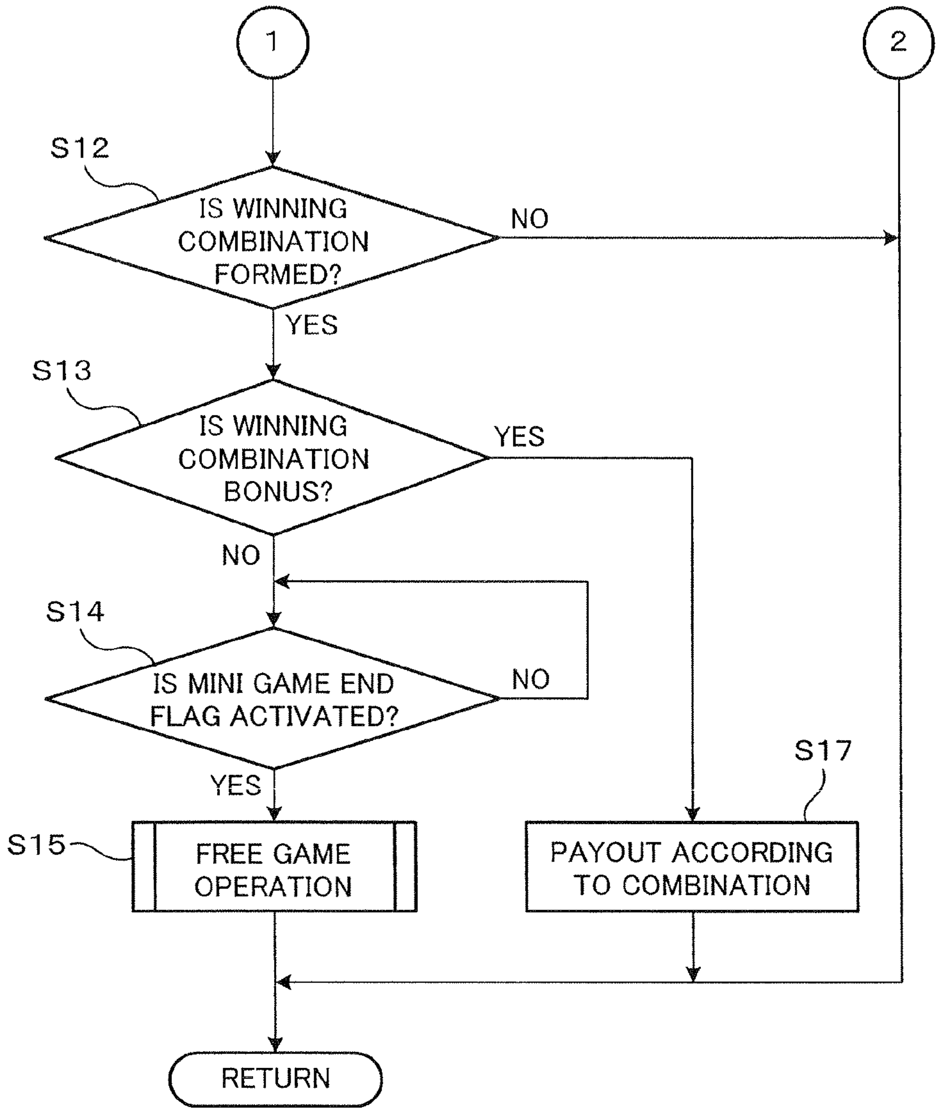
FIG. 48B is a flow chart showing another part of a basic game process.

FIGS. 48A and 48B are flow charts showing a process carried out by the main CPU 241 of the slot machine 1 during a basic game of the slot machine 1. A unit game includes a routine shown in FIGS. 48A and 48B. Note that the slot machine 1 is booted in advance, and a variable used in the CPU 241 on the other side, i.e. in the game controller 1 side, is initialized at a predetermined value. Accordingly, the slot machine 1 is constantly operated.

First, it is determined if there is a remaining credit, i.e., the remaining number of coins having been inserted by the player (S1). Specifically, a credit C stored in the RAM 243 is read out, and a process according to the read credit C is carried out. When the credit C is zero (S1, NO), the routine ends without any operation of a process since a game cannot be started. Meanwhile, when the credit C is equal to or more than one (S1, Yes), it is determined that there is at least one credit remaining and the process moves to S2.

In S2, it is determined whether or not the operation button 11 (bet button) is pressed (S2). When the operation button 11 (bet button) is not pressed for a predetermined time (S2, NO), a game condition is set (S3). Specifically, the number of coins to be bet on the payline L in the game is determined according to the operation of the operation button 11 (bet button). During this operation, an operation signal sent upon an operation of the operation button 11 is received. According to the number of times that the operation signal is received, the bet on the payline L is stored in a predetermined memory area of the RAM 243. A credit C stored in a predetermined memory area of the RAM 243 is then read out. A total bet where the above bet is added is subtracted from the read credit C. The resulting number is stored in the predetermined memory area of the RAM 243.

Afterwards, it is determined whether or not an operation button 11 (start button) is pressed (S4). When the operation button 11 (start button) is not pressed (S4, NO), S4 is repeated until the operation button is pressed. When the operation button 11 (start button) is pressed (S4, YES), it is determined whether or not to start a mini game (S5).

On the other hand, when the operation button 11 (bet button) is pressed in S2 (S2, YES), it is determined whether or not a value of the credit C is equal to or more than the value of the total bet in the previous game. In other words, it is determined whether or not it is possible to start a game with the operation button 11 (bet button) being pressed. Specifically, pressing of the operation button 11 (bet button) causes reading out of a bet on the payline L in the previous game and a credit C written in a predetermined memory area of the RAM 243. According to a relation of the read credit C to the bet, a process branches as follows depending on whether the value of the credit C is equal to or more than the value of total bet in the previous game. When it is determined that the value of the credit C is less than the value of the total bet of the previous game (S16, NO), the routine ends without any operation of a process since a game cannot be started.

Meanwhile, when it is determined that the value of the credit C is equal to or more than the value of the total bet of the previous game (S16, YES), the value of the total bet of the previous game is subtracted from the value of the credit C. Then, the resulting value is stored in a predetermined memory area of the RAM 243. Afterwards, it is determined whether or not to start a mini game (S5).

When it is determined to start a mini game (S6, YES), a mini game start flag is activated (S7). Specifically, data showing that the game start flag activated is written into a storage area of a mini game start flag of the RAM 243. Meanwhile, when it is determined not to start a mini game (S6, NO), a combination determination process is carried out (S8).

In the combination determination process, a combination of symbols to be stopped on the payline L is determined first. Specifically, a command to generate a random number is sent to the random number generation circuit. Then, a random number within a predetermined range which is generated by the random number generation circuit is sampled. The sampled random number is stored in a predetermined memory area of the RAM 243. Although a random number is generated in the random number generation circuit disposed outside the main CPU 241 in the present embodiment, a random number may be generated through a calculation by the main CPU 241, without the random number generating circuit.

Afterwards, a winning combination table for awarding a payout and a random number table stored in the ROM 242 are read out. Those read winning combination table and random number table are stored in a predetermined memory area of the RAM 243. Still-displaying of symbols are controlled for each reel in accordance with the random number table.

Then, the random number table and the winning combination table stored in the predetermined memory area of the RAM 243 are read out. Then, the random number written into the predetermined memory area of the RAM 243 is used as a parameter to refer to the random number table. A combination of symbols to be stopped on the payline L is then determined.

When a winning combination is determined, the winning combination table is stored into a predetermined memory area of the RAM 243. The random number and the winning combination table written in the predetermined memory area of the RAM 243 are read. In accordance with the random number and the winning combination table, a combination of symbols to be stopped and still-displayed are determined. During this process, the main CPU 241 reads out a symbol arrangement table stored from the ROM 242 and stores the table in a predetermined memory area of the RAM 243. The table is then used as a reference. The determined stop symbol data is stored in a predetermined memory area of the RAM 243. Alternatively, symbols to be stopped may be determined for each reel by using the random number table.

When a combination of symbols to be stopped on the payline L is determined, it is determined whether or not the combination is a winning combination. When the combination of symbols to be stopped on the payline L is a winning combination, a flag which indicates that a payout corresponding to the type of the winning combination will be awarded, is activated to generate the payout corresponding to the combination of symbols on the payline L forming the determined winning combination. The activated flag indicating that a payout will be awarded, is stored in a predetermined memory area of the RAM 243. To the contrary, when a combination of symbols to be stopped on the payline L is another combination, that is, a losing combination, the flag indicating that a payout will be awarded is not activated.

After the above combination determination process is carried out, reels 30A to 30C rotate to move symbols 301 in the display windows 7A to 7C (S9). Then, the rotation continues for a predetermined time (S10). Then, the rotation of reels 30A to 30C automatically stops (S11).

Then, it is determined whether or not a winning combination is formed through the combination determination process in S8 (S12). Specifically, this is done based on a status of the flag stored in the predetermined memory area of the RAM 243, which flag indicates a prize according to a combination of symbols on the payline L is awarded. When the flag is not activated (S12, NO), it is determined that a winning combination is not formed, and the routine ends.

Meanwhile, when the flag is activated (S12, YES), it is determined whether or not the winning combination formed in the combination determination process in S8 includes a "BLUE 7." Specifically, when the winning combination includes a "BLUE 7" (S13, YES), the routine ends after the number of coins are paid out in accordance to the winning combination (S17).

Meanwhile, when the winning combination does not include a "BLUE 7" (S13, NO), it is determined whether or not a mini game end flag is activated (S14). Specifically, it is determined whether or not data showing that the mini game end flag is activated is written into a mini game end flag area of the RAM 243. S14 is repeated when the mini game end flag is not activated (S14, NO). When the mini game end flag is activated (S14, YES), a free game process is carried out (S15). Then, the routine ends.

(Free Game Process)

Figure 49:
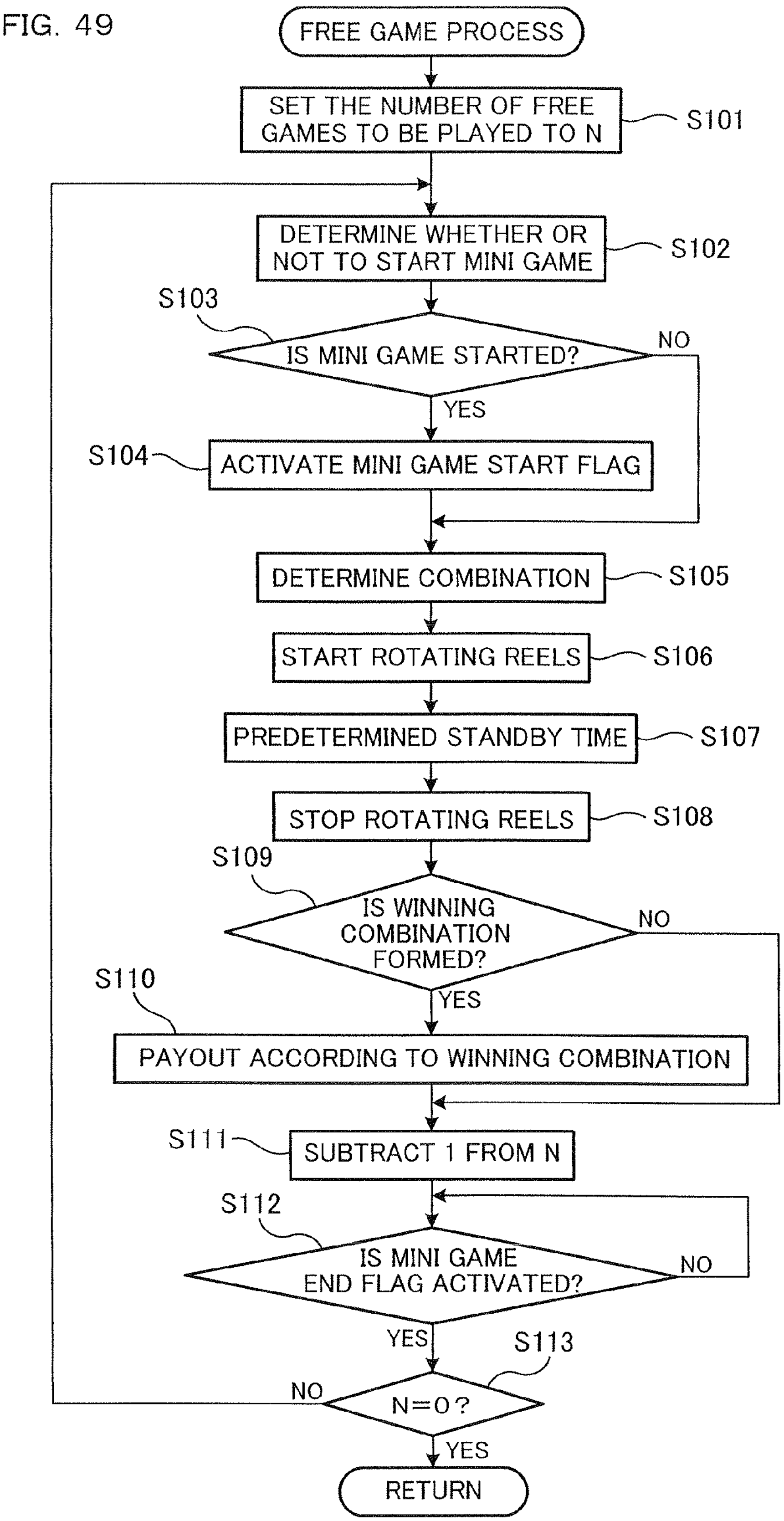
FIG. 49 is a flow chart showing a free game process.

The following describes a free game process with reference to FIG. 49.

First, N denotes the number of free games (S101). The number of free games is determined according to accumulated points acquired in a mini game of a basic game.

Then, whether or not to start a mini game is determined (S102). When a mini game is determined to start (S103, YES), a mini game start flag is activated (S104). Specifically, data indicating that the mini game start flag is activated is written into a storage area of the RAM 243 for storing the mini game start flag. Afterwards, the process moves to S105.

Meanwhile, when a mini game is determined not to start (S103, NO), the process immediately moves to S105. Thus, a combination determination process same as above is carried out (S105). A difference in this combination determination process is that the referred random number table is a free game random number table (not shown). Then, reels 30A to 30C start to rotate (S106). After a predetermined standby time (S107), each reels 30A to 30C stops rotating (S108).

Then, whether or not a winning combination is formed is determined (S109). When a winning combination is not formed (S109, NO), the process moves to S111. Meanwhile, when a winning combination is formed (S109, YES), a game medium according to the winning combination is paid out (S110). Specifically, the number of coins to be paid out for the winning combination is calculated, referring to the payout control table of FIG. 42. A credit stored in a predetermined memory area of the RAM 243 is then read out. The payout value calculated above is added to the credit. The sum is stored in a predetermined memory area of the RAM 243, and the stored value is displayed on the credit display unit 9.

In S111, 1 is subtracted from N (S111). Then, whether or not a mini game end flag is activated is determined (S112). Specifically, it is determined whether or not data showing that the mini game end flag is activated is written into a mini game end flag area of the RAM 243. S112 is repeated when the mini game end flag is not activated (S112, NO).

When the mini game end flag is activated (S112, YES), whether N is 0 is determined (S113). When N is not 0 (S113, NO), the operation is carried out again from S102. On the other hand, when N is 0 (S113, YES), the routine ends.

(Mini Game Process)

Figure 50:
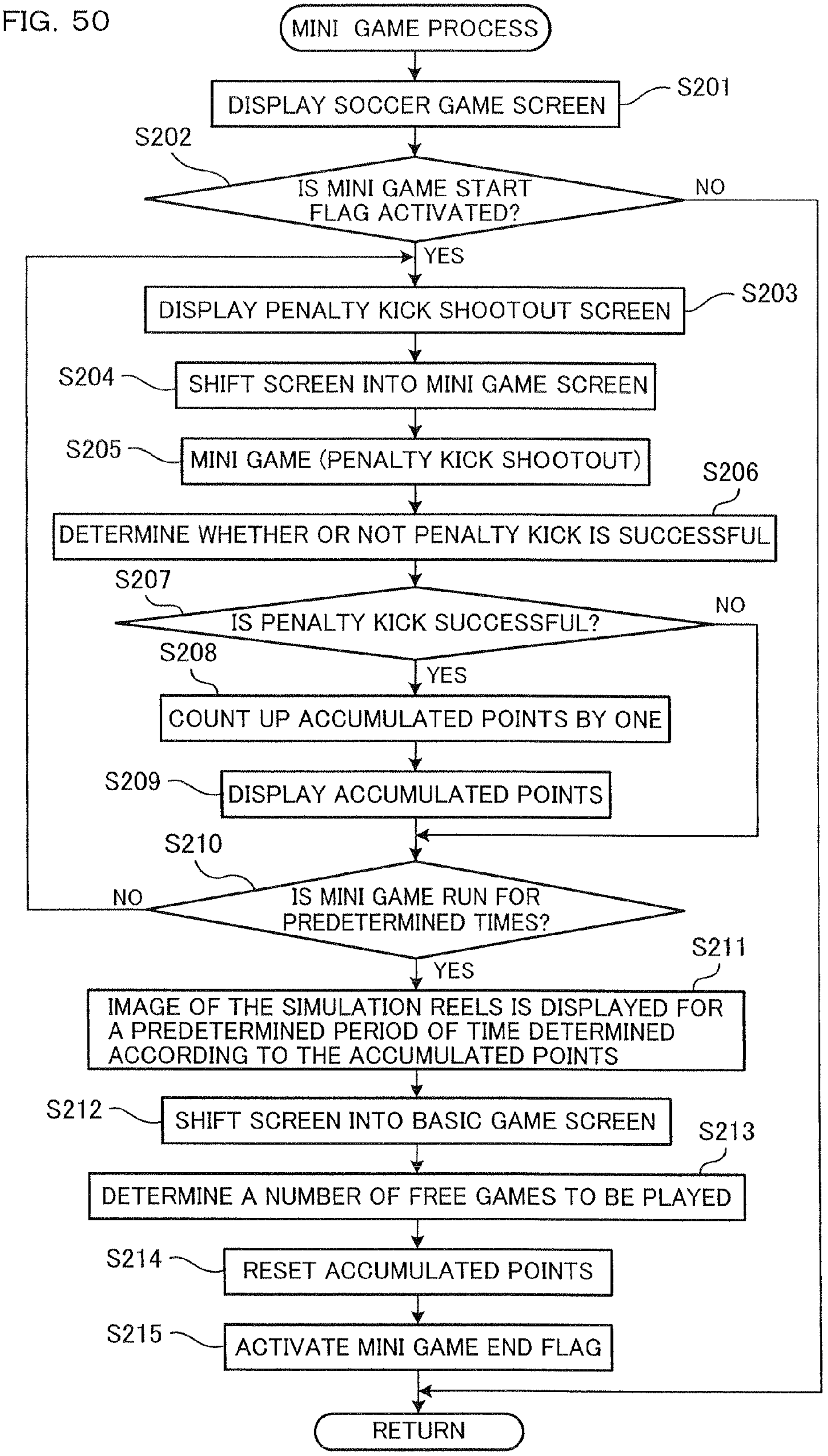
FIG. 50 is flow chart showing a mini game process.

The following describes a mini game process with reference to FIG. 50.

First, a soccer game screen, which is an effect screen displayed when a mini game is not run, is displayed on the upper liquid crystal panel 5A (S201). Then, whether or not the mini game start flag is activated is determined. Specifically, it is determined whether data showing that the mini game start flag is activated is written into the game start flag area or the RAM 243 (S202).

When the mini game start flag is not activated (S202, NO), the routine ends. Meanwhile, when the mini game start flag is activated (S202, YES), screens on the upper liquid crystal panel 5A switches, as shown in FIG. 36, from a soccer game screen to a penalty kick standby screen which is an effect screen displayed during a mini game. Then, with a mini game screen 320 displayed on the central liquid crystal panel 5B, the display windows 7A to 7C and a mini game screen 320 are displayed one atop the other (S204).

Then, a penalty kick shootout as a mini game is started (S205). That is, an image of a goal keeper and a kicker facing each other is displayed, and a cheering sound of audience members is outputted. Then, when the kicker places a ball and intends to kick it, whether or not a penalty kick is successful, i.e., whether or not the mini game is successful, is determined (S206). Specifically, a random number is used to determine whether or not the mini game is successful.

Then, it is determined whether or not a penalty kick shootout (mini game) is successful (S207). When the penalty kick shootout is successful (S207, YES), the total number of accumulated points is counted up by one (S208), and the total number of accumulated points is displayed (S209). Then, it is determined whether or not the mini game is run a predetermined number of times (S210). Meanwhile, when the penalty kick shootout is unsuccessful (S207, NO), the total number of accumulated points is not counted up, and it is determined whether or not the mini game is played for predetermined number of times (S210).

When the mini game is not played for predetermined number of times (S210, NO), the process is carried out again from S203, and a next penalty shootout starts. For example, when a penalty shootout is repeated for ten times or the like (S210, YES), an image of the simulation reels 30A to 30C is displayed as shown in FIG. 46. An image of the simulation reels is displayed for a predetermined period of time determined according to the accumulated points (S211). Afterwards, the screen switches to a basic game screen (S212). After determining the number of times the free game is run (S212), the accumulated points are reset (S214). Then, after setting the mini game end flag active (S215), this routine ends.

(Help Process)

Figure 51:
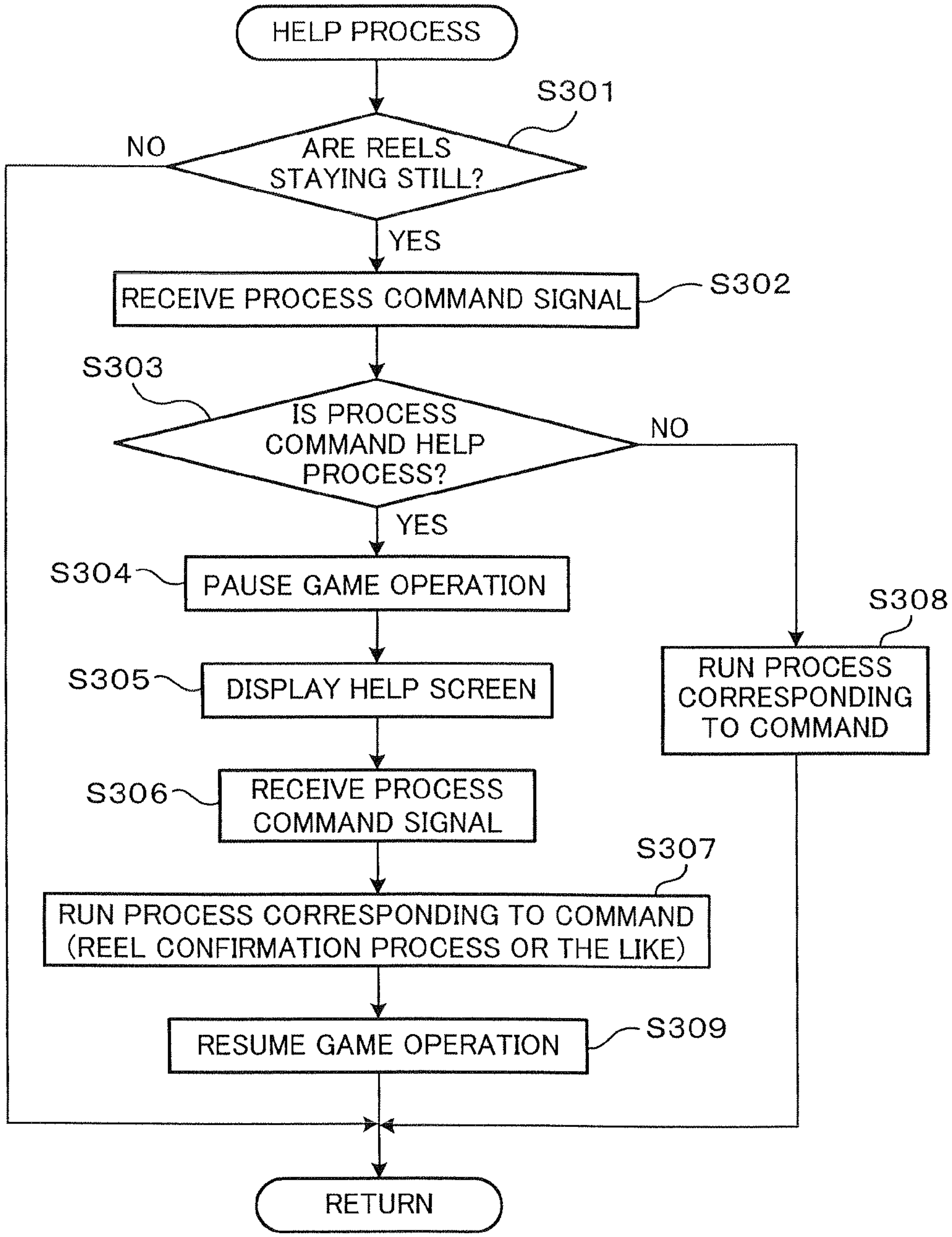
FIG. 51 is a flow chart of a help process.

The slot machine 1 is capable of carrying out a help process shown in FIG. 51 aside from a basic game process and a free game process. Specifically, it is determined whether or not the reels 30A to 30C are staying still (S301). When the reels 30A to 30C are not staying still due to an operation of a basic game or the like (S301, NO), the routine ends. In short, a help screen is not displayed. Meanwhile, when the reels 30A to 30C are staying still (S301, YES), an input signal outputted when a player presses the touch panel 69 shown in FIG. 39, the outputted signal is received as a process command signal (S302). Then, it is determined whether or not the process command signal is related to a help process (S303). When it is not related to a help process (S303, NO), a process corresponding to the command is carried out (S308). Afterwards, this routine ends.

Meanwhile, when the command is related to a help process (S303, YES), after a game process such as a basic game or the like is paused (S304), the display changes into a help screen. In other words, the help button frame 310 is displayed on the central liquid crystal panel 5B, and various kinds of help item buttons including a reel confirmation button 304, a rule button 305 and a payout button 306 are displayed in the help button frame 310 (S305).

Then, reception of a next command signal is started (S306). For example, when a reel confirmation button 304 is pressed, an input signal is received as a process command signal starting a reel confirmation process (S307). After a game process is resumed (S309), this routine ends.

(Reel Confirmation Process)

Figure 52:
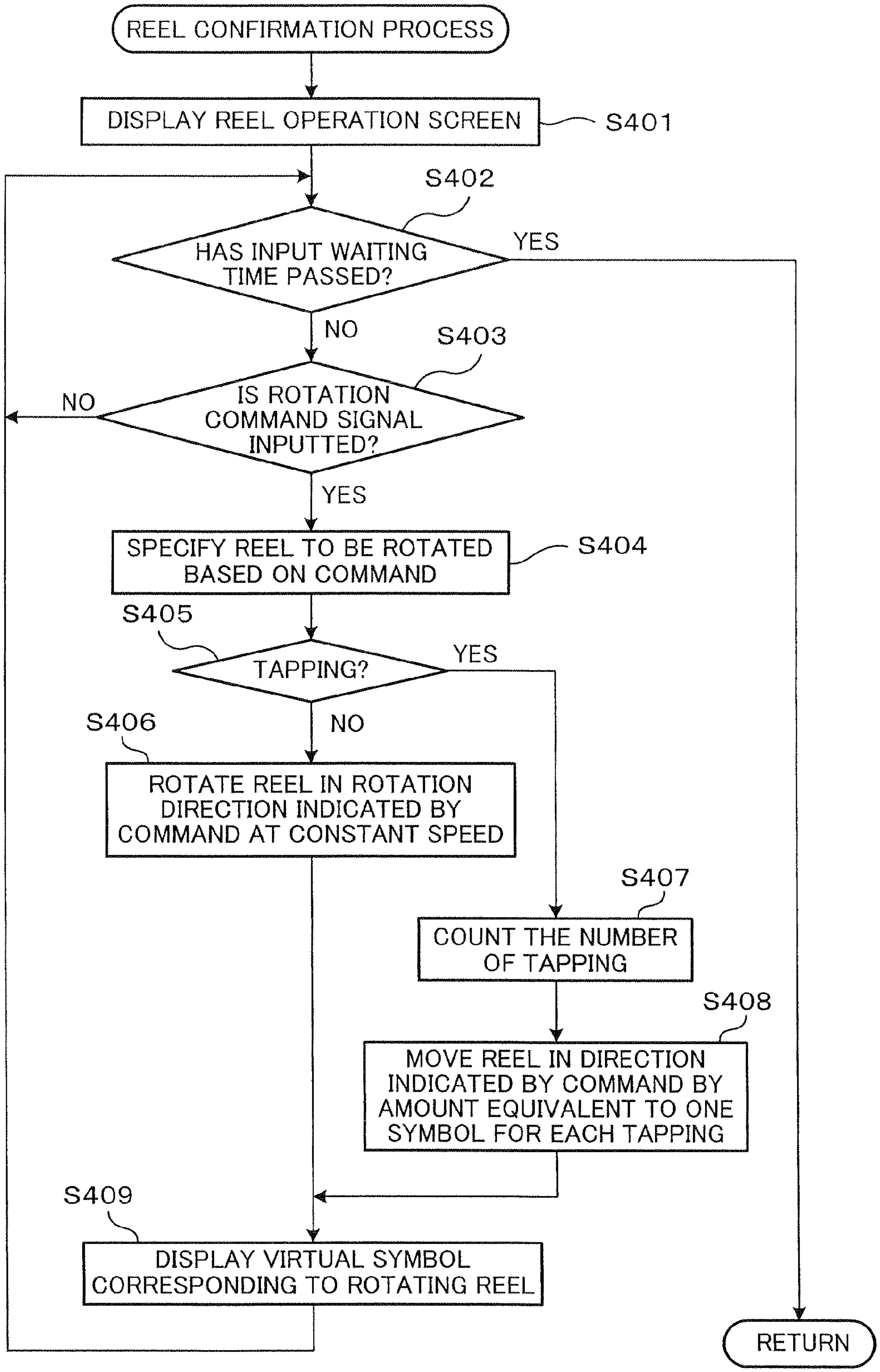
FIG. 52 is a flow chart of a reel confirmation process.

As shown in FIG. 52, when a reel confirmation process is carried out, a display switches to a reel operation screen shown in FIGS. 45 and 53. In other words, direction symbols indicating upward or downward direction assigned to each of the reels 30A to 30C are displayed (S401).

Then, it is determined whether or not an input waiting time has passed (S402). When the input waiting time has passed (S402, YES), this routine ends. During the input waiting time (S402, NO), whether or not a rotation command signal is inputted is determined. Specifically, as shown in FIG. 45, an input signal outputted in response to a press operation of the touch panel 69, is received. Then, based on press position data and display position data of the direction symbol 302 in the input signal, it is determined whether or not the signal inputted is a rotation command signal (S403). When the signal inputted is not a rotation command signal (S403, NO), this routine ends. Meanwhile, when the signal inputted is a rotation command signal (S403, YES), one out of the reels 30A to 30C positioned above the pressed position is specified as a rotation target, based on a command included in the rotation command signal, i.e., pressed position data (S404).

Then, it is determined whether or not the operation was tapping (S405). When the operation is not tapping (S405, NO), the one out of the specified reels 30A to 30C rotates at a constant speed in a direction indicated by the direction symbol 302 (S406). When the one reel (30A to 30C) rotates, the symbols 301 associated with the one rotating reel are displayed on the symbol display frame 312 (S409). Thus, a player is able to confirm symbols with the actually rotating one reel, as well as with the virtual symbols 301 displayed on the symbol display frame 312.

On the other hand, when the operation is tapping (S405, YES), the number of tapping is counted (S407) and then, one out of the reels 30A to 30C rotates by an amount equivalent to the number of symbols corresponding to the number of times input has been conducted. Specifically, as shown in FIG. 45, one tapping causes the one reel (30A to 30C) to rotate by a predetermined angle so that one symbol moves by a distance between the one symbol and the next symbol in a direction indicated by the direction symbol 302. The predetermined angle is an angle formed with a line extended from the center of the reel to one symbol and another line extended from the center of the reel to the next symbol on the same reel. Further, as show in FIG. 53, repeating of the tapping twice or more causes the one reel (30A to 30C) to move by an angle which is the product of a multiplication of the predetermined angle by the number of times the tapping has repeated, consequently moving one symbol 301 on the one reel (30A to 30C) by the number of symbols 301 corresponding to the number of times the tapping has repeated.

When the one out of the reels 30A to 30C rotates, the symbols 301 associated with the rotating one reel are displayed on the symbol display frame 312. Then, S402 is rerun, and a next press operation to the touch panel is waited for a predetermined time.

Although one out of the reels 30A to 30C rotates at a constant speed when a direction symbol 302 is pressed in the present embodiment, the present invention however is not limited to this. In other words, the one reel (30A to 30C) may rotate at a speed corresponding to the pressed area of the direction symbol 302 when the direction symbol 302 is pressed. In this case, when a player presses the touch panel 69 with a strong pressing force, one out of the reels 30A to 30C rotates at a high speed. On the other hand, when a player presses the touch panel 69 with a small pressing force, one out of the reels 30A to 30C rotates at a constant speed. Thus, a player is capable of changing the rotation speed of the reels 30A to 30C.

The detailed description of the present invention provided hereinabove mainly focused on characteristics thereof for the purpose of easier understanding; however, the scope of the present invention shall be construed as broadly as possible, encompassing various forms of other possible embodiments, and therefore the present invention shall not be limited to the above description. Further, the terms and phraseology used in the present specification are adopted solely to provide specific illustration of the present invention, and in no case should the scope of the present invention be limited by such terms and phraseology. Further, it will be obvious for those skilled in the art that the other structures, systems, methods or the like are possible, within the spirit of the invention described in the present specification. The description of claims therefore shall encompass structures equivalent to the present invention, unless otherwise such structures are regarded as to depart from the spirit and scope of the present invention. Further, the abstract is provided to allow, through a simple investigation, quick analysis of the technical features and essences of the present invention by an intellectual property office, a general public institution, or one skilled in the art who is not fully familiarized with patent and legal or professional terminology. It is therefore not an intention of the abstract to limit the scope of the present invention which shall be construed on the basis of the description of the claims. To fully understand the object and effects of the present invention, it is strongly encouraged to sufficiently refer to disclosures of documents already made available.

The detailed description of the present invention provided hereinabove includes a process executed on a computer or computer network. The above descriptions and expressions are provided to allow the one skilled in the art to most efficiently understand the present invention. A process carried out in or by respective steps yielding one result or blocks with a predetermined processing function described in the present specification shall be understood as a process with no self-contradiction. Further, the electrical or magnetic signal is transmitted/received and written in the respective steps or blocks. It should be noted that such a signal is expressed in the form of bit, value, symbol, text, terms, number, or the like solely for the sake of convenience. Although the present specification occasionally personifies the processes carried out in the steps or blocks, these processes are essentially executed by various devices. Further, the other structures necessary for the steps or blocks are obvious from the above descriptions.

Fourth Embodiment

The following describes a fourth embodiment of a gaming machine according to the present invention with reference to FIGS. 54 to 73. Note that the numerals assigned to each member of the FIGures, and the symbols indicating a step in a flowchart (e.g., S), and the descriptions thereof are valid only in the present embodiment, and thus do not indicate members or steps of another embodiment.

(Overview of the Gaming Machine)

Figure 54:
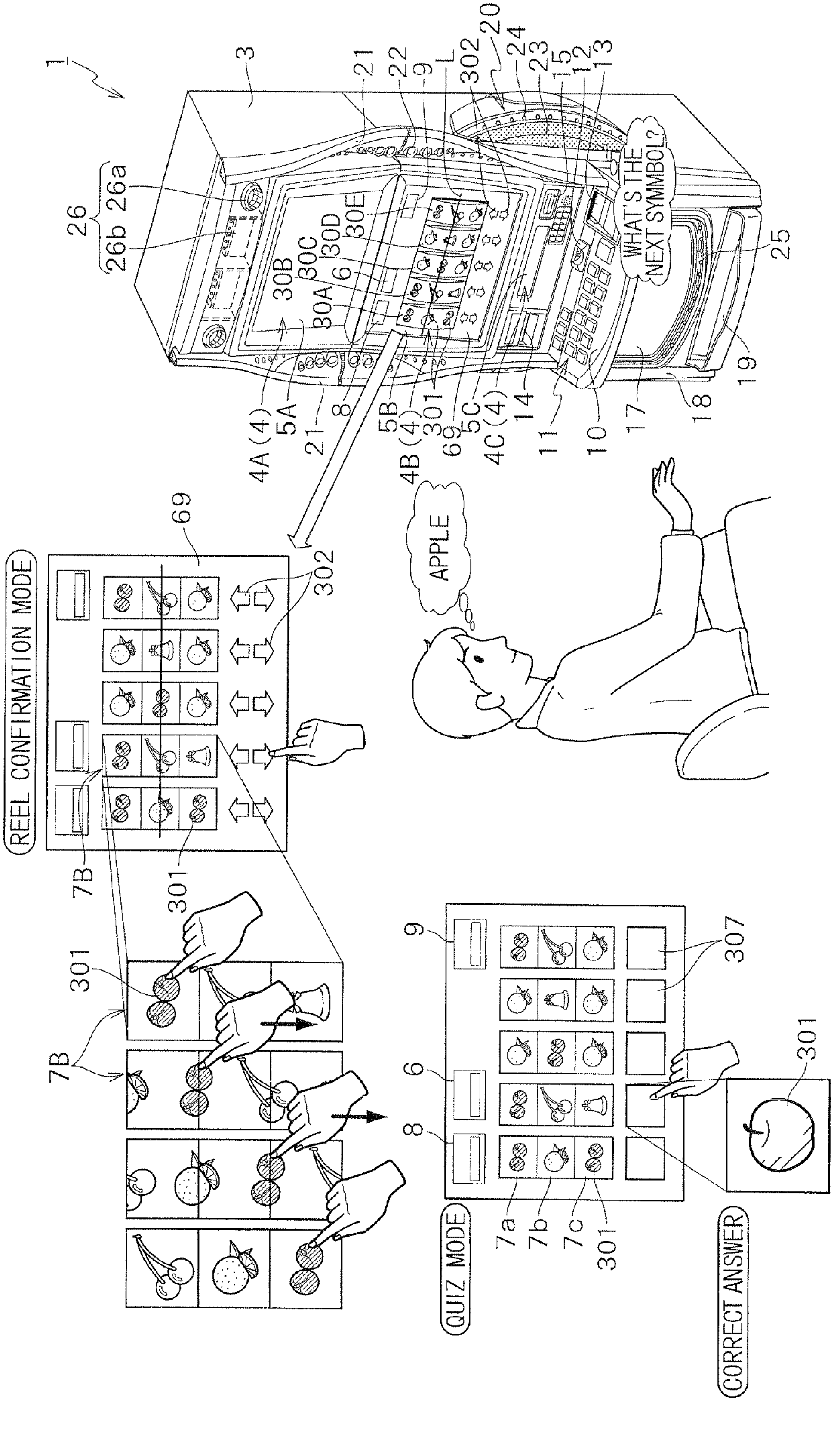
FIG. 54 is an explanatory view showing a playing method of a gaming machine.

As shown in FIG. 54, a gaming machine (slot machine 1) has one or more mechanical reels 30A, 30B, 30C, 30D, and 30E which rotate in response to a player's operation. To be more specific, the gaming machine has a first structure of rotating the reels 30A, 30B, 30C, 30D, 30E through an operation, and a second structure of displaying an arrangement of symbols in a special game.

To be more specific, the gaming machine includes: a game requiring a player's bet; reels 30A to 30E used in the game and mechanically driven to rotate; symbols 301 on the reels 30A to 30E; an input device that receives an input by the player; a display capable of generating a video image; a speaker 23 that outputs sound to an outside; a microphone 41 which inputs at least the player's voice; a special game using the sound outputted from the speaker 23 and the player's voice inputted into the microphone 31; and a controller that carries out the following steps of (a1) to (a3).

Specifically, the controller carries out the steps of: (a1) receiving input inputted through the input device. (a2) When the input is a rotation command related to the reels 30A to 30E, rotating the reels 30A to 30E during while the rotation command is being inputted; (a3) when a predetermined condition is met in the game, running the special game; (a4) when the special game results in a win, displaying a video image on the display, which indicates at least a part of an arrangement of the symbols 301 on the reels 30A to 30E.

The "gaming machine" may be a machine such as a slot machine 1 or the like for one player, or multiple players. For instance, a gaming machine for multiple players may include several slot machines 1 which are connected to one another and are capable of carrying out data communication with one another.

In addition to a function of running a game with mechanical reels 30A to 30E, the gaming machine may have a function of running one or more games through another mechanical operation, an electrical operation, or through a combination of mechanical and electrical operations. An example of an electrically operated gaming machine is a slot machine 1 which displays an image of reels 30A to 30E on a display of liquid crystal or the like, and virtually rotates or moves reels 30A to 30E. Note that a slot machine 1 is shown as an example of a gaming machine in the present embodiment; however, the gaming machine is not limited to this.

The "input device" is not particularly limited as long as it enables the reels 30A to 30E to be visible and enables an input through an operation by a player. Specifically, an input device may be a touch panel 69 disposed on an upper surface of a central liquid crystal panel 5B, or an operation button 11 which enables an input by connection/disconnection of mechanical contact points. Moreover, an input device may be a device which enables input of information through a data communication using wireless signals such as sound, light, radio wave, or the like.

The "display" may include a liquid crystal display device, a CRT (cathode-ray tube) device, a plasma display and the like In addition, one or more display 1 may be provided to the slot machine 1. In addition, for a gaming machine for multiple players, the display may be provided to each slot machine 1. Alternatively, a large screen display common to all the slot machines 1 may be provided separately from the slot machines 1.

The gaming machine structured as described above is used in a game requiring a player's bet and realizes a confirmation method of the symbols 301 on the reels 30A to 30E that are mechanically driven to rotate.

In other words, the confirmation method of the symbols 301 includes the first step of: receiving an input by a player, specifying an input position of the input, when the input position corresponds to a front area of the reels 30A to 30E, determining that a rotation command related to the reels 30A to 30E is inputted; and rotating the reels 30A to 30E in a rotation direction indicated by a rotation direction component of the reels 30A to 30E included in a movement direction based on the input position while the rotation command is being inputted; and the second step of: when a predetermined condition is formed in a game, running a special game using at least voice of the player; and when the special game results in a win, displaying a video image that indicates at least a part of an arrangement of the symbols 301 on the reels 30A to 30E.

Like this, according to the first structure or first step, the reels 30A to 30E are rotated while a player is inputting a rotation command. In short, the reels 30A to 30E rotate in response to the player's manual operation. Hence, the player is able to successively confirm the symbols 301 actually arranged on the reels 30A to 30E by the player him/herself carrying out an operation to rotate the reels 30A to 30E. Thus, the gaming machine enables the player to easily recognize the symbol arrangement on the reels 30A to 30E.

Moreover, according to the second structure or second step, when a predetermined condition is met in a game, a special game is run. The special game enables the player to take part in a game with the voice. When a player participates in a special game, and the player wins the special game, a video image is displayed on the display, which indicates at least a part of an arrangement of the symbols 301 on the reels 30A to 30E. Hence, the player can enjoy taking part in the special game. Further, it is possible to enable the player who wins the special game to recognize the arrangement of the symbols 301 more easily.

In addition to the first and second structures, the gaming machine has a third structure of running a special game using voice recognition process.

To be more specific, a result of voice recognition process for the player's voice inputted into the microphone is used to determine a win or loss in the special game of the gaming machine. Hence, when the gaming machine has the third structure, a result of voice recognition process for the voice of the player is used in the special game. Accordingly, is the player is able to feel as if s/he is conducting a conversation with the gaming machine in the special game. As a result, it is possible to increase a player's motivation to take part in the special game.

In addition to the first, second, and third structures, the gaming machine has a fourth structure where a special game is a game to guess and orally output a symbol 301 correctly.

To be more specific, in the special game of the gaming machine, a player wins when the player guesses an unseen symbol 301 based on an arrangement of the symbols 301 visible to the player, and orally outputs the guessed symbol 301 correctly. Hence, with the gaming machine having the fourth structure, the player wins the special game when a player guesses an unseen symbol 301 based on an arrangement of the symbols 301 visible to the player, and the guessed symbol 301 orally output is correct. Hence, the gaming machine is capable of having the player actively memorize the arrangement of the symbols 301.

Moreover, in addition to the first and second structures, the gaming machine has a fifth structure of rotating the reels 30A to 30E by flicking a touch panel 69.

To be more specific, a gaming machine includes: a game requiring a player's bet; reels 30A to 30E used in the game and mechanically driven to rotate to switch a rotation direction; symbols 301 arranged on the reels 30A to 30E; a display capable of generating a video image; an input device which is a touch panel 69 that is disposed to visibly cover at least the reels 30A to 30E and receives an input through a press operation by the player; a speaker 23 that outputs sound to outside; a microphone 41 which inputs at least the player's voice; a special game using the sound outputted from the speaker 23 and the player's voice inputted into the microphone 41; and a controller that carries out the following steps of (b1) to (b5).

Specifically, the controller carries out the steps of: (b1) specifying an input position in the input device; (b2) when the input position corresponds to a front area of the reels 30A to 30E, determining that a rotation command related to the reels 30A to 30E is inputted; (b3) rotating the reel in a rotation direction indicated by a rotation direction component of the reels 30A to 30E included in a movement direction based on the input position while the rotation command is being inputted; (B4) when a predetermined condition is met in the game, running the special game; and (b5) when the special game results in a win, displaying a video image on the display, which indicates at least a part of an arrangement of the symbols 301 on the reels 30A to 30E.

Like this, the gaming machine having the fifth structure exhibits effects by operating as follows. When a player presses a front area of the reels 30A to 30E, a rotation command related to the reels is inputted. When the input position through the press in the front area is moved, the reels 30A to 30E are rotated in a rotation direction indicated by a rotation direction component of the reels 30A to 30E included in a movement direction based on the input position.

In short, the reels 30A to 30E rotate in response to the player's operation of moving the input position while pressing the front of the reels 30A to 30E. Hence, the player is able to successively confirm the symbols 301 actually arranged on the reels 30A to 30E by the player him/herself carrying out an operation to rotate the reels 30A to 30E. Thus, the gaming machine enables the player to easily recognize the symbol arrangement on the reels 30A to 30E.

Moreover, when the input position is moved while pressing the input device disposed at the front of the reels 30A to 30E, the reels 30A to 30E rotate in response to the movement. Thus, the gaming machine enables the player to feel as if s/he is directly touching and rotating the reels 30A to 30E.

In addition to the first, second and fifth structures, the gaming machine has a sixth structure of rotating the reels through the direction symbol 302.

To be more specific, a gaming machine includes: a game requiring a player's bet; reels 30A to 30E used in the game and mechanically driven to rotate to switch a rotation direction; symbols 301 on the reels 30A to 30E; a display capable of generating a video image; an input device that is disposed to visibly cover the reels 30A to 30E and at least a part of a display area of the display and receives an input through a press operation by the player; and a controller that carries out the following steps of (c1) to (c8).

Specifically, the controller carries out the following steps of: (c1) displaying a video image of a direction symbol 302 indicating a rotation direction of the reels 30A to 30E; (c2) specifying an input position in the input device; (c3) when the input position corresponds to a front area of the reels 30A to 30E, determining that a rotation command related to the reels 30A to 30E is inputted; (c4) rotating the reels 30A to 30E in a rotation direction indicated by a rotation direction component of the reels 30A to 30E included in a movement direction based on the input position while the rotation command is being inputted; (c5) when the input position corresponds to a display position of the direction symbol 302, determining that a rotation command related to the reels 30A to 30E is inputted; (c6) rotating the reels 30A to 30E in a rotation direction indicated by the direction symbol 302 while the rotation command is being inputted; (c7) when a predetermined condition is met in a game, running a special game; and (c8) when the special game results in a win, displaying a video image on the display, which indicates at least a part of an arrangement of the symbols 301 on the reels 30A to 30E.

Like this, the gaming machine having the sixth structure exhibits effects when operating as follows. When a specific area of the input device corresponding to a display position of the direction symbol 302 is pressed by a player while a video image of the direction symbol 302 displayed on the display is visible to the player, a rotation command related to the reels 30A to 30E is inputted. In short, the reels 30A to 30E are capable of switching the rotation direction through the direction symbol 302. Further, the rotation direction is shown as an image with the direction symbol 302. Hence, the player is able to successively confirm the symbols 301 actually arranged on the reels 30A to 30E by the player him/herself carrying out an operation to rotate the reels 30A to 30E with the direction symbol 302. Thus, the gaming machine enables the player to easily recognize the symbol arrangement on the reels 30A to 30E. Moreover, with the gaming machine, the player who operates the reels 30A to 30E is able to easily determine a rotation direction of the reels 30A to 30E.

(Functional Block of the Gaming Machine)

Figure 55:
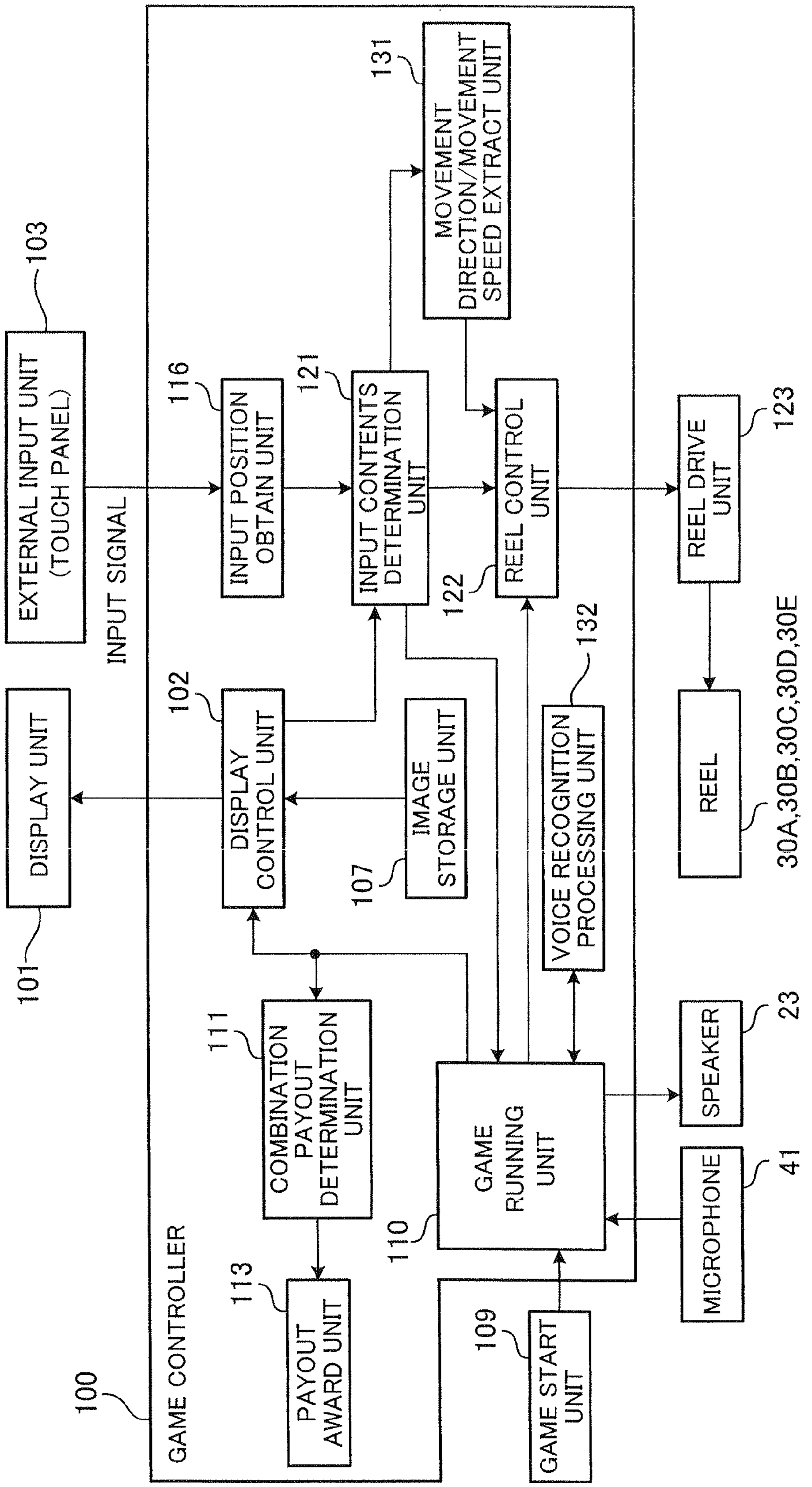
FIG. 55 is a block diagram of a gaming machine.

As shown in FIG. 55, the gaming machine with one of the above structures has a game controller 100, a display unit 101, an external input unit 103, a game start unit 109, a reel drive unit 123, mechanical reels 30A to 30E, a speaker 23, and a microphone 41.

(Display Unit 101)

The display unit 101 has functions of generating a video image and arranging/rearranging symbols 301 in a matrix with reels 30A to 30E. Note that the wording "arrange" means a state where the symbols 301 can be visually observed by a player. To "rearrange" means to arrange the symbols 301 again after releasing them.

A video reel displayed as an image may partially substitute for the reels 30A to 30E of the display unit 101. In other words, the display unit 101 may adopt a combination of mechanical (reel) and electrical (video reel) structures. Examples of an electrical structure are a liquid crystal display, a CRT (cathode-ray tube) device, a plasma display device, or the like.

(Game Controller 100)

The game controller 100 has an image storage unit 107 which stores image data such as a mini game screen, a help screen, or the like. The image storage unit 107 is accessed by a display control unit 102. The display control unit 102 reads various kinds of image data of the image storage unit 107 under control of a game running unit 110. The display control unit 102 then displays various kinds of images related to the game in the display unit 101. A specific displaying mode is mentioned below.

The game controller 100 is connected to the game start unit 109. The game start unit 109 has a function of outputting a game start signal in response to a player's operation. The game controller 100 has a game running unit 110, a combination payout determination unit 111, and a payout award unit 113. The combination payout determination unit 111 determines a payout according to a combination of symbols 301 rearranged on a payline L in a unit game. The payout award unit 113 awards each payout determined in the combination payout determination unit 111.

The game running unit 110 has a function of running various kinds of games such as a basic game, a mini game, a free game, or the like. Moreover, the game running unit 110 has a function of running a unit game where symbols 301 are rearranged, triggered by a start signal from the game start unit 109.

Note that a unit game starts from receiving a bet and includes a series of operations until a win or loss is resulted. For example, a unit game of the basic game includes a bet time to receive a bet, a game time to rearrange stopped symbols 301, and a payout time of a payout process to award payout.

A basic game is a main game which the gaming machine is originally intended for, and is run during an ordinary game mode. For instance in slot machine 1, a slot game which is run during an ordinary game mode is a basic game. Note that a slot game offers a chance of acquiring a game value according to symbols 301 stopped and displayed after variable displaying of the symbols 301. Examples of a game value are a medal, a coin, a game ball, money, paper money, a magnetic card, or the like.

A mini game is a sub game different from the main game of the gaming machine. It is run in parallel with the basic game, or during a period of time while the basic game is not being played. In the present invention, for example, a penalty shootout game run during a slot game is a mini game. In the penalty shootout game, continuous penalty kicks may be automatically taken. This game may allow a player to operate kicking directions or strength of the ball.

A free game can be played for a predetermined number of times without betting a coin. Free game is a kind of bonus game. A bonus game is more advantageous than a basic game. Note that a bonus game is not specifically limited as long as it is an advantageous game for a player, that is, more advantageous than a basic game. Examples of a bonus game are, a state where more game media are obtainable than a basic game, a state where a possibility of obtaining a game medium is higher than that of the basic game, a state where fewer game media are consumed than a basic game, and so on.

The game controller 100 includes an input position obtain unit 116, an input contents determination unit 121, and a reel control unit 122. The input position obtain unit 116 is connected to an external input unit 103. The external input unit 103 is disposed separately from the game controller 100, and receives a signal input from outside by a player. Although a touch panel is used as an external input unit 103 in the present embodiment, it is not limited to a touch panel. The external input unit 103 maybe a mouse or an operation button.

The input position obtain unit 116 has a function of specifying an input position based on a signal from the external input unit 103. The input contents determination unit 121 has functions of: receiving an input position from the input position obtain unit 116 and determining a command based on a relation of the input position to the image display area in the display unit 101; and outputting a command signal corresponding to the command to the reel control unit 122, the game running unit 110 and a movement direction/movement speed extract unit 131. To be more specific, the input contents determination unit 121 has a function of determining that a rotation command related to the reels 30A to 30E is inputted, when the input position corresponds to a display position of the direction symbol 302.

The game running unit 110 operates according to a command of a command signal. For example, when the command signal is a help command, it carries out a help process such as displaying a help screen as an image at a predetermined timing. The movement direction/movement speed extract unit 131 is run when a command signal is a reel rotation command. The movement direction/movement speed extract unit 131 has functions of: detecting a movement direction and a movement speed of an input position of a command signal; detecting a movement direction in accordance with the direction symbol 302; outputting rotation direction data corresponding to the movement direction to the reel control unit 122; and outputting rotation speed data corresponding to the movement speed to the reel control unit 122.

Moreover, the game running unit 110 is connected to the microphone 41 and the speaker 23 provided to the outside of the game controller 100. The game running unit 110 is also connected to a voice recognition processing unit 132 provided to the inside of the game running unit 110. The microphone 41 obtains the player's voice as a voice signal. The speaker 23 outputs various kinds of data signals as a sound, e.g., voice data and music data. The voice recognition processing unit 132 has a function of interpreting voice signal inputted from the microphone 41. In short, the voice recognition processing unit 132 has a function of interpreting the voice signal, based on a running state of a game, voice about a game, and game data.

The game running unit 110 has a function of transmitting the voice signal inputted from the microphone 41 to the voice recognition processing unit 132. The game running unit 110 has a function of using an interpretation result of the voice signal inputted from the voice recognition processing unit 132 for determining a win or loss in a special game. To be more specific, the game running unit 110 has functions of running a special game which a player wins by guessing and orally outputting an unseen symbol 301 correctly based on the arrangement of the symbols 301 visible to the player, and displaying a video image on the display unit 101, which indicates at least a part of an arrangement of the symbols 301 on the reels 30A to 30E, when the player wins the special game.

The reel control unit 122 is run when a command signal is a reel rotation command. The reel control unit 122 has functions of: forming a drive signal, based on the rotation direction data and the rotation speed data from the movement direction/movement speed extract unit 131; and outputting a drive signal to the reel drive unit 123 so as to rotate the reels 30A to 30E.

Each block of the game controller 100 may be formed with hardware, or software as needed.

(Operation of Game Controller 100)

The following describes operations of the game controller 100. First, symbols 301 are arranged into a matrix of five columns and three rows in the display unit 101. When the game running unit 110 runs a unit game through an operation by the game start unit 109, the reels 30A to 30E rotate and stop to rearrange the symbols 301. Then, the combination payout determination unit 111 determines a prize in accordance with a combination of symbols 301 rearranged on a payline, and the prize determined is awarded by the payout award unit 113.

When a player carries out a press operation to the external input unit 103, an input signal showing an input position in the external input unit 103 is outputted to the input position obtain unit 116. After extracting input position data included in the input signal in the input position obtain unit 116, the input signal is outputted to the input contents determination unit 121. Then, the input position data and a display area of the display unit 101 are compared to determine command contents of the input signal. The command signal including the command contents is outputted to the game running unit 110, the reel control unit 122 and the movement direction/movement speed extract unit 131, respectively.

When the command signal is received in the respective units 110, 122, 131, the game running unit 110 and the reel control unit 122 operate according to the command contents. In addition, when the command is a reel rotation command, the movement direction/movement speed extract unit 131 determines whether the command is a reel rotation command resulting from a press operation for the direction symbol 302 or a reel rotation command resulting from flicking the touch panel 69. For the reel rotation command based on the direction symbol 302, a direction indicated by the direction symbol 302 is outputted, as rotation direction data, to the reel control unit 122. In the meantime, for the reel rotation command resulting from flicking the touch panel 69, rotation direction data obtained on the basis of a flicking direction and rotation speed data obtained on the basis of a flicking speed are outputted to the reel control unit 122.

When the command is a reel rotation command, the reel control unit 122 rotates the reels 30A to 30E while the reel rotation command is being inputted. Specifically, when the rotation direction data and the rotation speed data are inputted, the reel control unit 122 rotates the reels 30A to 30E at a rotation speed corresponding to the rotation speed data in a rotation direction corresponding to the rotation direction data. In addition, when only the rotation direction data is inputted, the reel control unit 122 rotates the reels 30A to 30E at a predetermined rotation speed in a rotation direction corresponding to the rotation direction data.

Further, the game running unit 110 runs a special game when a predetermined condition is met in a game. When the game running unit 110 runs a special game, it enables a player to take part in a game with the voice. Hence, a result of voice recognition process for the player's voice is used in the special game. Thus, it is possible to enable the player to feel as if s/he is conducting a conversation with the gaming machine in the special game. As a result, it is possible to increase a player's motivation to take part in the special game.

To be more specific, the game running unit 110 runs a special game which a player wins by guessing and orally outputting an unseen symbol 301 correctly, based on the arrangement of the symbols 301 visible to the player. Further, the game running unit 110 displays, on the display unit 101, a video image of the symbol 301 guessed and orally output when the player wins the special game. Hence, the player can enjoy taking part in the special game. Further, it is possible to enable the player who wins the special game to recognize the arrangement of the symbols 301 more easily. Moreover, a player wins the special game by guessing and orally outputting an unseen symbol 301 correctly, based on the arrangement of the symbols 301 visible to the player. Thus, the gaming machine is capable of having the player actively memorize the arrangement of the symbols 301.

(Mechanical Structure)

Figure 56:
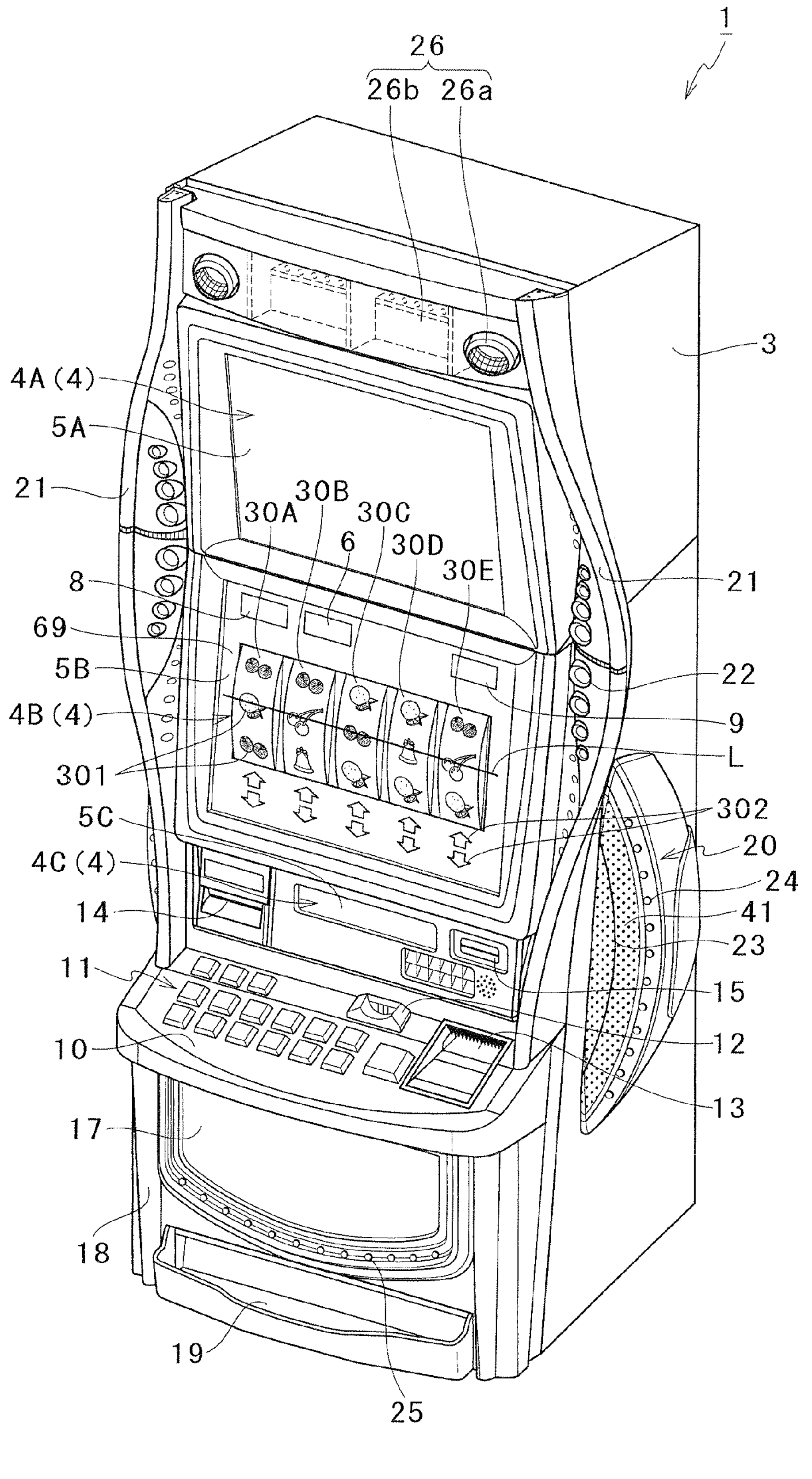
FIG. 56 is a perspective view showing an exterior of a gaming machine.

The following describes an embodiment where a gaming machine is specifically a slot machine 1. As shown in FIGS. 54 and 56, the slot machine 1 is an upright slot machine. The slot machine 1 has a cabinet 3 that receives therein electrical and mechanical parts for running a predetermined game. The cabinet 3 has a longer length in the vertical direction. On the front side of the cabinet 3 facing a player is a display 4. The display 4 displays a basic game, a mini game, and game information based on a game operation by the player.

Specifically, the display 4 has an upper variable display unit 4A, a middle variable display unit 4B, and a lower variable display 4C. The upper variable display unit 4A has a transparent upper liquid crystal panel 5A. The upper liquid crystal panel 5A is fixed on a front door of the cabinet 3. The upper liquid crystal panel 5A displays a soccer game screen or a penalty kick standby screen during basic, mini, and free games. In other words, the upper liquid crystal panel 5A displays a soccer game screen when the mini game is not running. Meanwhile, the upper liquid crystal panel 5A displays a penalty kick standby screen while the mini game is running.

The middle variable display unit 4B is a rotation symbol display panel on which a player directs the eyes at all times. The middle variable display unit 4B has a transparent middle liquid crystal panel 5B fixed on the front door of the cabinet 3. The middle liquid crystal panel 5B has five display windows 7A, 7B, 7C, 7D, and 7E presenting an internal state to the outside. Inside the display windows 7A to 7E, are reels 30A to 30E respectively arranged.

Figure 63:
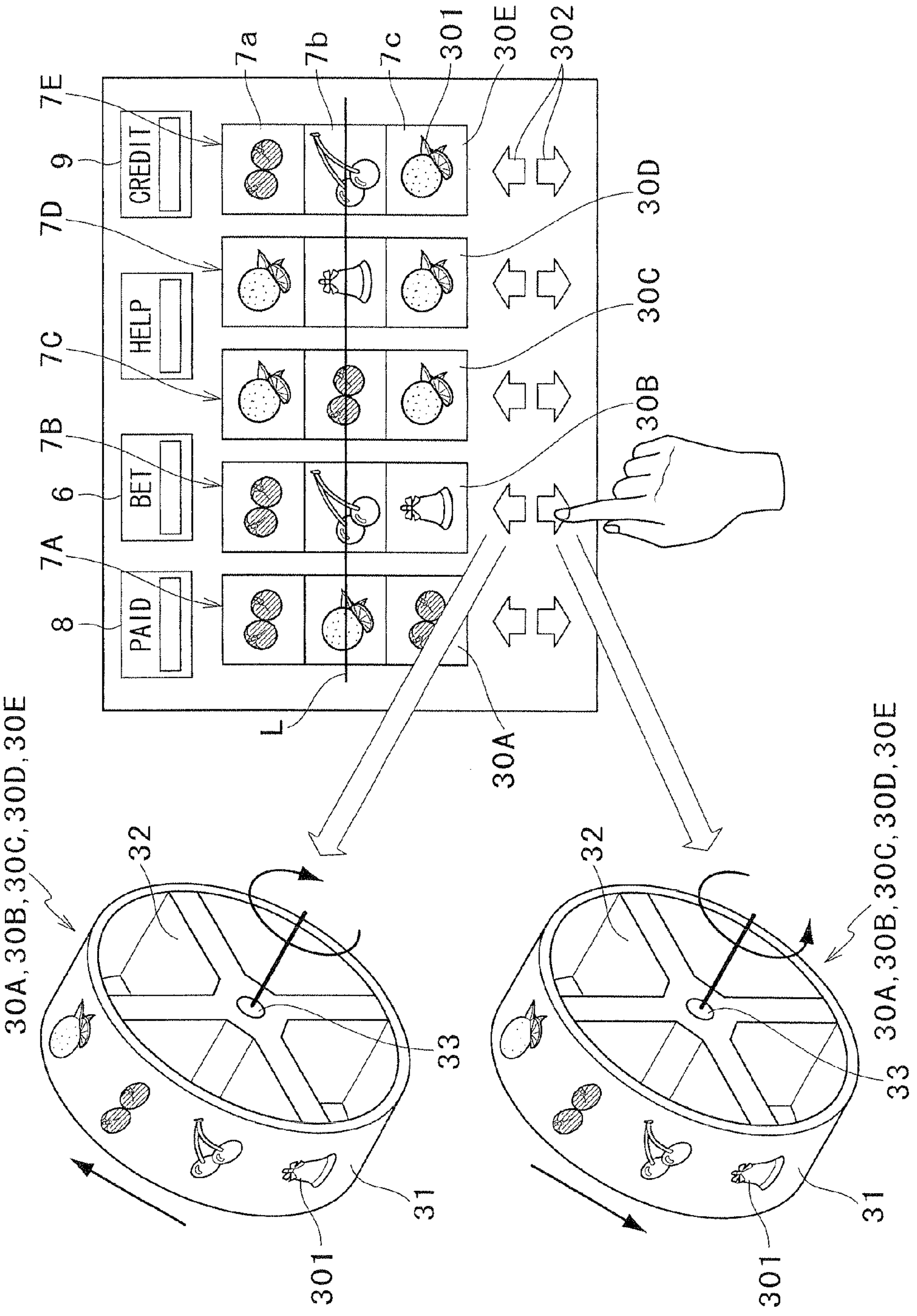
FIG. 63 is an explanatory view of a display screen in a reel confirmation mode.

As shown in FIG. 63, each of the reels 30A to 30E has a circular cylindrical member 31, a rotation axis 32 arranged at the center of the cylindrical member 31, and a support member 33 which connects the rotation axis 32 and the cylindrical member 31. The rotation axis 32 is connected to a rotation drive mechanism (not shown). The rotation drive mechanism enables the reels 30A to 30E to rotate and stop at a predetermined angle by providing a rotation drive force to the rotation axis 32 at any given timing.

On the outer cabinet surface of the cylindrical member 31 is a symbol column. The symbol column has a combination of symbols 301, including a "JACKPOT 7," a "BLUE 7," a "BELL," a "CHERRY," a "STRAWBERRY," a "PLUM," an "ORANGE," and an "APPLE." Moreover, the symbol column is set so that three successive symbols 301 on the symbol column are visible through associated one of the display windows 7A, 7B, 7C, 7D, 7E.

The reels 30A to 30E described above enable the symbol columns to respectively rotate in a vertical direction through mechanical drive. Thus, the slot machine 1 is capable of rearranging five columns and three rows of symbols 301 in display windows 7A to 7E by rotating and stopping the reels 30A to 30E.

The central liquid crystal panel 5B displays one payline L. The payline L horizontally crosses the five display windows 7A to 7E. Note that the payline is for determining a combination of the symbols 301. In other words, when symbols 301 are rearranged on and outside the payline L, only a combination of the symbols 301 rearranged on the payline L is considered. When the combination is recognized as a winning combination, a process such as paying out a coin according to the winning combination or the like is carried out.

The middle liquid crystal panel 5B displays a moving image effect or the like in an effect display unit when a player wins a game. The middle liquid crystal panel 5B also displays, on its upper area, images of a bet display unit 6, a payout display unit 8 and a credit display unit 9. The entire surface of the middle liquid crystal panel 5B is covered with the touch panel 69. The touch panel 69 is made of a transparent material including a transparent electrode or the like. Through the touch panel 69, an image of the each display unit displayed by the middle liquid crystal panel 5B, and the symbols 301 on the reels 30A to 30E are visible. Thus, the images on the middle liquid crystal panel 5B and the symbols 301 on the reels 30A to 30E are visible to the player through the touch panel 69.

In addition, the touch panel 69 has a function of outputting, as an input signal, two-dimensional position data of horizontal axis and vertical axis directions when receiving a pressing force. Hence, through the touch panel 69, the each display unit of the middle crystal panel 5B and the symbols 310 on the reels 30A to 30E are visible to the player. Moreover, the touch panel 69 outputs, to a below mentioned main body PCB 260, an input signal including information indicated by the each display unit when the player presses the each display unit.

The lower variable display unit 4C has a lower liquid crystal panel 5C which displays a point stored in a card, or a point of a game. A number displayed on the lower liquid crystal panel 5C is based on a display result of the middle variable display unit 4B. When a winning combination is formed on the middle variable display unit 4B, a point based on the winning combination is added to the game points displayed on the lower liquid crystal panel 5C. On the left side of the lower liquid crystal panel 5C is a ticket printer 14. On the right side of the lower liquid crystal panel 5C is a card reader 15.

Below the lower variable display unit 4C is an operation table 10. The operation table 10 projects forward from the front surface of the cabinet 3. The operation table 10 has an operation button 11. The operation button 11 is structured with, for instance, a bet button, a collect button, a start button, a stop button, or the like. The operation table 10 also has a coin insertion slot 12 and a paper money insertion slot 13. With the above structure, the operation table 10 functions as an operation unit enabling a player to carry out a game related operation.

Below the operation table 10 is a waist panel 17. The waist panel 17 is a plastic panel on which an image related to a game is printed. The waist panel 17 is fixed on a lower front door 18, and is illuminated by a cold cathode tube. Below the waist panel 17 is a coin receiving portion 19. The coin receiving portion 19 is formed so as to store the coins paid out according to the game result.

Both sides of the cabinet are provided with speakers 23, symmetrically. Each speaker 23 outputs music during the game or standby and outputs a sound of a question or guide during a special game or help mode. Further, each speaker 23 functions as the microphone 41. Each microphone 41 enables the player's voice to be captured as a voice signal suitable for an information process.

The cabinet 3 has a light emitting portion 20. The light emitting portion 20 includes light emitting components such as lamps, LED, or the like. The light emitting portion 20 is formed and disposed so as to surround a game area including the upper variable display unit 4A, the middle variable display unit 4B, the lower variable display unit 4C and the operation table 10.

The lamps in the light emitting portion 20 are a side lamp 22, a speaker lamp 24, an under lamp 25, a top lamp 26, or the like. The side lamps 22 are disposed to inclined parts 21. These inclined parts 21 are respectively disposed to the left and the right sides of the front surface side of the cabinet 3. The inclined parts 21 are projected in bow shapes, and are disposed so as to sandwich the upper variable display unit 4A, the central variable display unit 4B, the lower variable display unit 4C.

The speaker lamps 24 are projected sideways at the right and left ends of the cabinet 3 adjacent to the operation table 10. The speaker lamps 24 are provided to the arched speakers 23 and are aligned along edges of the speakers 23. The under lamps 25 are provided on the lower front door 18, and are aligned along a lower edge of the waist panel 17. The top lamps 26 are provided to the upper of the upper variable display unit 4A. The top lamps 26 include power lamps 26*a* disposed at both sides and band-type lamps 26*b* horizontally disposed at a center position.

(Electrical Structure)

Figure 57:
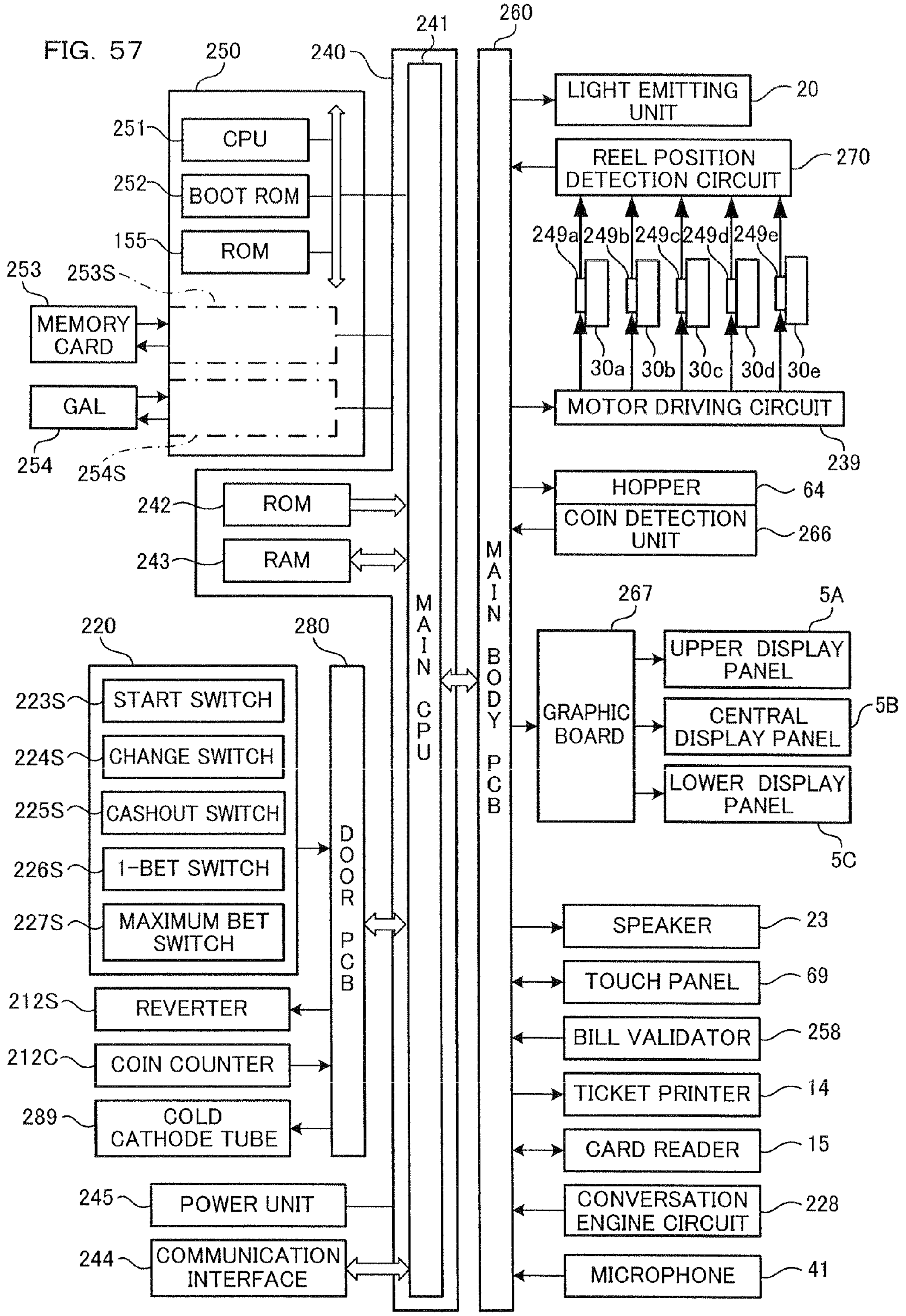
FIG. 57 is a block diagram showing a control circuit of a gaming machine.

FIG. 57 is a block diagram showing an electrical structure of the entire slot machine 1. A control unit having a controller 100 shown in FIG. 55 is disposed inside the cabinet 3. As shown in FIG. 57, the control unit has such components as a motherboard 240, a main body PCB (Printed Circuit Board) 260, a gaming board 250, a door PCB 280, various kinds of switches, a sensor, or the like.

The gaming board 250 has a CPU (Central Processing Unit) 251, a ROM 255, a boot ROM 252, a card slot 253S corresponding to a memory card 253, and an IC socket 254S corresponding to a GAL (Generic Array Logic) 254, connected to one another through an internal bus.

The memory card 253 stores a game program and a game system program. The game program includes a stop symbol determination program. The stop symbol determination program is for determining the symbols 301 to be stopped on the payline L (a code number corresponding to the symbols). The stop symbol determination program includes symbol weighting data corresponding to each of kinds of payout rates (e.g. 80%, 84%, and 88%). The symbol weighting data shows a corresponding relationship between a code number of each symbol and one or more random number values in a predetermined value range (0 to 256), for each of the display windows 7A, 7B, 7C, 7D, and 7E.

The memory card 253 stores a program which samples a random number. The random number sample program is read by a RAM 243 in time of carrying out a game running process, a bonus game process, or the like. This program is run by a main CPU 241. A random number is sampled by a program in the present embodiment; however, the method of sampling a random number is not limited to this. For example, it is possible to adopt a structure including: a random number generating circuit which generates a random number (random numbers) of a certain range, and a sampling circuit which samples a random number from the random number(s) generated by the random number generating circuit.

A payout rate is set according to the payout rate setting data outputted from the GAL 254. Symbols to be stopped are determined according to the symbol weighed data corresponding to the payout rate.

The memory card 253 stores various kinds of data used in the game program and the game system program. For example, the data showing a relationship between the random number range and the symbols 301 displayed in the display windows 7A to 7E in FIG. 54, is stored as a table in the memory card 253. The data is transferred to the RAM 243 of the motherboard 240 in time of running the game program.

The memory card 253 is attachable/detachable to/from the card slot 253S. The card slot 253S is connected to the motherboard 240 by an IDE bus. Thus, the gaming board 250 enables a player to change the types and contents of games to be run in the slot machine 1 through a switching operation including the steps of removing the memory card 253 from the card slot 253S, writing a different game program and a game system program in the memory card 253, and inserting the memory card 253 to the card slot 253S.

The game program includes a program according to a game progress, and a program for shifting into a bonus game. The game program also includes image data and sound data outputted during a game.

The GAL 254 has input ports and output ports. When data is inputted to the input ports, the GAL 254 outputs, from the output ports, the data corresponding to the inputted data. The data outputted from the output ports is the above-mentioned payout rate setting data.

The GAL 254 is attachable/detachable to/from the IC socket 254S. The IC socket 254S is connected to the motherboard 240 by a PCI bus. Thus, the gaming board 250 enables the payout rate setting data outputted from the GAL 254 to be changed through a switching operation including the steps of removing the GAL 254 from the IC socket 254S, rewriting a program stored in the GAL 254, and attaching the GAL 254 to the IC socket 254S.

The CPU 251, ROM 255, and boot ROM 252 connected to one another by an internal bus, are connected to the motherboard 240 by a PCI bus. The PCI bus transmits a signal between the motherboard 240 and the gaming board 250. The PCI bus also supplies power to the gaming board 250 from the motherboard 240. The ROM 255 stores country identification information and an authentication program. The boot ROM 252 stores a preliminary authentication program, a program for the CPU 251 to start the preliminary authentication program (boot code), or the like.

An authentication program is for authenticating a game program and a game system program (modification check program). The authentication program is for confirming and authenticating that the game program or the game system program is not modified. In other words, the authentication program is described in accordance with the authentication procedure of the game program and the game system program. A preliminary authentication program is for authenticating the authentication program. The preliminary authentication program is described in accordance with a procedure for verifying that the authentication program to be authenticated is not falsified. In short, the preliminary authentication program authenticates the authentication program.

The motherboard 240 has a main CPU 241(controller), a ROM (Read Only Memory) 242, a RAM (Random Access Memory) 243, and a communication interface 244.

The main CPU 241 functions as a controller to control the entire slot machine 1. Specifically, the main CPU 241 controls (i) when the start button is pushed after a credit is bet, to output a command signal to rotate and stop the reels 30A to 30E to start a variable display in the display windows 7A to 7E, (ii) after a variable display has started, to determine the symbols to be stopped, and (iii) to still-display the determined symbols in the display windows 7A to 7E.

In other words, the main CPU 241 functions as an arrangement controller for carrying out an arrangement control by which, among various kinds of symbols 301, the symbols to be stopped in a symbol matrix are selected and determined, and then scrolling of the symbols is stopped so that the determined symbol matrix appears. With this function, symbols 301 displayed after being scrolled by a rotation of the reels 30A, 30B, 30C, 30D, and 30E on the central liquid crystal panel 5B are rearranged in a new symbol matrix.

The ROM 242 stores a program such as a BIOS (Basic Input/Output System) or the like run by the main CPU 241. The ROM 242 also stores data which is permanently used. When the main CPU 241 runs the BIOS, each peripheral device is initialized, and a reading process via the gaming board 250 for a game program and a game system program stored in the memory card 253, is started. The RAM 243 stores data and a program used when the main CPU 241 carries out the process.

The communication interface 244 is for communicating, through a telecommunication circuit, with a host computer or the like provided in the arcade. The main body PCB (Printed Circuit Board) 260 and the door PCB 280 are respectively connected with the motherboard 240 through a USB (Universal Serial Bus). Moreover, the motherboard 240 is connected to a power unit 245. The power unit 245 supplies power to the motherboard 240 to boot the main CPU 241 of the motherboard 240, and supplies power to the gaming board 250 through the PCI bus to boot the CPU 251.

The main body PCB 260 and the door PCB 280 are connected to an equipment or a device which generates an input signal to be inputted into the main CPU 241, and an equipment or a device whose operation is controlled by a control signal outputted from the main CPU 241. The main CPU 241 runs a game program and a game system program stored in the RAM 243 in accordance with the input signal inputted to the main CPU 241. Thus, the main CPU 241 is capable of carrying out various kinds of processes such as storing a result of a calculation process to the RAM 243, and controlling each equipment and device by transmitting a control signal to the each equipment and device.

The main body PCB 260 is connected to a light emitting unit 20, a hopper 64, a coin detection unit 266, a graphic board 267, the speakers 23, a bill validator 258, the ticket printer 14, and the card reader 15. The light emitting unit 20 has lamps including the side lamps 22, the speaker lamps 24, the under lamps 25, the top lamps 26 and an LED.

Turning on and off the light emitting unit 20 is controlled according to a control signal outputted by the main CPU 241. The hopper 64 is disposed in the cabinet 3, and pays out a predetermined number of coins from a coin payout opening 16 to the coin receiving portion 19 in accordance with a control signal outputted by the main CPU 241. The coin detection unit 266 is disposed in the coin payout opening 16. The coin detection unit 266 outputs an input signal to the main CPU 241 upon detecting that a predetermined number of coins have been paid out from the coin payout opening 16.

The coin detection unit 266 counts the number of coins paid out by the hopper 64, and outputs the data of the resulting number to the main body PCB 260. According to the data of the number of coins paid out (by the hopper 64), the main body PCB outputs a signal to notify completion of payout of a coin or coins to the main CPU 241, when a set number of coins are paid out.

Figure 58:
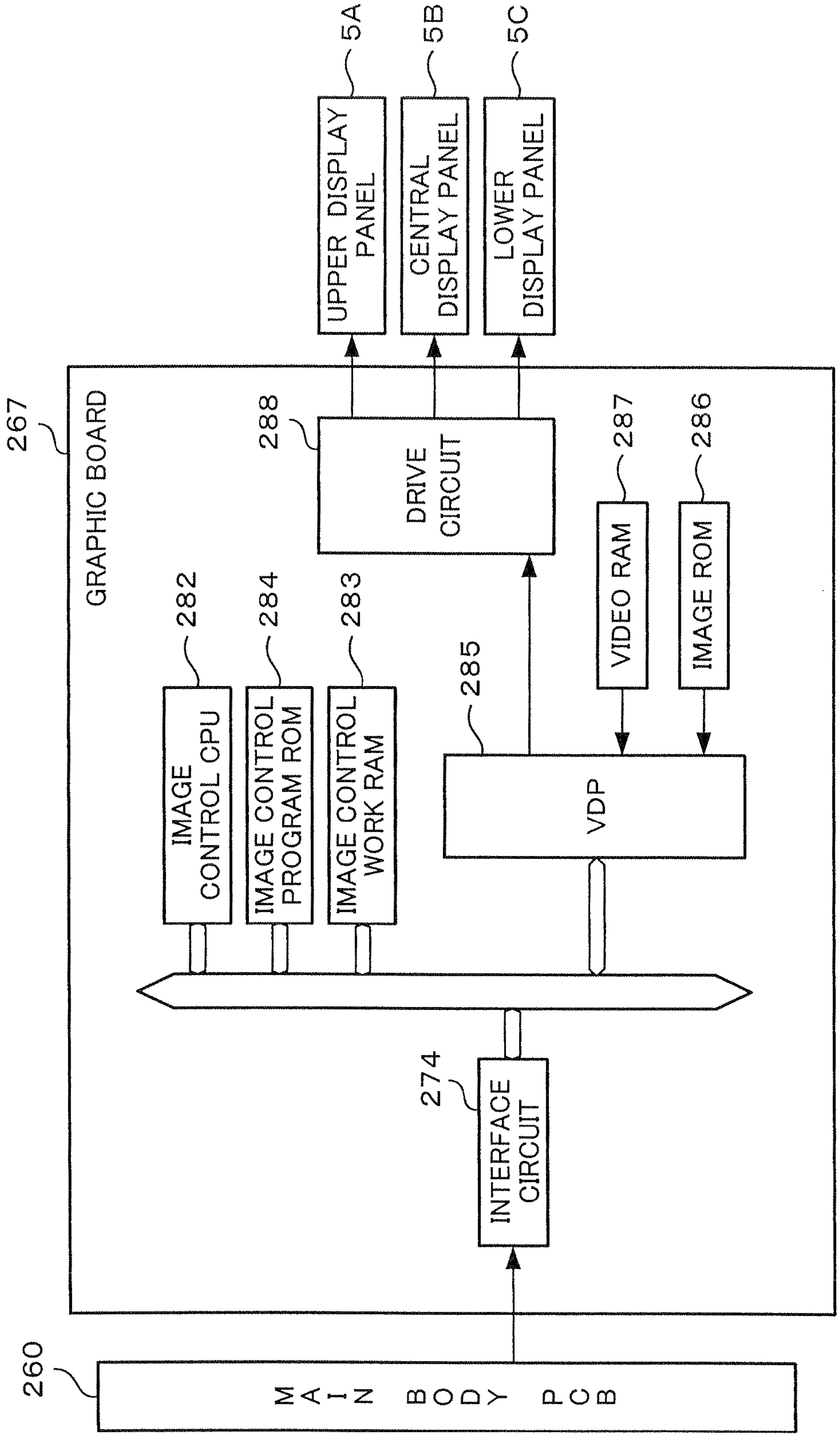
FIG. 58 is a block diagram of a graphic board.

The graphic board 267 controls display of an image on the upper liquid crystal panel 5A, the central liquid crystal panel 5B, and the lower liquid crystal panel 5C, in accordance with a control signal outputted from the main CPU 241. As shown in FIG. 58, the graphic board 267 has an interface circuit 281, an image control CPU 282, an image control work RAM 283, an image control program ROM 284, a VDP (Video Display Processor) 285, an image ROM 286, a video RAM 287, and a drive circuit 288.

The image control CPU 282 receives a control signal outputted from the main CPU 241 via the interface circuit 281. In response to the control signal from the main CPU 241, the image control CPU 282 runs the image control program stored in the image control program ROM 284 to determine an image to be displayed on the upper liquid crystal panel 5A, the central liquid crystal panel 5B, and the lower liquid crystal panel 5C.

The image control program ROM 284 stores various kinds of selection tables and an image control program related to displays on the upper liquid crystal panel 5A, the central liquid crystal panel 5B, and the lower liquid crystal panel 5C. The image control work RAM 283 functions as a temporary storage means when the image control CPU 282 runs the image control program.

The VDP 285 forms image data corresponding to a determination made in the image control CPU 282. The image ROM 286 stores dot data for forming an image such as a symbol 301. The video RAM 287 functions as a temporary storage means when an image is formed in the VDP 285. The drive circuit 288 outputs image data formed by the VDP 285 to the upper liquid crystal panel 5A, the central liquid crystal panel 5B, and the lower liquid crystal panel 5C. The image data used when the VDP generates image data is stored in the memory card 253, and is included in the game program read by the memory card 253 and temporarily stored in the RAM 243.

As shown in FIG. 57, the speakers 23 generate various kinds of sound effects when various kinds of effects are applied according to an output signal from the main body PCB 260. The bill validator 258 carries out at least the following processes: a process of reading an image of a bill, a process of determining whether or not the bill is genuine, and a process of, when the bill is genuine, accepting the bill into the cabinet 3. Moreover, when the bill validator 258 accepts a genuine bill, the bill validator outputs an input signal indicating the value of the accepted bill to the main CPU 241. The main CPU 241 stores, in the RAM 243, a credit/credits corresponding to the value of bill transmitted by the input signal.

According to a control signal outputted by the main CPU 241, the ticket printer 14 prints a barcode on a ticket, and then outputs the ticket with a barcode. The barcode contains encoded data of credits stored in the RAM 243, date and time, an identification number of the slot machine 1, or the like. The card reader 15 reads data from a smart card and transmits the data to the main CPU 241. In addition, the card reader 15 writes data into a smart card according to a control signal from the main CPU 241.

The main body PCB 260 is connected to a motor driving circuit 239 and a reel position detection circuit 270. The motor driving circuit 239 is connected to stepping motors 249*a*, 249*b*, 249*c*, 249*d*, and 249*e*. With the pulsed power supplied by the motor driving circuit 239, the stepping motors 249*a* to 249*e* respectively rotate the reels 30A to 30E at any given rotation speed, and position the reels 30A to 30E.

The reel position detection circuit 270 receives a pulse signal from a reel rotation sensor. In response to the pulse signal, the reel position detection circuit 270 outputs, to the main body PCB 260, a reel position signal to detect a position of the each reel 30A to 30E. The reel position signal is assigned to a code number of a below mentioned data table for a symbol, so as to enable detection of a rotation angle of the reels 30A to 30E, and rearranging of specified symbols 301 in specific positions.

The door PCB 280 is connected to a control panel 220, a reverter 212S, a coin counter 212C, and a cold cathode tube 289. In the control panel 220 are a switch 223S corresponding to the start button, a change switch 224S corresponding to a change button, a cash-out switch 225S corresponding to a cash-out button, a 1-bet switch 226S corresponding to a 1-bet button, and a maximum bet switch 227S corresponding to a maximum bet button. Each of the switches 223S to 227S outputs an input signal to the main CPU 241 when the player presses corresponding one of the buttons.

The coin counter 212C is disposed inside the coin insertion slot 12, and validates whether or not the coin inserted by the player to the coin insertion slot 12 is genuine. A coin that is not genuine is discharged from the coin payout opening 16. In addition, the coin counter 212C outputs an input signal to the main CPU 241 when it detects a genuine coin.

The reverter 212S operates in accordance with the control signal outputted by the main CPU 241. The reverter 212S distributes a coin recognized as genuine by the coin counter 212C to a cash enclosure (not shown) or the hopper 64 disposed inside the slot machine 1. That is, when the hopper 64 is filled with coins, the genuine coin will be distributed to a cash enclosure by the reveter 212S. To the contrary, when the hopper 64 is not filled with coins, the genuine coin will be distributed to the hopper 64. The cold cathode tube 289 functions as a backlight mounted to rear sides of the upper liquid crystal panel 5A, the central liquid crystal panel 5B, and the lower liquid crystal panel 5C. The cold cathode tube 289 lights up in accordance with a control signal outputted by the main PCU 241.

Moreover, the main body PCB 260 is connected to a conversation engine circuit 228. The conversation engine circuit 228 interprets the voice signal inputted from the microphone 41. The conversation engine circuit 228 interprets the voice signal, based on a running state of a game, and voice and game data relating to a game stored in the RAM 243.

(Symbol, Combination, or the Like)

The symbols 301 displayed in the display windows 7A to 7E of the slot machine 1 form symbol columns, each of which having twenty-two symbols. As shown in FIG. 59, one of code numbers 0 to 21 is assigned to each of the symbols constituting each column. Each of the symbol columns is constituted with a combination of symbols of "JACKPOT 7," "BLUE 7," "BELL," "CHERRY," "STRAWBERRY," "PLUM," "ORANGE," and "APPLE."

Three successive symbols in each of the symbol columns are respectively displayed (arranged) on an upper stage 7*a*, a middle stage 7*b*, and a lower stage 7*c* of each of the display windows 7A, 7B, 7C, 7D, and 7E, to form a symbol matrix of five columns and three rows in the display windows 7A to 7E. When the start button is pressed to start a game after the bet button is pressed, the symbols forming a symbol matrix start scrolling. This scrolling of the symbols stops (rearrangement) after a predetermined period from the beginning of the scrolling.

Various kinds of winning combinations are set in advance for each symbol. A winning combination is a combination of stopped symbols on the payline L which puts the player in an advantageous state. Examples of an advantageous state include: a state where coins according to a winning combination is paid out, a state where the number of coins to be paid out is added to a credit, a state where a bonus game is started.

For example, a combination on the payline L including an "APPLE" symbol serves as a bonus trigger which causes a transition of a gaming mode from a basic game to a bonus game. Further, when a combination including a "CHERRY" symbol is formed on the payline L in a basic game, twenty coins (game values) are paid out for one bet. When a combination including a "PLUM" symbol is formed on the payline L in a basic game, five coins are paid out for one bet.

Here, a bonus game is a gaming state which provides a larger advantage than a base game. Note that another bonus game may be employed in combination, provided that the other bonus game is advantageous to a player, i.e., the other bonus game is more advantageous than a basic game. For example, a bonus game may be a state where more coins are possibly obtained than the basic game, a state where the probability of obtaining coins is higher than in the basic game, a state where fewer coins are consumed than the basic game, free game, or the like.

The following describes each table stored in the ROM 242 of a main control board 71, with reference to FIGS. 60 and 61.

(Payout Control Table)

FIG. 60 is a payout control table which controls a payout awarded in accordance to a winning combination. The payout control table is stored in the ROM 242 of the main control board 71, and a piece of information of a payout is assigned to a type of winning combination. For example, a payout corresponding to a winning combination including a "BELL" is "10." A payout corresponding to a winning combination including a "BLUE 7" is "40." Note that payouts for a basic game and a free game are set to be the same in the present embodiment (Free Game Quantity Table)

FIG. 61 is a table referred to when determining the number of free games to be played for the number of points acquired in a mini game of a basic game. The points awarded in a mini game correspond to the number of free games to be played in the free game quantity table. For example, when the accumulated points are 4, the free games are run eighty (80) times. When the accumulated points are 8, the free games are run a hundred sixty (160) times. Thus, by succeeding in a mini game in a basic game and acquiring many points, it is possible to continue a free game for a long period of time.

(Display State)

The following specifically describes an example of a display state of the display 4 in an operation of the slot machine 1.

(Help Mode Screen)

Figure 62:
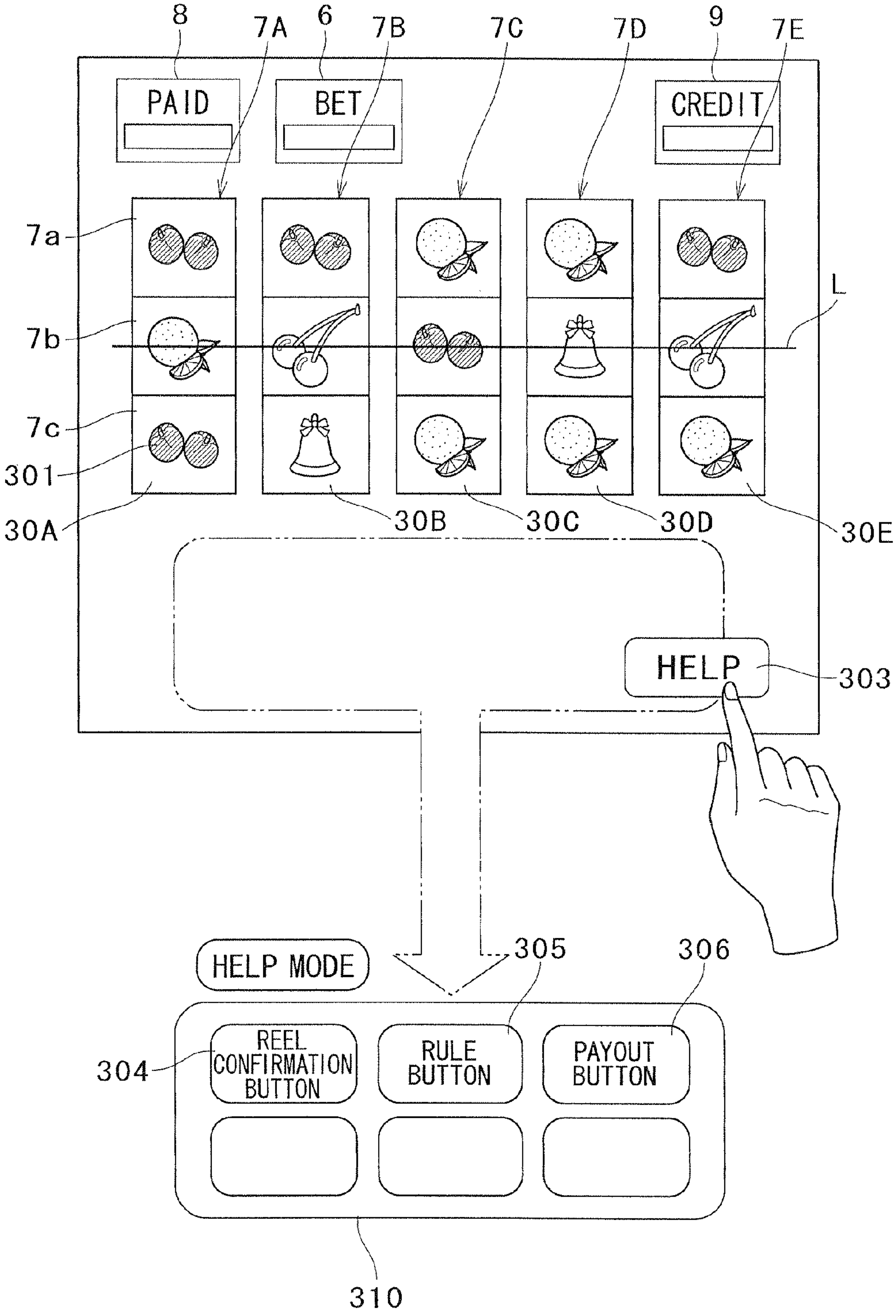
FIG. 62 is an explanatory view of a display screen in a help mode.

FIG. 62 shows a display state of the display 4 when a mode switches from a game mode to a help mode. That is, the bet display unit 6, the payout display unit 8, and the credit display unit 9 are displayed in the upper part of the central liquid crystal panel 5B constituting a part of the display 4. In addition, in the center of the central liquid crystal panel 5B, window frames of the display windows 7A to 7E are displayed. When a basic game or a free game starts, all the symbols 301 on the reels 30A to 30E visible through the display windows 7A to 7E are variably displayed.

Moreover, in the lower part of the central liquid crystal panel 5B, a help button 303 is displayed. The help button 303, upon being pressed, activates the help mode. The help mode provides a player with troubleshooting information regarding a game.

A help mode screen has a help button frame 310 arranged below the display windows 7A to 7E. The help button frame 310 has a reel confirmation button 304, a rule button 305, and a payout button 306 inside. The reel confirmation button 304 is for activating a reel confirmation mode which enables a player to confirm the symbols 301. The rule button 305 is for activating a rule guidance mode which provides a player with an introduction to a game or guidance on a method of playing a game. The payout button 306 is for activating a payout guidance mode which provides a player with guidance on payouts.

(Reel Confirmation Mode Screen)

FIG. 63 shows a display state of the display 4 when a reel confirmation mode is activated by pressing the direction symbol 302. That is, in the lower part of the central liquid crystal panel 5B constituting a part of the display 4, direction symbols 302 are displayed. Each of the direction symbols 302 has an arrow shape. One direction symbol and another paired with the former are symmetrically disposed so that one points out the upward direction and the other, the downward direction. Each pair of upper and lower direction symbols 302 is arranged below each of the display windows 7A to 7E. These pairs of direction symbols 302 function as command buttons to output command information to rotation-drive each of the reels 30A to 30E in upward and downward directions.

Thus, pressing of a direction symbol 302 pointing an upward direction causes upward rotation of at least one of the corresponding reels 30A, 30B, 30C, 30D, and 30E positioned above the direction symbols 302 during while the direction symbol 302 is pressed. On the other hand, pressing of a direction symbol 302 pointing a downward direction causes downward rotation of at least one of the reels 30A, 30B, 30C, 30D, and 30E positioned above the direction symbol 302 during while the direction symbol 302 is pressed.

Figure 64:
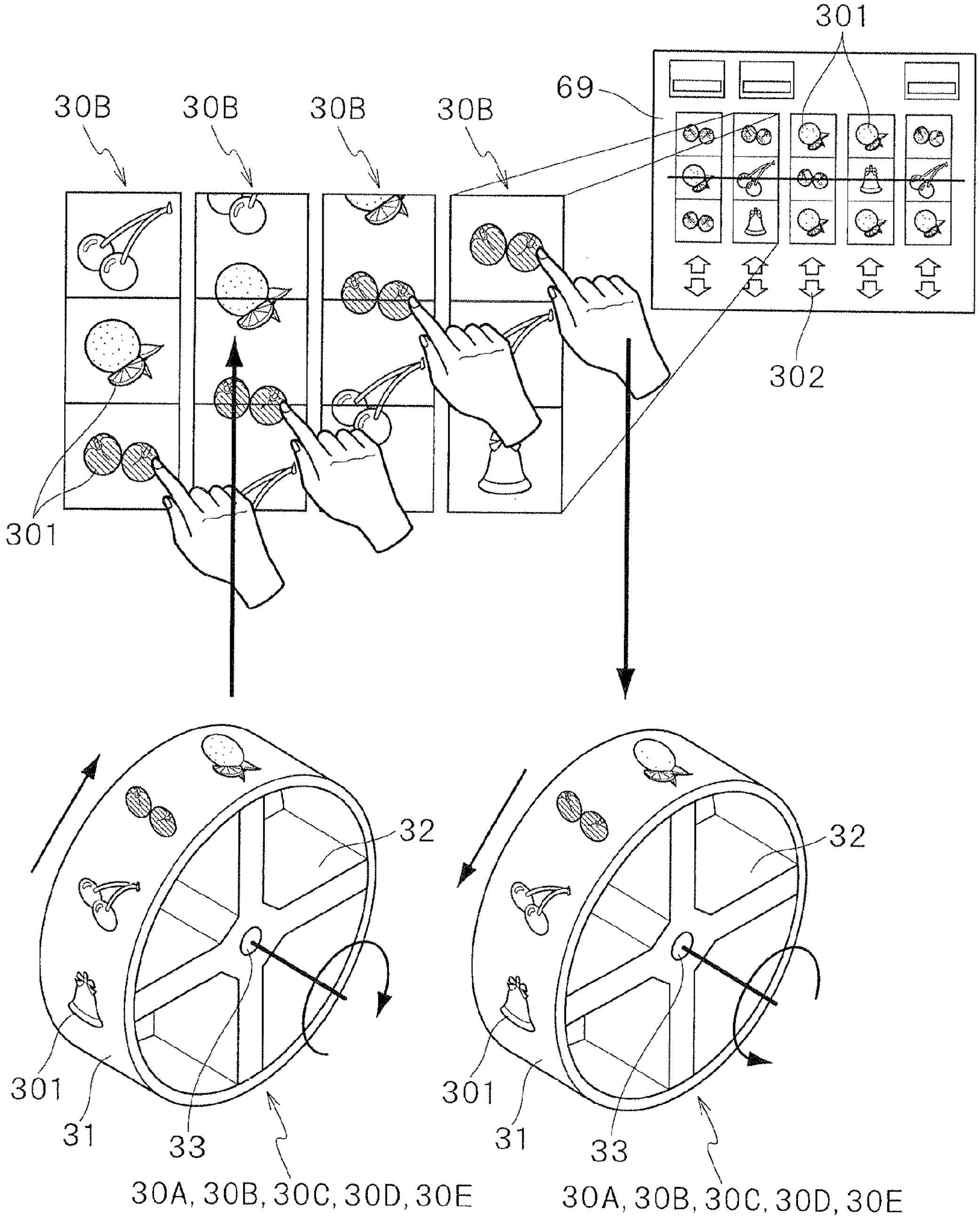
FIG. 64 is an explanatory view of a display screen in a reel confirmation mode.

FIG. 64 shows a display state of the display 4 when a reel confirmation mode is activated by a flicking operation. Meanwhile, the reel confirmation mode by the flicking operation is completely the same as the display state of the display 4 when a reel confirmation mode is activated by pressing the direction symbol 302.

In the reel confirmation mode by the flicking operation, when a player presses a front area of the reels 30A to 30E in the touch panel 69, a rotation command related to the reel is inputted. Then, when the player carries out a flicking operation, a rotation direction component included in a flicking movement direction and movement speed included in the rotation direction component are extracted. The rotation direction component and the movement speed are made to correspond to a rotation direction and rotation speed of the reels 30A to 30E, so that the symbol 301 positioned at a tip of the player's finger is moved while the symbols 301 follow the flicking operation.

(Quiz Mode Screen)

Figure 65:
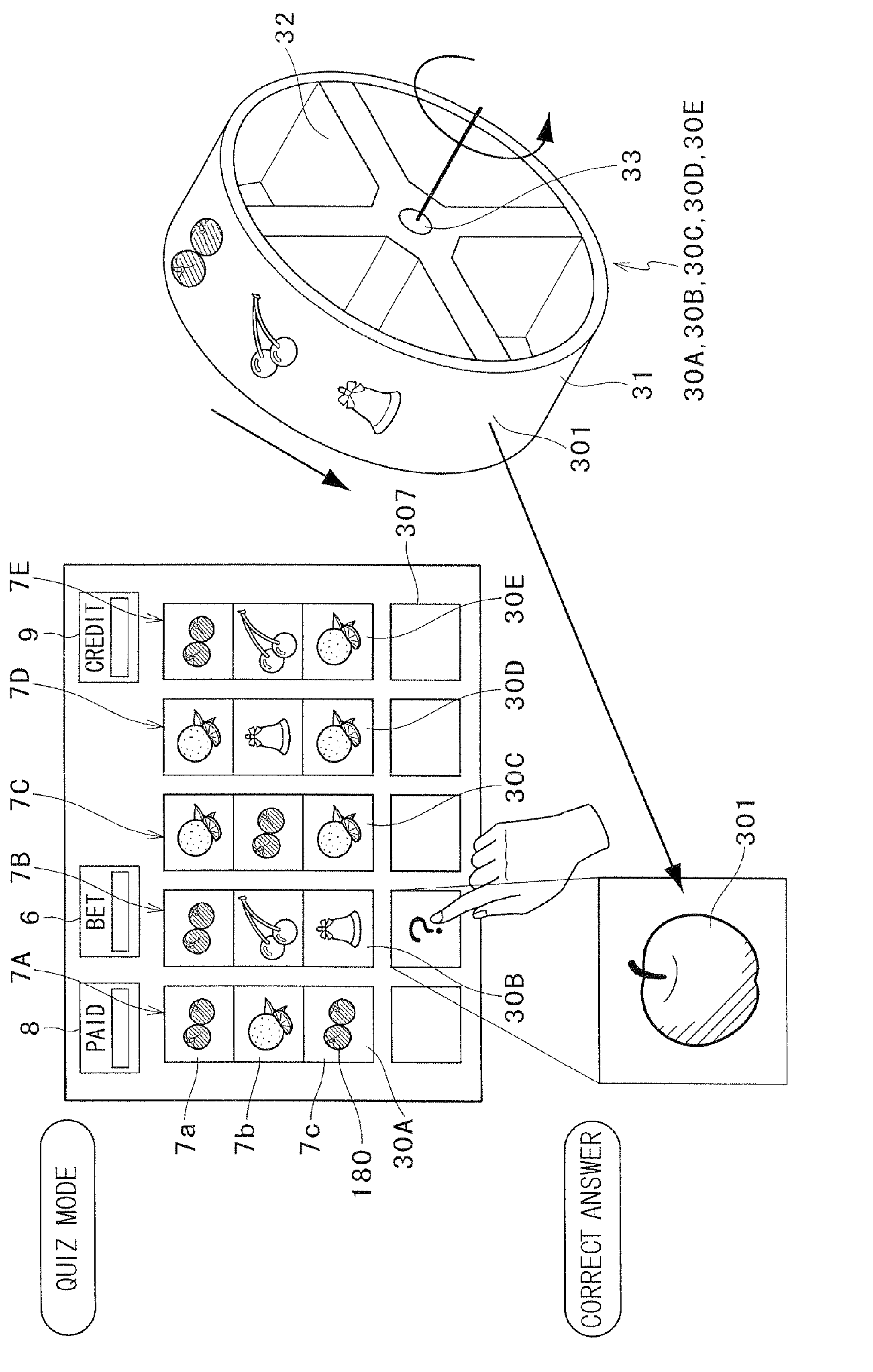
FIG. 65 is an explanatory view of a display screen in a quiz mode.

FIG. 65 shows a display state of the display 4 when a quiz mode, which is a special game, is run. In short, quiz frames 307 are displayed in the lower part of the middle liquid crystal panel 5B constituting a part of the display 4. The quiz frames 307 are disposed below the display windows 7A, 7B, 7C, 7D, 7E, respectively. Each of the quiz frames 307 displays a symbol of "?" during the quiz. The quiz frames function as a display screen that displays a video image of the symbols 301 when a player correctly answers a quiz.

(Mini Game Screen)

Figure 66:
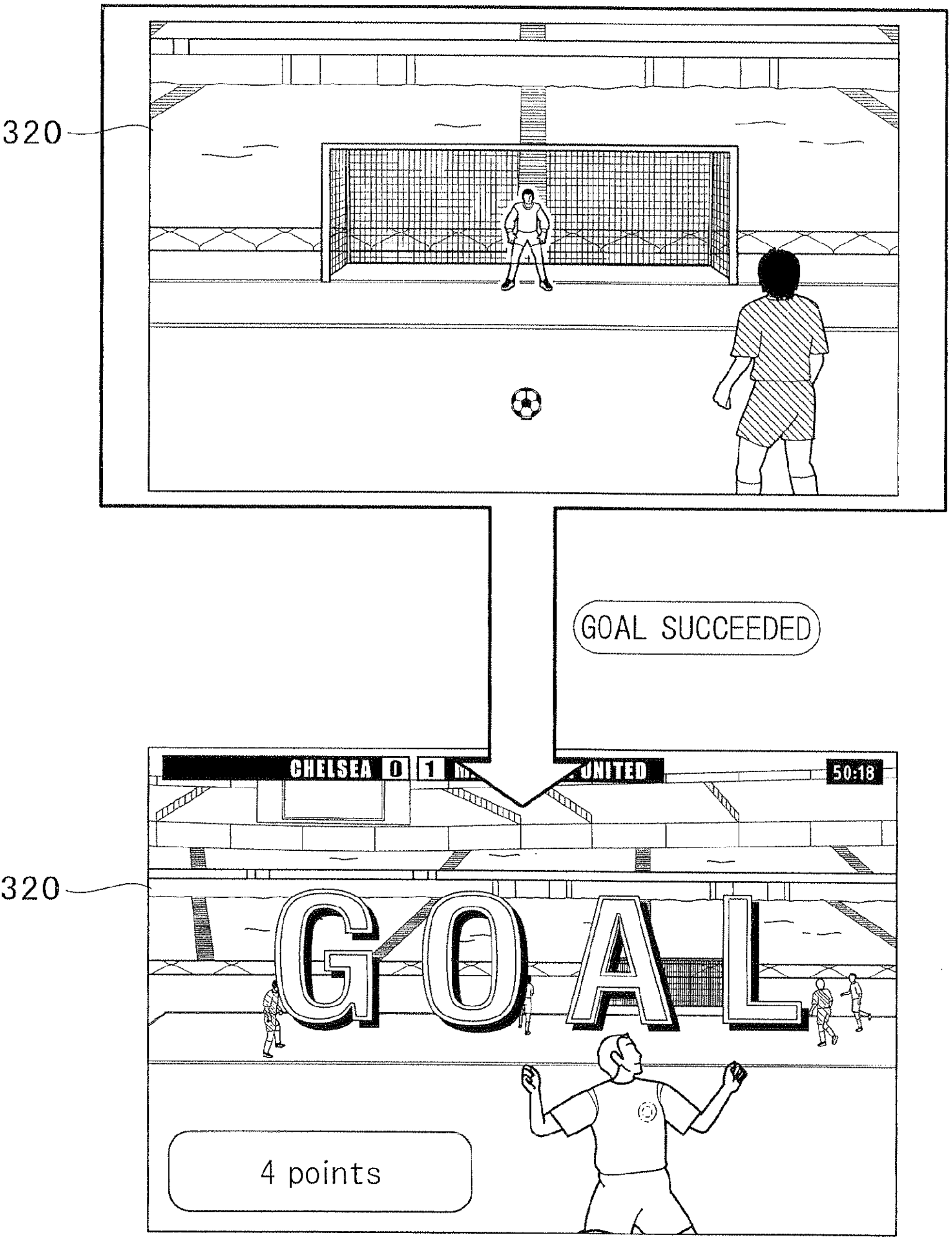
FIG. 66 is an explanatory view of a mini game screen.

FIG. 66 shows a display state of the display 4 when a mini game is run. In other words, when a mini game starts, a mini game screen 320 is displayed on the entire upper liquid crystal panel 5A. A mini game screen 320 shows a penalty kick shootout of a soccer game. Specifically, a kicker who kicks a ball and a goal keeper who defends a goal are displayed as an initial screen. After a predetermined standby time, the kicker kicks the ball. When the ball goes into the goal, an image reading "GOAL" and accumulated points are displayed. This allows a player to confirm the points acquired. To the contrary, when the ball does not go into the goal, the screen goes back to an initial screen of a next penalty shootout. Note that there will be no points generated in this case.

(Process Operation of the Slot Machine 1: Booting Process)

Figure 67:
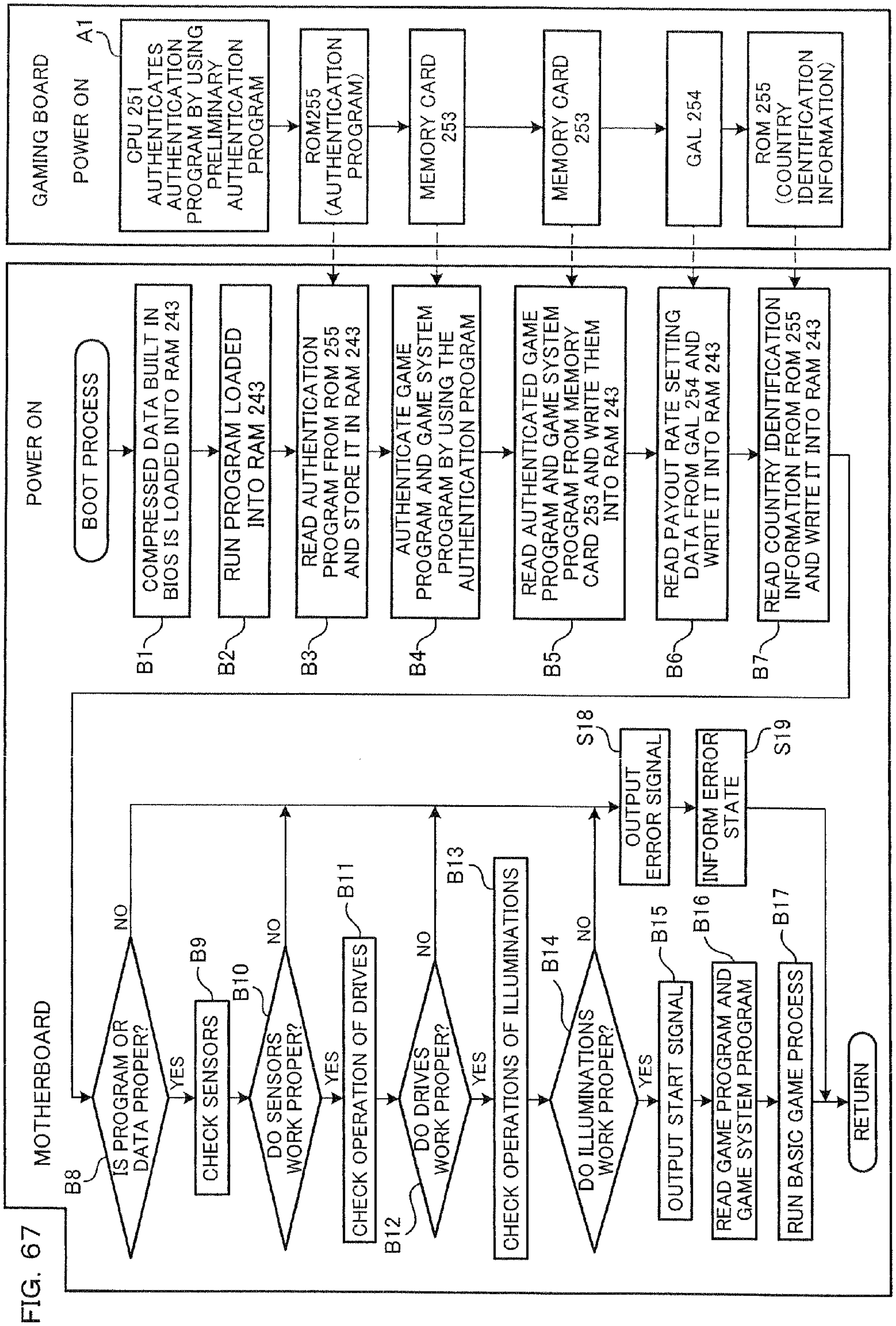
FIG. 67 is a flow chart of a booting process.

The following describes a booting process taking place in the slot machine 1. When power is supplies to the slot machine 1, a booting process routine shown in FIG. 67 is run in the motherboard 240 and the gaming board 250. In the present embodiment, a memory card 253 is inserted into the card slot 253S of the gaming board 250, and the GAL 254 is attached to the IC socket 254S.

First, when a power switch is turned on (power is supplied) in the power unit 245, the motherboard 240 and the gaming board 250 are booted. When the motherboard 240 and the gaming board 250 are booted, different processes are respectively carried out in parallel. That is, in the gaming board 250, the CPU 241 carries out processes of reading a preliminary authentication program stored in the boot ROM 252, and carrying out preliminary authentication by the preliminary authentication program. Note that the preliminary authentication is a process in which the preliminary authentication program is run to confirm and authenticate that authentication program is not falsified in advance before importing the program into the motherboard 240 (A1).

In the motherboard 240, the main CPU 241 runs the BIOS stored in the ROM 242. As a result, the compressed data incorporated in the BIOS is loaded into the RAM 243 (B1). Then, the main CPU 241 runs the BIOS loaded into the RAM 243, and diagnoses and initializes various kinds of peripheral devices (B2).

Afterwards, the main CPU 241 reads, via PCI bus, the authentication program stored in the ROM 255, and stores the read authentication program into the RAM 243 (B3). During this step, the main CPU 241 drives a checksum through an ADDSUM method (a standard check function) which is adopted in a standard BIOS. Thus, it is confirmed whether or not the authentication program is stored in the RAM 243 without an error.

The main CPU 241 then confirms a component connected to the IDE bus. Then, the main CPU 241 accesses to the memory card 253 inserted into the card slot 253S via the IDE bus, to read the game program and the game system program from the memory card 253. In this case, data constituting the game program and the game system program are read in a unit of four bytes. Then, the main CPU 241 confirms and authenticates, according to the authentication program stored in the RAM 243, that the read game program and the game system program are not falsified (B4).

When the authentication process ends properly, the main CPU 241 writes and stores the authenticated game program and the game system program in the RAM 243 (B5).

The main CPU 241 then accesses to the GAL 254 attached to the IC socket 254S to read payout rate setting data from the GAL 254, and stores the data in the RAM 243 (B6). Afterwards, the main CPU 241 reads the country identification information stored in the ROM 255 of the gaming board 250, and stores the information in the RAM 243 (B7).

With a result of the above authentication process, the main CPU 241 determines whether the program or data is proper (B8). When the program or data is not proper (B8, NO), an error signal including ID information to specify a slot machine 1 is outputted to a centralized control device (not shown). The centralized control device specifies a slot machine 1 in an error state based on the error signal. The centralized control device then instructs a staff standing by near the slot machine 1 to deal with the error, and stores error history information containing a time and date and a place when/where the error has occurred, or the like (B18). Then, the error state is informed in the form of an audio output from the speaker 23 of the slot machine 1, and in the form of light emitted from the light emitting portion 20. Afterwards, the routine in the motherboard 240 ends.

On the other hand, when the program or data is proper (B8, YES), operations of sensors disposed to the slot machine 1 are checked sequentially (B9). Then, whether or not all the sensors operate properly is determined (B10). When an error is detected in at least one sensor (B10, NO), the above mentioned B18 and B19 are carried out, and the routine ends thereafter.

On the other hand, when all the sensors operate properly (B10, Yes), operations of all drive mechanisms are checked sequentially (B11). Then, it is determined whether or not all the drive mechanisms operate properly (B12). When an error is detected in at least one drive mechanisms (B12, NO), the above mentioned B18 and B19 are carried out, and the routine ends thereafter. On the other hand, when all the drive mechanisms operate properly (B12, Yes), operations of all illuminations are checked sequentially (B13). Then, it is determined whether or not all the illuminations operate properly (B14). When an error is detected in at least one illumination (B14, No), the above mentioned B18 and B19 are carried out, and the routine ends thereafter.

On the other hand, when all the illuminations operate properly (B14, Yes), a boot signal indicating that all the illuminations have been booted properly is outputted to the centralized control device (not shown) or the like (B15). Afterwards, a basic game process is carried out (B16), and this routine ends. The following describes a basic game process in detail.

(Basic Game Process)

Figure 68A:
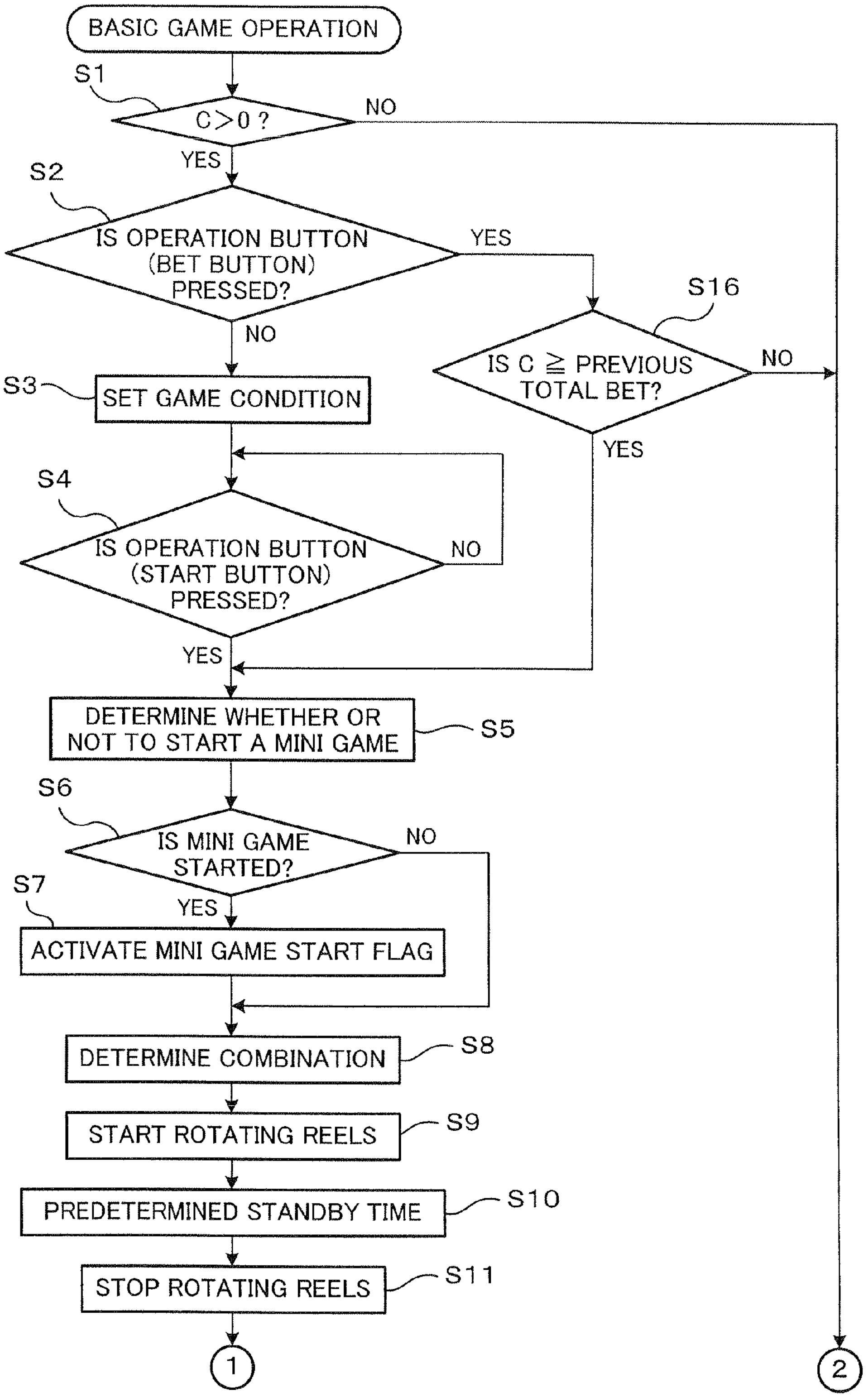
FIG. 68A is a flow chart showing a part of a basic game process.
Figure 68B:
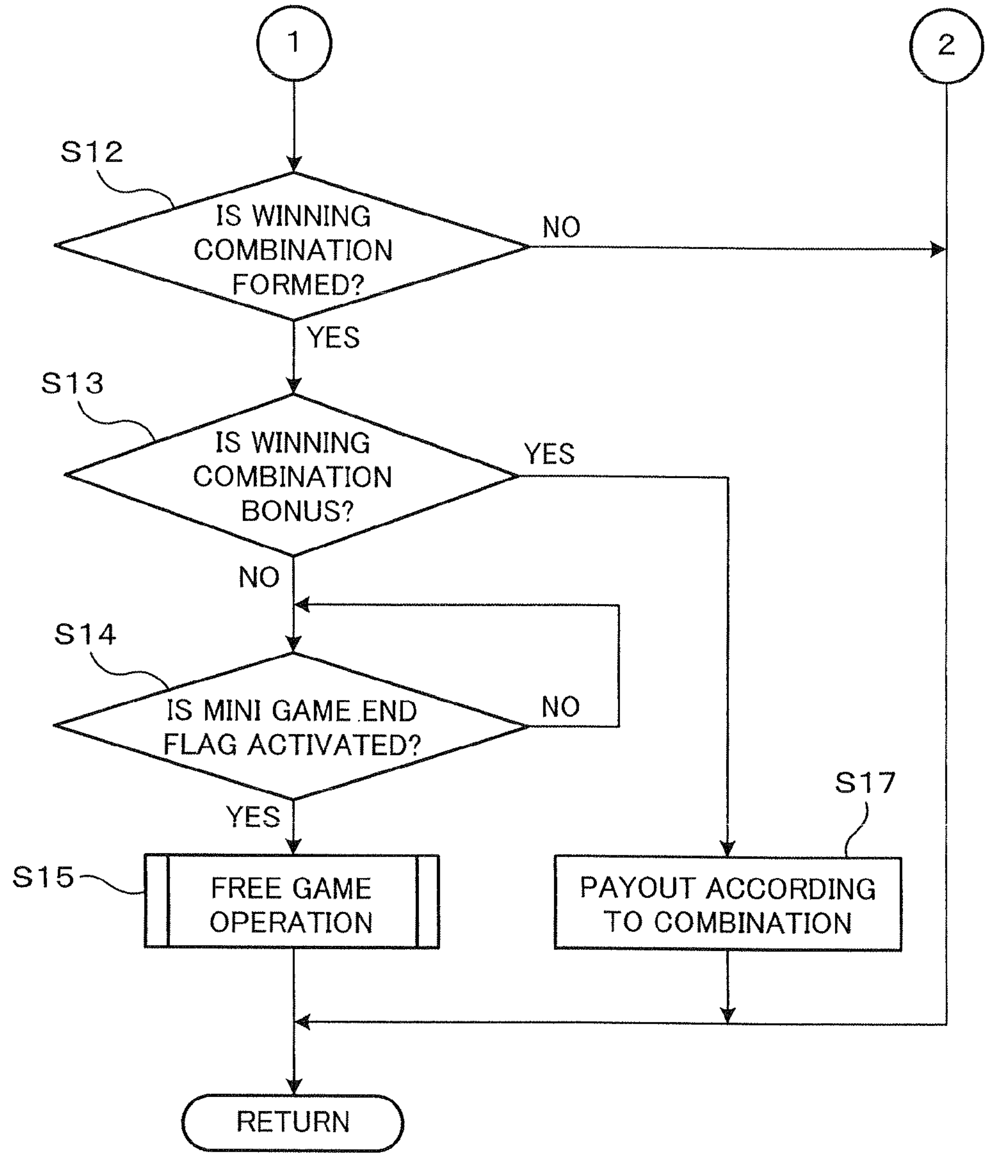
FIG. 68B is a flow chart showing another part of a basic game process.

FIGS. 68A and 68B are flow charts showing processing operations in a basic game of the slot machine 1, which is run by the main CPU 241 of the slot machine. One routine shown in FIGS. 68A and 68B constitutes a unit game. Note that the slot machine 1 is booted in advance, and a variable used in the CPU 241 on the other side, i.e. in the game controller 1 side, is initialized at a predetermined value. Accordingly, the slot machine 1 is constantly operated.

First, it is determined whether there is a remaining credit, i.e., the remaining number of coins having been inserted by the player (S1). Specifically, a credit C stored in the RAM 243 is read, and a process according to the read credit C is carried out. When the credit C is zero (S1, NO), the routine ends without any operation of a process since a game cannot be started. Meanwhile, when the credit C is one or more (S1, Yes), it is determined that there is one or more credit remaining and the process moves to S2.

In S2, it is determined whether or not the operation button 11 (bet button) is pressed (S2). When the operation button 11 (bet button) is not pressed for a predetermined time (S2, NO), a game condition is set (S3). Specifically, the number of coins to be bet on the payline L in the game is determined according to the operation of the operation button 11 (bet button). During this operation, an operation signal sent upon an operation of the operation button 11 is received. According to the number of times that the operation signal is received, the bet on the payline L is stored in a predetermined memory area of the RAM 243. Then, the credit C written in a predetermined memory area of the RAM 243 is read out. A total bet having added the above bet is subtracted from the credit C read out. The resulting number is stored in the predetermined memory area of the RAM 243.

Afterwards, it is determined whether or not an operation button 11 (start button) is pressed (S4). When the operation button 11 (start button) is not pressed (S4, NO), S4 is repeated until the bet button 11 is pressed. When the operation button 11 (start button) is pressed (S4, YES), it is determined whether or not to start a mini game (S5).

On the other hand, when the operation button 11 (bet button) is pressed in S1 (S2, YES), it is determined whether or not a value of the credit C is equal to or more than the value of the total bet in the previous game. In other words, it is determined whether or not to start a game through a press operation of the operation button 11 (bet button). Specifically, pressing of the operation button 11 (bet button) causes reading out of a bet on the payline L in the previous game and a credit C written in a predetermined memory area of the RAM 243. According to a relation of the read credit C to the bet, a process branches as follows depending on whether the value of the credit C is equal to or more than the value of total bet in the previous game. When it is determined that the value of the credit C is less than the value of the total bet of the previous game (S16, NO), the routine ends without any operation of a process since a game cannot be started.

Meanwhile, when it is determined that the value of the credit C is equal to or more than the value of the total bet of the previous game (S16, YES), the value of the total bet of the previous game is subtracted from the value of the credit C. Then, the resulting value is stored in a predetermined memory area of the RAM 243. Afterwards, it is determined whether or not to start a mini game (S5).

When it is determined to start a mini game (S6, YES), a mini game start flag is set as "ON" (S7). Specifically, data showing that the game start flag is "ON" is written into a storage area of a mini game start flag of the RAM 243. Meanwhile, when it is determined not to start a mini game (S6, NO), a combination determination process is carried out (S8).

In the combination determination process, a combination of symbols to be stopped on the payline L is determined first. Specifically, a command to generate a random number is sent to the random number generation circuit. Then, a random number within a predetermined range which is generated by the random number generation circuit, is sampled. The sampled random number is stored in a predetermined memory area of the RAM 243. Although a random number is generated in the random number generation circuit disposed outside the main CPU 241 in the present embodiment, a random number may be generated through a calculation by the main CPU 241, without the random number generating circuit.

Afterwards, a winning combination table for awarding a prize and a random number table stored in the ROM 242 are read. These read winning combination table and random number table are stored in a predetermined memory area of the RAM 243. Still-displaying (of symbols) are controlled for each reel in accordance with the random number table.

Then, the random number table and the winning combination table stored in the predetermined memory area of the RAM 243 are read. Then, the random number value written into the predetermined memory area of the RAM 243 is used as a parameter to refer to the random number table. A combination of symbols to be stopped on the payline L is then determined.

When a winning combination is determined, the winning combination table is stored into a predetermined memory area of the RAM 243. The random number and the winning combination table written in the predetermined memory area of the RAM 243 are read. In accordance with the random number and the winning combination table, a combination of symbols to be stopped and still-displayed are determined. During this process, the main CPU 241 reads out a symbol arrangement table stored in the ROM 242 and stores the table in a predetermined memory area of the RAM 243. The table is then used as a reference. The determined stop symbol data is stored in a predetermined memory area of the RAM 243. Alternatively, symbols to be stopped may be determined for each reel by using the random number table.

When a combination of symbols to be stopped on the payline L is determined, it is determined whether or not the combination is a winning combination. When the combination of symbols to be stopped on the payline L is a winning combination, a flag which indicates that a prize corresponding to the type of the winning combination will be awarded, is activated to generate the prize corresponding to the combination of symbols on the payline L forming the determined winning combination. The activated flag indicating that a prize will be awarded, is stored in a predetermined memory area of the RAM 243. To the contrary, when a combination of symbols to be stopped on the payline L is another combination, that is, a losing combination, the flag indicating that a prize will be awarded is not activated.

After the above combination determination process is carried out, reels 30A to 30E rotate so as to move symbols 301 in the display windows 7A to 7E (S9). Then, the rotation continues for a predetermined time (S10). Then, the rotation of reels 30A to 30E automatically stops (S11).

Then, it is determined whether or not a winning combination is formed through the combination determination process in S8 (S12). Specifically, this is done based on a status of the flag stored in the predetermined memory area of the RAM 243, which flag indicates a prize according to a combination of symbols on the payline L is awarded. When the flag indicating that a prize is awarded is not activated (S12, NO), it is determined that a winning combination is not formed, and the routine ends.

On the other hand, when the flag indicating that a prize is awarded is activated (S12, YES), it is determined whether or not the winning combination formed in the combination determination process of S8 includes a "BLUE 7" (S13). To be more specific, when the winning combination includes a "BLUE 7" (S13, YES), the number of coins according to the winning combination is paid out (S17), and this routine ends.

Meanwhile, when the winning combination does not include a "BLUE 7" (S13, NO), it is determined whether or not a mini game end flag is on (S14). Specifically, it is determined whether or not data showing that the mini game end flag is on is written into a mini game end flag area of the RAM 243. When the mini game end flag is not ON (S14, NO), S14 is repeated. When the mini game end flag is ON (S14, YES), a free game process is run (S15). Then, the routine ends.

(Free Game Process)

Figure 69:
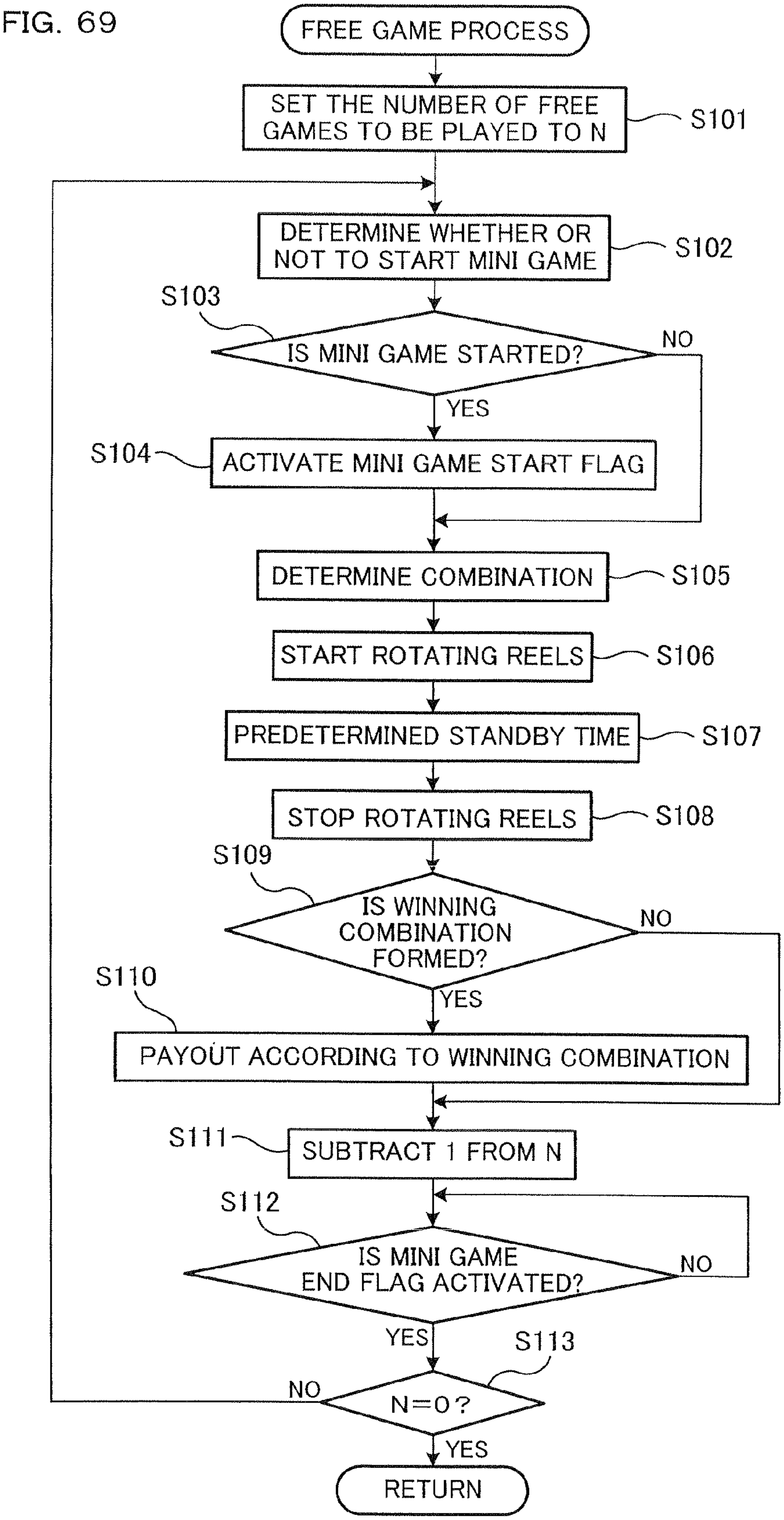
FIG. 69 is a flow chart of a free game process.

The following describes a free game process with reference to FIG. 69.

First, N denotes the number of free games (S101). The number of free games is determined according to accumulated points acquired in a mini game of a basic game.

Then, whether or not to start a mini game is determined (S102). When a mini game is determined to start (S103, YES), a mini game start flag is set activated (S104). Specifically, data indicating that the mini game start flag is activated is written into a storage area of the RAM 243 for storing the mini game start flag. Afterwards, the process moves to S105.

Meanwhile, when a mini game is determined not to start (S103, NO), the process immediately moves to S105. Thus, the combination determination process same as above is carried out (S105). A difference in this combination determination process is that the referred random number table is a free game random number table (not shown). Then, reels 30A to 30E start to rotate (S106). After a predetermined standby time (S107), each reels 30A to 30E stops rotating (S108).

Then, whether or not a winning combination is formed is determined (S109). When a winning combination is not formed (S109, NO), the process moves to S111. Meanwhile, when a winning combination is formed (S109, YES), a game medium according to the winning combination is paid out (S110). Specifically, the number of coins to be paid out for the winning combination is calculated, referring to the payout control table of FIG. 60. A credit stored in a predetermined memory area of the RAM 243 is then read out. The payout value calculated above is added to the credit. The sum is stored in a predetermined memory area of the RAM 243, and the stored value is displayed on the credit display unit 9.

In S111, 1 is subtracted from N (S111). Then, whether or not a mini game end flag is ON is determined (S112). Specifically, it is determined whether or not data showing that the mini game end flag is activated is written into a mini game end flag area of the RAM 243. S112 is repeated when the mini game end flag is not activated (S112, NO).

When the mini game end flag is activated (S112, YES), whether N is 0 is determined (S103). When N is not 0 (S103, NO), the operation is carried out again from S102. On the other hand, when N is 0 (S103, YES), the routine ends.

(Mini Game Process)

Figure 70:
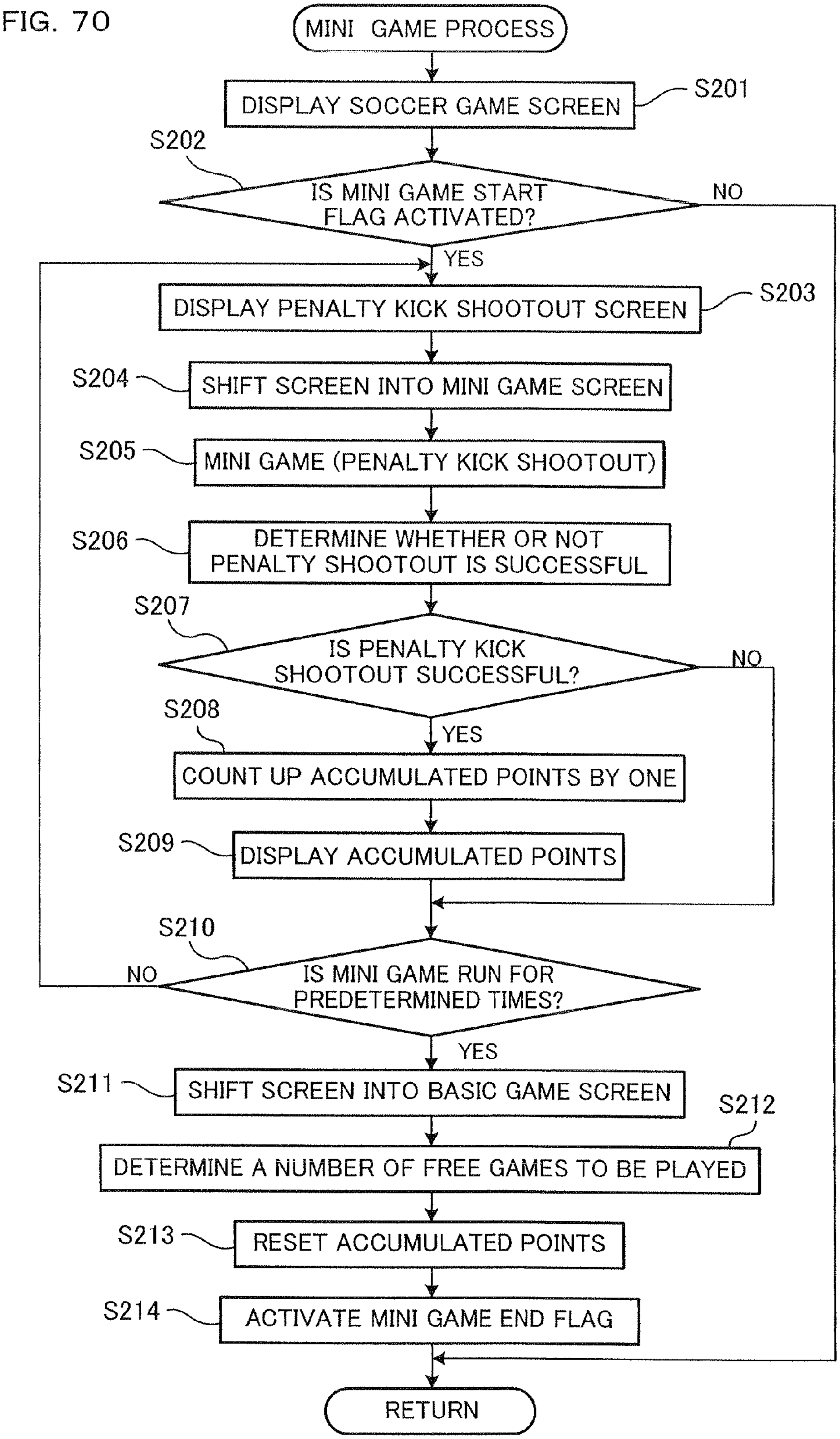
FIG. 70 is a flow chart of a mini game process.

The following describes a mini game process with reference to FIG. 70.

First, a soccer game screen, which is an effect screen displayed when a mini game is not run, is displayed on the upper liquid crystal panel 5A (S201). Then, whether or not the mini game start flag is activated is determined. Specifically, it is determined whether data showing that the mini game start flag is activated is written into the game start flag area or the RAM 243 (S202).

When the mini game start flag is not activated (S202, NO), the routine ends. Meanwhile, when the mini game start flag is activated (S202, YES), screens on the upper liquid crystal panel 5A switches, as shown in FIG. 54, from a soccer game screen to a penalty kick standby screen which is an effect screen displayed during a mini game. Then, with a mini game screen 320 displayed on the middle liquid crystal panel 5B, the display windows 7A to 7E and a mini game screen 320 are displayed one atop the other (S204).

Then, a penalty kick shootout as a mini game is started (S205). That is, an image of a goal keeper and a kicker facing each other is displayed, and a cheering sound of audience members is outputted. Then, when the kicker places a ball and intends to kick it, whether or not a penalty kick is successful, i.e., whether or not the mini game is successful, is determined (S206). Specifically, the table shown in FIG. 63 and a random number are used to determine whether or not the mini game is successful.

Then, it is determined whether or not a penalty kick shootout (mini game) is successful (S207). When the penalty kick shootout is successful (S207, YES), the accumulated number of points is counted up by one (S208), and the accumulated number of points is displayed (S209). Then, it is determined whether or not the mini game is run for a predetermined number of times (S210). Meanwhile, when the penalty kick shootout is unsuccessful (S207, NO)., the accumulated number of points is not counted up, and it is determined whether or not the mini game is played for a predetermined number of times (S210).

When the mini game is not played for a predetermined number of times (S210, NO), the process is carried out again from S203, and a next penalty kick shootout starts. When a penalty kick shootout is repeated for ten times or the like (S210, YES), the screen switches to a basic game screen (S211). After determining the number of the free games (S212), the accumulated number of points are reset (S213). Then, after activating the mini game end flag (S214), this routine ends.

(Help Process)

Figure 71:
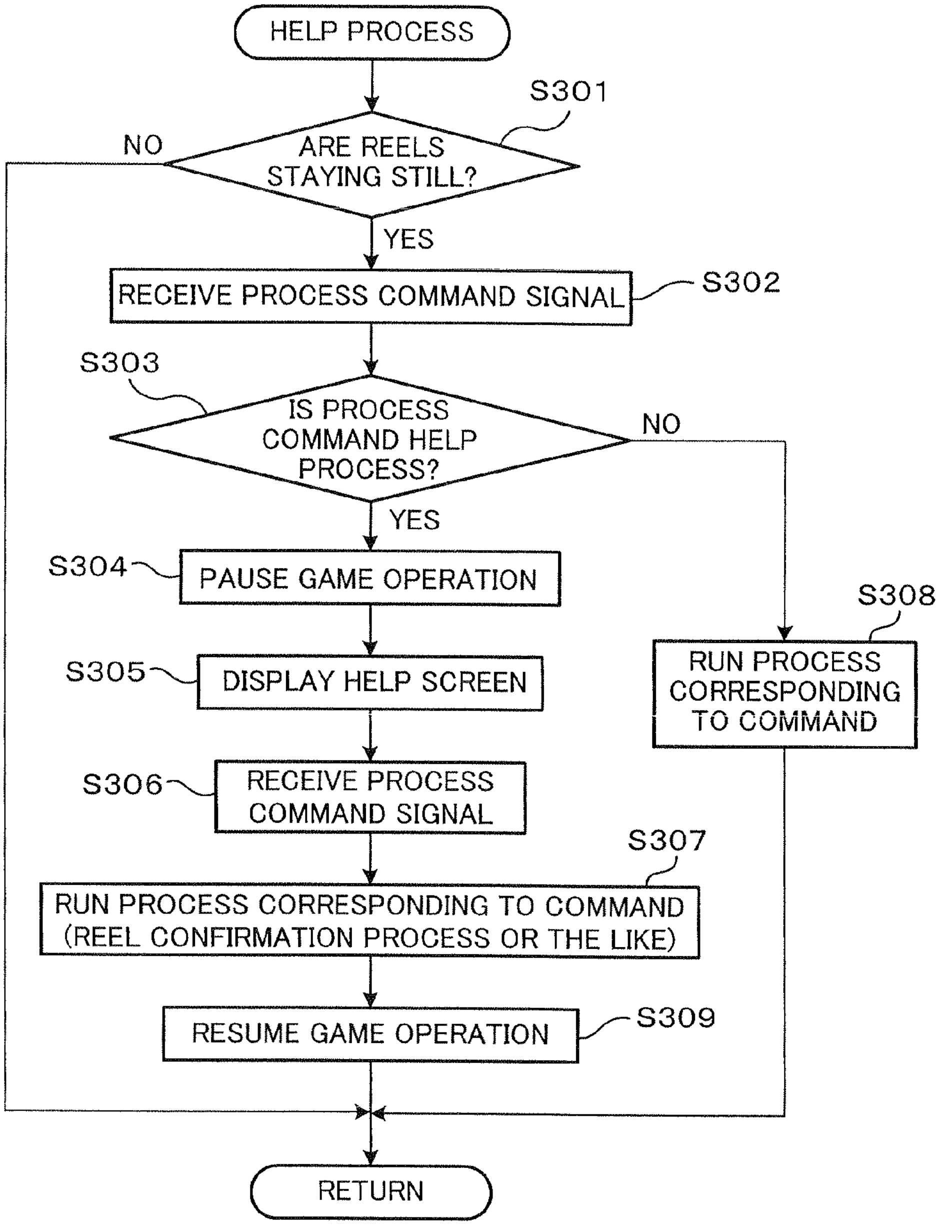
FIG. 71 is a flow chart of a help process.

The slot machine 1 is capable of carrying out a help process shown in FIG. 71 aside from a basic game process and a free game process. Specifically, it is determined whether or not the reels 30A to 30E are staying still (S301). When the reels 30A to 30E are not staying still due to an operation of a basic game or the like (S301, NO), the routine ends. In short, a help screen is not displayed. Meanwhile, when the reels 30A to 30E are staying still (S301, YES), an input signal outputted when a player presses the touch panel 69 shown in FIG. 57 is received as a process command signal (S302). Then, it is determined whether or not the process command signal is related to a help process (S303). When the process command signal is not related to a help process (S303, NO), a process corresponding to the command is carried out (S308). Afterwards, this routine ends.

Meanwhile, when the command is related to a help process (S303, YES), after a game process such as a basic game or the like is paused (S304), the display changes into a help screen. In other words, the help button frame 310 is displayed on the middle liquid crystal panel 5B, and various kinds of help item buttons including a reel confirmation button 304, a rule button 305 and a payout button 306 are displayed in the help button frame 310 (S305).

Then, reception of a next command signal is started (S306). For example, when a reel confirmation button 304 is pressed, an input signal is received as a process command signal starting a reel confirmation process (S307). After a game process is resumed (S309), this routine ends.

(Reel Confirmation Process)

Figure 72:
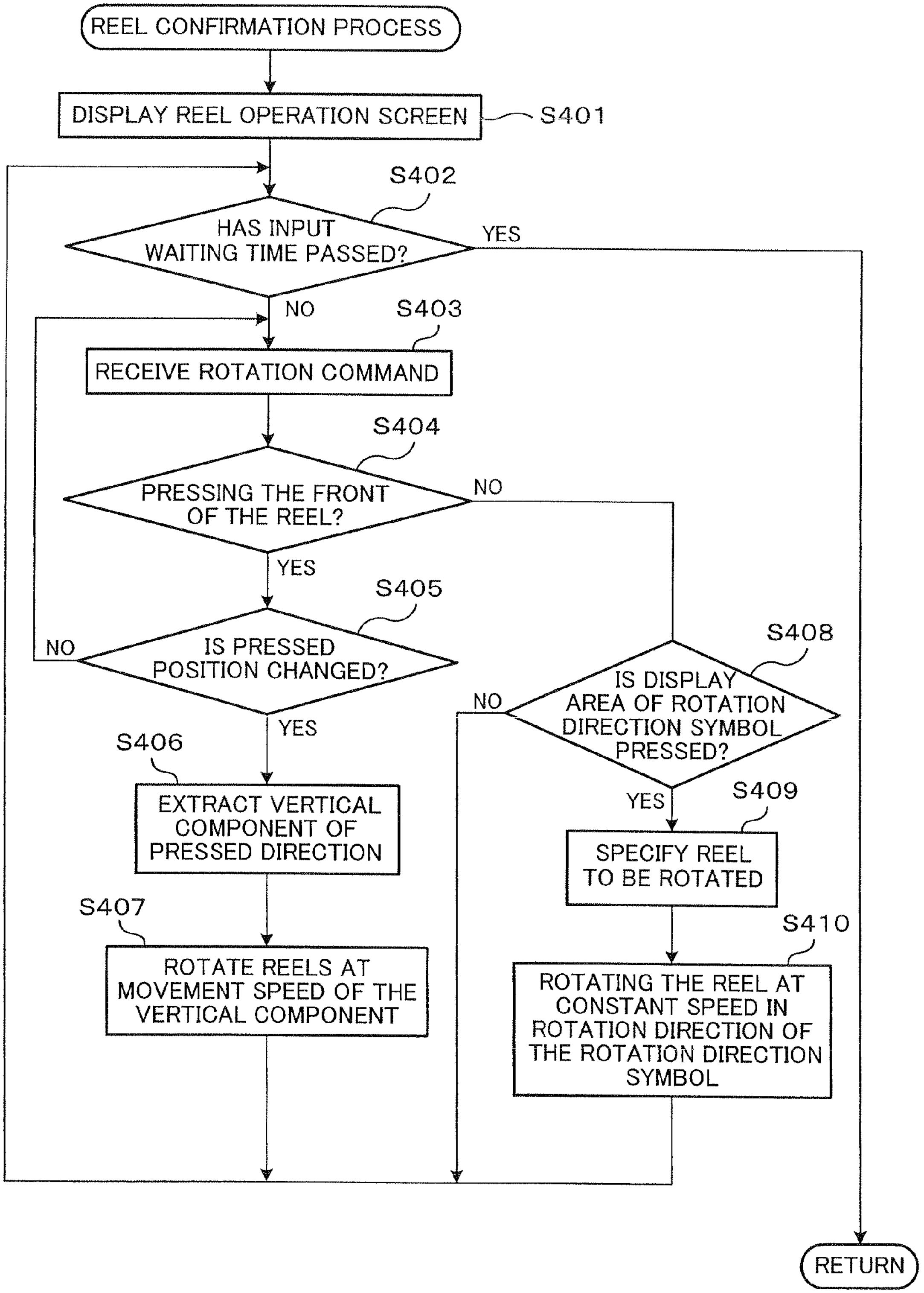
FIG. 72 is a flow chart of a reel confirmation process.

As shown in FIG. 72, when a reel confirmation process is carried out, a display switches to a reel operation screen shown in FIG. 63. In other words, direction symbols pointing upward or downward directions associated with each of the reels 30A to 30E are displayed (S401).

Then, it is determined whether or not an input waiting time has passed (S402). When the input waiting time has passed (S402, YES), this routine ends. When the input waiting time has not passed (S402, NO), whether or not a rotation command signal is inputted is determined. Specifically, as shown in FIG. 64, an input signal outputted in response to a press operation of the touch panel 69 is received. Based on a relation between the pressed position data included in the input signal to the front area data of the reels 30A to 30E, it is determined whether a front area of the reels 30A to 30E is pressed or not (S404).

When a front area of the reels 30A to 30E is pressed (S404, YES), it is determined that a rotation command signal is inputted. Then, it is determined whether a pressed position is changed or not (S405). When a pressed position is not changed (S405, NO), the process is carried out again from S403 and the reception of a rotation command signal is resumed until a pressed position is changed. On the other hand, when a pressed position is changed (S405, YES), it is determined that a flicking operation is carried out, and a vertical direction component of a press direction that is a flicking direction is extracted (S406).

Afterwards, movement speed of the vertical direction component is extracted and rotation speed of the reels 30A to 30E so as to make a movement speed of the symbols 301 is calculated. The reels 30A to 30E positioned below the pressed position are rotated at the rotation speed in a direction based on the press direction (S407). Thus, since the symbols 301 are moved while following the drag operation, a player can confirm the symbols 301, feeling as if s/he is directly touching and rotating the reels 30A to 30E.

Meanwhile, when a front area of the reels 30A to 30E is not pressed (S404, NO), it is determined whether a rotation command signal is inputted, based on the pressed position data and the display position data of the direction symbol 302 (S408). When the signal inputted is not a rotation command signal (S408, NO), this routine ends. Meanwhile, when the signal inputted is a rotation command signal (S408, YES), one or more of the reels 30A to 30E positioned above the pressed position are specified as rotation target(s), based on a command included in the rotation command signal, i.e., pressed position data (S409). Then, the one or more of the specified reels 30A to 30E rotate at a constant speed in a direction indicated by the direction symbol 302 (S410). Thus, a player is able to rotate the reels 30A to 30E in a direction indicated by the direction symbols 302 while she/he is pressing the direction symbols 302. Thus, a player is able to easily confirm, through the eyes, the symbols 301 on the reels 30A to 30E.

When a player releases the press operation, S402 is re-run and a standby state is made for an input standby period. When a press operation is resumed in an input standby period, the symbols 301 are moved by a drag operation in accordance with a pressed position, or the symbols 301 are moved by the direction symbol 302.

Although the reels 30A to 30E rotate at constant speed when the direction symbols 302 are pressed in the present embodiment, the present invention is not limited to this. In other words, the reels 30A to 30E may rotate at a speed corresponding to the pressed area of the direction symbols 302 when the direction symbols 302 are pressed. In this case, when a player presses the touch panel 69 with a strong pressing force, the reels 30A to 30E rotate at a high speed. On the other hand, when a player presses the touch panel 69 with a small pressing force, the reels 30A to 30E rotate at a constant speed. Thus, a player is capable of changing the rotation speed of the reels 30A to 30E.

(Quiz Process)

Figure 73:
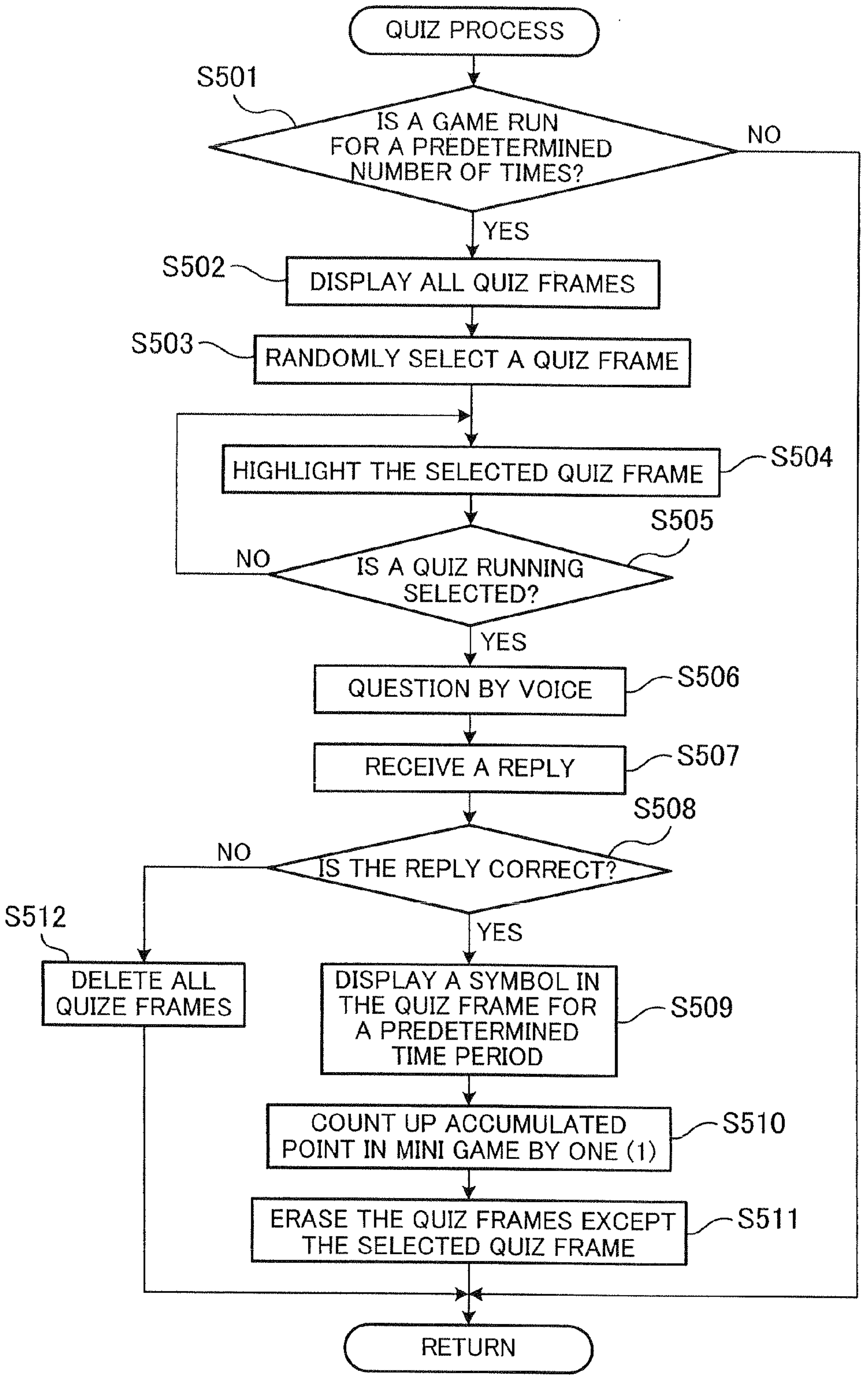
FIG. 73 is a flow chart of a quiz process.

As shown in FIG. 73, when a quiz process is run, it is determined whether a game is run for a predetermined number of times (S501). When a game is not run for a predetermined number of times (S501, NO), this routine ends. On the other hand, when a game is run for a predetermined number of times (S501, YES), a display switches to a quiz mode screen shown in FIG. 65. In short, quiz frames 307 corresponding to the respective reels 30A to 30E are displayed (S502).

Afterwards, the quiz frames 307 are subject to a random selection process (S503) and a selected quiz frame 307 is highlighted. In short, a mark of "?" is displayed in the quiz frame 307 (S504). The highlighted display of the quiz frame 307 is not particularly limited as long as a player can recognize that the selected quiz frame 307 is different from another quiz frame 307. For example, the highlighted display may be such a form of changing a color or brightness of the quiz frame 307 or changing a shape of the quiz frame 307.

Afterwards, it is determined whether a player selects running of a quiz (S505). That is, determining whether or not to run a quiz includes a first determination form of determining whether a player presses the quiz frame 307, and a second determination form of determining whether a player utters a voice to start a game, such as "Start a quiz." When it is not determined that running a quiz is selected in at least one of the first and second determination forms (S505, NO), a standby state for selection is continued.

When running a quiz is selected (S505, YES), a question is outputted from the speakers 23 as a form of a sound (S506). Afterwards, an answer to the question by the player in a form of the voice is received (S507). When the player answers the question with a form of a voice, and the voice is received, it is determined whether the answer is correct or not (S508). When the answer is not correct (S508, NO), this routine ends. On the other hand, when the answer is correct (S508, YES), a symbol 301 just after it disappeared from the display windows 7A to 7E is displayed in the quiz frame 307 for a predetermined period of time (S509).

Afterwards, the accumulated number of points in the mini game is counted up by one (1) (S510). Hence, by correctly answering a quiz question, a player is put in an advantageous state in the mini game. Accordingly, the player has a motivation to actively take part in the quiz. Afterwards, after a quiz frame 307 except the selected quiz frame 307 is erased (S511), this routine ends.

The detailed description of the present invention provided hereinabove mainly focused on characteristics thereof for the purpose of easier understanding; however, the scope of the present invention shall be construed as broadly as possible, encompassing various forms of other possible embodiments, and therefore the present invention shall not be limited to the above description. Further, the terms and phraseology used in the present specification are adopted solely to provide specific illustration of the present invention, and in no case should the scope of the present invention be limited by such terms and phraseology. Further, it will be obvious for those skilled in the art that the other structures, systems, methods or the like are possible, within the spirit of the invention described in the present specification. The description of claims therefore shall encompass structures equivalent to the present invention, unless otherwise such structures are regarded as to depart from the spirit and scope of the present invention. Further, the abstract is provided to allow, through a simple investigation, quick analysis of the technical features and essences of the present invention by an intellectual property office, a general public institution, or one skilled in the art who is not fully familiarized with patent and legal or professional terminology. It is therefore not an intention of the abstract to limit the scope of the present invention which shall be construed on the basis of the description of the claims. To fully understand the object and effects of the present invention, it is strongly encouraged to sufficiently refer to disclosures of documents already made available.

The detailed description of the present invention provided hereinabove includes a process executed on a computer or computer network. The above descriptions and expressions are provided to allow the one skilled in the art to most efficiently understand the present invention. A process carried out in or by respective steps yielding one result or blocks with a predetermined processing function described in the present specification shall be understood as a process with no self-contradiction. Moreover, an electrical or magnetic signal is transmitted/received and written in each step or block. In the process of each step or block, the signal is expressed as a bit, a value, a symbol, a character, a term, a number or the like. However, it should be noted that these are used for the convenience of explanation. Although the present specification occasionally personifies the processes carried out in the steps or blocks, these processes are essentially executed by various devices. Further, the other structures necessary for the steps or blocks are obvious from the above descriptions.

Fifth Embodiment

The following describes a fifth embodiment of a gaming machine according to the present invention with reference to FIGS. 74 to 90. Note that the numerals assigned to each member of the FIGures, and the symbols indicating a step in a flowchart (e.g., S), and the descriptions thereof are valid only in the present embodiment, and thus do not indicate members or steps of another embodiment.

(Overview of the Gaming Machine)

Figure 74:
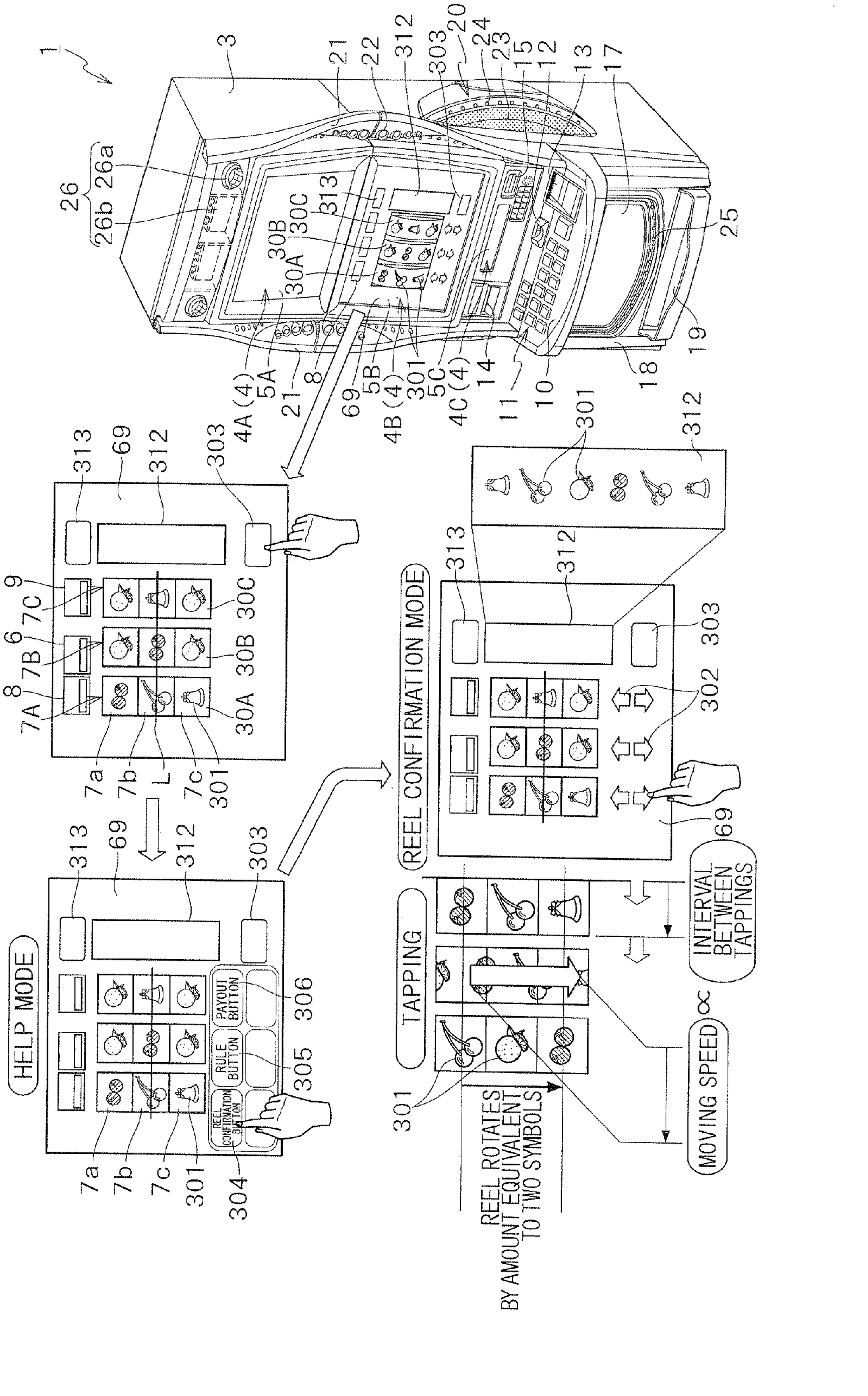
FIG. 74 is an explanatory drawing showing a playing method of a gaming machine.

As shown in FIG. 74, a gaming machine (slot machine 1) has a first structure where a mechanical reel rotates at a speed corresponding to an interval between rotation commands, by an amount equivalent to the number of symbols corresponding to the number of commands inputted.

Specifically, the gaming machine includes: a game requiring a player's bet; reels 30A, 30B, and 30C used in the game and mechanically driven to rotate, symbols 301 on the reels 30A to 30C, an input device which receives an input by the player, and a controller which is programmed to carry out the following steps of (a1) to (a4).

Specifically, the controller carries out the steps of: (a1) receiving an input inputted through the input device, (a2) when the input is a rotation command related to one out of the reels 30A to 30C, counting the number of rotation commands inputted; (a3) stopping the one reel (30A to 30C) after rotating the one reel (30A to 30C) by an amount equivalent to the number of rotation commands inputted; and (a4) when the rotation command is inputted more than once, rotating the one reel (30A to 30C) at rotation speed corresponding to an interval between rotation commands.

The gaming machine may be a machine such as a slot machine 1 or the like for one player, or multiple players. For instance, a gaming machine for multiple players may include several slot machines 1 which are connected to one another and are capable of carrying out data communication with one another.

In addition to a function of running a game with mechanical reels 30A to 30C, the gaming machine may have a function of running one or more games through another mechanical operation, an electrical operation, or through a combination of mechanical and electrical operations. An example of an electrically operated gaming machine is a slot machine 1 which displays an image of reels 30A to 30C on a display of liquid crystal or the like, and virtually rotates or moves reels 30A to 30C. Note that a slot machine 1 is shown as an example of a gaming machine in the present embodiment; however, the gaming machine is not limited to this.

An input device is not specifically limited as long as the input device enables a player's operation to input information therethrough. Specifically, an input device may be a touch panel 69 disposed on an upper surface of a central liquid crystal panel 5B, or an operation button 11 which enables an input by connection/disconnection of mechanical contact points. Moreover, an input device may be a device which enables input of information through a data communication using wireless signals such as sound, light, radio wave, or the like.

According to the above structure, when a player inputs a rotation command through the input device, the reel rotates by an amount equivalent to the number of symbols 301 corresponding to the number of rotation commands inputted. In short, the reels 30A to 30C are rotatable in response to an operation by the player. Thus, the player is able to successively confirm the symbols 301 actually arranged on the reels 30A to 30C when the reels 30A to 30C rotate in response to an operation by the player.

Further, when a rotation command is inputted more than once, one out of the reels 30A to 30C rotates at rotation speed corresponding to an interval between rotation command inputs. Thus, a player is able to change a moving speed of the symbols 301 as s/he intends. Thus, a moving speed of symbols 301 can be adapted according to a preference and confirmation skill of a player when a player successively confirms the symbols 301. As a result, a player is able to easily recognize a symbol arrangement on the reels 30A to 30C.

A gaming machine with such structures realizes a below mentioned confirmation method of a symbol 301. The confirmation method of a symbol 301 includes the steps of: receiving an input by the player; when the input is a rotation command related to one out of the reels 30A to 30C, counting the number of rotation commands inputted; stopping the one reel (30A to 30C) after rotating the one reel (30A to 30C) by an amount equivalent to the number of symbols corresponding to the number of rotation commands inputted; and when the rotation command is inputted more than once, rotating the reel at rotation speed corresponding to an interval between rotation command inputs.

More specifically, the gaming machine realizes a confirmation method of symbols 301 including: (a1) a first step of receiving an input inputted through the input device; (a2) a second step of, when the input is a rotation command related to a reel, counting the number of rotation commands inputted; (a3) a third step of stopping the reel after rotating the reel by an amount equivalent to the number of symbols corresponding to the number of rotation commands inputted; and (a4) a fourth step of, when the rotation command is inputted for more than once, rotating the reel at rotation speed corresponding to an interval between rotation command inputs.

In addition to the first structure, the gaming machine has a second structure where a rotation mode of the reels 30A to 30C is changed depending on whether the operation is tapping or continuous pressing.

Specifically, the gaming machine includes: a game requiring a player's bet; reels 30A to 30C used in the game and mechanically driven to rotate; symbols 301 on the reels 30A to 30C; an input device which receives an input by the player; and a controller that is programmed to operate in the following steps of (b1) to (b6).

Specifically, the controller carries out the steps of: (b1) receiving an input inputted through the input device; (b2) when the input is a rotation command related to one out of the reels 30A to 30C, determining whether the rotation command is inputted through tapping or continuous pressing; (b3) when the input is a rotation command related to the one reel (30A to 30C), rotating the one reel (30A to 30C) while the rotation command is being inputted; (b4) when the rotation command is inputted through tapping, start counting the number of rotation commands inputted; (b5) rotating the one reel (30A to 30C) by an amount equivalent to the number of symbols 301 corresponding to the number of rotation commands inputted; and (b6) when the rotation command is inputted more than once, rotating the one reel (30A to 30C) at rotation speed corresponding to an interval between rotation command inputs.

Here, "tapping" refers to an operation which stops inputting information immediately after starting the same through the input device. In a case that the input device is a mouse, clicking applies to tapping. Meanwhile, "continuous pressing" refers to an operation where an continuous input through the input device takes place without intermittence.

According to the above structure, when a player inputs a rotation command through an input device through tapping, one out of the reels 30A to 30C rotates by an amount equivalent to the number of symbols 301 corresponding to the number of rotation commands inputted. Meanwhile, when a player inputs a rotation command through the input device through continuous pressing, one out of the reels 30A to 30C rotates while the rotation command is being inputted. In short, the reels 30A to 30C are rotatable in response to a player's operation intermittently according to the number of rotation commands inputted, as well as continuously. Thus, a player is able to successively confirm the symbols 301 actually arranged on the reels 30A to 30C by the player him/herself carrying out an operation to rotate the reels. Thus, the player is able to easily recognize a symbol arrangement on the reels.

Further, when more than one rotation commands are inputted through tapping, one out of the reels 30A to 30C rotates at rotation speed corresponding to an interval between rotation command inputs. Thus, a player is able to change a moving speed of the symbols 301 as s/he intends. Thus, a moving speed of symbols 301 can be adapted according to a preference and confirmation skill of a player when a player successively confirms the symbols 301. As a result, a player is able to easily recognize a symbol arrangement.

In addition to the first structure, the gaming machine has a third structure where rotation directions of the reels 30A to 30C are changeable by a touch panel which is an input device.

Specifically, the gaming machine includes; a game requiring a player's bet; reels 30A to 30C, for use in the game, which are mechanically driven to rotate and whose rotation directions are switchable; symbols 301 on each of the reels 30A to 30C; a display capable of generating a video image; a touch panel 69 which is an input device disposed so that at least a part of a display area of the display is visible through the touch panel 69, for receiving an input through a press operation by the player; and a controller which is programmed to carry out the following steps of (c1) to (c5).

Specifically, the controller carries out the steps of: (c1) displaying video images of a direction symbol 302 indicating a rotation direction of the reels 30A to 30C. (c2) specifying an input position in the touch panel 69; (c3) when the input position corresponds to a display position of a direction symbol 302, determining that a rotation command related to one out of the reels 30A to 30C is inputted and counting the number of rotation commands inputted; (c4) stopping the one reel (30A to 30C) after rotating the one reel (30A to 30C) in a direction indicated by the direction symbol 302 by an amount equivalent to the number of symbols 301 corresponding to the number of rotation commands inputted; (c5) when the rotation command is inputted more than once, rotating the one reel (30A to 30C) in rotation speed corresponding to an interval between rotation command inputs.

Examples of an electrical structure are a liquid crystal display device, a CRT (cathode-ray tube) device, a plasma display device, or the like. Moreover, either one display or plural displays may be provided to the slot machine 1. As for a gaming machine for multiple players, a display may be provided to each slot machine 1, or a large screen display shared by all the slot machines 1 may be provided in addition to the slot machines 1. In the present embodiment, an upper liquid crystal panel 5A and a central liquid crystal panel 5B fall under the category of a display.

The above structure enables a player to input a rotation command related to one out of the reels 30A to 30C associated with the direction symbol 302 simply by pressing a specific area, of the input device, corresponding to a display position of the direction symbol 302, while a video image of the direction symbol 302 is visible on the display. Then, the one reel (30A to 30C) rotates in a direction corresponding to the direction symbol 302 by an amount equivalent to the number of symbols 301 corresponding to the number of rotation commands inputted. In other words, the reels 30A to 30C are rotatable in one direction or the other by an amount equivalent to the number of symbols 301 corresponding to the number of rotation commands inputted in response to a player's operation. Further, a rotation direction is shown as an image.

Thus, the player is able to successively confirm the symbols 301 actually arranged on the reels 30A to 30C by the player him/herself carrying out an operation to rotate the reels 30A to 30C. Thus, the player is able to easily recognize a symbol arrangement on the reels 30A to 30C. Moreover, with the gaming machine, the player who operates the reels 30A to 30C is able to easily determine a rotation direction of the reels 30A to 30C.

In addition to the first and the third structures, the gaming machine has a fourth structure which allows a video image of a symbol 301 to be displayed.

Specifically, the controller of the gaming machine is further programmed to carry out the step of: (c6) successively displaying, on the display, a video image of at least one of the symbols 301 on the reels 30A to 30C in sync with the rotation of one out of the reels 30A to 30C.

According to the above structure, a video image of at least one of the symbols 301 on the reels 30A to 30C is successively displayed on the display in sync with the rotation of the reels 30A to 30C. Thus, a symbol is also able to be confirmed with a video image of a virtual symbol 301. Hence, a player is able to recognize a symbol arrangement more easily.

The gaming machine has the first, second, third, and fourth structures. Specifically, the gaming machine includes; a game requiring a player's bet; reels 30A to 30C, for use in the game, which are mechanically driven to rotate and whose rotation directions are switchable; symbols 301 on each of the reels 30A to 30C; a display capable of generating a video image; an input device disposed so that at least a part of a display area of the display is visible through the input device, for receiving an input through a press operation by the player; and a controller which is programmed to carry out the following steps of (d1) to (d8).

Specifically, the controller carries out the steps of: (d1) displaying a video image of a direction symbol 302 indicating a rotation direction of the reels 30A to 30C; (d2) specifying an input position in the input device; (d3) when the input position corresponds to a display position of the direction symbol 302, determining that a rotation command related to one out of the reels 30A to 30C is inputted; (d4) when the rotation command is inputted through tapping, start counting the number of rotation commands inputted; (d5) rotating the one reel (30A to 30C) by an amount equivalent to the number of symbols 301 corresponding to the number of rotation commands inputted; (d6) when the rotation command is inputted more than once, rotating the one reel (30A to 30C) at rotation speed corresponding to an interval between rotation command inputs; (d7) when the rotation command is inputted through continuous pressing, rotating the one reel (30A to 30C) while the rotation command is being inputted; and (d8) successively displaying, on the display, a video image of at least one of the symbols 301 on the one reel (30A to 30C) in sync with the rotation of the one reel (30A to 30C)

The first, second, third, and fourth structures realize the effect of each structure.

(Game Controller 100)

Figure 75:
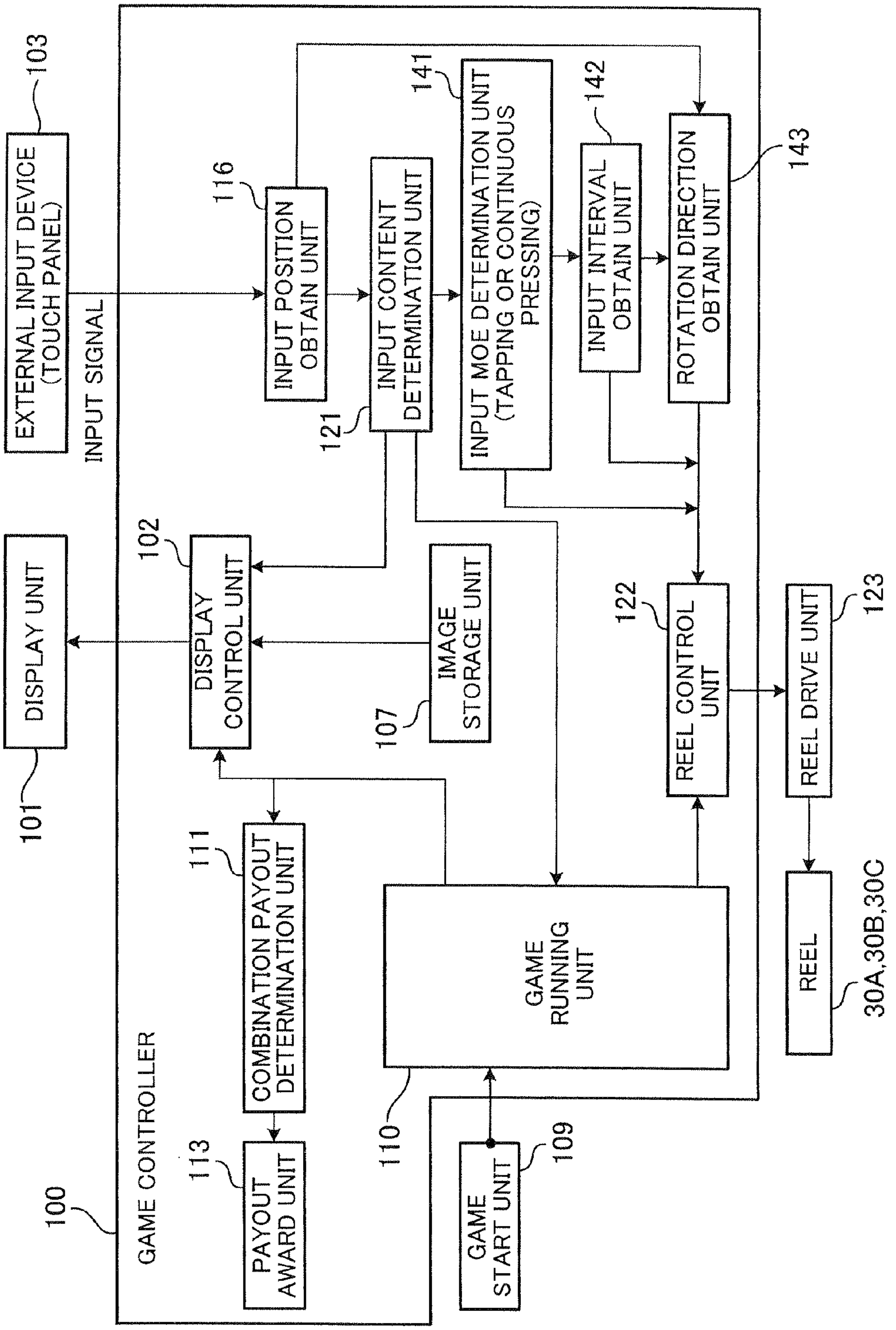
FIG. 75 is a block diagram of a gaming machine.

The game controller 100, as illustrated in FIG. 75, has an image storage unit 107 which stores image data such as a mini game screen, a help screen, or the like. The image storage unit 107 is accessed by a display control unit 102. The display control unit 102 reads out various kinds of image data of the image storage unit 107 under the control of a game running unit 110. The display control unit 102 then displays various kinds of images related to the game in the display unit 101. A specific displaying mode is mentioned below.

The game controller 100 is connected to the game start unit 109. The game start unit 109 has a function of outputting a game start signal in response to a player's operation. The game controller 100 has a game running unit 110, a combination payout determination unit 111, and a payout award unit 113. The combination payout determination unit 111 determines a payout according to a combination of symbols 301 rearranged on a payline L in a unit game. The payout award unit 113 awards each payout determined in the combination payout determination unit 111.

The game running unit 110 has a function of running various kinds of games such as a basic game, a mini game, a free game, or the like. Further, the game running unit 110 has a function of running a unit game where symbols 301 are rearranged, triggered by a start signal from the game start unit 109. Further, the game running unit 110 has a function of displaying, on the display unit 101, a video image of all the symbols on the reels 30A to 30C based on a result of a mini game.

A unit game starts from receiving a bet and includes a series of operations until a win or loss is resulted. For example, a unit game of the basic game includes a bet time to receive a bet, a game time to rearrange stopped symbols 301, and a payout time of a payout process to award payout.

A basic game is a main game which the gaming machine is originally intended for, and is run during an ordinary game mode. For instance in slot machine 1, a slot game which is run during an ordinary game mode is a basic game. Note that a slot game offers a chance of acquiring a game value according to symbols 301 stopped and displayed after variable displaying of the symbols 301. Examples of a game value are a medal, a coin, a game ball, money, paper money, a magnetic card, or the like.

A mini game is a sub game (special game) different from the main game of the gaming machine. The mini game is run in parallel with the basic game, or during a period of time while the basic game is not being played. In the present invention, for example, a penalty shootout game run during a slot game is a mini game. In the penalty shootout game, continuous penalty kicks may be automatically taken. This game may allow a player to operate kicking directions or strength of the ball.

A free game can be played for a predetermined number of times without betting a coin. A free game is a kind of bonus game. A bonus game is more advantageous than a basic game. Note that a bonus game is not specifically limited as long as it is an advantageous game for a player, that is, more advantageous than a basic game. Examples of a bonus game are, a state where more game media are obtainable than a basic game, a state where a possibility of obtaining a game medium is higher than that of the basic game, a state where fewer game media are consumed than a basic game, and so on.

The game controller 100 includes an input position obtain unit 116, an input content determination unit 121, a reel control unit 122, an input mode determination unit 141, an input interval obtain unit 142, and a rotation direction obtain unit 143. The input position obtain unit 116 is connected to an external input unit 103. The external input unit 103 is disposed separately from the game controller 100, and receives a signal input from outside by a player. Although a touch panel is used as an external input unit 103 in the present embodiment, the external input unit is not limited to this. The external input unit 103 maybe a mouse or an operation button.

The input position obtain unit 116 has functions of specifying an input position based on a signal from the external input unit 103; and outputting the obtained input position to the input content determination unit 121 and rotation direction obtain unit 143. The input content determination unit 121 has functions of: receiving an input position from the input position obtain unit 116 and determining a command based on a relation of the input position to the image display area in the display unit 101; and outputting a command signal corresponding to the command to the input mode determination unit 141 and the game running unit 110. More specifically, the input content determination unit 121 has a function of determining that, when the input position corresponds to a display position of a direction symbol, a rotation command related to a reel is inputted.

The input mode determination unit 141 has functions of: determining whether or not an input from the input content determination unit 121 is a rotation command related to one out of the reels 30A to 30C; when the input is a rotation command related to the one reel (30A to 30C), determining whether the rotation command is inputted through tapping or continuous pressing; when the rotation command is inputted through tapping, running the reel control unit 122 to stop the one reel (30A to 30C) after rotating the one reel (30A to 30C) by an amount equivalent to one symbol; counting the number of tapping, and running the reel control unit 122 to stop the one reel (30A to 30C) after rotating the one reel (30A to 30C) by an amount equivalent to the number of symbols 301 corresponding to the number of tapping; and when the rotation command is inputted through continuous pressing, running the reel control unit 122 to rotate the one reel (30A to 30C) while the rotation command is being inputted.

The input mode determination unit 141 has a function of, when a continuous pressing takes place, transmitting a command signal of continuously inputted rotation command to the input interval obtain unit 142. The input interval obtain unit 142 has a function of: determining rotation speed of the reels 30A to 30C corresponding to an interval between inputs of command signals of rotation commands; and running the reel control unit 122 to rotate the reels 30A to 30C at a determined rotation speed.

The rotation direction obtain unit 143 has functions of: determining whether a rotation direction of the reels 30A to 30C is upward direction or downward direction based on a input position outputted from the input position obtain unit 116; running the reel control unit 122 to rotate the reels 30A to 30C in the determined rotation direction.

The game running unit 110 operates according to a command of a command signal. For example, when the command signal is a help command, it carries out a help process such as displaying a help screen as an image at a predetermined timing. The game running unit 110 has functions of: displaying a video image of a direction symbol indicating a rotation direction of a reel; successively displaying, on the display unit 101, a video image of at least one symbol 301 on the reels 30A to 30C in sync with a rotation of the reels 30A to 30C. Further, the reel control unit 122 enters an operation mode when the command signal is a rotation command related to the reels, and has a function of outputting a drive signal to the reel drive unit 123 to rotate reels 30A to 30C. Specifically, the reel control unit 122 has a function of outputting a drive signal to rotate one out of the reels 30A to 30C in a rotation direction indicated by the associated direction symbol while the rotation command related to the one reel (30A to 30C) is being inputted.

Each block of the game controller 100 may be formed with hardware, or software as needed.

(Operation of Game Controller 100)

The following describes operations of the game controller 100. First, symbols 301 are arranged into a matrix of three columns and three rows in the display unit 101. When the game running unit 110 runs a unit game through an operation by the game start unit 109, the reels 30A to 30C rotate and stop to rearrange the symbols 301. Then, the combination payout determination unit 111 determines a payout in accordance with a combination of symbols 301 rearranged on a payline, and the payout determined is awarded by the payout award unit 113.

When a player carries out a press operation to the external input unit 103, an input signal showing an input position in the external input unit 103 is outputted to the input position obtain unit 116. After extracting input position data included in the input signal in the input position obtain unit 116, the input signal is outputted to the input content determination unit 121 and the rotation direction obtain unit 143. Afterwards, a command signified by the input signal is determined by comparing the input position data and a display area of the display unit 101. Then, a command signal including the command is respectively outputted to the game running unit 110 and the input mode determination unit 141.

When the game running unit 110 and the input mode determination unit 141 receive the command signal, they operate according to the command. When the command is a reel rotation command by a player's operation, it is determined, in the input mode determination unit 141, whether the input mode is tapping or continuous pressing. When the command is inputted through tapping, the number of tapping is counted. The reel control unit 122 is run to rotate the reels 30A to 30C by an amount equivalent to the number of symbols corresponding to the number of tapping.

In addition, when tapping is more than once, an interval between command signal inputs is measured in the input interval determination unit 142. Then, it is determined rotation speed of the reels 30A to 30C corresponding to the interval between inputs. The determined rotation speed is transmitted to the reel control unit 122, and is applied as rotation speed when the reels 30A to 30C rotate. Further, when an input position is transmitted from the input position obtain unit 116 to the rotation direction obtain unit 143, it is determined whether a rotation direction of the reels 30A to 30C is upward direction or downward direction, based on the transmitted input position. Then, the determined rotation direction is outputted to the reel control unit 122, and applied, in the reel control unit 122, as rotation speed when the reels 30A to 30C rotate.

On the other hand, when the rotation command is inputted through continuous pressing, the reels 30A to 30C rotate while the rotation command is being inputted. Further, the game running unit 110 successively displays, on the display unit 101, a video image of at least one of the symbols 301 on the reels 30A to 30C in sync with the rotation of the reels 30A to 30C. Thus, a player is able to confirm a symbol with a video image of a virtual symbol.

Further, the game running unit 110 runs a mini game when a predetermined condition is met in a game such as a basic game. When a predetermined condition is met as a result of a mini game, the game running unit 110 displays, on the display unit 101, a video image of all the symbols 301 on the reels 30A to 30C.

(Mechanical Structure)

Figure 76:
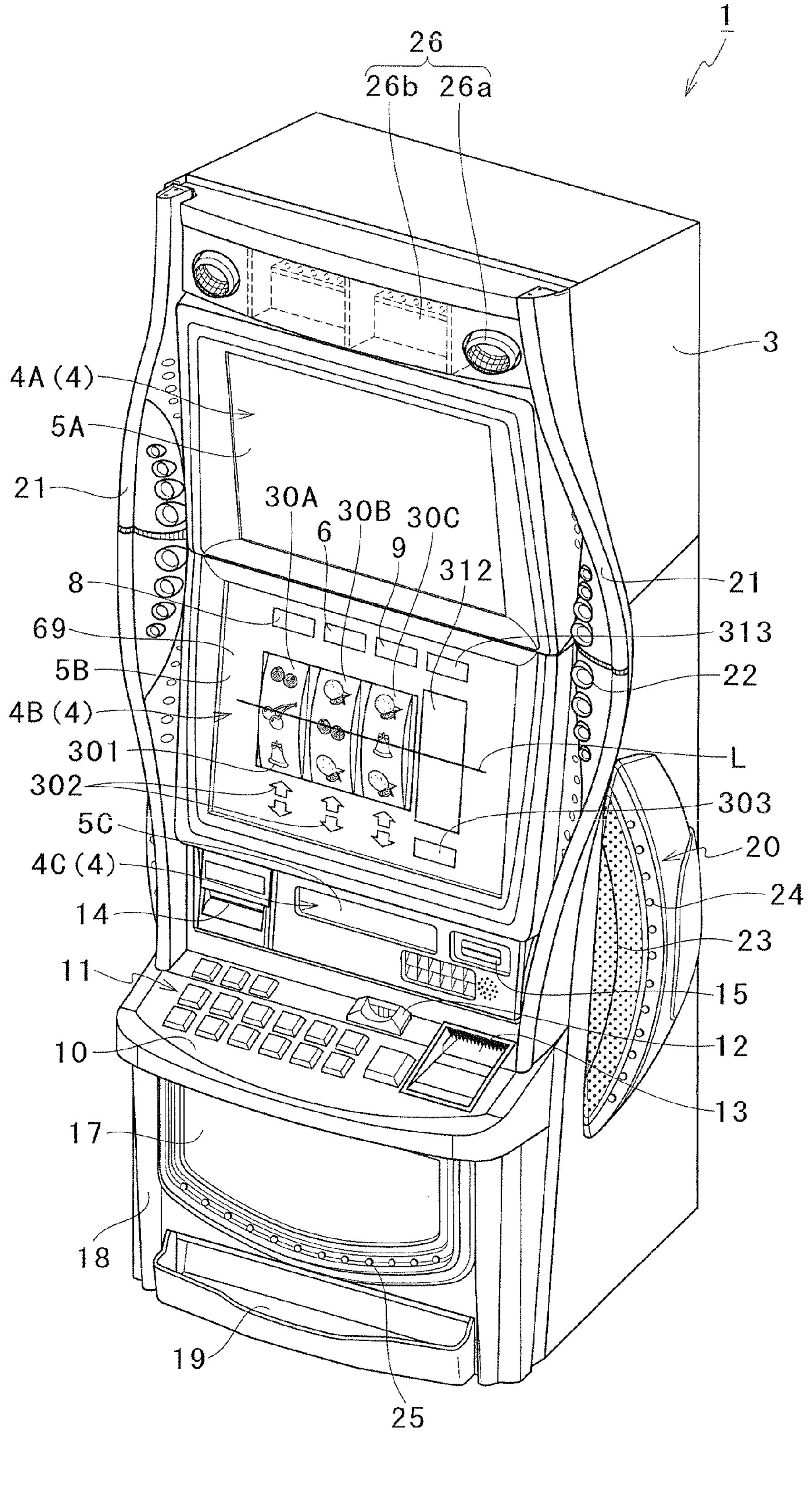
FIG. 76 is a perspective view showing an exterior of a gaming machine.

The following describes an embodiment where a gaming machine is specifically a slot machine 1. As shown in FIGS. 74 and 76, a slot machine 1 is an upright slot machine. The slot machine 1 has a cabinet 3 housing an electrical component and a mechanical component for running a predetermined game. The cabinet 3 has a longer length in the vertical direction. On the front side of the cabinet 3 facing a player is a display 4. The display 4 displays a basic game, a mini game, and game information based on a game operation by the player.

Specifically, the display 4 has an upper variable display unit 4A, a middle variable display unit 4B, and a lower variable display 4C. The upper variable display unit 4A has a transparent upper liquid crystal panel 5A. The upper liquid crystal panel 5A is fixed on a front door of the cabinet 3. The upper liquid crystal panel 5A displays a soccer game screen or a penalty kick standby screen during basic, mini, and free games. In other words, the upper liquid crystal panel 5A displays a soccer game screen when the mini game is not running, and a penalty kick standby screen while the mini game is running.

The middle variable display unit 4B is a rotation symbol display panel on which a player directs the eyes at all times. The middle variable display unit 4B has a transparent central liquid crystal panel 5B fixed on the front door of the cabinet 3. The central liquid crystal panel 5B has three display windows 7A, 7B, and 7C presenting an internal state to the outside. Inside the display windows 7A to 7C, are reels 30A to 30C respectively arranged.

Figure 84:
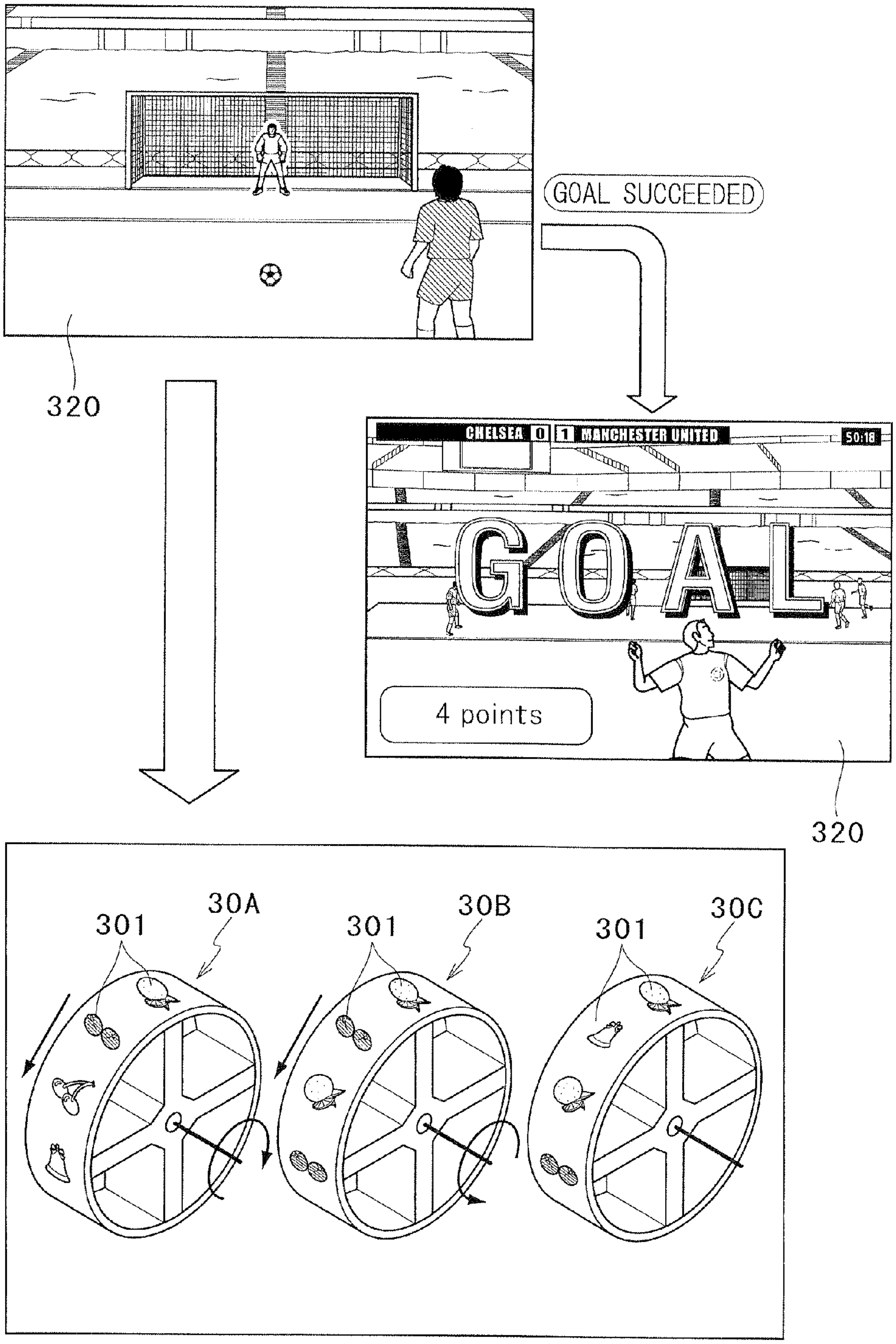
FIG. 84 is an explanatory drawing of a mini game screen.
Figure 85:
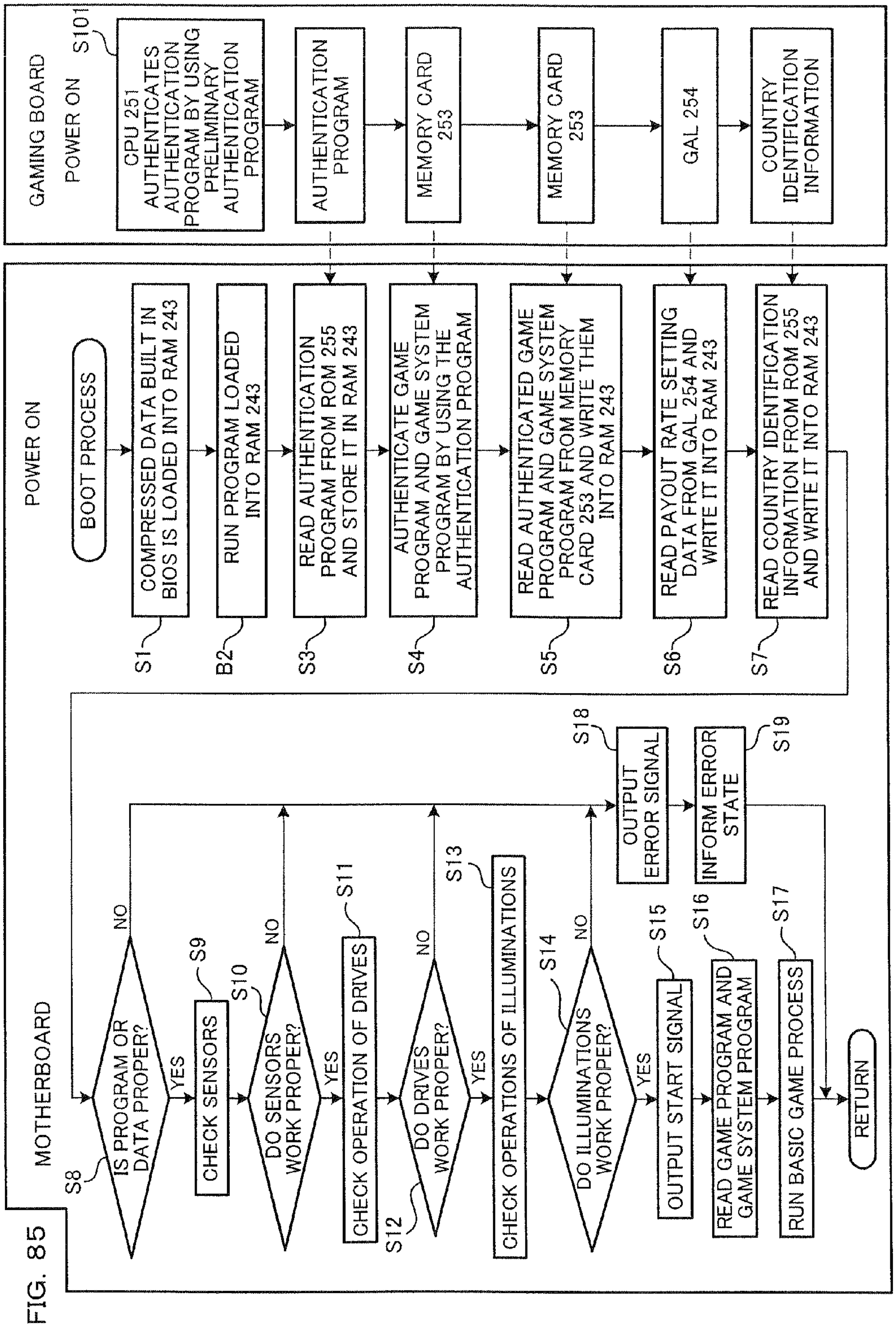
FIG. 85 is a flow chart of a boot process.

As shown in FIG. 84, each of the reels 30A to 30C has a circular cylindrical member 31, a rotation axis 32 arranged at the center of the cylindrical member 31, and a support member 33 which communicates the rotation axis 32 and the cylindrical member 31. The rotation axis 32 communicates with a rotation drive mechanism (not shown). The rotation drive mechanism enables the reels 30A to 30C to rotate and stop at a predetermined angle by providing a rotation drive force to the rotation axis 32 at any given timing.

On the outer cabinet surface of the cylindrical member 31 is a symbol column. The symbol column has a combination of symbols 301, including a "JACKPOT 7," a "BLUE 7," a "BELL," a "CHERRY," a "STRAWBERRY," a "PLUM," an "ORANGE," and an "APPLE." Further, the symbol column is set so that three successive symbols 301 on the symbol column are visible through associated one of the display windows 7A to 7C.

The reels 30A to 30C described above enable the symbol columns to respectively rotate in a vertical direction through mechanical drive. Thus, the slot machine 1 is capable of rearranging three columns and three rows of symbols 301 in display windows 7A to 7C by rotating and stopping the reels 30A to 30C.

The central liquid crystal panel 5B displays one payline L. The payline L horizontally crosses the three display windows, 7A to 7C. Note that the payline is for determining a combination of the symbols 301. In other words, when symbols 301 are rearranged on and outside the payline L, only a combination of the symbols 301 rearranged on the payline L is considered. When the combination is recognized as a winning combination, a process such as paying out a coin according to the winning combination or the like is carried out.

The central liquid crystal panel 5B displays a moving image effect or the like in an effect display unit when a player wins a game. The central liquid crystal panel 5B also displays, on its upper area, images of a bet display unit 6, a payout display unit 8, and a credit display unit 9. The entire surface of the central liquid crystal panel 5B is covered with the touch panel 69. The touch panel 69 is made of a transparent material including a transparent electrode or the like. Through the touch panel 69, an image of the each display unit displayed by the central liquid crystal panel 5B, and the symbols 301 on the reels 30A to 30C are visible. Thus, the images on the central liquid crystal panel 5B, and the symbols 301 on the reels 30A to 30C, are visible to the player through the touch panel 69.

In addition, the touch panel 69 has a function of outputting, as an input signal, two-dimensional position data of horizontal axis and vertical axis directions when receiving a pressing force. Hence, through the touch panel 69, the each display unit of the central crystal panel 5B and the reels 30A to 30C are visible to the player. Further, the touch panel 69 outputs, to a below mentioned main body PCB 260, an input signal including information indicated by the each display unit when the player presses the each display unit.

The lower variable display unit 4C has a lower liquid crystal panel 5C which displays a point stored in a card, or a point of a game. A number displayed on the lower liquid crystal panel 5C is based on a result displayed of the middle variable display unit. When a winning combination is formed on the middle variable display unit 4B, a point based on the winning combination is added to the game point/s displayed on the lower liquid crystal panel 5C. On the left side of the lower liquid crystal panel 5C is a ticket printer 14. On the right side of the lower liquid crystal panel 5C is a card reader 15.

Below the lower variable display unit 4C is an operation table 10. The operation table 10 projects forward from the front surface of the cabinet 3. The operation table 10 has an operation button 11. The operation button 11 is structured with, for instance, a bet button, a collect button, a start button, a stop button, or the like. The operation table 10 also has a coin insertion slot 12 and a bill insertion slot 13. With the above structure, the operation table 10 functions as an operation unit enabling a player to carry out game related operations.

Below the operation table 10 is a waist panel 17. The waist panel 17 is a plastic panel on which an image related to a game is printed. The waist panel 17 is fixed on a lower front door 18, and is illuminated by a cold cathode tube. Below the waist panel 17 is a coin receiving portion 19. The coin receiving portion 19 is formed so as to store the coins paid out according to the game result.

The cabinet 3 has a light emitting section 20. The light emitting section 20 includes light emitting components such as lamps, LED, or the like. The light emitting section 20 is formed and disposed so as to surround a game area including the upper variable display unit 4A, the middle variable display unit 4B, the lower variable display unit 4C, and the operation table 10.

The lamps in the light emitting section 20 are a side lamp 22, a speaker lamp 24, an under lamp 25, a top lamp 26, or the like. The side lamps 22 are disposed to inclined units 21. These inclined units 21 are respectively disposed to the left and the right sides of the front surface side of the cabinet 3.

The inclined units 21 are projected in bow shapes, and are disposed so as to sandwich the upper variable display unit 4A, the middle variable display unit 4B, the lower variable display unit 4C.

The speaker lamps 24 are projected sideways at the right and left ends of the cabinet 3 adjacent to the operation table 10. The speaker lamps 24 are provided on arc-shaped speakers 23, and are aligned along edges of the speakers 23. The under lamps 25 are provided on the lower front door 18, and are aligned along a lower edge of the waist panel 17. The top lamp 26 is provided above the upper variable display unit 4A. The top lamps 26 has power lamps 26*a* arranged at both sides respectively and a band-type lamp 26*b* horizontally arranged between the power lamps.

(Electrical Structure)

Figure 77:
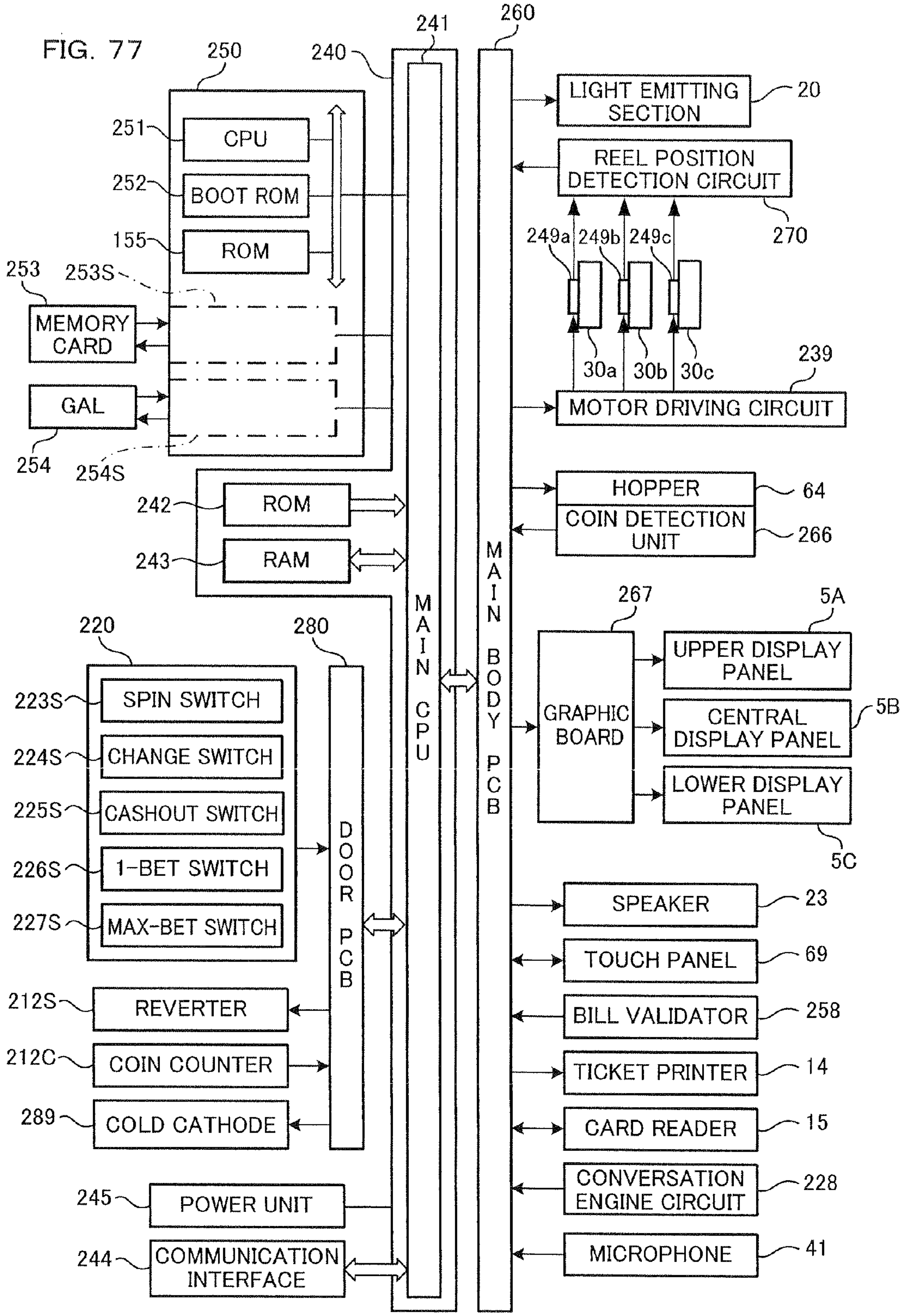
FIG. 77 is a block diagram showing a control circuit of a gaming machine.

FIG. 77 is a block diagram showing an electrical structure of the entire slot machine 1. A control unit having a controller 100 shown in FIG. 75 is disposed inside the cabinet 3. As shown in FIG. 77, the control unit has such components as a motherboard 240, a main body PCB (Printed Circuit Board) 260, a gaming board 250, a door PCB 280, various kinds of switches, a sensor, or the like.

The gaming board 250 has a CPU (Central Processing Unit) 251, a ROM 255, a boot ROM 252, a card slot 253S corresponding to a memory card 253, and an IC socket 254S corresponding to a GAL (Generic Array Logic) 254, connected to one another through an internal bus.

The memory card 253 stores a game program and a game system program. The game program includes a stop symbol determination program. The stop symbol determination program is for determining the symbols 301 to be stopped on the payline L (a code number corresponding to the symbols). The stop symbol determination program includes symbol weighing data corresponding to each of kinds of payout rates (e.g. 80%, 84%, and 88%). The symbol weighting data shows a corresponding relationship between a code number of each symbol and one or more random number values in a predetermined value range (0 to 256), for each of the display windows 7A to 7C.

The memory card 253 stores a program which samples a random number. The random number sample program is read out by a RAM 243 in time of carrying out a game running process, a bonus game process, or the like. This program is run by a main CPU 241. A random number is sampled by a program in the present embodiment; however, the method of sampling a random number is not limited to this. For example, it is possible to adopt a structure including: a random number generating circuit which generates a random number (random numbers) of a certain range, and a sampling circuit which samples a random number from the random number(s) generated by the random number generating circuit.

A payout rate is set according to the payout rate setting data outputted from the GAL 254. Symbols to be stopped are determined according to the symbol weighed data corresponding to the payout rate.

The memory card 253 stores various kinds of data used in the game program and the game system program. For example, the data showing a relationship between the random number range and the symbols 301 displayed in the display windows 7A to 7C shown in FIG. 74, is stored as a table in the memory card 253. The data is transferred to the RAM 243 of the motherboard 240 in time of running the game program.

The memory card 253 is attachable/detachable to/from the card slot 253S. The card slot 253S is connected to the motherboard 240 by an IDE bus. Thus, the gaming board 250 enables a player to change the types and contents of games to be run in the slot machine 1 through an switching operation including the steps of removing the memory card 253 from the card slot 253S, writing a different game program and a game system program in the memory card 253, and inserting the memory card 253 to the card slot 253S.

The game program includes a program according to a game progress, and a program for shifting into a bonus game. The game program also includes image data and sound data outputted during a game.

The GAL 254 has input ports and output ports. When data is inputted to the input ports, the GAL 254 outputs, from the output ports, the data corresponding to the inputted data. The data outputted from the output ports is the above-mentioned payout rate setting data.

The GAL 254 is attachable/detachable to/from the IC socket 254S. The IC socket 254S is connected to the motherboard 240 by a PCI bus. Thus, the gaming board 250 enables the payout rate setting data outputted from the GAL 254 to be changed through an switching operation including the steps of removing the GAL 254 from the IC socket 254S, rewriting a program stored in the GAL 254, and attaching the GAL 254 to the IC socket 254S.

The CPU 251, ROM 255, and boot ROM 252 connected to one another by an internal bus, are connected to the motherboard 240 by a PCI bus. The PCI bus transmits a signal between the motherboard 240 and the gaming board 250. The PCI bus also supplies power to the gaming board 250 from the motherboard 240. The ROM 255 stores country identification information and an authentication program. The boot ROM 252 stores a preliminary authentication program, a program for the CPU 251 to start the preliminary authentication program (boot code), or the like.

An authentication program is for authenticating a game program and a game system program (modification check program). The authentication program is for confirming and authenticating that the game program or the game system program is not modified. In other words, the authentication program is described in accordance with the authentication procedure of the game program and the game system program. A preliminary authentication program is for authenticating the authentication program. The preliminary authentication program is described in accordance with a procedure for verifying that the authentication program to be authenticated is not falsified. In short, the preliminary authentication program authenticates the authentication program.

The motherboard 240 has a main CPU 241(controller), a ROM (Read Only Memory) 242, a RAM (Random Access Memory) 243, and a communication interface 244.

The main CPU 241 functions as a controller to control the entire slot machine 1. Specifically, the main CPU 241 controls (i) when the start button is pushed after a credit is bet, to output a command signal to rotate and stop the reels 30A to 30C to start a variable display in the display windows 7A to 7C, (ii) after a variable display has started, to determine the symbols to be stopped, and (iii) to still-display the determined symbols in the display windows 7A to 7C.

In other words, the main CPU 241 functions as an arrangement controller for carrying out an arrangement control by which, among various kinds of symbols 301, the symbols to be stopped in a symbol matrix are selected and determined, and then scrolling of the symbols is stopped so that the determined symbol matrix appears. With this function, symbols 301 displayed after being scrolled by a rotation of the reels 30A to 30C on the central liquid crystal panel 5B are rearranged in a new symbol matrix.

The ROM 242 stores a program such as a BIOS (Basic Input/Output System) or the like run by the main CPU 241. The ROM 242 also stores data which is permanently used.

When the main CPU 241 runs the BIOS, each peripheral device is initialized, and a reading process via the gaming board 250 for a game program and a game system program stored in the memory card 253, is started. The RAM 243 stores data and a program used when the main CPU 241 carries out the process.

The communication interface 244 is for communicating, through a telecommunication circuit, with a host computer or the like provided in the arcade. The main body PCB (Printed Circuit Board) 260 and the door PCB 280 are respectively connected with the motherboard 240 through a USB (Universal Serial Bus). Moreover, the motherboard 240 is connected to a power unit 245. The power unit 245 supplies power to the motherboard 240 to boot the main CPU 241 of the motherboard 240, and supplies power to the gaming board 250 through the PCI bus to boot the CPU 251.

The main body PCB 260 and the door PCB 280 are connected to an equipment or a device which generates an input signal to be inputted into the main CPU 241, and an equipment or a device whose operation is controlled by a control signal outputted from the main CPU 241. The main CPU 241 runs a game program and a game system program stored in the RAM 243 in accordance with the input signal inputted to the main CPU 241. Thus, the main CPU 241 is capable of carrying out various kinds of processes such as storing a result of a calculation process to the RAM 243, and controlling each equipment and device by transmitting a control signal to the each equipment and device.

The main body PCB 260 is connected to the light emitting section 20, a hopper 64, a coin detection unit 266, a graphic board 267, the speakers 23, a bill validator 258, the ticket printer 14, and the card reader 15. The light emitting section 20 has lamps including the side lamps 22, the speaker lamps 24, the under lamps 25, the top lamps 26 and an LED.

Turning on and off the light emitting section 20 is controlled according to a control signal outputted by the main CPU 241. The hopper 64 is disposed in the cabinet 3, and pays out a predetermined number of coins from a coin payout opening 16 to the coin receiving portion 19 in accordance with a control signal outputted by the main CPU 241. The coin detection unit 266 is disposed in the coin payout opening 16. The coin detection unit 266 outputs an input signal to the main CPU 241 upon detecting that a predetermined number of coins have been paid out from the coin payout opening 16 the unit 266.

The coin detection unit 266 counts the number of coins paid out by the hopper 64, and outputs the data of the resulting number to the main body PCB 260. According to the data of the number of coins paid out (by the hopper 64), the main body PCB outputs a signal to notify completion of payout of a coin or coins to the main CPU 241, when a set number of coins are paid out.

Figure 78:
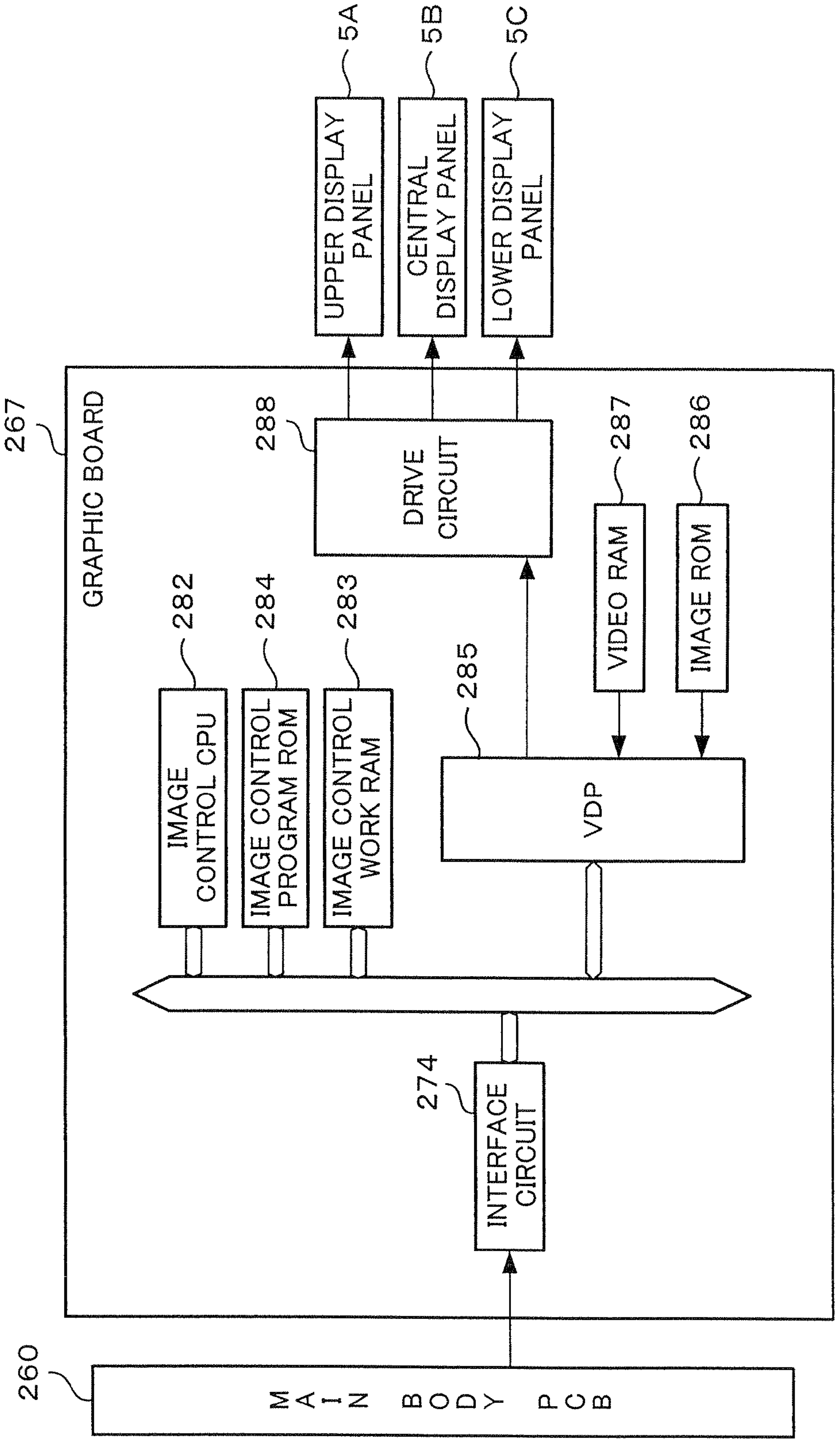
FIG. 78 is a block diagram of a graphic board.

The graphic board 267 controls display of an image on the upper liquid crystal panel 5A, the central liquid crystal panel 5B, and the lower liquid crystal panel 5C, in accordance with a control signal outputted from the main CPU 241. As shown in FIG. 78, the graphic board 267 has an interface circuit 281, an image control CPU 282, an image control work RAM 283, an image control program ROM 284, a VDP (Video Display Processor) 285, an image ROM 286, a video RAM 287, and a drive circuit 288.

The image control CPU 282 receives a control signal outputted from the main CPU 241 via the interface circuit 281. In response to the control signal from the main CPU 241, the image control CPU 282 runs the image control program stored in the image control program ROM 284 to determine an image to be displayed on the upper liquid crystal panel 5A, the central liquid crystal panel 5B, and the lower liquid crystal panel 5C.

The image control program ROM 284 stores various kinds of selection tables and an image control program related to displays on the upper liquid crystal panel 5A, the central liquid crystal panel 5B, and the lower liquid crystal panel 5C. The image control work RAM 283 functions as a temporary storage means when the image control CPU 282 runs the image control program.

The VDP 285 forms image data corresponding to a determination made in the image control CPU 282. The image ROM 286 stores dot data for forming an image such as a symbol 301. The video RAM 287 functions as a temporary storage means when an image is formed in the VDP 285. The drive circuit 288 outputs image data formed by the VDP 285 to the upper liquid crystal panel 5A, the central liquid crystal panel 5B, and the lower liquid crystal panel 5C. The image data used when the VDP generates image data is stored in the memory card 253, and is included in the game program read by the memory card 253 and temporarily stored in the RAM 243.

As shown in FIG. 77, the speakers 23 generate various kinds of sound effects when various kinds of effects are applied according to an output signal from the main body PCB 260. The bill validator 258 carries out at least the following processes: a process of reading an image of a bill, a process of determining whether or not the bill is genuine, and a process of, when the bill is genuine, accepting the bill into the cabinet 3. Further, when the bill validator 258 accepts a genuine bill, the bill validator outputs an input signal indicating the value of the accepted bill to the main CPU 241. The main CPU 241 stores, in the RAM 243, a credit/credits corresponding to the value of paper money transmitted by the input signal.

According to a control signal outputted by the main CPU 241, the ticket printer 14 prints a barcode on a ticket, and then outputs the ticket with a barcode. The barcode contains encoded data of credits stored in the RAM 243, date and time, an identification number of the slot machine 1, or the like. The card reader 15 reads data from a smart card and transmits the data to the main CPU 241. In addition, the card reader 15 writes data into a smart card according to a control signal from the main CPU 241.

The main body PCB 260 is connected to a motor driving circuit 239 and a reel position detection circuit 270. The motor driving circuit 239 is connected to stepping motors 249*a*, 249*b*, and 249*c*. With the pulsed power supplied by the motor driving circuit 239, the stepping motors 249*a* to 249*c* respectively rotate the reels 30A to 30C at any given rotation speed, and position the reels 30A to 30C.

The reel position detection circuit 270 receives a pulse signal from a reel rotation sensor. In response to the pulse signal, the reel position detection circuit 270 outputs, to the main body PCB 260, a reel position signal to detect a position of the each reel 30A to 30C. The reel position signal is assigned to a code number of a below mentioned data table for a symbol, so as to enable detection of a rotation angle of the reels 30A to 30C, and rearranging of specified symbols 301 in specific positions.

The door PCB 280 is connected to a control panel 220, a reverter 212S, a coin counter 212C, and a cold cathode tube 289. In the control panel 220 are a switch 223S corresponding to the start button, a change switch 224S corresponding to a change button, a cash-out switch 225S corresponding to a cash-out button, a 1-bet switch 226S corresponding to a 1-bet button, and a maximum bet switch 227S corresponding to a maximum bet button. Each of the switches 223S to 227S outputs an input signal to the main CPU 241 when the player presses corresponding one of the buttons.

The coin counter 212C is disposed inside the coin insertion slot 12, and validates whether or not the coin inserted by the player to the coin insertion slot 12 is genuine. Anything other than a genuine coin is discharged to the coin receiving tray 16. The coin counter 212C outputs an input signal to the main CPU 241 when detecting a genuine coin.

The reverter 212S operates in accordance with the control signal outputted by the main CPU 241. The reverter 212S distributes a coin recognized as genuine by the coin counter 212C to a cash enclosure (not shown) or the hopper 64 disposed inside the slot machine 1. That is, when the hopper 64 is filled with coins, the genuine coin will be distributed to a cash enclosure by the reveter 212S. To the contrary, when the hopper 64 is not filled with coins, the genuine coin will be distributed to the hopper 64. The cold cathode 289 functions as a backlight mounted to rear sides of the upper liquid crystal panel 5A, the central liquid crystal panel 5B, and the lower liquid crystal panel 5C. The cold cathode 289 lights up in accordance with a control signal outputted by the main PCU 241.

(Symbol, Combination, or the Like)

The symbols 301 displayed in the display windows 7A to 7C of the slot machine 1 forms symbol columns, each of which having twenty-two symbols. As shown in FIG. 79, one of code numbers 0 to 21 is assigned to each of the symbols constituting each column. Each of the symbol columns is constituted with a combination of symbols of "JACKPOT 7," "BLUE 7," "BELL," "CHERRY," "STRAWBERRY," "PLUM," "ORANGE," and "APPLE."

Three successive symbols in each of the symbol columns are respectively displayed (arranged) on an upper stage 7*a*, a middle stage 7*b*, and a lower stage 7*c* of each of the display windows 7A to 7C, to form a symbol matrix of three columns and three rows. When the start button is pressed to start a game after the bet button is pressed, the symbols forming a symbol matrix start scrolling. This scrolling of the symbols stops (rearrangement) after a predetermined period from the beginning of the scrolling.

Various kinds of winning combinations are set in advance for each symbol. A winning combination is a combination of stopped symbols on the payline L which puts the player in an advantageous state. Examples of an advantageous state include: a state where coins according to a winning combination is paid out, a state where the number of coins to be paid out is added to a credit, a state where a bonus game is started.

For example, a combination on the payline L including an "APPLE" symbol serves as a bonus trigger which causes a transition of a gaming mode from a basic game to a bonus game. Further, when a combination including a "CHERRY" symbol is formed on the payline L in a basic game, twenty coins (values) are paid out for one bet. When a combination including a "PLUM" symbol is formed on the payline L in a basic game, five coins are paid out for one bet.

Here, a bonus game is a gaming state which provides a larger advantage than a base game. Note that another bonus game may be employed in combination, provided that the other bonus game is advantageous to a player, i.e., the other bonus game is more advantageous than a basic game. For example, a bonus game may be a state where more coins are possibly obtained than the basic game, a state where the probability of obtaining coins is higher than in the basic game, a state where fewer coins are consumed than the basic game, free game, or the like.

The following describes each table stored in the ROM 242 of a main control board 71, with reference to FIGS. 80 and 81.

(Payout Control Table)

FIG. 80 is a payout control table which controls a payout awarded in accordance to a winning combination. The payout control table is stored in the ROM 242 of the main control board 71, and a piece of information of a payout is assigned to a type of winning combination. For example, a payout assigned to a winning combination including a "BELL" symbol is "10." A payout assigned to a winning combination including a "BLUE 7" is "40." Note that payouts for a basic game and a free game are set to be the same in the present embodiment.

(Free Game Quantity Table)

FIG. 81 is a table referred to when determining the number of free games to be played for the number of points acquired in a mini game of a basic game. The points awarded in a mini game correspond to the number of free games to be played in the free game quantity table. For example, when the accumulated points are 4, the free games are run eighty (80) times. When the accumulated points are 8, the free games are run a hundred sixty (160) times. Thus, by succeeding in a mini game in a basic game and acquiring many points, it is possible to continue a free game for a long period of time.

(Display State)

The following specifically describes an example of a display state of the display 4 in an operation of the slot machine 1.

(Help Mode Screen)

Figure 82:
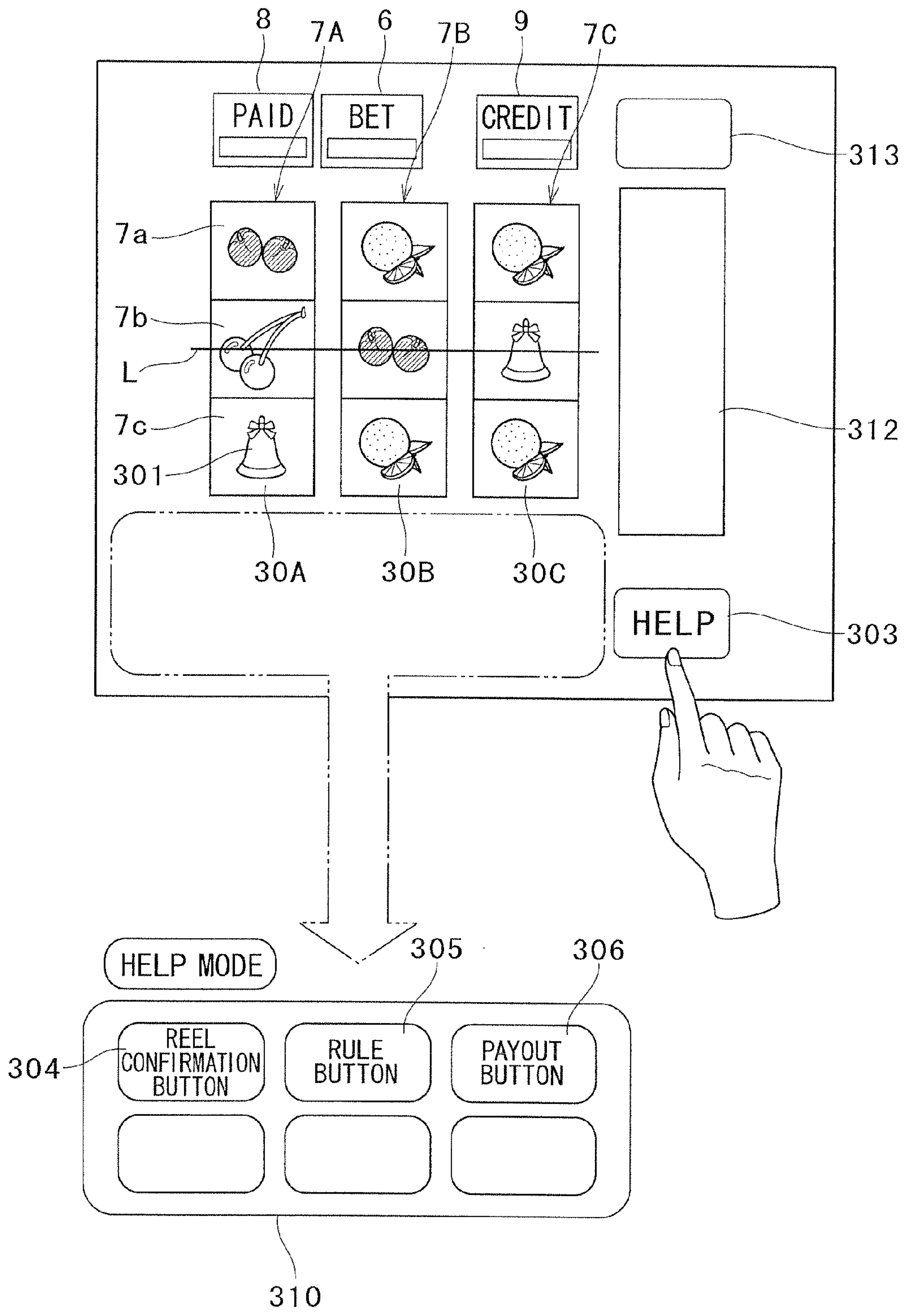
FIG. 82 is an explanatory drawing of a display screen in a help mode.

FIG. 82 shows a display state of the display 4 when modes switched from a game mode to a help mode. That is, the bet display unit 6, the payout display unit 8, and the credit display unit 9 are displayed in the upper part of the central liquid crystal panel 5B constituting a part of the display 4. In addition, in the center of the central liquid crystal panel 5B, window frames of the display windows 7A to 7C are displayed. When a basic game or a free game starts, all the symbols 301 on the reels 30A to 30C visible through the display windows 7A to 7C are variably displayed.

Moreover, in the lower part of the central liquid crystal panel 5B, a help button 303 is displayed. The help button 303, upon being pressed, activates the help mode. The help mode provides a player with troubleshooting information regarding a game.

A help mode screen has a help button frame 310. The help button frame 310 is provided to the right corner part of the help mode screen. The help button frame 310 has a reel confirmation button 304, a rule button 305, and a payout button 306 inside. The reel confirmation button 304 is for activating a reel confirmation mode which enables a player to confirm the symbols 301. The rule button 305 is for activating a rule guidance mode which provides a player with an introduction to a game or guidance on a method of playing a game. The payout button 306 is for activating a payout guidance mode which provides a player with guidance on payouts.

(Reel Confirmation Mode Screen)

Figure 83:
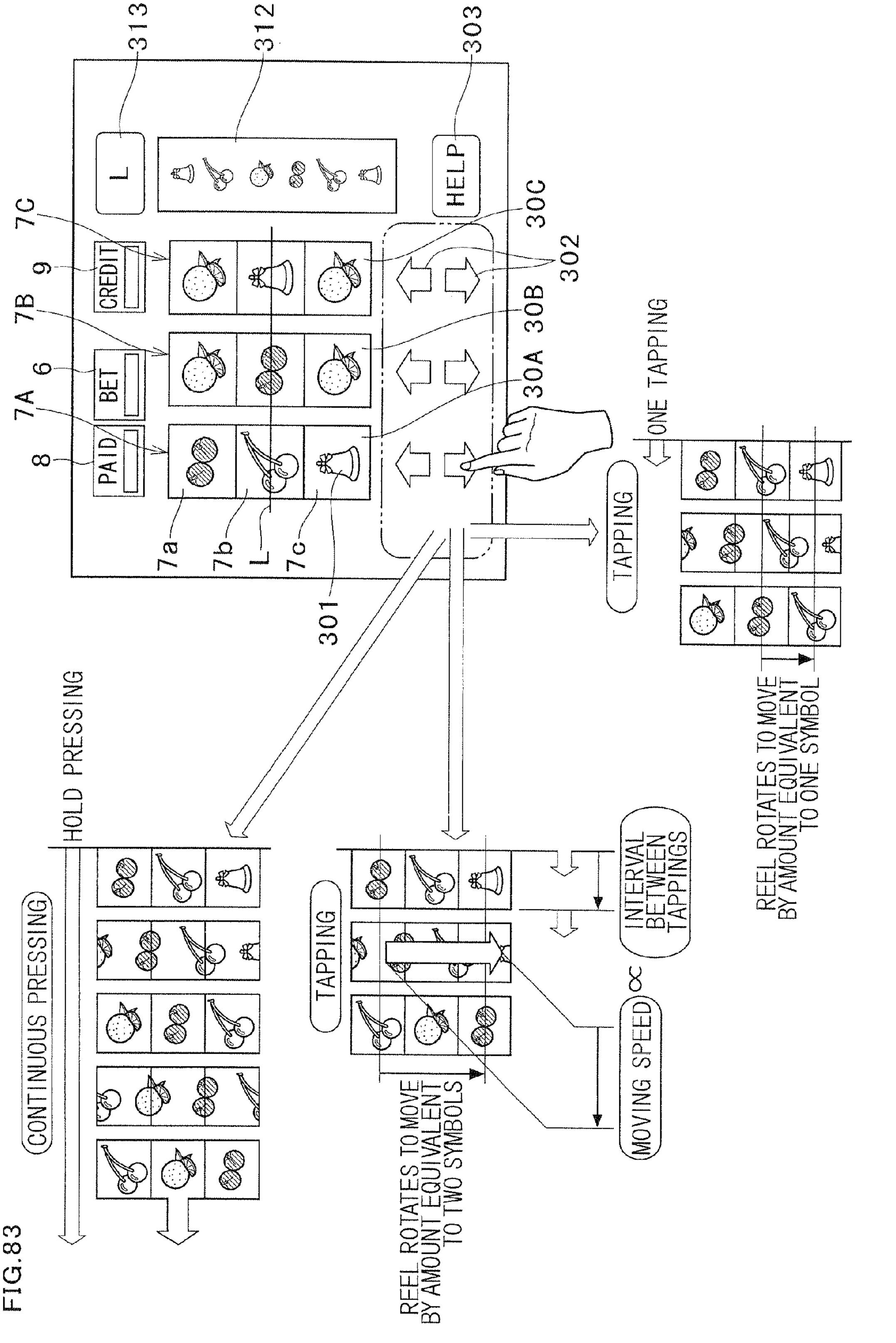
FIG. 83 is an explanatory drawing of a display screen in a reel confirmation mode.

FIG. 83 shows a display mode of the display 4 during a reel confirmation mode. That is, in the lower part of the central liquid crystal panel 5B constituting a part of the display 4, direction symbols 302 are displayed. Each of the direction symbols 302 has an arrow shape. One direction symbol and another paired with the former are symmetrically disposed so that one points out the upward direction and the other, the downward direction. Each pair of upper and lower direction symbols 302 are arranged below each of the display windows 7A to 7C. These pairs of direction symbols 302 function as command buttons to output a command to rotation drive each of the reels 30A to 30C in upward or downward directions.

Thus, when a player presses a direction symbol 302 indicating the upward direction through tapping, a reel moves by an amount equivalent to the number of symbols 301 corresponding to the number of tapping. Specifically when the direction symbol is tapped once, the reel rotates to move by an amount equivalent to one symbol 301. Further, when the direction symbol is tapped twice, the reel rotates to move by an amount equivalent to two symbols 301.

Further, when the direction symbol is tapped more than twice, the reel rotates to move a symbol 301 at rotation speed corresponding to an interval of each tapping. For instance, when an interval between each tapping is short, the reel rotates to move a symbol 301 at high speed. When an interval between each tapping is long, the reel rotates to move a symbol 301 moves at low speed. Note that when tapping is only once, the reel rotates to move a symbol 301 at predetermined rotation speed. Where a moving speed of the symbol 301 when tapping is once is a first moving speed, and a moving speed of the symbol 301 when tapping is more than once is a second moving speed, the first moving speed to the second moving speed may have the following relationship: the first moving speed is set to the minimum speed which is slower than the second moving speed; or the first moving speed is between the minimum and maximum speed of the second moving speed.

On the other hand, when the direction symbol is not pressed by tapping, that is, when the direction symbol is continuously pressed, one out of the reels 30A to 30C rotates while the direction symbol is being pressed. Such intermittent rotation or continuous rotation is in a direction indicated by the direction symbol 302 pressed by the player. In other words, pressing of a direction symbol 302 indicating upward direction causes intermittent or continuous upward rotation of one out of the reels 30A to 30C associated with the direction symbol 302. On the other hand, pressing of a direction symbol 302 indicating a downward direction causes downward rotation of the reels 30A to 30C corresponding to the direction symbol 302.

The reel confirmation mode screen has a symbol display frame and a reel specifying frame 313. The symbol display frame 312 and the reel specifying frame 313 are also provided to the game mode screen and the help mode screen. The reel specifying frame 313 is provided to the upper right corner part of the screen. The symbol display frame 312 has a vertically long rectangular shape, and provided between the reel specifying frame 313 and the help button 303.

The reel specifying frame 313 is a display unit for displaying a code to specify one out of the reels 30A to 30C, which has a symbol column to be displayed in a symbol display frame 312. Specifically, when the symbol column of the left reel 30A is displayed in the symbol display frame 312, a code "L" is displayed in the reel specifying frame 313. When the symbol column of the central reel 30B is displayed in the symbol display frame 312, a code "C" is displayed in the reel specifying frame 313. When the symbol column of the right reel 30C is displayed in the symbol display frame 312, a code "R" is displayed in the reel specifying frame 313.

The symbol display frame 312 displays a video image of the symbols 301 of one out of the reels 30A to 30C corresponding to the code indicated in the reel specifying frame 313. The symbol display frame 312 displays an alignment of the symbols 301 identical to the symbol column on one out of the reels 30A to 30C. Note that the symbol display frame 312 may display all the symbols of the symbol column, or a part of the symbol column.

The symbol display frame 312 successively displays a video image of the symbols 301 on one out of the reels 30A to 30C having disappeared from corresponding one out of the display windows 7A to 7C in sync with the rotation of the reel. Thus, the player is able to confirm a symbol alignment with a video image of virtual symbols 301 successively displayed on the symbol display frame 312 in sync with a rotation of one out of the reels 30A to 30C.

(Mini Game Screen)

FIG. 84 shows a display state of the display 4 during a mini game. In other words, when a mini game starts, a mini game screen 320 is displayed on the entire upper liquid crystal panel 5A. A mini game screen 320 shows a penalty shootout of a soccer game. Specifically, a kicker who kicks a ball and a goal keeper who defends a goal are displayed as an initial screen. After a predetermined standby time, the kicker kicks the ball. When the ball goes into the goal, an image reading "GOAL" and accumulated points are displayed. This allows a player to confirm the points acquired. To the contrary, when the ball does not go into the goal, the screen goes back to an initial screen of a next penalty shootout. Note that there will be no points generated in this case.

When the mini game ends, the display shifts from the mini game screen to an image of simulation reels 30A to 30C. Specifically, an image of all the simulation reels 30A to 30C is displayed. These simulation reels are displayed rotating at a constant speed. Thus, when the simulation reels rotate once, all the symbols of each of the reels 30A to 30C are displayed to be confirmed. The duration of the display time of the simulation reels is limited according to the number of points acquired in the mini game. In other words, the duration of the video image of the simulation reels 30A to 30C is set according to the number of points acquired in the mini game. Thus, the more points acquired, the longer the duration of the display time. As a result, it becomes easier to confirm all the symbols 301.

(Process Operation of the Slot Machine 1: Booting Process)

The following describes a booting process taking place in the slot machine 1. When power is supplied to the slot machine 1, a booting process routine shown in FIG. 85 takes place in the motherboard 240 and the gaming board 250. In the present embodiment, a memory card is inserted into the card slot 253S of the gaming board 250, and the GAL 254 is attached to the IC socket 254S.

First, when a power switch is turned on (power is supplied) in the power unit 245, the motherboard 240 and the gaming board 250 are booted. When the motherboard 240 and the gaming board 250 are booted, different processes are respectively carried out in parallel. That is, in the gaming board 250, the CPU 251 carries out processes of reading a preliminary authentication program stored in the boot ROM 252, and carrying out preliminary authentication by the preliminary authentication program. Note that the preliminary authentication is a process in which the preliminary authentication program is run to confirm and authenticate that authentication program is not modified in advance before importing the program into the motherboard 240 (A1).

Meanwhile, in the motherboard 240, the main CPU 241 runs BIOS stored in the ROM 242. As a result, the compressed data built in the BIOS is loaded into the RAM 243 (B1). Then, the main CPU 241 runs the BIOS loaded into the RAM 243, and diagnoses and initializes various kinds of peripheral devices (B2).

Afterwards, the main CPU 241 reads out, via PCI bus, the authentication program stored in the ROM 255, and stores the read out authentication program to the RAM 243 (B3). During this step, the main CPU 241 drives a checksum through an ADDSUM method (a standard check function) which is adopted in a standard BIOS. Thus, it is confirmed whether or not the authentication program is stored in the RAM 243 without an error.

The main CPU 241 then confirms a component connected to the IDE bus. Then, the main CPU 241 accesses to the memory card 253 inserted into the card slot 253S via the IDE bus, to read out the game program and the game system program from the memory card 253. In this case, data constituting the game program and the game system program are read in units of four bytes. Then, the main CPU 241 confirms and authenticates, according to the authentication program stored in the RAM 243, that the read game program and the game system program are not modified (B4).

When the authentication process ends properly, the main CPU 241 writes and stores the authenticated game program and the game system program in the RAM 243 (B5).

The main CPU 241 then accesses to the GAL 254 attached to the IC socket 254S to read out payout rate setting data from the GAL 254, and stores the data in the RAM 243 (B6). Afterwards, the main CPU 241 reads out the country identification information stored in the ROM 255 of the gaming board 250, and stores the information to the RAM 243 (B7).

With a result of the above authentication process, the main CPU 241 determines whether the program or data is proper (B8). When the program or data is not proper (B8, NO), an error signal including ID information to specify a slot machine 1 is outputted to a centralized control device (not shown). The centralized control device specifies a slot machine 1 in an error state based on the error signal. The centralized control device then instructs a staff standing by near the slot machine 1 to deal with the error, and stores an error history information containing a time and date and a place when/where the error has occurred, or the like (B18). Then, the error state is informed in the form of an audio output from the speaker 23 of the slot machine 1, and in the form of light emitted from the light emitting section 20. Afterwards, the routine in the motherboard 240 ends.

On the other hand, when the program or data is proper (B8, YES), operations of sensors disposed to the slot machine 1 are checked successively (B9). Then, whether or not all the sensors operate properly is determined (B10). When an error is detected in at lest one sensor (B10, NO), the above mentioned B18 and B19 are carried out, and the routine ends thereafter.

On the other hand, when all the sensors operate properly (B10, Yes), operations of all drive mechanisms are checked successively (B11). Then, it is determined whether or not all the drive mechanisms operate properly (B12). When an error is detected in at least one drive mechanisms (B12, NO), the above mentioned B18 and B19 are carried out, and the routine ends thereafter. On the other hand, when all the drive mechanisms operate properly (B12, Yes), operations of all illuminations are checked successively (B13). Then, it is determined whether or not all the illuminations operate properly (B14). When an error is detected in at least one illumination (B14, No), the above mentioned B18 and B19 are carried out, and the routine ends thereafter.

On the other hand, when all the illuminations operate properly (B14, Yes), a boot signal indicating that all the illuminations have been booted properly is outputted to the centralized control device (not shown) or the like (B15). Afterwards, a basic game process is carried out (B16), and this routine ends. The following describes the basic game process in detail.

(Basic Game Process)

Figure 86A:
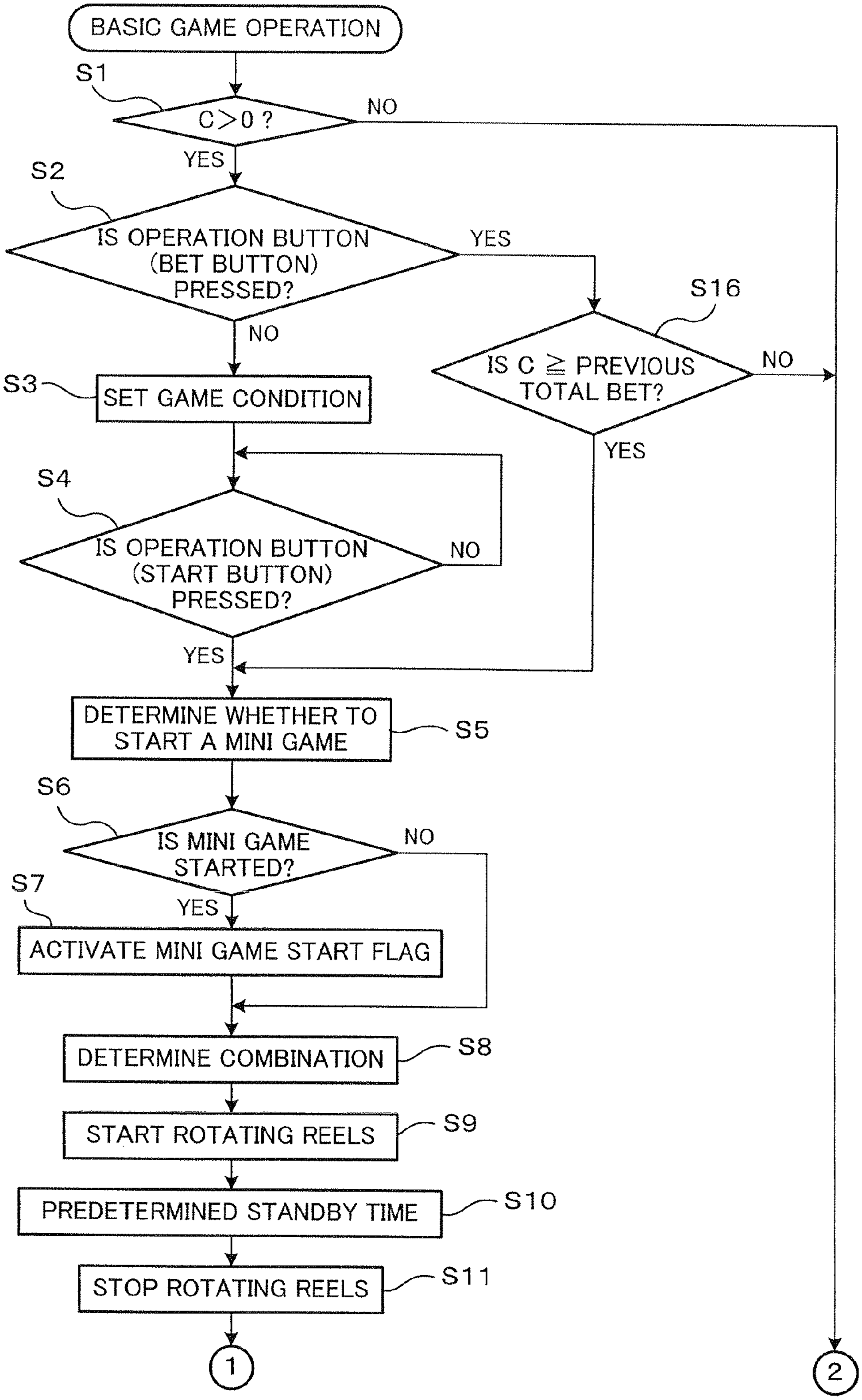
FIG. 86A is a flow chart showing part of a basic game process.
Figure 86B:
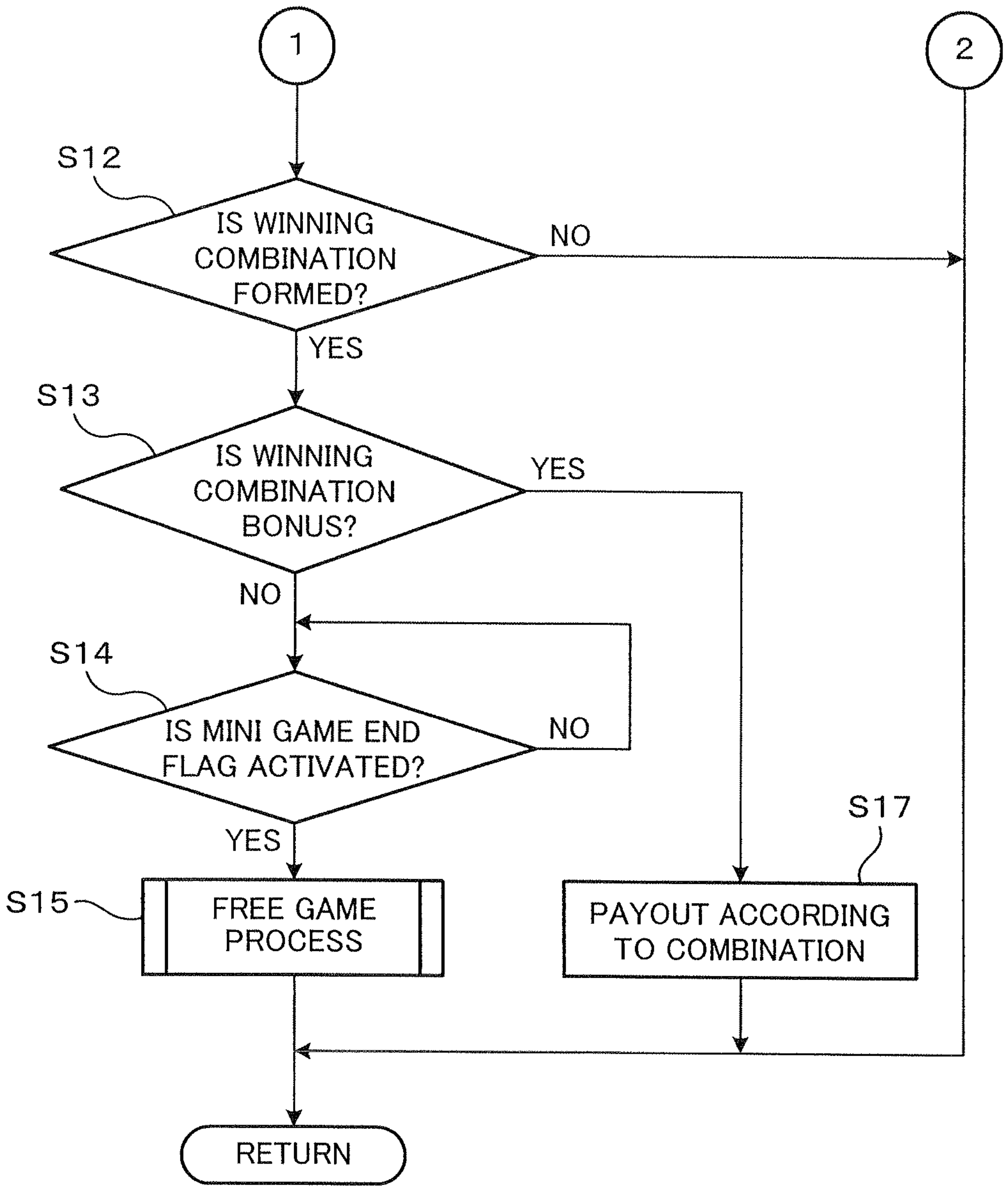
FIG. 86B is a flow chart showing another part of a basic game process.

FIGS. 86A and 86B are flow charts showing a process carried out by the main CPU 241 of the slot machine 1 during a basic game of the slot machine 1. A unit game includes a routine shown in FIGS. 86A and 86B. Note that the slot machine 1 is booted in advance, and a variable used in the CPU 241 on the other side, i.e. in the game controller 1 side, is initialized at a predetermined value. Accordingly, the slot machine 1 is constantly operated.

First, it is determined if there is a remaining credit, i.e., the remaining number of coins having been inserted by the player (S1). Specifically, a credit C stored in the RAM 243 is read out, and a process according to the read credit C is carried out. When the credit C is zero (S1, NO), the routine ends without any operation of a process since a game cannot be started. Meanwhile, when the credit C is equal to or more than one (S1, Yes), it is determined that there is at least one credit remaining and the process moves to S2.

In S2, it is determined whether or not the operation button 11 (bet button) is pressed (S2). When the operation button 11 (bet button) is not pressed for a predetermined time (S2, NO), a game condition is set (S3). Specifically, the number of coins to be bet on the payline L in the game is determined according to the operation of the operation button 11 (bet button). During this operation, an operation signal sent upon an operation of the operation button 11 is received. According to the number of times that the operation signal is received, the bet on the payline L is stored in a predetermined memory area of the RAM 243. A credit C stored in a predetermined memory area of the RAM 243 is then read out. A total bet where the above bet is added is subtracted from the read credit C. The resulting number is stored in the predetermined memory area of the RAM 243.

Afterwards, it is determined whether or not an operation button 11 (start button) is pressed (S4). If the operation button 11 (start button) is not pressed (S4, NO), S4 is repeated until the bet button 11 is pressed. When the operation button 11 (start button) is pressed (S4, YES), it is determined whether or not to start a mini game (S5).

On the other hand, when the operation button 11 (bet button) is pressed in S2 (S2, YES), it is determined whether or not a value of the credit C is equal to or more than the value of the total bet in the previous game. In other words, it is determined whether or not it is possible to start a game with the operation button 11 (bet button) being pressed. Specifically, pressing of the operation button 11 (bet button) causes reading out of a bet on the payline L in the previous game and a credit C written in a predetermined memory area of the RAM 243. According to a relation of the read credit C to the bet, a process branches as follows depending on whether the value of the credit C is equal to or more than the value of total bet in the previous game. When it is determined that the value of the credit C is less than the value of the total bet of the previous game (S16, NO), the routine ends without any operation of a process since a game cannot be started.

Meanwhile, when it is determined that the value of the credit C is equal to or more than the value of the total bet of the previous game (S16, YES), the value of the total bet of the previous game is subtracted from the value of the credit C. Then, the resulting value is stored in a predetermined memory area of the RAM 243. Afterwards, it is determined whether or not to start a mini game (S5).

When it is determined to start a mini game (S6, YES), a mini game start flag is activated (S7). Specifically, data showing that the game start flag activated is written into a storage area of a mini game start flag of the RAM 243. Meanwhile, when it is determined not to start a mini game (S6, NO), a combination determination process is carried out (S8).

In the combination determination process, a combination of symbols to be stopped on the payline L is determined first. Specifically, a command to generate a random number is sent to the random number generation circuit. Then, a random number within a predetermined range which is generated by the random number generation circuit, is sampled. The sampled random number is stored in a predetermined memory area of the RAM 243. Although a random number is generated in the random number generation circuit disposed outside the main CPU 241 in the present embodiment, a random number may be generated through a calculation by the main CPU 241, without the random number generating circuit.

Afterwards, a winning combination table for awarding a payout and a random number table stored in the ROM 242 are read out. Those read winning combination table and random number table are stored in a predetermined memory area of the RAM 243. Still-displaying of symbols are controlled for each reel in accordance with the random number table.

Then, the random number table and the winning combination table stored in the predetermined memory area of the RAM 243 are read out. Then, the random number written into the predetermined memory area of the RAM 243 is used as a parameter to refer to the random number table. A combination of symbols to be stopped on the payline L is then determined.

When a winning combination is determined, the winning combination table is stored into a predetermined memory area of the RAM 243. The random number and the winning combination table written in the predetermined memory area of the RAM 243 are read. In accordance with the random number and the winning combination table, a combination of symbols to be stopped and still-displayed are determined. During this process, the main CPU 241 reads out a symbol arrangement table stored from the ROM 242 and stores the table in a predetermined memory area of the RAM 243. The table is then used as a reference. The determined stop symbol data is stored in a predetermined memory area of the RAM 243. Alternatively, symbols to be stopped may be determined for each reel by using the random number table.

When a combination of symbols to be stopped on the payline L is determined, it is determined whether or not the combination is a winning combination. When the combination of symbols to be stopped on the payline L is a winning combination, a flag which indicates that a payout corresponding to the type of the winning combination will be awarded, is activated to generate the payout corresponding to the combination of symbols on the payline L forming the determined winning combination. The activated flag indicating that a payout will be awarded, is stored in a predetermined memory area of the RAM 243. To the contrary, when a combination of symbols to be stopped on the payline L is another combination, that is, a losing combination, the flag indicating that a payout will be awarded is not activated.

After the above combination determination process is carried out, reels 30A to 30C rotate so as to move symbols 301 in the display windows 7A to 7C (S9). Then, the rotation continues for a predetermined time (S10). Then, the rotation of reels 30A to 30C automatically stops (S11).

Then, it is determined whether or not a winning combination is formed through the combination determination process in S8 (S12). Specifically, this is done based on a status of the flag stored in the predetermined memory area of the RAM 243, which flag indicates a prize according to a combination of symbols on the payline L is awarded. When the flag is not activated (S12, NO), it is determined that a winning combination is not formed, and the routine ends.

Meanwhile, when the flag is activated (S12, YES), it is determined whether or not the winning combination formed in the combination determination process in S8 includes a "BLUE 7." Specifically, when the winning combination includes a "BLUE 7" (S13, YES), the routine ends after the number of coins are paid out in accordance to the winning combination (S17).

Meanwhile, when the winning combination does not include a "BLUE 7" (S13, NO), it is determined whether or not a mini game end flag is activated (S14). Specifically, it is determined whether or not data showing that the mini game end flag is activated is written into a mini game end flag area of the RAM 243. S14 is repeated when the mini game end flag is not activated (S14, NO). When the mini game end flag is activated (S14, YES), a free game process is carried out (S15). Then, the routine ends.

(Free Game Process)

Figure 87:
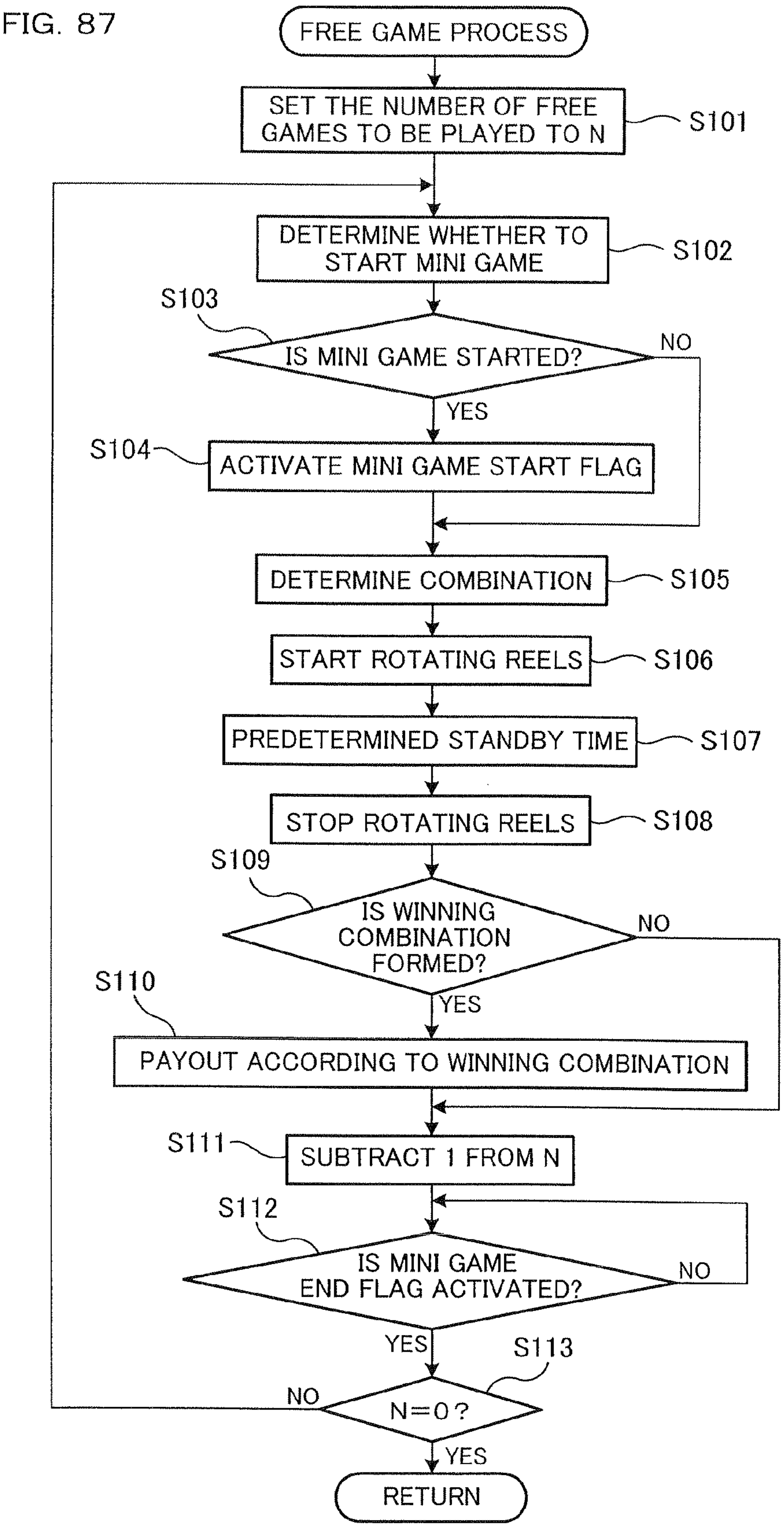
FIG. 87 is a flow chart showing a free game process.

The following describes a free game process with reference to FIG. 87.

First, N denotes the number of free games (S101). The number of free games is determined according to accumulated points acquired in a mini game of a basic game.

Then, whether or not to start a mini game is determined (S102). When a mini game is determined to start (S103, YES), a mini game start flag is activated (S104). Specifically, data indicating that the mini game start flag is activated is written into a storage area of the RAM 243 for storing the mini game start flag. Afterwards, the process moves to S105.

Meanwhile, when a mini game is determined not to start (S103, NO), the process immediately moves to S105. Thus, a combination determination process same as above is carried out (S105). A difference in this combination determination process is that the referred random number table is a free game random number table (not shown). Then, reels 30A to 30C start to rotate (S106). After a predetermined standby time (S107), each reels 30A to 30C stops rotating (S108).

Then, whether or not a winning combination is formed is determined (S109). When a winning combination is not formed (S109, NO), the process moves to S111. Meanwhile, when a winning combination is formed (S109, YES), a game medium according to the winning combination is paid out (S110). Specifically, the number of coins to be paid out for the winning combination is calculated, referring to the payout control table of FIG. 80. A credit stored in a predetermined memory area of the RAM 243 is then read out. The payout value calculated above is added to the credit. The sum is stored in a predetermined memory area of the RAM 243, and the stored value is displayed on the credit display unit 9.

In S111, 1 is subtracted from N (S111). Then, whether or not a mini game end flag is activated is determined (S112). Specifically, it is determined whether or not data showing that the mini game end flag is activated is written into a mini game end flag area of the RAM 243. S112 is repeated when the mini game end flag is not activated (S112, NO).

When the mini game end flag is activated (S112, YES), whether N is 0 is determined (S113). When N is not 0 (S113, NO), the operation is carried out again from S102. On the other hand, when N is 0 (S113, YES), the routine ends.

(Mini Game Process)

Figure 88:
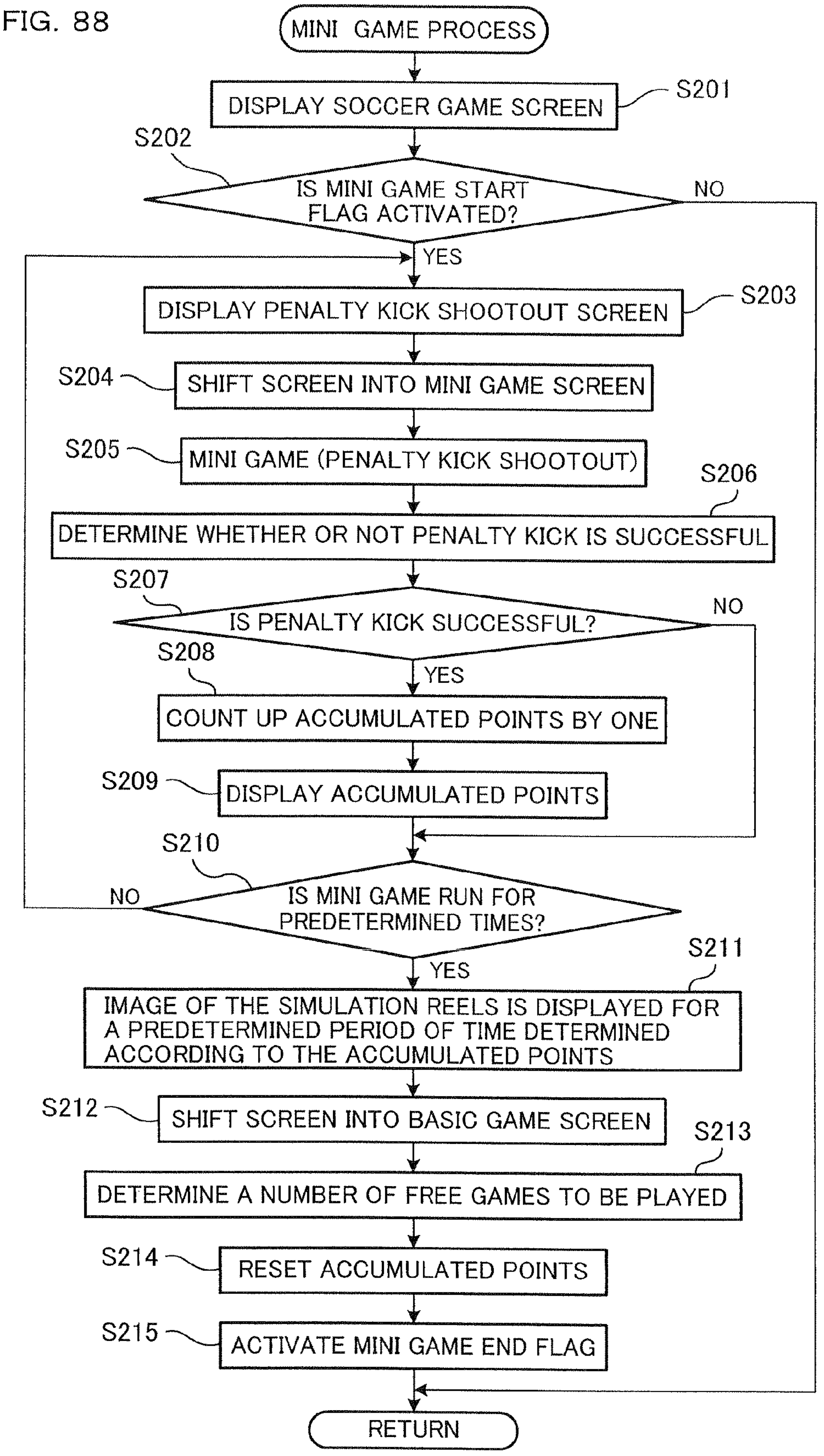
FIG. 88 is flow chart showing a mini game process.

The following describes a mini game process with reference to FIG. 88.

First, a soccer game screen, which is an effect screen displayed when a mini game is not run, is displayed on the upper liquid crystal panel 5A (S201). Then, whether or not the mini game start flag is activated is determined. Specifically, it is determined whether data showing that the mini game start flag is activated is written into the game start flag area or the RAM 243 (S202).

When the mini game start flag is not activated (S202, NO), the routine ends. Meanwhile, when the mini game start flag is activated (S202, YES), screens on the upper liquid crystal panel 5A switches, as shown in FIG. 74, from a soccer game screen to a penalty kick standby screen which is an effect screen displayed during a mini game. Then, with a mini game screen 320 displayed on the central liquid crystal panel 5B, the display windows 7A to 7C and a mini game screen 320 are displayed one atop the other (S204).

Then, a penalty kick shootout as a mini game is started (S205). That is, an image of a goal keeper and a kicker facing each other is displayed, and a cheering sound of audience members is outputted. Then, when the kicker places a ball and intends to kick it, whether or not a penalty kick is successful, i.e., whether or not the mini game is successful, is determined (S206). Specifically, a random number is used to determine whether or not the mini game is successful.

Then, it is determined whether or not a penalty kick shootout (mini game) is successful (S207). When the penalty kick shootout is successful (S207, YES), the total number of accumulated points is counted up by one (S208), and the total number of accumulated points is displayed (S209). Then, it is determined whether or not the mini game is run a predetermined number of times (S210). Meanwhile, when the penalty kick shootout is unsuccessful (S207, NO), the total number of accumulated points is not counted up, and it is determined whether or not the mini game is played for predetermined number of times (S210).

When the mini game is not played for predetermined number of times (S210, NO), the process is carried out again from S203, and a next penalty shootout starts. For example, when a penalty shootout is repeated for ten times or the like (S210, YES), an image of the simulation reels 30A to 30C is displayed as shown in FIG. 84. An image of the simulation reels is displayed for a predetermined period of time determined according to the accumulated points (S211). Afterwards, the screen switches to a basic game screen (S212). After determining the number of times the free game is run (S212), the accumulated points are reset (S214). Then, after setting the mini game end flag active (S215), this routine ends.

(Help Process)

Figure 89:
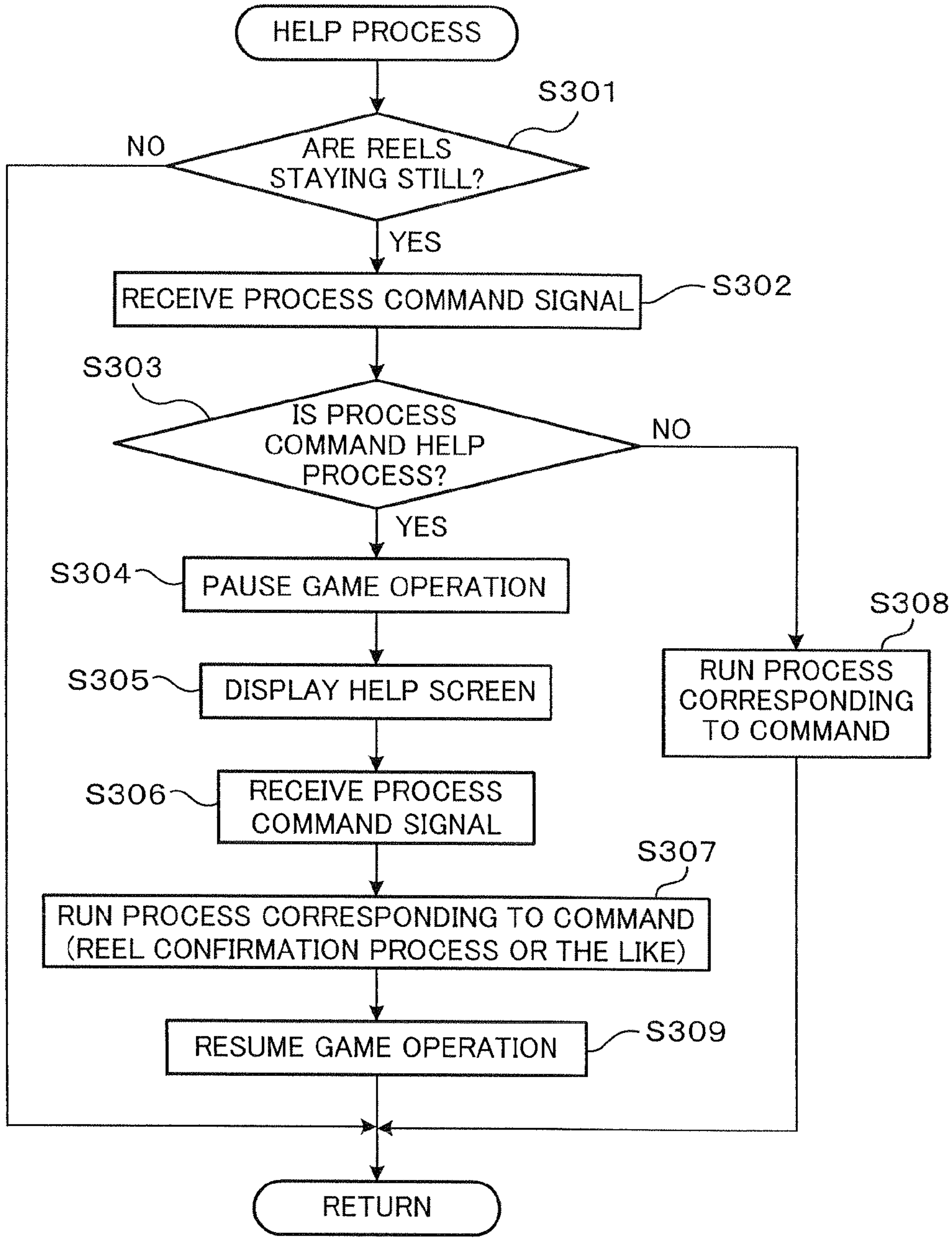
FIG. 89 is a flow chart of a help process.

The slot machine 1 is capable of carrying out a help process shown in FIG. 89 aside from a basic game process and a free game process. Specifically, it is determined whether or not the reels 30A to 30C are staying still (S301). When the reels 30A to 30C are not staying still due to an operation of a basic game or the like (S301, NO), the routine ends. In short, a help screen is not displayed. Meanwhile, when the reels 30A to 30C are staying still (S301, YES), an input signal outputted when a player presses the touch panel 69 shown in FIG. 77, the outputted signal is received as a process command signal (S302). Then, it is determined whether or not the process command signal is related to a help process (S303). When it is not related to a help process (S303, NO), a process corresponding to the command is carried out (S308). Afterwards, this routine ends.

Meanwhile, when the command is related to a help process (S303, YES), after a game process such as a basic game or the like is paused (S304), the display changes into a help screen. In other words, the help button frame 310 is displayed on the central liquid crystal panel 5B, and various kinds of help item buttons including a reel confirmation button 304, a rule button 305 and a payout button 306 are displayed in the help button frame 310 (S305).

Then, reception of a next command signal is started (S306). For example, when a reel confirmation button 304 is pressed, an input signal is received as a process command signal starting a reel confirmation process (S307). After a game process is resumed (S309), this routine ends.

(Reel Confirmation Process)

Figure 90:
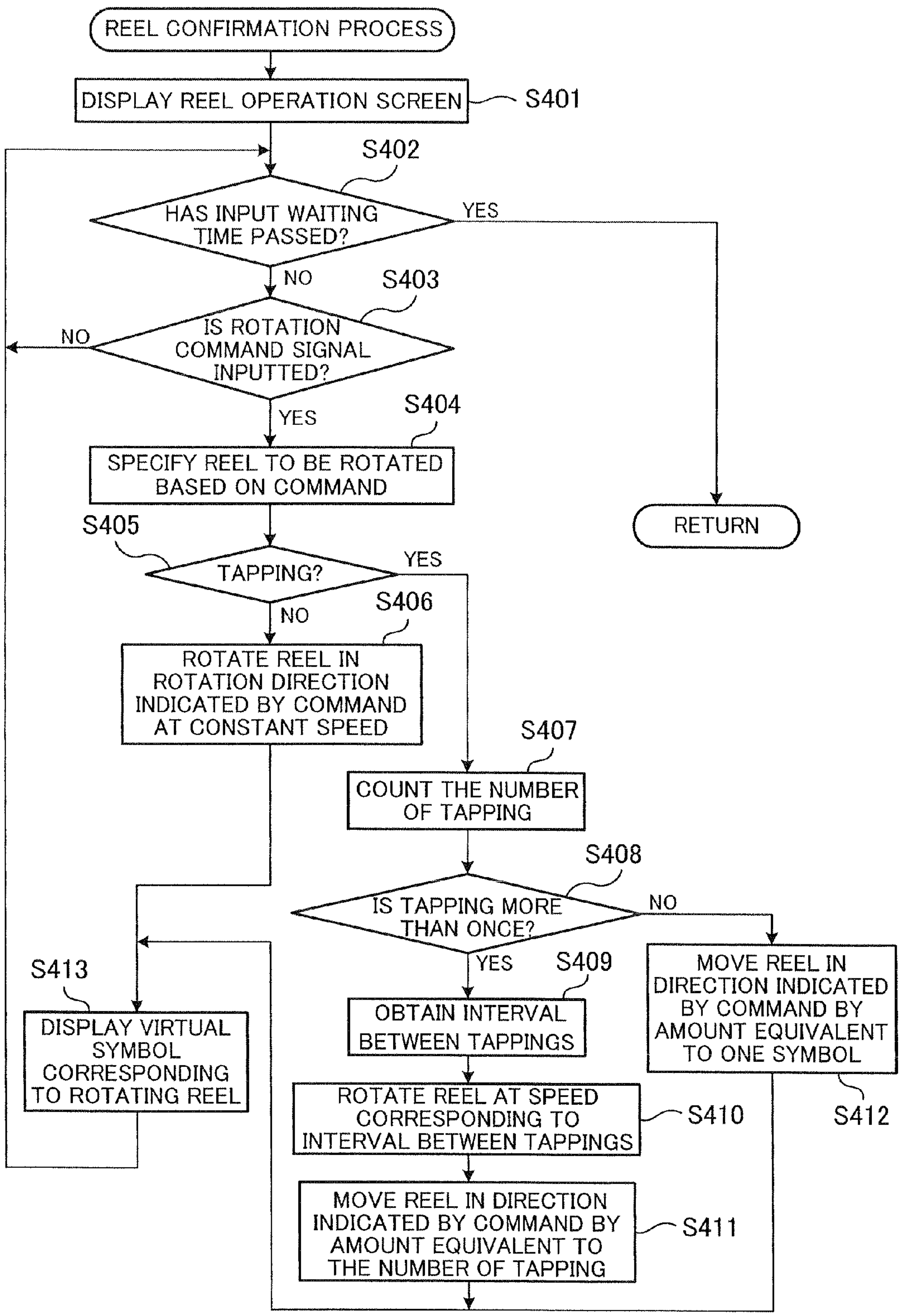
FIG. 90 is a flow chart of a reel confirmation process.

As shown in FIG. 90, when a reel process is carried out, a display switches to a reel operation screen shown in FIG. 83. In other words, direction symbols pointing upward or downward directions assigned to each of the reels 30A to 30C are displayed (S401).

Then, it is determined whether or not an input waiting time has passed (S402). When the input waiting time has passed (S402, YES), this routine ends. During the input waiting time (S402, NO), whether or not a rotation command signal is inputted is determined. Specifically, an input signal outputted in response to a press operation of the touch panel 69, is received. Then, based on press position data and display position data of the direction symbol 302 in the input signal, it is determined whether or not the signal inputted is a rotation command signal (S403). When the signal inputted is not a rotation command signal (S403, NO), S402 is repeated. Meanwhile, when the signal inputted is a rotation command signal (S403, YES), one out of the reels 30A to 30C positioned above the pressed position are specified as rotation target(s), based on a command included in the rotation command signal, i.e., pressed position data (S404)

Then, it is determined whether or not the rotation command signal is inputted through tapping (S405). When the rotation command signal is not inputted through tapping, the one specified reel (30A to 30C) rotates at a constant speed in a direction indicated by the direction symbol 302 (S406). When the one reel (30A to 30C) rotates, virtual symbols of the symbols 301 of the rotating one reel (30A to 30C) are displayed on the symbol display frame 312. Thus, a player is able to confirm symbols with the actually rotating one out of the reels 30A to 30C, as well as with the virtual symbols 301 displayed on the symbol display frame 312.

On the other hand, when the rotation command signal is inputted through tapping (S405, YES), the number of tapping is counted (S407). Then, it is determined whether or not the number of tapping was more than once (S408). When the number of tapping is once (S408, NO), a symbol 301 is moved by an amount equivalent to one symbol (S412). When one out of the reels 30A to 30C rotates, virtual symbols of the symbols 301 of the rotating one reel (30A to 30C) are displayed on the symbol display frame 312. Afterwards, S402 is repeated.

Meanwhile, when the number of tapping is more than once (S408, YES), an interval between each tapping is measured (S409). Then, one out of the reels 30A to 30C rotates at rotation speed corresponding to the interval between each tapping (S410). Then, the one reel (30A to 30C) rotates in a rotation direction indicated by the command by an amount equivalent to the number of symbols corresponding to the number of tapping (S411). Then, after virtual symbols of the symbols 301 on the rotating one reel (30A to 30C) are displayed in the symbol display frame 312 (S413), S402 is repeated.

Although the reels 30A to 30C rotate at a constant speed when the direction symbols 302 are pressed in the present embodiment, the present invention however is not limited to this. In other words, the reels 30A to 30C may rotate at a speed corresponding to the pressed area of the direction symbols 302 when the direction symbols 302 are pressed. In this case, when a player presses the touch panel 69 with a strong pressing force, the reels 30A to 30C rotate at a high speed. On the other hand, when a player presses the touch panel 69 with a small pressing force, the reels 30A to 30C rotate at a constant speed. Thus, a player is capable of changing the rotation speed of the reels 30A to 30C.

The detailed description of the present invention provided hereinabove mainly focused on characteristics thereof for the purpose of easier understanding; however, the scope of the present invention shall be construed as broadly as possible, encompassing various forms of other possible embodiments, and therefore the present invention shall not be limited to the above description. Further, the terms and phraseology used in the present specification are adopted solely to provide specific illustration of the present invention, and in no case should the scope of the present invention be limited by such terms and phraseology. Further, it will be obvious for those skilled in the art that the other structures, systems, methods or the like are possible, within the spirit of the invention described in the present specification. The description of claims therefore shall encompass structures equivalent to the present invention, unless otherwise such structures are regarded as to depart from the spirit and scope of the present invention. Further, the abstract is provided to allow, through a simple investigation, quick analysis of the technical features and essences of the present invention by an intellectual property office, a general public institution, or one skilled in the art who is not fully familiarized with patent and legal or professional terminology. It is therefore not an intention of the abstract to limit the scope of the present invention which shall be construed on the basis of the description of the claims. To fully understand the object and effects of the present invention, it is strongly encouraged to sufficiently refer to disclosures of documents already made available.

The detailed description of the present invention provided hereinabove includes a process executed on a computer or computer network. The above descriptions and expressions are provided to allow the one skilled in the art to most efficiently understand the present invention. A process carried out in or by respective steps yielding one result or blocks with a predetermined processing function described in the present specification shall be understood as a process with no self-contradiction. Further, the electrical or magnetic signal is transmitted/received and written in the respective steps or blocks. It should be noted that such a signal is expressed in the form of bit, value, symbol, text, terms, number, or the like solely for the sake of convenience. Although the present specification occasionally personifies the processes carried out in the steps or blocks, these processes are essentially executed by various devices. Further, the other structures necessary for the steps or blocks are obvious from the above descriptions.

What is claimed is:

1. A gaming machine comprising:

a game requiring a player's bet;

a reel used in the game and mechanically driven to rotate;

a plurality of symbols on the reel;

an input device that is disposed to visibly cover at least the reel and receives an input through a press operation by the player;

a display capable of generating a video image; and a controller that is programmed to operate:

(a1) to rotate the reel based on an input position in the input device, wherein the reel is mechanically driven to rotate and whose rotation direction is switchable, and wherein the controller is further programmed to carry out the steps of:

(d1) displaying a video image of a direction symbol indicating a rotation direction of the reel;

(d2) specifying an input position in the input device;

(d3) when the input position corresponds to a display position of the direction symbol, determining that a rotation command related to a reel is inputted; and in the step (a1), when the rotation command is inputted through tapping, stopping the reel after rotating the reel by an amount equivalent to one symbol;

when the rotation command is inputted through continuous pressing, rotating the reel while the rotation command is being inputted; and successively displaying, on the display, a video image of at least one of the symbols on the reel in sync with the rotation of the reel.

2. A gaming machine comprising:

a game requiring a player's bet;

a reel used in the game and mechanically driven to rotate;

a plurality of symbols on the reel;

an input device that is disposed to visibly cover at least the reel and receives an input through a press operation by the player;

a display capable of generating a video image; and a controller that is programmed to operate:

(a1) to rotate the reel based on an input position in the input device, wherein the reel is mechanically driven to rotate and whose rotation direction is switchable, and wherein the controller is further programmed to carry out the steps of:

(e1) displaying a video image of a direction symbol indicating a rotation direction of the reel;

(e2) specifying an input position in the input device;

(e3) when the input position corresponds to a display position of the direction symbol, determining that a rotation command related to a reel is inputted;

(e4) when the rotation command is inputted through tapping, counting the number of tapping, and in the step (a1), stopping the reel after rotating the reel by an amount equivalent to the number of symbols corresponding to the number of times input has been conducted;

when the rotation command is inputted through continuous pressing, rotating the reel while the rotation command is being inputted; and successively displaying, on the display, a video image of at least one of the symbols on the reel in sync with the rotation of the reel.

3. A gaming machine comprising:

a game requiring a player's bet;

a reel used in the game and mechanically driven to rotate;

a plurality of symbols on the reel;

an input device that is disposed to visibly cover at least the reel and receives an input through a press operation by the player; and a controller that is programmed to operate:

(a1) to rotate the reel based on an input position in the input device, wherein the controller is further programmed to carry out the steps of:

(b1) receiving an input inputted through the input device;

(b2) when the input is a rotation command related to the reel, determining whether the rotation command is inputted through tapping or continuous pressing;

(b3) when the rotation command is inputted through continuous pressing, rotating the reel while the rotation command is being inputted;

(b4) when the rotation command is inputted through tapping, counting the number of rotation commands inputted, and in the step (a1), rotating the reel by an amount equivalent to the number of symbols corresponding to the number of rotation commands inputted; and when the rotation command is inputted more than once, rotating the reel at rotation speed corresponding to an interval between rotation command inputs.

4. A gaming machine comprising:

a game requiring a player's bet;

a reel used in the game and mechanically driven to rotate;

a plurality of symbols on the reel;

an input device that is disposed to visibly cover at least the reel and receives an input through a press operation by the player;

a display capable of generating a video image; and a controller that is programmed to operate:

(a1) to rotate the reel based on an input position in the input device, wherein the reel is mechanically driven to rotate and whose rotation direction is switchable, and wherein the controller is further programmed to carry out the steps of;

(c1) displaying a video image of a direction symbol indicating a rotation direction of the reel;

(c2) specifying an input position in the input device;

(c3) when the input position corresponds to a display position of the direction symbol, determining that a rotation command related to a reel is inputted and counting the number of rotation commands inputted, and in the step (a1), stopping the reel after rotating the reel in a direction indicated by the direction symbol by an amount equivalent to the number of symbols corresponding to the number of rotation commands inputted;

when the rotation command is inputted more than once, rotating the reel at rotation speed corresponding to an interval between rotation command inputs.

5. The gaming machine according to claim 4, wherein the controller is further programmed to carry out the step of:

(c6) successively displaying, on the display, a video image of at least one of the symbols on the reel in sync with the rotation of the reel.

6. A gaming machine comprising:

a game requiring a player's bet;

a reel used in the game and mechanically driven to rotate;

a plurality of symbols on the reel;

an input device that is disposed to visibly cover at least the reel and receives an input through a press operation by the player;

a display capable of generating a video image; and a controller that is programmed to operate:

(a1) to rotate the reel based on an input position in the input device, wherein the reel is mechanically driven to rotate and whose rotation direction is switchable, and wherein the controller is further programmed to carry out the steps of:

(d1) displaying a video image of a direction symbol indicating a rotation direction of the reel;

(d2) specifying an input position in the input device;

(d3) when the input position corresponds to a display position of the direction symbol, determining that a rotation command related to the reel is inputted;

(d4) when the rotation command is inputted through tapping, counting the number of rotation commands inputted, and in the step (a1), rotating the reel by an amount equivalent to the number of symbols corresponding to the number of rotation commands inputted;

when the rotation command is inputted more than once, rotating the reel at rotation speed corresponding to an interval between rotation command inputs;

when the rotation command is inputted through continuous pressing, rotating the reel while the rotation command is being inputted;

(d5) successively displaying, on the display, a video image of at least one of the symbols on the reel in sync with the rotation of the reel.

* * * * *